(12) United States Patent
Golding et al.

(10) Patent No.: US 9,556,314 B2
(45) Date of Patent: Jan. 31, 2017

(54) POLYPHOSPHAZENES

(71) Applicant: THE SECRETARY OF STATE FOR DEFENCE, London (GB)

(72) Inventors: Peter Golding, Reading (GB); David Mearns Duncan, Shrivenham (GB); Anthony John Bellamy, Shrivenham (GB); Alessandro Enzo Contini, Shrivenham (GB); Eleftheria Dossi, Shrivenham (GB)

(73) Assignee: The Secretary of State for Defence, London (GB)

( * ) Notice: Subject to any disclaimer, the term of this patent is extended or adjusted under 35 U.S.C. 154(b) by 0 days.

(21) Appl. No.: 14/408,160

(22) PCT Filed: Jun. 20, 2013

(86) PCT No.: PCT/GB2013/000276
§ 371 (c)(1),
(2) Date: Dec. 15, 2014

(87) PCT Pub. No.: WO2013/190260
PCT Pub. Date: Dec. 27, 2013

(65) Prior Publication Data
US 2015/0141540 A1      May 21, 2015

(30) Foreign Application Priority Data
Jun. 21, 2012   (GB) .................................. 1210980.7

(51) Int. Cl.
*C08G 79/02*   (2016.01)
*B01J 19/10*   (2006.01)
(Continued)

(52) U.S. Cl.
CPC .............. *C08G 79/025* (2013.01); *B01J 19/10* (2013.01); *C06B 45/105* (2013.01); *C06C 9/00* (2013.01);
(Continued)

(58) Field of Classification Search
CPC ...................................................... C08G 79/02
(Continued)

(56) References Cited

U.S. PATENT DOCUMENTS

| | | | |
|---|---|---|---|
| 3,844,983 | A | 10/1974 | Reynard et al. |
| 3,948,820 | A | 4/1976 | Reynard et al. |

(Continued)

FOREIGN PATENT DOCUMENTS

| | | |
|---|---|---|
| EP | 0014865 A1 | 9/1980 |
| GB | 1597698 | 9/1981 |
| WO | 2006032882 A1 | 3/2006 |

OTHER PUBLICATIONS

Finar, I. L., "Organic Chemistry, vol. 1, Fifth Edition," 1967, pp. 830-861, Longmans, Green and Co. Ltd., London.
(Continued)

*Primary Examiner* — Duc Truong
(74) *Attorney, Agent, or Firm* — Dean W. Russell; Elena S. Polovnikova; Kilpatrick Townsend & Stockton LLP

(57) ABSTRACT

Substituted poly(phosphazene) compounds comprising a combination of units having one or more of the structures (i) to (iii) wherein: the combination comprises $R_1$ and $R_2$; each $R_1$ is independently an optionally substituted alkyl- or alkyl ether-based side chain containing an isocyanate-reactive moiety, an epoxide-reactive moiety, an amine-reactive moiety, a supramolecular noncovalent bonding moiety, or combinations thereof; and each $R_2$ is independently an optionally substituted alkyl- or alkyl ether-based side chain containing nitro, nitramine, nitrate ester, azide, an ammonium com-
(Continued)

pound moiety with energetic counter-ion, or combinations thereof. Methods of making the compounds are also described.

14 Claims, 13 Drawing Sheets

(51) Int. Cl.
      *C06B 45/10*        (2006.01)
      *C08G 59/40*        (2006.01)
      *C08L 85/02*        (2006.01)
      *C06C 9/00*        (2006.01)
      *F42B 3/113*        (2006.01)

(52) U.S. Cl.
      CPC ........... *C08G 59/4071* (2013.01); *C08L 85/02* (2013.01); *F42B 3/113* (2013.01); *B01J 2219/08* (2013.01)

(58) Field of Classification Search
      USPC ......... 528/398; 521/168, 180, 189; 525/538; 422/127
      See application file for complete search history.

(56) References Cited

U.S. PATENT DOCUMENTS

| | | | |
|---|---|---|---|
| 4,242,499 A | 12/1980 | Allcock et al. | |
| 4,412,066 A | 10/1983 | Allcock et al. | |
| 8,268,959 B2 * | 9/2012 | Golding | C06B 43/00 528/398 |
| 2015/0144017 A1 | 5/2015 | Golding et al. | |

OTHER PUBLICATIONS

Ahmad, S. Rafi, et al., "Studies into Laser Ignition of Confined Pyrotechnics," Propellants Explos., Pyrotech., 2008, vol. 33, pp. 396-402, Wiley-VCH Verlag GmbH & Co. KGaA, Weinheim, Germany.

Bala, Kason, et al., "Non-Isocyanate Curable, Energetic (Azido) Polyphosphazenes," 41st International Conference of Fraunhofer ICT, Karlsruhe, Germany, Jun. 29-Jul. 2, 2010, 12 pages.

Allcock, Harry R. et al., "Second-Order Nonlinear Optical Poly(organophosphazenes): Synthesis and Nonlinear Optical Characterization," Macromolecules, 1991, pp. 1000-1010, vol. 24, American Chemical Society.

International Patent Application No. PCT/GB2013/000276, Partial International Search Report mailed Apr. 14, 2014, 6 pages.

International Patent Application No. PCT/GB2013/000276, International Search Report mailed Jun. 17, 2014, 6 pages.

International Patent Application No. PCT/GB2013/000276, International Preliminary Report on Patentability mailed Dec. 31, 2014, 11 pages.

U.S. Appl. No. 14/408,184, "Non-Final Office Action", May 19, 2016, 5 pages.

U.S. Appl. No. 14/408,184, "Restriction Requirement", Dec. 18, 2015, 5 pages.

PCT/GB2013/000275, "International Preliminary Report on Patentability", Dec. 31, 2014, 7 pages.

PCT/GB2013/000275, "International Search Report and Written Opinion", Apr. 14, 2014, 11 pages.

Canadian Patent Application No. 2,877,063, Office Action mailed May 24, 2016, 3 pages.

* cited by examiner

POLYPHOSPHAZENES

CROSS REFERENCE TO RELATED APPLICATIONS

This application is the U.S. national phase of International Application No. PCT/GB2013/000276 filed on Jun. 20, 2013, and published in English on Dec. 27, 2013 as International Publication No. WO 2013/190260 A2, which application claims priority to Great Britain Patent Application No. 1210980.7 filed on Jun. 21, 2012, the contents of both of which are incorporated herein by reference.

FIELD OF THE INVENTION

This invention relates to a series of energetic binders. In particular, though not exclusively, the invention relates to a series of energetic binders based on an inorganic polyphosphazene backbone. The invention also relates to the synthesis of these energetic binders, inert precursors and curing the energetic binders.

BACKGROUND TO THE INVENTION

Polymeric organic materials are widely used in all types of energetic formulations, primarily as either fuels or combustible binders. During the formulation of plastic bonded explosives, the hazard characteristics of all but the most insensitive of high explosives can be greatly improved by the addition of a suitable binder. However, whilst the addition of such a binder desensitises the explosive, if the binder is inert and has a lower density than the filler, it inevitably detracts from the performance. The tendency when formulating explosives is therefore to maximise solids loading in order to enhance performance. In contrast, larger quantities of binder are most beneficial in optimising safety. One way of improving these conflicting requirements is to use an energetic binder.

Energetic binders can still be effective in desensitising the explosive but are also able to contribute to the overall energy of the system. The consequence of this is that they can be used in somewhat larger proportions than an inert binder, whilst retaining, or even increasing, the overall energy of the system. Given that energetic polymers may be intrinsically less sensitive, enhanced quantities of these materials may benefit charge safety by two separate mechanisms: (1) through the attainment of reduced solids loading and (2) because of the intrinsic insensitively of the material being added. Thus, as the binder loading is increased, a non-detonable energetic binder is effectively replacing a proportion of the detonable crystalline filler. The term 'energetic polymer' is normally used to describe macro molecules which contain energetic functionalities such as nitrato, nitro or azido groups.

The difficulty with energetic binders is to obtain materials which combine high energy-density with peak physical properties. Existing examples of energetic binders comprise glycidyl azide polymer (GAP), poly (3-methyl-3-nitratomethyl oxetane) (polyNIMMO) and polyglycidyl nitrate (polyGLYN) share modest energy densities and relatively high glass transition temperatures ($T_g$s) which means that for service use they must be plasticised. It is a known problem that plasticisers tend to migrate out of explosives which can lead to the contamination of other components and compromise the low temperature performance of the explosive.

WO2006032882 describes an energetic binder which has both high energy-density and low glass transition temperature which could be used without plasticisation. This patent application clearly showed that polyphosphazenes could offer significant advantages over the energetic binder of the prior art in the formulation of reduced hazard compositions. However, the polyphosphazenes described in this application are not curable and could only be used, in pressed applications. This meant that plastic bonded explosives containing around 21% or more of the polyphosphazene binder would be likely to slump. Therefore, there is a need to cure the energetic binders in order to overcome the problem of a plastic bonded explosive slumping.

One existing class of energetic polyphosphazenes which contain azido substituted side chains has previously been cured (K. Bala, P. Golding, T. G. Hibbert, P. Jenkins, M. K. Till and M. Willcox, "Non-isocyanate curable, energetic (azido) polyphosphazenes" 41st International Conference of Fraunhofer ICT., Karlsruhe, Germany, 29 Jun. to 2 Jul. 2010) by reacting its pendant azido groups with a bismaleimide curing agent. Because these azide containing functionalities are the source of energy in this class of polymer, the number of such groups incorporated into the polymer chain is usually high (eg 50-100%) in order to maximise its energetic properties. However, the presence of high percentages of azide groups in such systems leads to disadvantages when using this type of cure procedure. Thus, when a difunctional curing agent (e.g. a bismaleimide) is added to an azido polyphosphazene of this type, it can react essentially in one of two ways: i) with two separate azide groups on different polymeric molecules (intermolecular reaction), thereby effecting cross-linking (i.e. the desired result) or ii) with two separate azide groups on the same polymer chain (intramolecular reaction). The latter reaction consumes reagent, but is unproductive as it links together different sections of a single polymer chain, without achieving a cure. Thus, reaction ii) consumes reagent without benefit, thereby requiring the addition of significantly more curative than is theoretically required to effect cross-linking of the polymer system. This has two disadvantages: 1) the excess curative is permanently incorporated into the polymer chain without benefit, but because it is inert it significantly decreases the overall energy (per unit mass) available from the system; 2) whenever the cure reagent reacts with azide groups, either in the desired mode, to produce cross-links or in the unproductive 'intramolecular' mode, it chemically destroys azide groups at both its reaction sites, as part of the cure process. Because there is a high percentage of azide groups present in the polymer (to maximise energy), the extent of intramolecular reaction becomes significant and hence the energy loss, due largely to removal of azide groups by these intramolecular reactions, also becomes significant.

A further disadvantage of this existing curing procedure is that it can only be effected with energetic polymers which contain azido functionalities. Azide based polymers, although energetic, are non-oxidising. When preparing energetic formulations (e.g. propellants, explosives and pyrotechnics) it is often difficult to achieve a good oxygen balance, particularly when using inert or non-oxidising energetic binders.

It is an object of the invention to provide curable polyphosphazenes which overcome or mitigate at least one of the above problems and/or another problem associated with the prior art.

STATEMENTS OF THE INVENTION

According to a first aspect of the present invention there is provided a substituted poly(phosphazene) compound comprising a combination of units having one or more of the structures (i) to (iii),

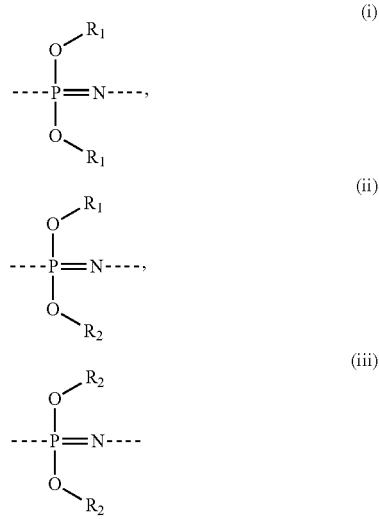

wherein: the combination comprises $R_1$ and $R_2$;

each $R_1$ is independently an optionally substituted alkyl- or alkyl ether-based side chain containing an isocyanate-reactive moiety, an epoxide-reactive moiety, an amine-reactive moiety, a supramolecular noncovalent bonding moiety, or combinations thereof; and each $R_2$ is independently an optionally substituted alkyl- or alkyl ether-based side chain containing nitro, nitramine, nitrate ester, azide, an ammonium compound moiety with energetic counter-ion, or combinations, thereof.

The ammonium compound moiety may suitably be primary (nitrogen atom joined to the side chain and three hydrogen atoms), secondary (nitrogen atom joined to the side chain, two hydrogen atoms and an optionally substituted alkyl substituent), tertiary (nitrogen atom joined to the side chain, one hydrogen atom and two optionally substituted alkyl substituents) or quaternary (nitrogen atom joined the side chain and three optionally substituted alkyl substituents).

The energetic counter ion may comprise nitrogen and/or oxygen atoms. In an embodiment, the energetic counter ion may comprise a greater number of nitrogen and/or oxygen atoms than carbon atoms.

On account of the defined combination of units, the compounds of the invention have desirable energetic characteristics and include at least one side chain facilitating or enhancing cross-linking or supramolecular noncovalent bonding of the compounds, which may in turn enhance their usability.

Embodiments of the invention illustrate optional or preferred features of the invention. These embodiments/features may be combined and applied to each aspect of the invention, unless incompatible.

Each $R_1$ and each $R_2$ is selected independently. Thus, for example, a compound may comprise a mixture of $R_1$ structures and/or a mixture of $R_2$ structures, such mixtures typically being random. However, at least half of, or even substantially all of, $R_1$ and/or $R_2$ may, in an embodiment, be identical. Therefore, where reference is made herein to "at least one $R_1$" this also embraces, but is not limited to, "at least half of $R_1$" or "each $R_1$". Similarly, where reference is made herein to "at least one $R_2$" this also embraces, but is not limited to, "at least half of $R_2$" or "each $R_2$".

In an embodiment each $R_1$ and/or $R_2$ comprise 1 to 20 carbon atoms, suitably in the range of from 2 to 15 carbon atoms, for example in the range of from 2 to 10 carbon atoms or 2 to 7 carbon atoms.

In an embodiment, at least one $R_1$ comprises a side chain containing a supramolecular bonding moiety that is a hydrogen bonding moiety capable of establishing hydrogen bonds with one or more partner moieties. In an embodiment, the hydrogen bonding moiety comprises at least two hydrogen bond donation or acceptance sites, preferably at least three hydrogen bond donation or acceptance sites, most preferably at least four hydrogen bond donation or acceptance sites. In an embodiment, the hydrogen bonding moiety comprises at least one hydrogen bond donation site and at least one hydrogen bond acceptance site, preferably at least two hydrogen bond donation sites and at least two hydrogen bond acceptance sites. Advantageously, the hydrogen bonding moiety may be self-complementary, such that it is capable of establishing hydrogen bonds with one or more partner moieties of the same structure.

In an embodiment, at least one $R_1$ comprises a side chain of Formula I or Formula II:

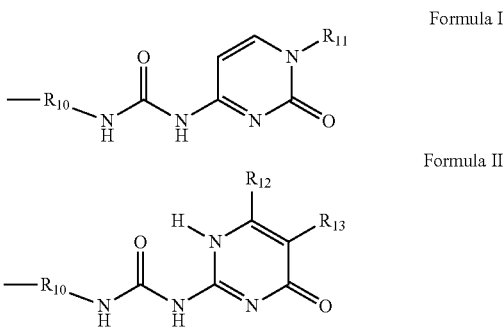

wherein: each $R_{10}$ is independently selected from optionally substituted alkyl, alkyl ether, alkenyl or aryl based bridging groups, preferably comprising 1 to 7 carbon atoms; each $R_{11}$ is independently selected from the group containing: optionally substituted alkyl, alkyl ether, alkenyl, alkoxy, aryl, cyclic or heterocyclic, and UV active chromophores, preferably comprising 1 to 7 carbon atoms; and each $R_{12}$ and $R_{13}$ is independently hydrogen or a side chain being a linear, cyclic or branched alkyl group comprising 1 to 7 carbon atoms.

In an embodiment at least one $R_1$ comprises a side chain comprising a supramolecular bonding moiety that is an electrostatic bonding moiety capable of establishing electrostatic bonds with one or more partner moieties. In one embodiment, the electrostatic bonding moiety comprises an ammonium compound moiety. In an embodiment the ammonium compound moiety may comprise an energetic counter ion. In one embodiment, at least one $R_1$ comprises an alkyl based ammonium tri- or tetrazolonate moiety. In one embodiment, the moiety is a tetrazolonate moiety. In one embodiment, the moiety is 3-nitro-5-oxo-1,2,4-triazolonate.

In one embodiment the compound comprises a supramolecular bonding moiety for facilitating self-assembly of the compound into a supramolecular (noncovalently) crosslinked structure. In an embodiment, such a structure provides a compound that is a solid at room temperature but may optionally disassembled into a liquid or less viscous form, for example, by heating or dissolution in a solvent.

In one embodiment at least one $R_1$ comprises a side chain containing an amine-reactive moiety comprising epoxy, isocyanate, aldehyde, carboxy, or combinations thereof.

In one embodiment at least one $R_1$ comprises a side chain containing an epoxide-reactive moiety comprising amino, phenol, hydroxyl, thiol or carboxy or combinations thereof.

In one embodiment at least one $R_1$ comprises a side chain containing an isocyanate-reactive moiety comprising hydroxyl, thiol, primary amino, secondary amino, carboxy, enamino, imino, ammonium compound moiety, or combinations thereof. Notably ammonium compound moieties may be reacted with isocyanates, e.g. upon conversion to a free base amine, and may hence be considered isocyanate-reactive for the purposes of this invention.

In one embodiment at least one $R_1$ comprises $C_{1-9}$(alkyl)$CH_2NH_2$; $C_{1-9}$(alkyl)$CH(OH)CH_2OH$; $C_{1-9}$(alkyl)$CH_2NHC(O)O(CH_2)_2OH$; or combinations thereof. In one embodiment at least one $R_1$ comprises $C_{1-5}$(alkyl)$CH_2NH_2$; $C_{1-5}$(alkyl)$CH(OH)CH_2OH$; $C_{1-5}$(alkyl)$CH_2NHC(O)O(CH_2)_2OH$; or combinations thereof. In one embodiment at least one $R_1$ comprises $C_{1-3}$(alkyl)$CH_2NH_2$; $C_{1-3}$(alkyl)$CH(OH)CH_2OH$; $C_{1-3}$(alkyl)$CH_2NHC(O)O(CH_2)_2OH$; or combinations thereof.

In one embodiment at least one of $R_1$ includes an alkyl or alkyl ether based ammonium compound side chain of general Formula III

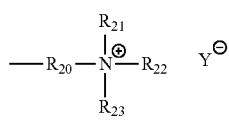

Formula III wherein: $R_{20}$ is an optionally substituted $C_{1-9}$ (or $C_{1-5}$ or $C_{1-3}$) alkyl or alkyl ether bridging group; each $R_{21}$, $R_{22}$ and $R_{23}$ is independently hydrogen or optionally substituted $C_{1-5}$ alkyl or alkyl ether; and Y is a counter ion, preferably an energetic counter-ion, e.g. selected from dinitramide, nitrate, tri- or tetrazolonates, picrates; hydrazino-nitroethenates or combinations thereof.

Specific structures of $R_1$ may be, for example, as illustrated in one or more of the exemplary "PZ" compounds disclosed herein.

In an embodiment at least one $R_2$ comprises one or more of: $C_{1-18}$(alkyl)$CH(ONO_2)CH_2(ONO_2)$; $C_{1-18}$(alkyl)$CH(N_3)CH_2(N_3)$; $C_{1-18}$(alkyl) $CH_2(N_3)$; $C_{1-19}$(alkyl)$CH_2(ONO_2)$; and an alkyl or alkyl ether based ammonium compound side chain with an energetic counter ion; or combinations thereof. In an embodiment at least one $R_2$ comprises one or more of: $C_{1-8}$(alkyl)$CH(ONO_2)$ $CH_2(ONO_2)$; $C_{1-8}$(alkyl)$CH(N_3)CH_2(N_3)$; $C_{1-8}$(alkyl) $CH_2(N_3)$; $C_{1-9}$(alkyl)$CH_2(ONO_2)$; and a $C_{1-9}$ alkyl or alkyl ether based ammonium compound side chain with an energetic counter ion preferably selected from dinitramide, nitrate, tri- or tetrazolonates, picrates, or hydrazino-nitroethenates; or combinations thereof.

In an embodiment at least one $R_2$ comprises —$(CH_2)_4CH$ $(ONO_2)CH_2(ONO_2)$; —$CH_2CH(ONO_2)CH_2(ONO_2)$; a $C_{1-5}$ (or $C_{1-3}$) alkyl or alkyl ether based ammonium compound side chain with an energetic counter ion preferably selected from dinitramide, nitrate, tri- or tetrazolonates, picrates, or hydrazino-nitroethenates; or combinations thereof.

In an embodiment at least one $R_2$ comprises an alkyl or alkyl ether based ammonium compound side chain of general Formula III wherein: $R_{20}$ is an optionally substituted $C_{1-9}$ (or $C_{1-5}$ or $C_{1-3}$) alkyl or alkyl ether bridging group; each $R_{21}$, $R_{22}$ and $R_{23}$ is independently hydrogen or optionally substituted $C_{1-5}$ alkyl or alkyl ether; and Y is an energetic counter ion, preferably selected from dinitramide, nitrate, tri- or tetrazolonates, picrates; hydrazino-nitroethenates or combinations thereof.

In an embodiment, at least one $R_2$ is an oxygen-containing side chain.

Specific structures of $R_2$ may be, for example, as illustrated in any of the exemplary "PZ" compounds disclosed herein.

Notably, where $R_1$ comprises an ammonium compound moiety with an energetic counter ion, $R_2$ may be the same as $R_1$. In one embodiment $R_1$ and $R_2$ are both selected from ammonium compound moieties with an energetic counter ion, e.g. as defined or described anywhere herein.

In an embodiment, at least one $R_1$ and at least one $R_2$ are different. In an embodiment each $R_1$ is distinct from each $R_2$.

In an embodiment at least 20% or even at least 50% of units in the compound are units having one or more of the structures (i) to (iii). In one embodiment the compound consists, or consists substantially of such units.

In an embodiment the compound comprises one or more further units. In an embodiment the compound further comprises one or more units having one or more of the structures (iv) to (vi)

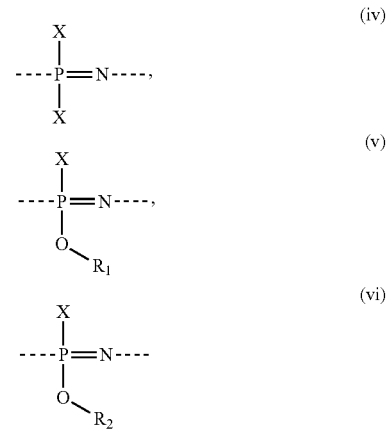

wherein $R_1$ and $R_2$ are as above; and each X is independently selected from $C_{1-20}$ (or $C_{1-10}$ or $C_{1-5}$) fluoroalkoxy or fluoroalkoxy ether.

In an embodiment at least 20% or even at least 50% of units in the compound are units having one or more of the structures (i) to (vi). In one embodiment the compound consists, or consists substantially of such units.

In an embodiment the compound comprises one or more further units.

In one embodiment one or more units comprise a phosphazene unit with a chromophore attached thereto. A chromophore is defined by IUPAC as the part (atom or group of atoms) of a molecular entity in which the electronic transition responsible for a given spectral band is approximately localized. The term arose in the dyestuff industry, referring originally to the groupings in the molecule that are responsible for a dye's colour, i.e. the selective absorption of radiation. In the context of the present invention, the term "chromophore" thus refers to atoms or groups of atoms which enhance the absorption of electromagnetic radiation by the compound.

Suitably, the chromophore enhances the absorption of electromagnetic radiation by the compound, compared to compound without the chromophore.

In an embodiment the chromophore absorbs, or is suitable for enhancing the absorption of, radiation having a wavelength in the range of from 200 nm to 2000 nm, preferably in the range of from 400 to 1200 nm, more preferably in the range of from 600 to 1000 nm, especially in the range of from 700 to 900 nm, in particular about 800 nm. As is known in the art, the absorption of chromophore compounds can be tailored, for example, by adjusting their degree of conjugation.

Advantageously, the chromophore may be selected and introduced in an amount sufficient to allow the compound to be more readily ignited by light, e.g. laser generated light or flash tubes. The term "light" is used herein synonymously with "electromagnetic radiation". In one embodiment the chromophore is selected and incorporated to provide a compound which is ignitable by a diode laser with a power of 44.5 W at 801 nm wavelength, a pulse duration of approximately 0.3 s, with the laser beam being focussed to produce a nominal beam spot size of 0.3 mm diameter on a sample surface.

In an embodiment the compound comprises at least 0.1%, or at least 0.5%, or at least 1%, or at least 2% chromophore side chains.

Any suitable organic chromophore or dye may be attached to the further phosphazene unit. In an embodiment, the chromophore comprises a conjugated system. In an embodiment the chromophore is attached by nucleophilic substitution. In an embodiment the chromophore is attached via an alkoxy bridging group, suitably an aminoalkoxy bridging group, e.g. an aminopropanoxy bridging group. In an embodiment the chromophore is attached as a counter ion of an ammonium compound side chain. The ammonium compound side chain may suitably be alkoxy based. In an embodiment the chromophore is attached via a urea/urethane link to a side chain.

Examples of known dyes which may be attached to phosphazene units are provided in I. L. Finar, 'Organic Chemistry', Volume 1, Fifth Edition, 1967, Longmans, Green and Co. Ltd., London, pages 830-861, which is incorporated herein by reference. In one embodiment the chromophore is selected from, azo-dyes, diphenylmethane dyes, triphenylmethane dyes, xanthen dyes, diphenylamine (quinone-imine) dyes), heterocyclic dyes, vat dyes, anthraquinod dyes, sulphur dyes, and phthalocyanine dyes, e.g. as described in Finar.

In one embodiment the chromophore is an anthraquinod dye. In one embodiment the chromophore is a N-(1'-hydroxyanthracene-9',10'-dione-4'-yl)-3-aminopropan-1-oxy side chain. In one embodiment the chromophore is not an anthraquinod dye and/or not a N-(1'-hydroxyanthracene-9',10'-dione-4'-yl)-3-aminopropan-1-oxy side chain.

Advantageously, the chromophore may be an energetic counter-ion, preferably conjugated. In an embodiment the energetic counter ion comprises both nitrogen and oxygen atoms and/or contains a greater number of nitrogen and/or oxygen atoms than carbon atoms. In one embodiment the energetic counter-ion may be a tri- or tetrazolonate, in particular an oxo tri- or tetra-azolonate. In one embodiment the energetic counter-ion may be 3-nitro-5-oxo-1,2,4-triazolonate. In one embodiment the chromophore does not comprise 3-nitro-5-oxo-1,2,4-triazolonate.

Suitably the energetic counter-ion may form part of $R_1$ or $R_2$. Advantageously, an energetic chromophore may be present in greater amounts without detrimentally affecting the energetic nature of the composition. Suitably such energetic chromophore side chains may be present in an amount of at least 5%, at least 10% or even at least 15%.

In an embodiment the compound is selected from any of the "PZ" compounds disclosed herein. In an embodiment the compound is as defined or described anywhere herein, with the proviso that the compound is not one or more of (optionally any of) the "PZ" compounds disclosed herein.

In an embodiment the compound comprises in the range of from 0.5% to 30%, preferably in the range of from 1% to 20%, more preferably in the range of from 2% to 15%, or even in the range of from 2% to 10% or 2% to 5% of side chains containing $R_1$. In an embodiment the compound comprises at least 50%, preferably at least 65%, more preferably at least 75% of side chains containing $R_2$. In an embodiment the percentage of side chains comprising energetic moieties (e.g. as defined for $R_2$) is at least 50%, preferably at least 65% more preferably at least 75%.

In an embodiment the polymer comprises n units, with 3<n<3000. In an embodiment, 100<n<3000. In an embodiment the polymer has a number average molecular weight ($M_n$) in the range of from 1,000 to 150,000, for example in the range of from 5,000 to 50,000 even in the range of from 10,000 to 30,000 g mol$^{-1}$.

The invention embraces cross-linking the compound. From a second aspect, the invention resides in a cross-linked polyphosphazene product comprising the reaction product of a compound according to the first aspect of the invention with a cross-linking agent.

In an embodiment the compound comprises an epoxide-reactive moiety and the cross-linking agent comprises a plurality of epoxide functional groups.

In an embodiment the compound comprises an amine-reactive moiety and the cross-linking agent comprises a plurality of amine, functional groups.

In an embodiment the compound comprises an isocyanate-reactive moiety and the cross-linking agent comprises a plurality of isocyanate functional groups.

In an embodiment the cross-linked product is a foamed product. Any type of foamed product is embraced and the particular properties of such products, for example their bubble size/distribution, may be readily optimised by a skilled person. From a third aspect the invention embraces the use any of the compounds or products defined or described herein as energetic binders/co-binders/ingredients for explosives, pyrotechnic compositions or propellant compositions.

In one embodiment the compound or product may be used in or as a (delay) fuse or as a stab sensitive foam. In one embodiment use is made for these applications of a foamed reaction product of an isocyanate with PZ-23 [P-(2,2,2-trifluoroethan-1-oxy/5,6-dinitratohexan-1-oxy/4-aza-5-oxo-6-oxa-8-hydroxyoctan-1-oxy)polyphosphazene].

From a fourth aspect, the invention resides in a method for the synthesis of a poly(phosphazene) compound, such as for example any of the compounds defined or described herein, the method comprising: providing a substitutable poly(phosphazene) backbone; attaching a pendant group —O—$R_1$, or a precursor thereof, to the backbone via nucleophilic substitution with an alkoxide; attaching a pendant group —O—$R_2$, or a precursor thereof, to the backbone via nucleophilic substitution with an alkoxide; and converting at least part of any precursor into the relevant pendant group.

In an embodiment the substitutable poly(phosphazene) backbone comprises pendant fluoralkoxy or fluoroalkoxy ether groups. In an embodiment the substitutable poly(phosphazene) backbone comprises pendant chlorine atoms.

In an embodiment converting the precursor or precursors comprises: forming an ammonium compound pendant group; converting an ammonium compound group to a free base; denitrating; nitrating or combinations thereof.

In an embodiment, —O—$R_1$ is a precursor of —O—$R_2$ and a subset or percentage of —O—$R_1$ groups is converted to —O—$R_2$. For example, in one embodiment, —O—$R_1$ comprises a hydroxyalkoxy or hydroxyalkoxy precursor functionality and conversion of —O—$R_1$ to —O—$R_2$ comprises partial nitration.

In an embodiment, —O—$R_2$ is a precursor of —O—$R_1$ and a subset or percentage of —O—$R_2$ groups is converted to —O—$R_1$. For example, in one embodiment, —O—$R_2$ comprises a nitratoalkoxy functionality and conversion of —O—$R_2$ to —O—$R_1$ comprises partial denitration.

In an embodiment, —O—$R_1$ and —O—$R_2$ have a common precursor attached to the backbone via nucleophilic substitution with an alkoxide.

In an embodiment the method comprises attaching an aminoalkoxy group and reacting the aminoalkoxy group to form an ammonium compound alkoxy moiety comprising an energetic counter ion.

In an embodiment the method comprises attaching a nitratable group, such as a hydroxyalkoxy group or a hydroxyalkoxy precursor group, and (i) partially nitrating the group or (ii) nitrating the group and subsequently partially denitrating the group.

In an embodiment the method comprises the sequential steps of: attaching a nitratable precursor group of —O—$R_2$ to the backbone; attaching an aminoalkoxy group to the backbone; nitrating to convert the precursor group to a nitratoalkoxy group (forming —O—$R_2$) and to convert the aminoalkoxy group into an ammonium nitrate alkoxy group; and optionally further reacting the ammonium nitrate alkoxy group, e.g. via its free amine, to form —O—$R_1$. In one embodiment the nitratable precursor comprises a (2',2'-dimethyl-1',3'-dioxolan-4'yl)-methan-1-oxy group. In one embodiment the aminoalkoxy group comprises a 3-aminopropan-1-oxy group.

In an embodiment the method comprises the sequential steps of: attaching a hydroxyalkoxy (or a hydroxyalkoxy precursor group) and an aminoalkoxy group to the backbone in a one pot synthesis; nitrating the groups to form a nitratoalkoxy group forming —O—$R_2$ and an ammonium nitrate alkoxy group; and optionally further reacting the ammonium nitrate alkoxy group, e.g. via its free amine, to form —O—$R_1$. In one embodiment the hydroxyalkoxy group comprises a 2,3-dihydrooxypropan-1-oxy group. In one embodiment the aminoalkoxy group comprises 3-aminopropan-1-oxy.

In an embodiment further reaction of the ammonium nitrate alkoxy group comprises: converting the ammonium nitrate alkoxy group to form an aminoalkoxy group; and reacting the aminoalkoxy group to form a hydroxyalkoxy group. In one embodiment the method comprises reacting the aminoalkoxy group with 1,1'-Carbonyldiimidazole to form an intermediate; and reacting the intermediate with a glycol to form an a hydroxyalkoxy —O—$R_1$ group.

In an embodiment further reaction of the ammonium nitrate alkoxy group comprises reacting the ammonium nitrate group, suitably via its free base, to form an ammonium alkoxy moiety comprising an energetic counter ion as hereinbefore described or defined, e.g. selected from: dinitramide, tri- or tetrazolonates, picrates, hydrazino-nitroethenates or combinations thereof.

In an embodiment the method comprises the sequential steps of attaching a nitratable group, such as a hydroxyalkoxy or hydroxyalkoxy precursor group, to the backbone; nitrating the nitratable group to form a nitratoalkoxy group —O—$R_2$; and partially denitrating the nitrated precursor group to form an isocyanate-reactive —O—$R_1$.

In an embodiment the hydroxyalkoxy group or precursor used in the nitration is a dihydroxyalkoxy precursor, and the denitrating step is followed by epoxidising partially denitrated precursor to form an epoxidised product. Optionally the method may comprise ring-opening the epoxidised product to form a dihydroxyalkoxy group.

In an embodiment the hydroxyalkoxy and aminoalkoxy groups used in the method have 1 to 10 carbon atoms.

In an embodiment the method comprises a step of flow nitration wherein one or more reactants are subjected to sonication, preferably ultrasonication.

From a fifth aspect, the invention resides in a nitrating method for nitrating a precursor compound comprising one or more nitratable functional groups, the nitrating method comprising sonicating the compound whilst subjecting the compound to nitrating conditions. In an embodiment the nitrating conditions comprise contacting the compound with a nitrating agent, e.g. concentrated nitric acid and or concentrated sulphuric and nitric acid. In an embodiment the nitrating method is a flow nitration method, which may be continuous. In an embodiment the compound is subjected to nitrating conditions in a sonicated reaction line. In an embodiment the reaction line passes through a sonicated bath. In an embodiment the reaction line comprises one or more coils in the ultrasonic bath. In an embodiment the sonication is ultrasonication. In an embodiment the ultrasonication is at a frequency in excess of 15 KHz, or even in excess of 25 KHz.

In one embodiment the compound is sonicated under nitrating conditions for at least 5 seconds, preferably at least 15 seconds.

In an embodiment, the precursor compound is a polyphosphazene comprising nitratable functional groups, e.g. as defined anywhere herein.

From a sixth aspect, the invention resides in a flow-nitration apparatus, the apparatus comprising: a first reagent conduit for a precursor pound comprising one or more nitratable functional groups; a second reagent conduit for nitrating agent; a mixing junction for mixing precursor compound and nitrating agent received from the conduits; and a sonicated reaction chamber for facilitating nitration of the precursor compound by the nitration medium. The mixing junction and reaction chamber may be integral. In an embodiment the reaction chamber comprises or consists of a reaction line passing through a sonicated bath, suitably an ultrasonicated bath. In an embodiment the apparatus includes chilling means or a chiller for chilling the mixing junction and/or reaction chamber. In an embodiment the chilling means or chiller is integral with or held by the sonicated bath. In an embodiment the apparatus further comprises a quench vessel for ending nitration of the precursor compound by the nitration medium.

The invention also embraces intermediates of use in preparing polyphosphazene compounds, for example those of the first aspect of the invention. From a seventh aspect, the invention resides in a polyphosphazene compound comprising a polyphosphazene backbone and one or more aminoalkoxy side chains. In one embodiment the compound further comprises one or more hydroxyalkoxy side chains or hydroxyalkoxy precursor side chains. In one embodiment the side chains independently comprise in the range of from 1 to 10 carbon atoms.

From an eighth aspect, the invention resides in any one of the "PZ" compound disclosed herein, or combinations thereof.

From a ninth aspect, the invention resides in a method of igniting or combusting any of the compounds described herein. In one embodiment, the method comprises irradiating the binder with an effective amount of electromagnetic radiation. In one embodiment the compound is irradiated to achieve combustion supported by the irradiation. In another embodiment the binder is irradiated to effect self-sustaining ignition.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property then a range of values defined by a combination of any of the upper limits with any of the lower limits may also be implied.

In this specification, references to parameters are—unless stated otherwise—to properties measured under ambient conditions, i.e. at atmospheric pressure and at a temperature of from 16 to 22 or 25° C., or from 1.8 to 22 or 25° C., for example about 20° C.

The chemical names provided below do not necessarily comply rigorously with accepted chemical naming conventions. However, when taken in conjunction with the chemical formulae provided elsewhere in this submission, they should be unambiguous.

Throughout the description, the full name of the compound made and/or its structure will be given along with an abbreviated name for ease of reading. The majority of the polyphosphazene products described herein comprise random mixed substituent polyphosphazenes containing a number of chemically different side groups on a single molecular polymer chain. For brevity, where these side groups are named and it is desired to indicate the relative (nominal) proportions which are present in the molecule, these are shown in brackets after the name of the relevant substituents, in the form of a percentage. Thus, for example the mixed substituent PolyPZ-4 containing 14% of 2,2,2-trifluoroe-than-1-oxy groups, 75% of 5,6-dinitratohexan-1-oxy groups and 11% of 3-aminopropan-1-oxy groups is named as: —[P-(2,2,2-trifluoroethan-1-oxy (14%)/5,6-dinitratohexan-1-oxy (75%)/3-aminopropan-1-oxy (11%)] polyphosphazene].

The various mixed substituent polyphosphazenes described herein are believed to be predominantly linear (unless cured) and to be randomly substituted by the different side chain functionalities. Unless otherwise stated the degrees of substitution given for the different side chains (within a single molecule) have been determined by means of $^1$H NMR (nuclear magnetic resonance spectroscopy) using a Bruker DPX-250 spectrometer. Chemical shifts are quoted in parts per million, with reference to tetramethylsilane (TMS) for $^1$H and $^{13}$C spectra and to an internal instrument reference (nominally $CFCl_3$) for $^{19}$F spectra. All such figures are nominal, being limited by the degree of accuracy afforded by this technique.

The present invention will now be further described with reference to the following non-limiting examples and the accompanying illustrative drawings, of which:

Figure 3A:
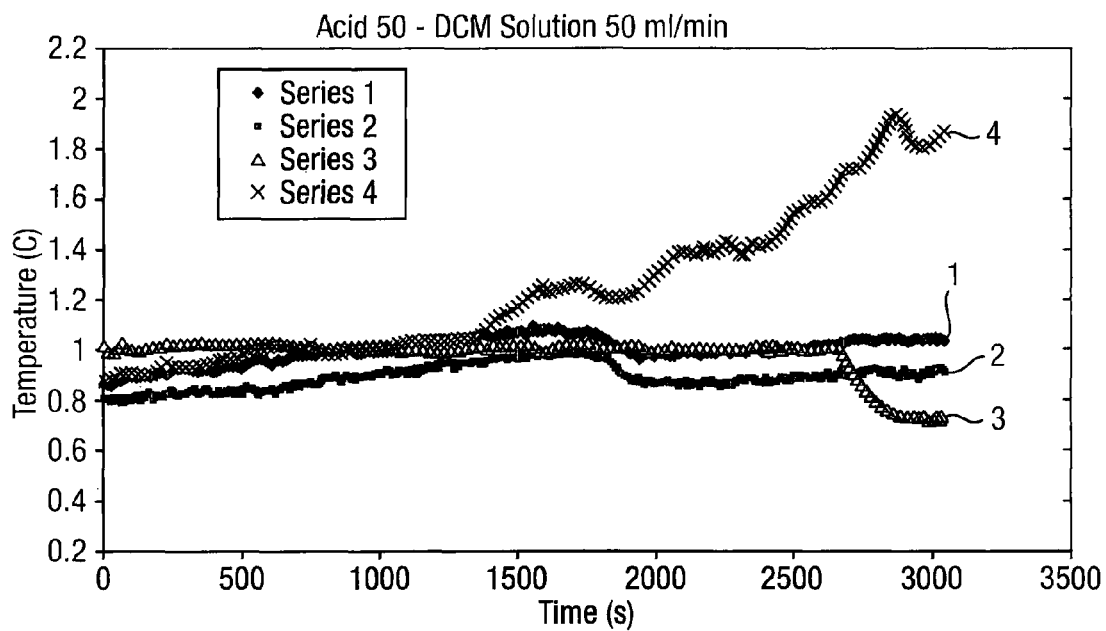
Figure 3B:
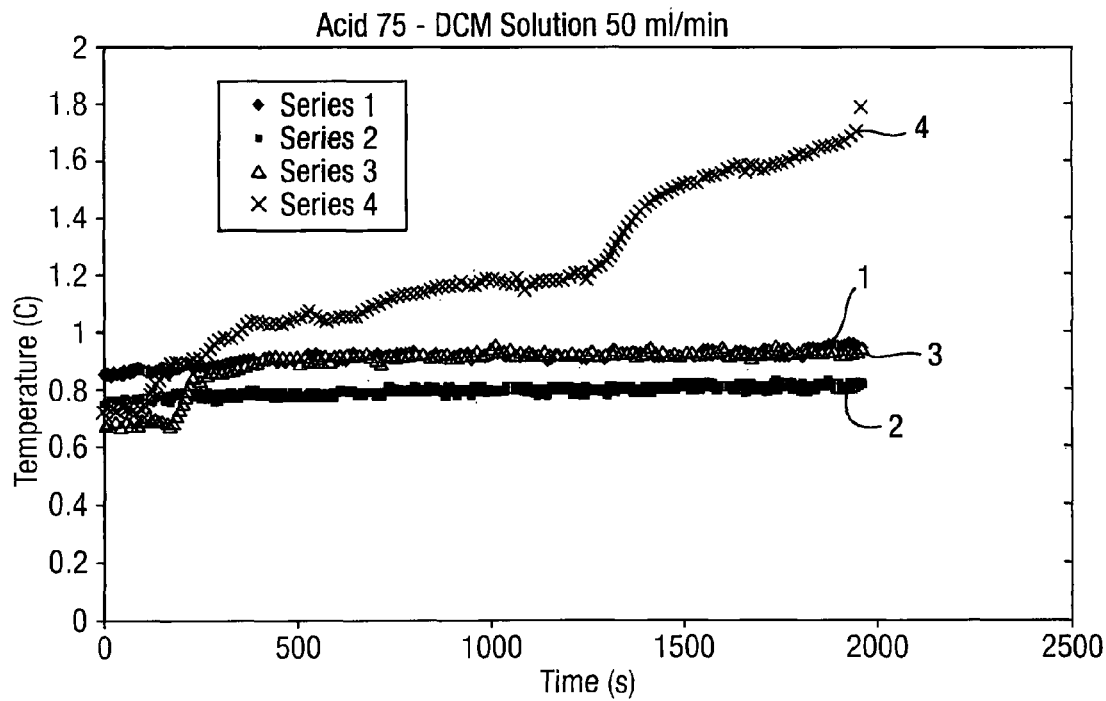
Figure 4A:
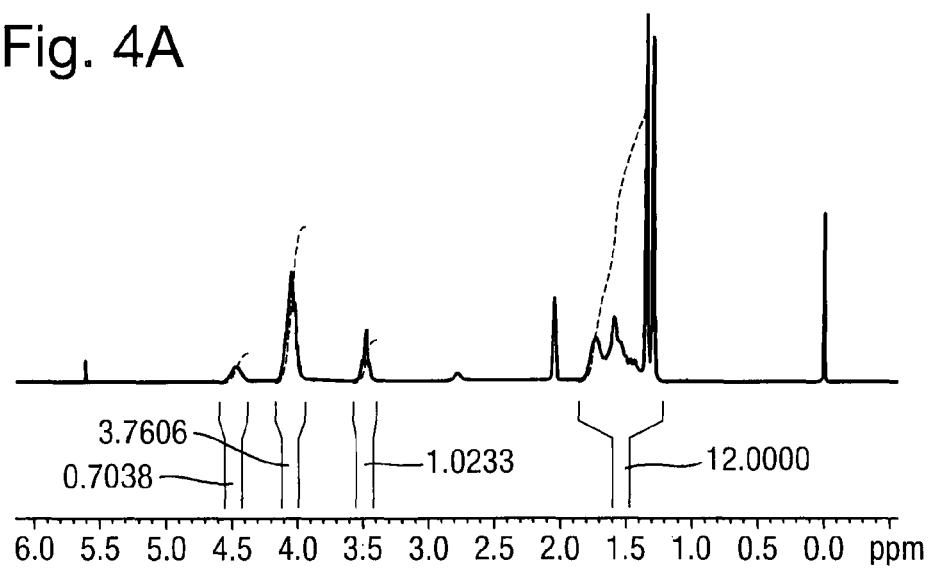
Figure 4B:
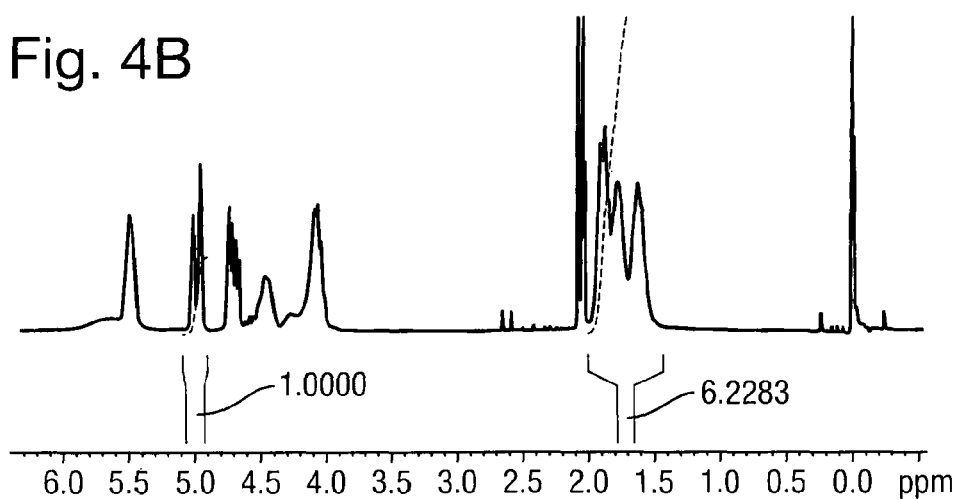
Figure 4C:
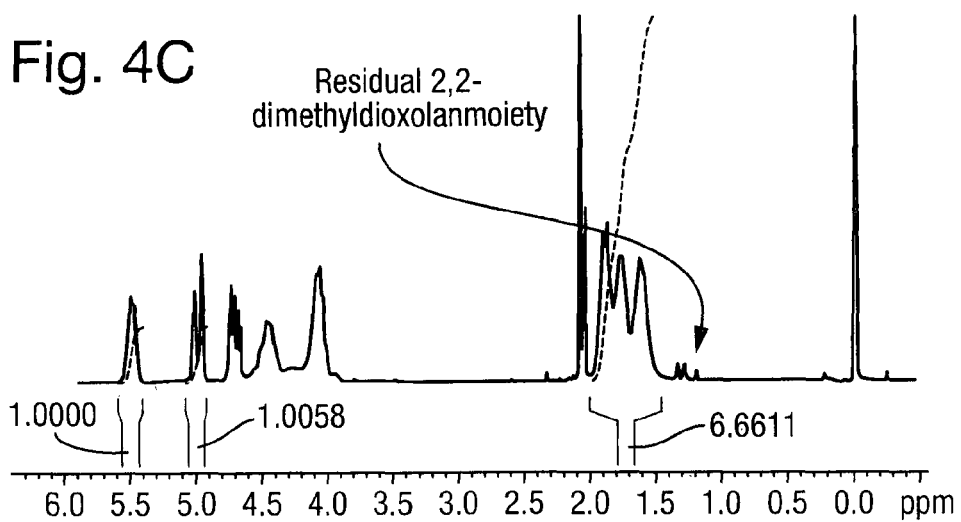

FIGS. 3A and 3B are thermograms at acid/substrate flow rates of 50/50 ml/h and 75/50 ml/h respectively of flow nitration experiments in accordance with an embodiment of the invention with PolyPZ-1 ('Nitrator A') (Series 3 trace: T-reactor; Series 1 and Series 2 traces: pre-reactor feed streams; Series 4 trace: sonicated residence line (reaction mixture) stream);

FIGS. 4A, 4B and 4C show $^1$H NMR spectra (acetone-$d_6$) of (4A) PolyPZ-1 substrate, (4B) Flow nitration product (using ultrasound) after 2 h continuous operation (=PolyPZ-19) and (4C) after 5 h continuous operation, showing contamination of PolyPZ-19 product by residual undernitrated product, due to build-up of polymeric deposits in the reaction line.

Figure 5:
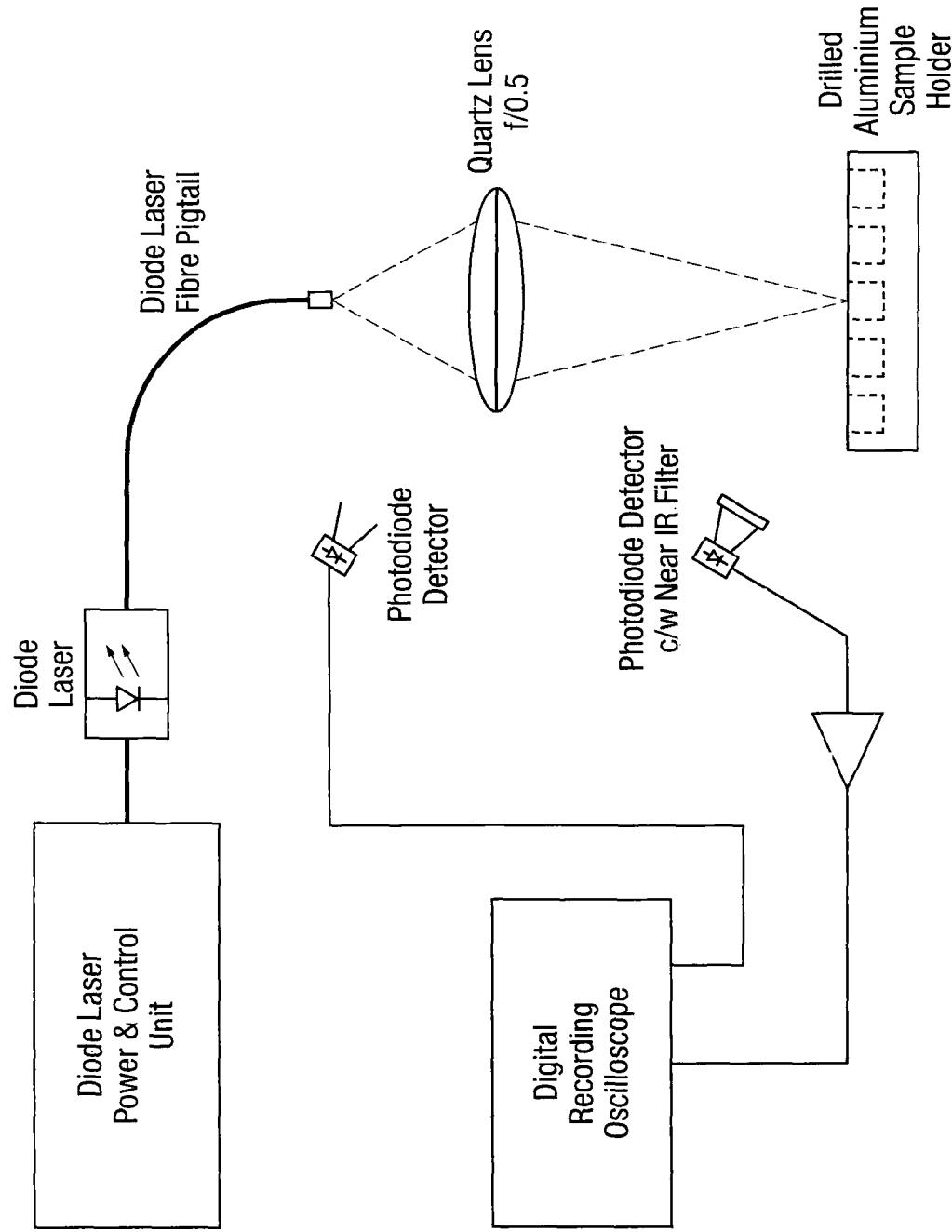
Figure 6:
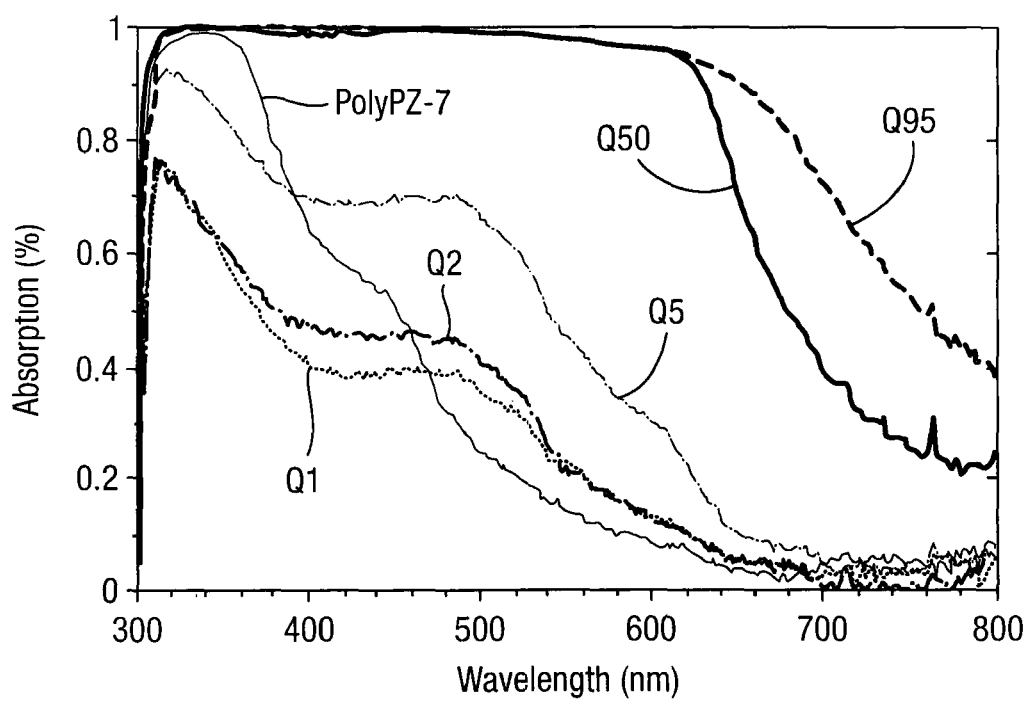
Figure 7:
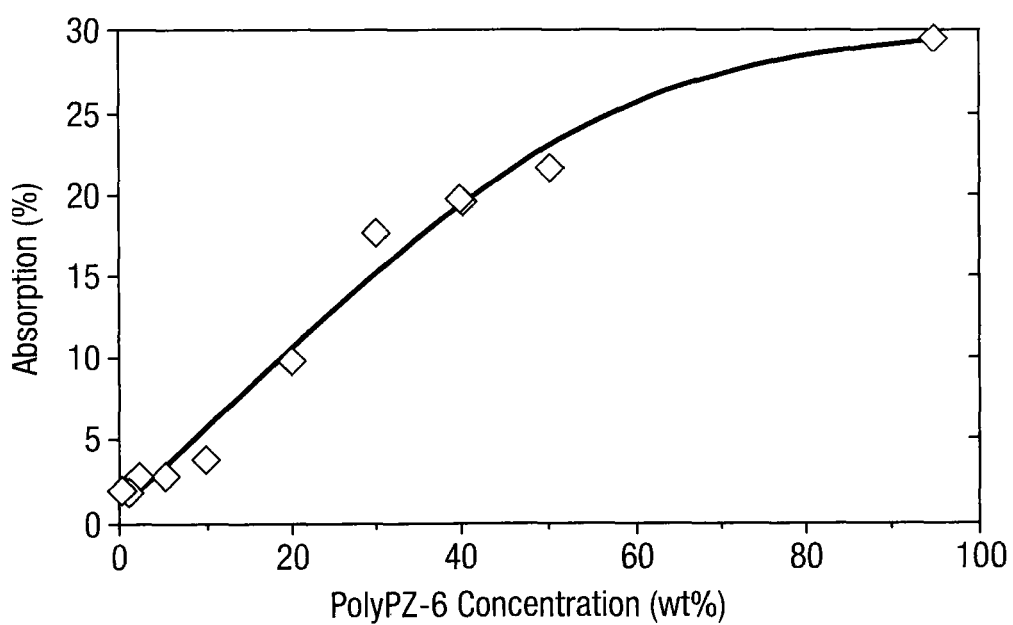
Figure 9:
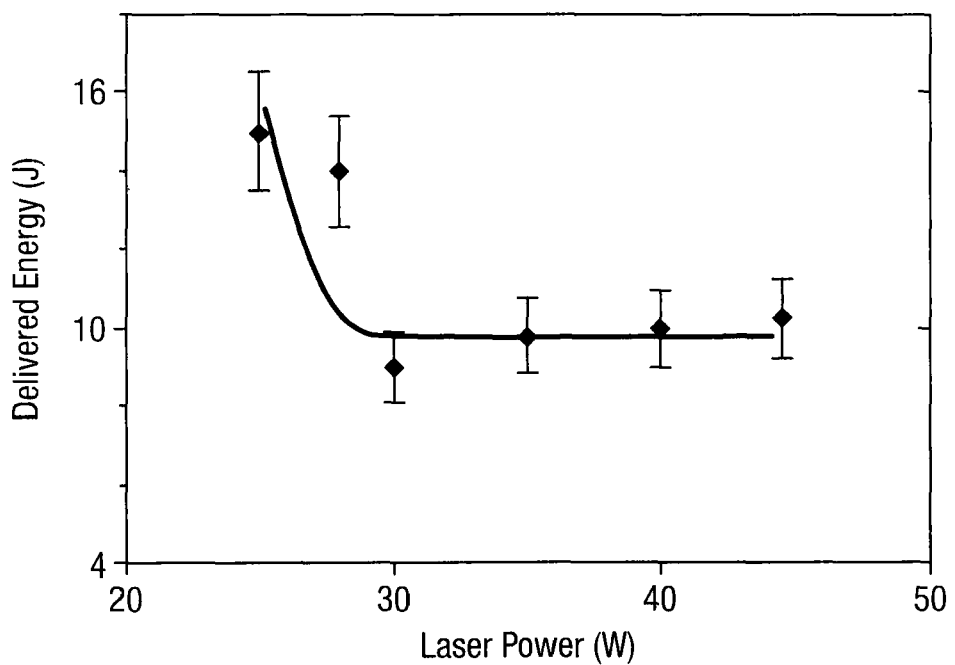
Figure 10:
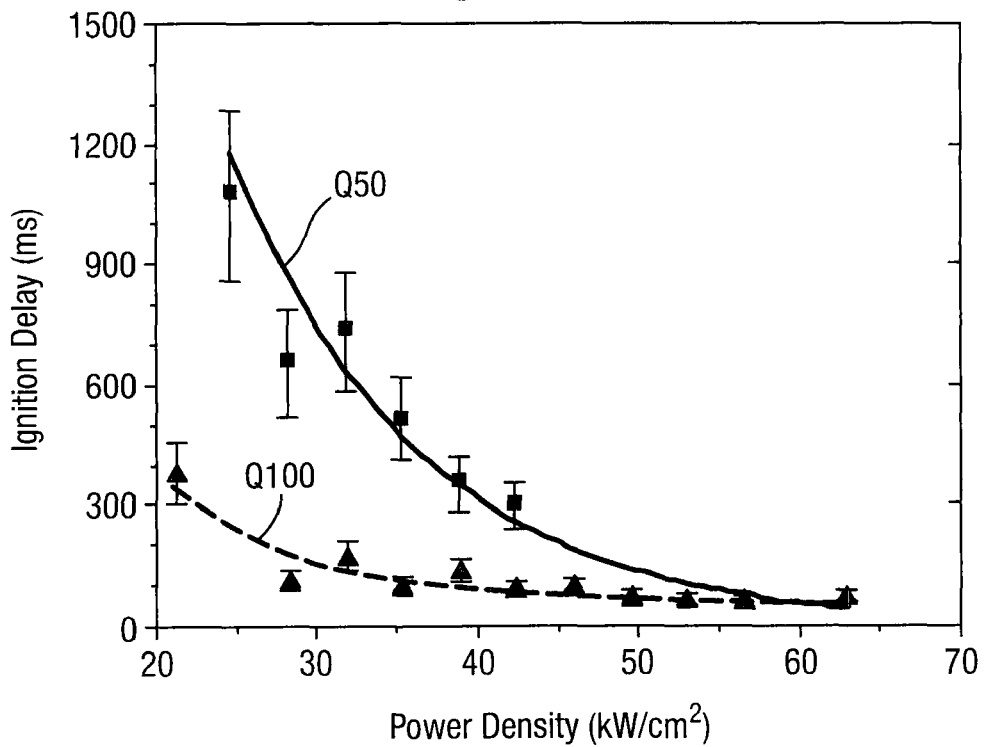
Figure 11:
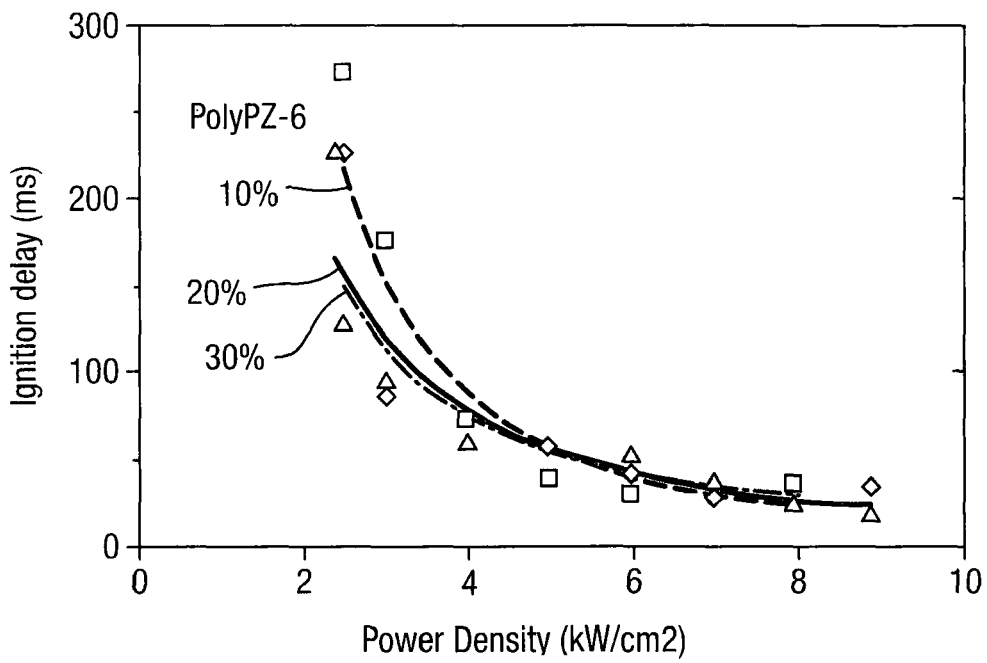
Figure 13:
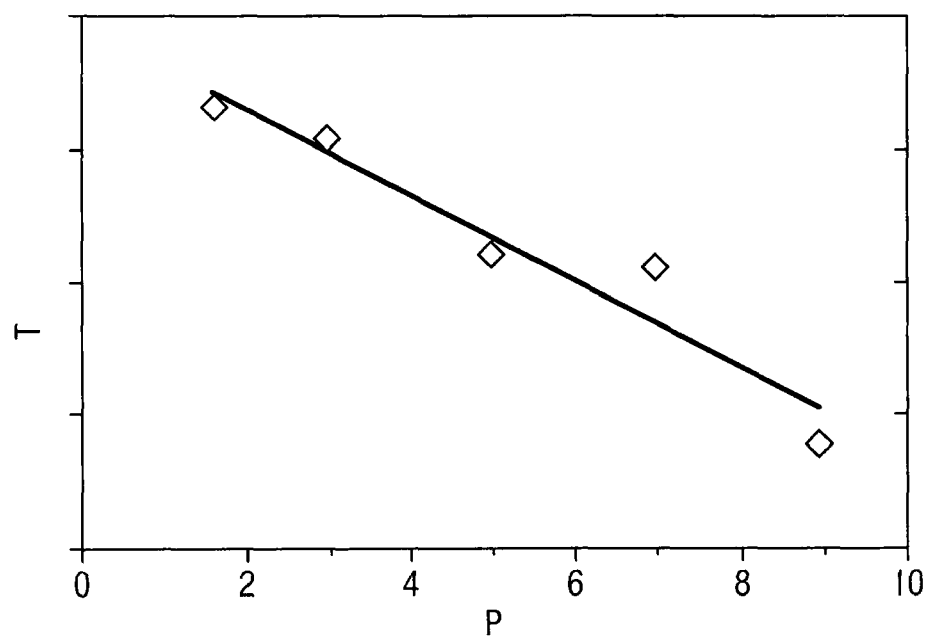
Figure 12:
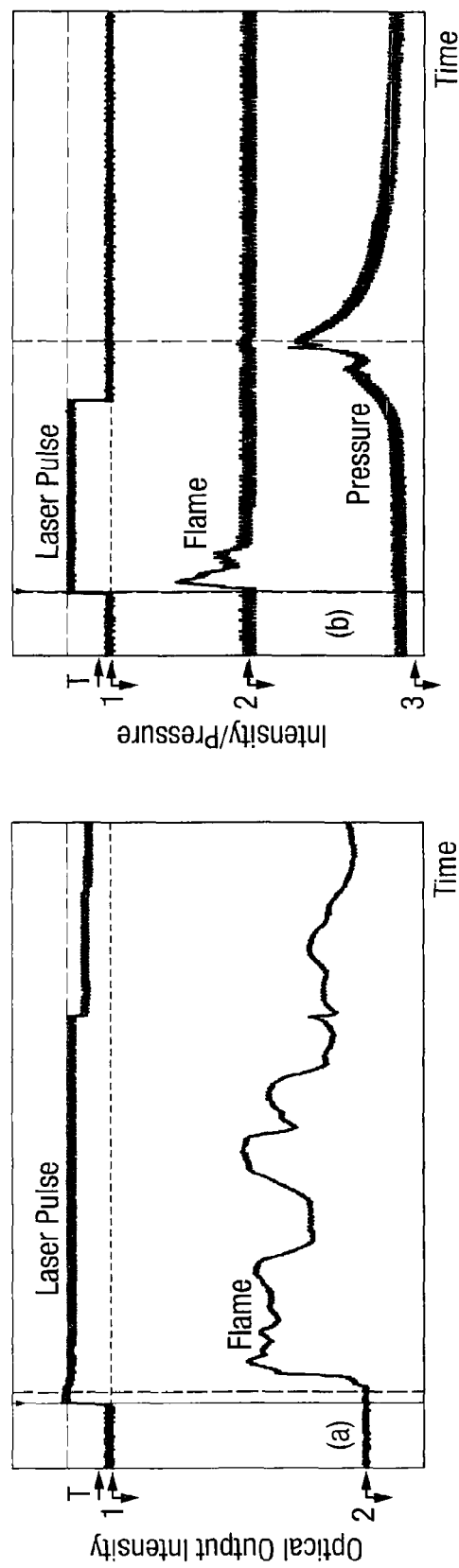
Figure 14A:
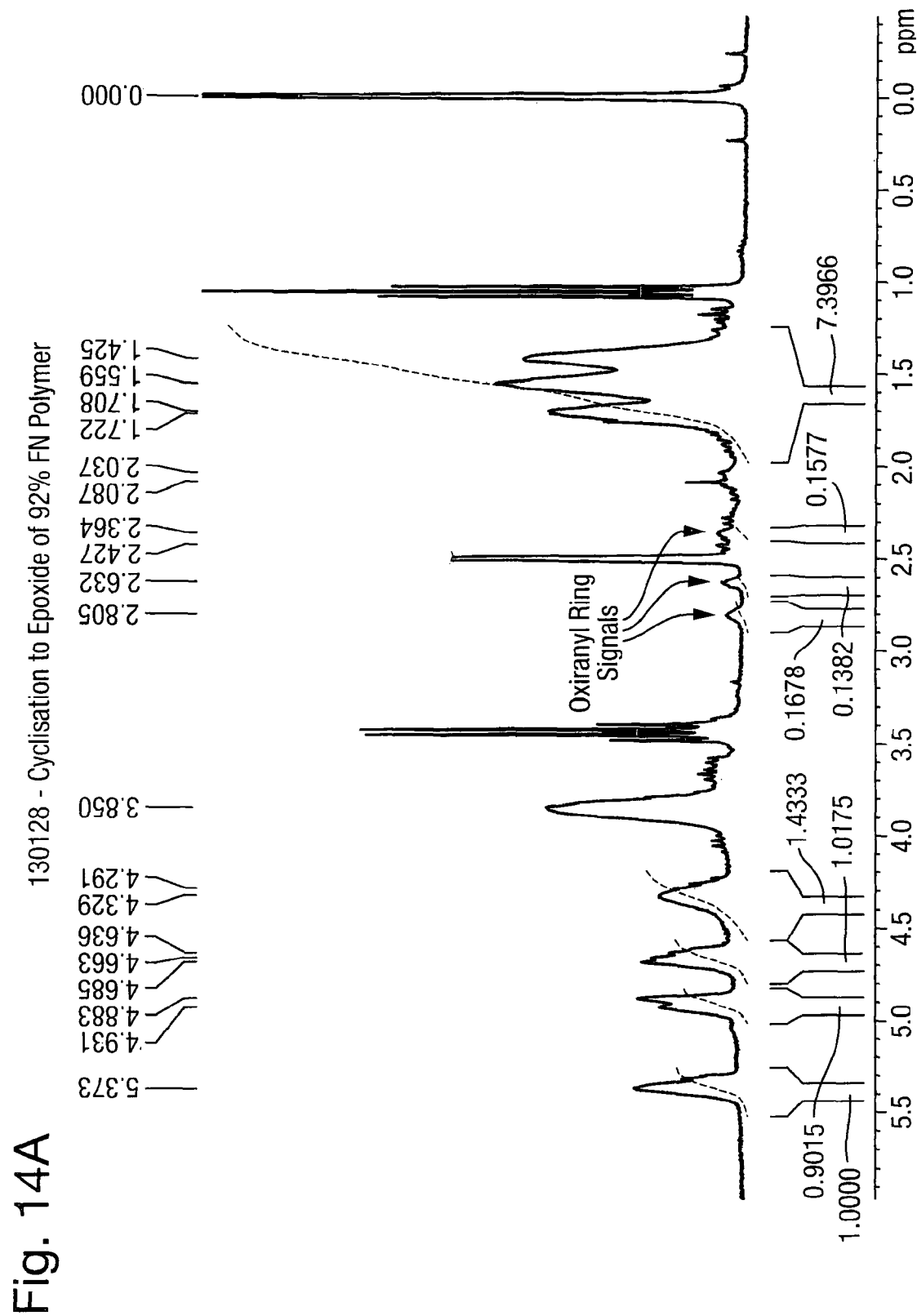
Figure 14B:
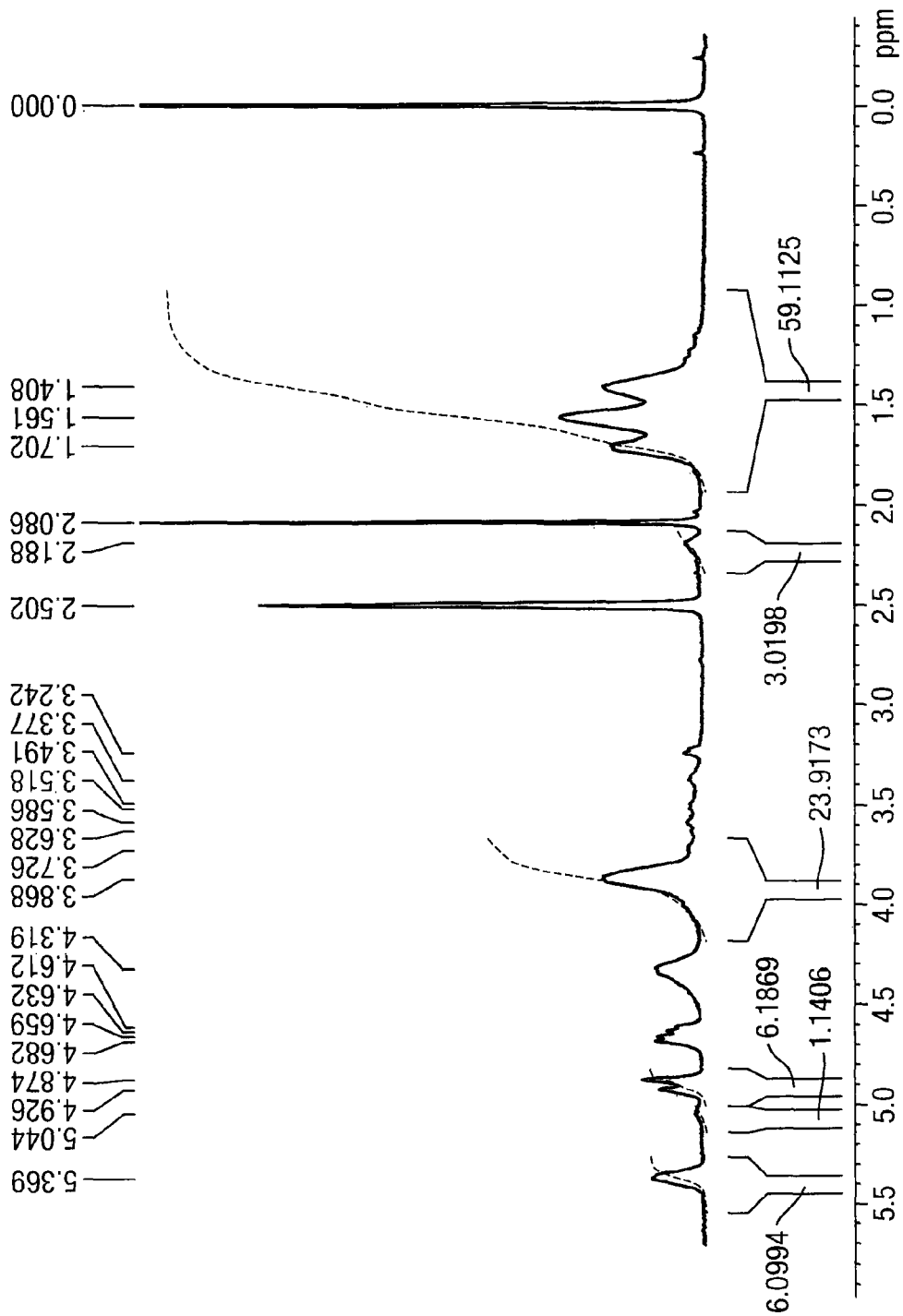

FIG. 5 shows a schematic of a laser ignition apparatus used to test embodiments of the invention;

FIG. 6 shows absorption spectra for PolyPZ-7, and its blends with PolyPZ-6 (1-95 wt %);

FIG. 7 shows absorption at 801 nm of PolyPZ-6 (1-100 wt %) blended with PolyPZ-7;

FIG. 8 shows oscilloscope traces of the ignition events for PolyPZ-6 using two different laser power levels and two different pulse durations;

FIG. 9 shows dependence of the pulse energy required for self-sustaining ignition of PolyPZ-6, on laser power;

FIG. 10 shows a plot of ignition delay versus laser power density for Q100 (PolyPZ-6) and Q50 (PolyPZ-6/PolyPZ-7, 50:50 wt %)[1.5 s pulse, spot size: 0.3 mm];

FIG. 11 shows dependence of ignition delay time on laser power density for HNS IV/PolyPZ-6 formulations (10 wt %, 20 wt % or 30 wt % binder) [300 ms pulse, spot size: 0.8 mm];

FIG. 12 shows oscilloscope traces showing flame intensity and pressure with time during a) unconfined and b) confined ignition of HNS IV/PolyPZ-6 (80:20);

FIG. 13 shows a plot of time delay to peak pressure (T-arbitrary units) versus power density (P, W/cm$^2$) for the confined ignition of PolyPZ-6/HNS IV (80:20); and FIGS. 14A and 14B show 1H NMR spectra (DMSO-d6) of PolyPZ-20 (obtained by ring closure in PolyPZ-19) and PolyPZ-21, the hydrolysed product, respectively.

For ease of reference, a list of the names of the polyphosphazenes referred to in this application is provided at the end of the description, along with their chemical structures.

DETAILED DESCRIPTION

Examples

A. Synthesis of (Inert) Precursor Polyphosphazenes

Aspects of the invention describe the synthesis of novel, inert polyphosphazenes. A number of 'inert' polyphosphazenes have been synthesised as precursors to the formation of the analogous energetic salts (see below). Thus, the preparation of PolyPZs-28, 29, 30, 31 and 32 are detailed below. Although a common synthetic approach has been adopted towards the preparation of all these products, different isolation procedures are required for the individual products; consequently details of a number of individual preparations are given below.

A.1. Synthesis of PolyPZ-31 [P-(2,2,2-trifluoroethan-1-oxy/2-(butylamino)ethan-1-oxy)polyphosphazene]

This reaction was carried out under a nitrogen atmosphere. Sodium hydride as a 60% w/w dispersion in protecting mineral oil, (412 mg, 10.28 mmol of NaH) was freed from oil by washing with dry hexane (3×2 ml) in a test tube with the aid of a thin glass rod. After washing with each aliquot of hexane the suspended sodium hydride was precipitated by centrifugation and the clear supernatant liquid decanted. Dry THF (2 ml) was added to the oil-free NaH and the resulting suspension transferred inside a nitrogen-flushed 50 ml three-necked round bottomed flask, connected to a nitrogen line. Additional dry THF (13 ml) was added to the flask until the total volume of solvent was ~15 ml. 2-(N-butylamino)ethanol (98%, 1.205 g; 10.28 mmol) in dry THF (5 ml) was added slowly to the flask via a syringe and the mixture vigorously stirred at room temperature for 2.5 h. During the first 5 minutes after alcohol addition hydrogen evolution was observed. A thin white suspension formed within the THF.

PolyPZ-12 [P-bis(2,2,2-trifluoroethan-1-oxy)polyphosphazene] (500 mg, 2.06 mmol) in dry THF (10 ml) was slowly added to the alkoxide suspension prepared in the previous step, using a glass syringe. The reaction mixture was boiled under reflux at 75° C. for 20 h and then cooled to ambient temperature. The solvent was evaporated and the residual brown wax transferred, with stirring, to water (50 ml) to yield a yellow, strongly basic (pH 13) suspension. The product was directly extracted into CHCl$_3$ (2×50 ml) without acidification. The CHCl$_3$ solutions were combined, dried over MgSO$_4$ and filtered. Removal of solvent by rotary evaporation left a viscous, sticky product which was dissolved in acetone (1.5 ml). The resulting solution was added drop-wise to water (150 ml) with stirring to yield a white suspension which was stirred for 1 hour using a magnetic stirrer, after which time the polymer had coalesced onto the glass walls of the flask. The clear supernatant liquid was decanted and the polymer rinsed several times with distilled water before being dried, initially in-vacuo at 40° C. for 2 h, then overnight above a drying agent. This yielded: PolyPZ-31 [P-(2,2,2-trifluoroethan-1-oxy (18%)/2-(butylamino)ethan-1-oxy (82%)) polyphosphazene as a light yellow, almost colourless, transparent, viscous liquid. Yield: 252 mg (monomer unit molecular weight: 271.2, 45%). NMR (acetone-d$_6$): $^1$H: 0.93 (br s, 3.00H, butyl Me), 1.29-1.43 (br m, 4.30H, butyl C-2 CH$_2$, C-3 CH$_2$), 2.64 (br s, 1.73H, butyl C-1 CH$_2$), 2.86 (br s, 2.11H, ethoxy C-2 CH$_2$), ~3.10 (br s, 0.82H, NH ?), 4.14 (br s, 1.79H ethoxy C-1 CH$_2$) and 4.54

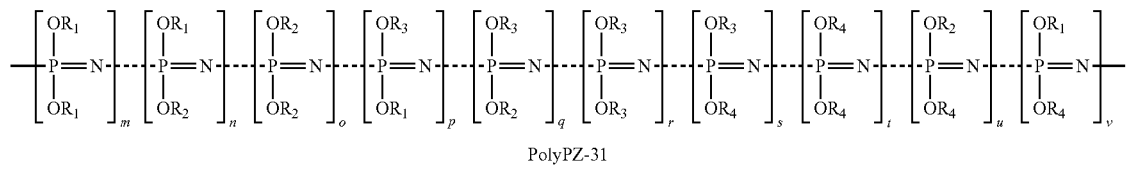

PolyPZ-31

R$_1$ = —CH$_2$CF$_3$, R$_2$ = —(CH$_2$)$_2$NH(CH$_2$)$_3$CH$_3$,
p = q = r = s = t = u = v = 0 ppm (br s, 0.44H, CH$_2$ trifluoroethoxy); $^{19}$F (no reference): −75.55 ppm (br s, trifluoroethoxy); $^{13}$C (10000 pulses): 14.45 (butyl Me), 21.25 (butyl C-3), 33.27 (butyl C-2), 50.27 (butyl C-1) and 63.71-65.98 ppm (broad, ethoxy C1 and C2). $^1$H-$^1$H correlation (COSY45): 0.93 (butyl Me) coupled to 1.29-1.43 (butyl C-2 CH$_2$, C-3 CH$_2$), 2.64-2.86 (butyl C-1 CH$_2$) coupled to 1.29-1.43 and 4.14 (C-1 CH$_2$) coupled to 2.64-2.86 (ethoxy C-2 CH$_2$). IR (NaCl plates, thin film of neat polymer): 3300 v N—H and 2930 cm$^{-1}$ v C—H. The $^1$H, $^{13}$C, $^{13}$C DEPT135, COSY45 and $^1$H-$^{13}$C correlation spectra of the starting alcohol 2-(N-butylamino)ethanol were also recorded (acetone-d$_6$) to aid the assignment of the $^1$H and $^{13}$C signals in PolyPZ-31.

A.2. Synthesis of: PolyPZ-32 [P-(2,2,2-trifluoroethan-1-oxy (19%)/3-aminopropan-1-oxy (81%)) polyphosphazene]

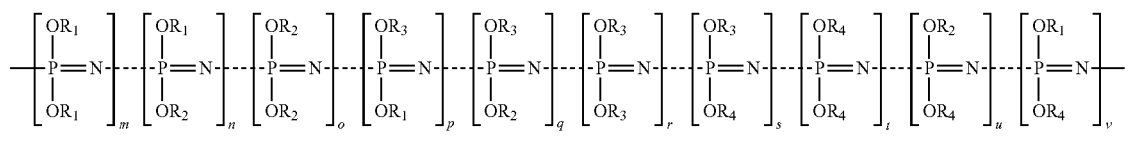

PolyPZ-32

R$_1$ = —CH$_2$CF$_3$, R$_2$ = —(CH$_2$)$_3$NH$_2$,
p = q = r = s = t = u = v = 0

This reaction was carried out under a nitrogen atmosphere. Sodium hydride as a 60% w/w dispersion in protecting mineral oil (412 mg, 10.28 mmol of NaH) was transferred (without removing the mineral oil) into a nitrogen-flushed 50 ml three-necked round bottomed flask, connected to a nitrogen line. Dry THF (15 ml) was added to the flask. 3-Aminopropanol (772 mg, 10.28 mmol) in dry THF (5 ml) was added slowly to the suspension, using a syringe and the mixture stirred vigorously at room temperature for 3 h. During the first 5 minutes of alcohol addition hydrogen evolution was observed. A white suspension readily formed in the THF.

PolyPZ-12 [P-bis(2,2,2-trifluoroethan-1-oxy)polyphosphazene] (500 mg, 2.06 mmol) in dry THF (10 ml) was slowly added to the suspension prepared in the previous step, using a glass syringe. The reaction mixture was boiled under reflux for 24 hours and then cooled to ambient temperature. The solvent was evaporated to leave a residual yellow wax which was added, with stirring, to water (50 ml) to yield a fine yellow, basic (pH 13) suspension. The aqueous solution was reduced in volume to ~5 ml, using a rotary evaporator and then poured into methanol (50 ml). Sodium hydroxide separated out as a fine white powder which was filtered off. The solvent was evaporated off and the polymer re-dissolved in water (5 ml) which was subsequently acidified to pH 1 by the addition of aqueous hydrochloric acid 18.5% (~1 ml) to generate a solution of PolyPZ-32 as the hydrochloride salt (Poly PZ-55). This solution was added drop-wise to ethanol (100 ml), where the polymeric salt precipitated immediately as a collection of small, yellow, sticky globules. The latter were collected with a spatula (to which they readily adhered) rinsed with fresh ethanol, and dissolved in water (5 ml). The resulting light yellow solution was neutralised to pH 8 by the addition of aq. 1M sodium hydroxide (~3 drops) to regenerate the polymeric free amine. Removal of water on a rotary evaporator to dryness yielded PolyPZ-32 [P-(2,2,2-trifluoroethan-1-oxy (19%)/3-aminopropan-1-oxy (81%)) polyphosphazene] as a clear brown, brittle glass (with slight sodium chloride contamination). Yield: 300 mg (Monomer unit molecular weight: 202.69, 72%). NMR (D$_2$O): $^1$H: 2.07 (br s, 1.75H, aminopropoxy C-3 CH$_2$), 3.13 (br s, 2.00H, aminopropoxy C-2 CH$_2$), 4.13 (br s, 1.90H, aminopropoxy C-1 CH$_2$) and 4.65 ppm (br s, 0.44H, CH$_2$ trifluoroethoxy); $^{19}$F (no reference): −75.50 ppm (br s, trifluoroethoxy).

A.3. Synthesis of: PolyPZ-28 [P-(2,2,2-trifluoroethan-1-oxy/2-(methylamino)ethan-1-oxy)polyphosphazene]

transferred (without removing the mineral oil) into a nitrogen-flushed 50 ml three-necked round bottomed flask, connected to a nitrogen line. Dry THF (40 ml) was added to the flask. 2-(Methylamino)ethanol (purity>99%, 1,540 g, 20.5 mmol) in dry THF (10 ml) was added dropwise to the suspension and the mixture stirred at room temperature for 1.5 hours. During the first 10 minutes of alcohol addition hydrogen evolution was observed. A white-grey suspension formed in the THF.

PolyPZ-12 [P-bis(2,2,2-trifluoroethan-1-oxy)polyphosphazene] (1.00 g, 4.12 mmol) dissolved in dry THF (20 ml) was slowly added to the alkoxide suspension prepared in the previous step via a dropping funnel. The reaction mixture was boiled under reflux for 22 hours, then cooled to ambient temperature. The solvent was evaporated and the residual waxy product was added, with stirring, to water (100 ml) to yield a pale-yellow, strongly basic (pH 14) suspension. This suspension was acidified to pH 2 by the addition of aqueous hydrochloric acid 18.5% (~8.5 ml). Residual mineral oil (from the NaH) was extracted with CHCl$_3$ (2×50 ml) and the aqueous phase evaporated to dryness. The light-brown residue was dissolved in methanol (20 ml) and the resulting suspension filtered to eliminate most of the sodium chloride. The filtrate was volume reduced (by evaporation) to approximately 5 ml and filtered again. The clear filtrate was then poured drop-wise into CHCl$_3$ (200 ml) with stirring. Acetone (30 ml) was added to the initial fine suspension to aid coagulation of the polymer salt, which adhered to the walls of the flask within 3 hours. The clear supernatant liquid was decanted and discarded. The polymer was rinsed with fresh CHCl$_3$ (2×10 ml) and dried in-vacuo at 45° C. for 2 hours to yield a white sticky product which comprised ($^1$H NMR spectroscopy, MeOH-d$_4$) a mixture of the desired polymeric salt, contaminated with protonated 2-(N-methylamino)ethanol (~25 mol %). Dissolution of this impure product in methanol (5 ml) followed by drop-wise re-precipitation (twice) into a stirred solution of CHCl$_3$ (100 ml) and acetone (30 ml), yielded the polymeric salt as a sticky solid. This was rinsed with fresh CHCl$_3$ (2×10 ml), freed of solvent in-vacuo (45° C. for 1 hour) and dissolved in water (5 ml) to yield an acidic (pH 2) clear yellow solution. Basification to pH 12 by the addition of aqueous sodium hydroxide (30 wt %, ~0.4 ml) followed by evaporation of water produced the dry, basic polymer. This was dissolved in methanol (5 ml) and filtered to remove sodium chloride. The clear filtrate was evaporated and the residue dried in-vacuo at 45° C. for 2 hours to yield PolyPZ-28 [P-(2,2,2-trifluoroethan-1-oxy (5%)/2-methylamino)ethan-1-oxy (95%)) polyphosphazene as a pale yellow, brittle foam. Yield: 616 mg (monomer repeat unit molecular weight: 195.5, hence 77%). NMR (CD$_3$OD): 2.42 (br s,

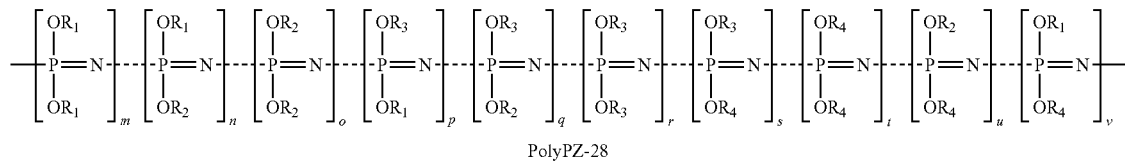

PolyPZ-28

R$_1$ = —CH$_2$CF$_3$, R$_2$ = —(CH$_2$)$_2$NHCH$_3$,
p = q = r = s = t = u = v = 0

This reaction was carried out under a nitrogen atmosphere. Sodium hydride as a 60% w/w dispersion in protecting mineral oil (824 mg, 20.6 mmol of NaH) was 2.75H, Me), 2.80 (br s, 2.00H, C2 CH$_2$), 4.11 (br s, 1.91H, C1 CH$_2$) and 4.73 ppm (br s, 0.09H, trifluoroethoxy). $^{19}$F (no reference): −75.96 ppm (br s, trifluoroethoxy).

A.4. Synthesis of: PolyPZ-29 [P-(2,2,2-trifluoroethan-1-oxy/2-(ethylamino)ethan-1-oxy/polyphosphazene]

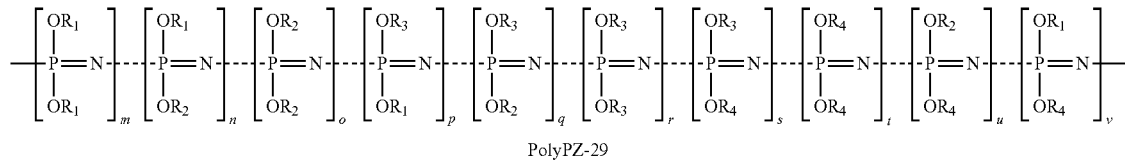

PolyPZ-29

R₁ = —CH₂CF₃, R₂ = —(CH₂)₂NHCH₂CH₃,
p = q = r = s = t = u = v = 0

This reaction was carried out under a nitrogen atmosphere. Sodium hydride as a 60% w/w dispersion in protecting mineral oil, (1.65 g, 0.99 g, 41.2 mmol of NaH) was freed from oil by washing with dry n-heptane (3×10 ml) in a test tube with the aid of a thin glass rod. After washing with each aliquot of heptane the suspended sodium hydride was precipitated by centrifugation and the clear supernatant liquid decanted. The sodium hydride was transferred, together with dry THF (60 ml) into a nitrogen-flushed 250 ml three-necked round bottomed flask, connected to a nitrogen line. 2-(Ethylamino)ethanol (3.67 g, 41.15 mmol) in dry THF (20 ml) was added slowly to the flask via a syringe and the mixture vigorously stirred at room temperature for 1.5 h. Hydrogen evolution was observed during the first 5 minutes from the alcohol addition. A white suspension formed in the THF.

PolyPZ-12 [P-bis(2,2,2-trifluoroethan-1-oxy)polyphosphazene] (2.0 g, 8.23 mmol) in dry THF (40 ml) was slowly added to the suspension prepared in the previous step, using a glass syringe. The reaction mixture was boiled under reflux for 24 h and then cooled to ambient temperature. The solvent was evaporated and the residual yellow wax added, with stirring, to water (50 ml) to yield a white suspension. This suspension was extracted with CHCl₃ (2×50 ml) and brine (10 ml) to aid the separation of phases. The CHCl₃ portions were combined, dried (MgSO₄) and evaporated to yield a clear, viscous oil which was identified as a mixture of the desired polymer; together with free 2-(ethylamino)ethanol. This oil was dissolved in water (5 ml) and the solution acidified to pH 2 (HCl, 18.5 wt %, ~10 drops). The water was evaporated and the sticky residue dissolved in methanol (10 ml) before being precipitated into a mixture of CHCl₃ and acetone (150 ml, 60:40 vol %). The resulting suspension was stirred using a magnetic stirrer until the polymeric salt had coagulated onto the glass walls of the flask, leaving a clear supernatant solution, which was decanted. The polymeric salt was rinsed with acetone (2×10 ml) dissolved in methanol (10 ml) and re-precipitated into acetone (100 ml) to yield a large white sticky agglomerate of polymer. The acetone was decanted and the product re-dissolved in water (5 ml) and basified to pH 13 (sodium hydroxide, 30 wt %, ~0.3 ml). The water was evaporated to dryness and the residue re-dissolved in methanol (20 ml). The resultant suspension was filtered to eliminate the sodium chloride and the filtrate evaporated to leave PolyPZ-29 [P-(2,2,2-trifluoroethan-1-oxy (14%)/2-(ethylamino)ethan-1-oxy (86%)) polyphosphazene] as an opaque, tacky gum. Yield: 1.40 g, (unit monomer molecular weight: 224.08, hence yield: 76%). NMR: $^1$H (CD₃OD): 1.13 (br t, J=7 Hz, 3.00H, Me), 2.68 (br q, J=7 Hz, 1.96H, NCH₂CH₃), 2.84 (br s, 1.97H, POCH₂CH₂N), 4.10 (br m, 1.95H, POCH₂CH₂N) and 4.50 ppm (br s, 0.31H, OCH₂CF₃). $^{19}$F (no internal standard): −75.89 ppm, br s, trifluoroethoxy.

A.5. Synthesis of: PolyPZ-30: [P-(2,2,2-trifluoroethan-1-oxy/2-(propylamino)ethan-1-oxy)/polyphosphazene]

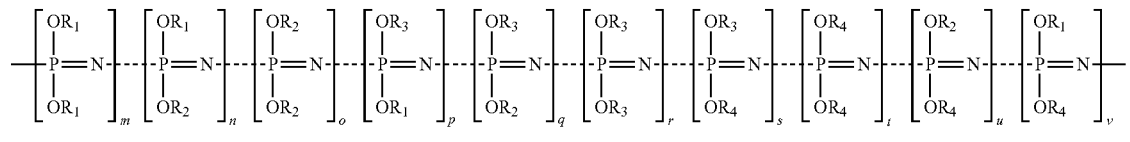

PolyPZ-30

R₁ = —CH₂CF₃, R₂ = —(CH₂)₂NH(CH₂)₂CH₃,
p = q = r = s = t = u = v = 0

This reaction was carried out under a nitrogen atmosphere. Sodium hydride as a 60% w/w dispersion in protecting mineral oil (1.65 g, 0.99 g NaH, 41.2 mmol) was freed from oil by washing with dry n-heptane (3×10 ml) in a test tube with the aid of a thin glass rod. After washing With each aliquot of heptane, the suspended sodium hydride was precipitated by centrifugation and the clear supernatant liquid decanted. The sodium hydride was transferred, together with dry THF (60 ml) into a nitrogen-flushed 250 ml three-necked round bottomed flask, connected to a nitrogen line. 2-(Propylamino)ethanol (4.25 g, 41.15 mmol) in dry THF (20 ml) was added slowly to the flask using a syringe and the mixture vigorously stirred at room temperature for 1.5 h. Hydrogen evolution was observed during the first 5 minutes from the alcohol addition. A white suspension formed in the THF.

PolyPZ-12 [P-bis(2,2,2-trifluoroethan-1-oxy)polyphosphazene] (2.0 g, 8.23 mmol) in dry THF (40 ml) was slowly added to the alkoxide suspension prepared in the previous step, using a glass syringe. The reaction mixture was boiled under reflux for 24 hours and then cooled to ambient temperature. The solvent was evaporated to leave a yellow viscous oil to which water (150 ml) was added with stirring.

This yielded a yellow suspension which coagulated spontaneously into large agglomerates of polymeric product. This product was directly extracted, without acidification into CHCl$_3$ (3×50 ml). These CHCl$_3$ extracts were combined and dried over MgSO$_4$. After filtration, the solvent was removed by rotary evaporation to leave a viscous, sticky product. This was dissolved in acetone (10 ml) and the resulting solution was precipitated drop-wise into water (200 ml) with stirring. The resulting white suspension was stirred for one hour using a magnet stirrer, by which time the polymer-had coalesced onto the glass walls of the flask. The clear supernatant liquid was decanted and the polymer rinsed several times with distilled water before being dried initially in-vacuo at 40° C. for 2 hours, then overnight above a drying agent. This yielded PolyPZ-30 [P-(2,2,2-trifluoroethan-1-oxy (15%)/2-(propylamino)ethan-1-oxy) 85%)) polyphosphazene] as a colourless, transparent, waxy solid at room temperature. Yield: 1.50 g, (monomer unit molecular weight: 248.1, 73%). NMR (acetone-d$_6$): $^1$H: 0.95 (br t, J=7 Hz, 3.00H, Me), 1.52 (br m, 1.98H, NCH$_2$CH$_2$CH$_3$), 2.59 (br s, 1.93H, NCH$_2$CH$_2$CH$_3$), 2.84 (br s, 1.95H, POCH$_2$CH$_2$N), 4.10 (br s, 1.90H, POCH$_2$CH$_2$N) and 4.48 ppm (br s, 0.34H, CH$_2$ trifluoroethoxy). $^{19}$F (no internal standard): −76.15 ppm (br s, trifluoroethoxy).

A.6. Synthesis of PolyPZ-33 [P-(2,2,2-trifluoroethan-1-oxy/N-acetyl-3-aminopropan-1-oxy)polyphosphazene]

A.6.i Preparation of PolyPZ-33 [P-(2,2,2-trifluoroethan-1-oxy (19%)/N-acetyl-3-aminopropan-1-oxy (81%)) polyphosphazene] by reaction of PolyPZ-32 [P-(2,2,2-trifluoroethan-1-oxy (19%)/3-aminopropan-1-oxy (81%)) polyphosphazene] with methyl acetate To a solution of PolyPZ-32 [P-(2,2,2-trifluoroethan-1-oxy (19%)/3-aminopropan-1-oxy (81%)) polyphosphazene] (50 mg, 0.25 mmol) in methanol (5 ml) was added an excess of methyl acetate (3.0 ml, 25 mmol, 100 equivalents). This solution was boiled under reflux for 6 hours and then cooled to room temperature. The solvent was removed by evaporation initially using a water pump and subsequently under high vacuum at 50° C. to yield: PolyPZ-33 [P-(2,2,2-trifluoroethan-1-oxy (19%)/N-acetyl-3-aminopropan-1-oxy (81%)) polyphosphazene] as a light-yellow, brittle foam. Yield: 71 mg, 104%. NMR (CD$_3$OD): $^1$H: 1.90 (br s, 2.00H, C2 CH$_2$), 1.95 (br s, 2.91H, COCH$_3$), 3.25-3.34 (br m, 2.52H, CH$_2$NHCOCH$_3$), 4.04 (br s, 2.24H, P—OCH$_2$) and 4.43 ppm (br s, 0.56H, trifluoroethoxy). $^{19}$F (no reference): −76.10 ppm (br s, trifluoroethoxy).

A.6.ii Preparation of PolyPZ-33 [P-(2,2,2-trifluoroethan-1-oxy (60%)/N-acetyl-3-aminopropan-1-oxy (40%)) polyphosphazene] by reaction of PolyPZ-12 with the sodium salt of 3-(N-acetylamino)propan-1-ol This reaction was carried out under a nitrogen atmosphere. Sodium hydride as a 60% w/w dispersion in protecting mineral oil (412 mg, 10.3 mmol of NaH) was transferred (without removing the mineral oil) into a nitrogen-flushed 50 ml three-necked round bottomed flask, connected to a nitrogen line. Dry THF (20 ml) was added to the flask. 3-(N-acetylamino)propan-1-ol was freed of acetic acid contaminant by stirring (2 g) in acetone (20 ml) with 1 g of Amberlyst A26 resin (basic form). The beads of resin were then filtered off and the solvent evaporated to yield acetic acid free product. This purified 3-(N-acetylamino)propan-1-ol, (1.21 g, 10.3 mmol) was dissolved in dry THF (5 ml) and added drop-wise to the suspension; the mixture was then stirred at room temperature for 2 hours. A white-grey suspension formed in the THF.

PolyPZ-12 [P-bis(2,2,2-trifluoroethan-1-oxy)polyphosphazene] (500 mg, 2.06 mmol) dissolved in dry THF (10 ml) was slowly added to the alkoxide suspension prepared in the previous step, using a dropping funnel. The reaction mixture

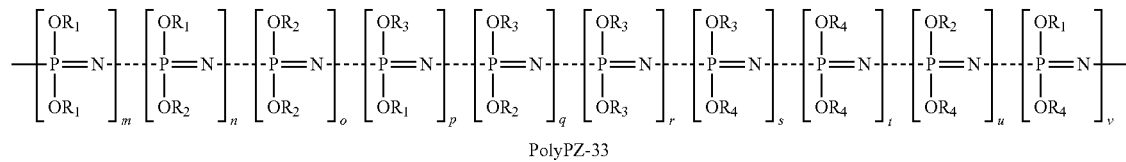

PolyPZ-33

R$_1$ = —CH$_2$CF$_3$, R$_2$ = —(CH$_2$)$_3$NHC(O)CH$_3$
p = q = r = s = t = u = v = 0 was boiled under reflux for 15 hours and then cooled to ambient temperature. The solvent was evaporated and the residual waxy product added, with stirring, to water (50 ml) to yield a strongly basic (pH 14) solution. The residual mineral oil was extracted from this with CHCl$_3$ (2×50 ml) and discarded; the aqueous phase was evaporated to dryness. The light-brown residue obtained from this aqueous phase was dissolved in acetone (50 ml) and the resulting suspension filtered to eliminate the sodium chloride. The clear filtrate was added drop-wise to CHCl$_3$ (200 ml) with stirring where the polymer coagulated. The product was rinsed with fresh CHCl$_3$ (2×10 ml) and dried in-vacuo at 45° C. for 2 hours to yield PolyPZ-33 [P-(2,2,2-trifluoroethan-1-oxy (60%)/N-acetyl-3-aminopropan-1-oxy (40%)) polyphosphazene] as a white rubbery solid. Yield: 160 mg (monomer unit MW=256.6, hence yield: 30%). NMR (CD$_3$OD): 1.81 (br s, 2.00H, C2 CH$_2$), 1.95 (br s, 3.01H, NCOMe), 3.30 {br s, 2.26H (with solvent peak), C3 CH$_2$), 4.04 (br s, 1.91H, C1 CH$_2$) and 4.39 ppm (br s, 2.92H, CH$_2$ trifluoroethoxy). $^{19}$F (no reference): −76.45 ppm (br s, trifluoroethoxy).-

A.7. Synthesis of PolyPZ-34 [P-(2,2,2-trifluoroethan-1-oxy/N-acetyl-2-(methylamino)ethan-1-oxy) polyphosphazene]

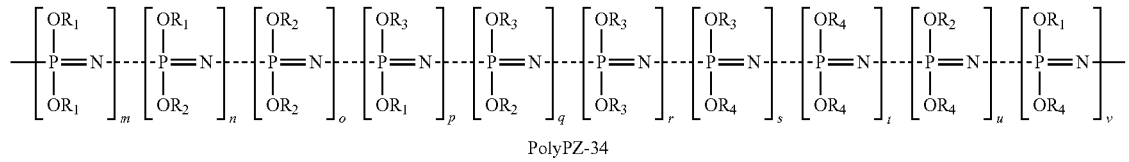

PolyPZ-34

$R_1 = $ —CH$_2$CF$_3$, $R_2 = $ —(CH$_2$)$_2$N(CH$_3$)C(O)CH$_3$,
$p = q = r = s = t = u = v = 0$

PolyPZ-28 [P-(2,2,2-trifluoroethan-1-oxy (5%)/2-(methylamino)ethan-1-oxy (95%)) polyphosphazene] (220 mg, 1.12 mmol) was added to a stirred mixture of methanol (2.2 ml), methyl acetate (8.8 ml) and acetic anhydride (220 µl, 2.33 mmol) where it dissolved. After 14 hours, the solvent was removed by evaporation to leave a white-to-grey, sticky residue which comprised the required product, but contaminated with acetic acid (335 mg). This polymer was therefore dissolved in methanol (1 ml) and twice re-precipitated into ethyl acetate (30 ml), yielding on each occasion a fine suspension which coagulated onto the glass walls of the beaker within 30 minutes, when stirred. The supernatant liquid was decanted and discarded. The polymer was rinsed with fresh ethyl acetate (2×15 ml) and then 'dried' in-vacuo at 50° C. to yield a pale yellow, brittle glass, still containing traces of acetic acid. The polymer was re-dissolved in methanol (1 ml) and Amberlyst A26 resin, basic form (50 mg) added. After stirring for one hour the Amberlyst resin was filtered off and the solvent was evaporated to leave acid-free PolyPZ-34 [P-(2,2,2-trifluoroethan-1-oxy (5%)/N-acetyl-2-(methylamino)ethan-1-oxy (95%)) polyphosphazene]. Yield: 220 mg, 51%. NMR (D$_2$O): $^1$H: 2.12 and 2.21 (two br s, 2.79H, N—COCH$_3$, syn+anti conformers), 2.93 and 3.14 (two br s, 2.99H, N-Me, syn+anti conformers), 3.67 (br s, 2.00H, POCH$_2$CH$_2$N) and 4.13 ppm (br s, 2.21H, POCH$_2$CH$_2$N). $^{19}$F (no reference): −74.80 ppm (br s, trifluoroethoxy).

B. Synthesis of Energetic Polyphosphazenes

Energetic polyphosphazenes can be made from the compounds described above and examples of some of these are given below. The conversion of PolyPZs-28, 29, 30, 31 and 32 to their salts utilises a common synthetic approach, but as these products have variable solubility in the solvents required for their purification, they require different isolation procedures. A number of individual preparation and isolation procedures are therefore described below in detail.

In many of the examples specific degrees of side chain substitution are quoted for product polyphosphazenes and their precursors. However, it is possible to modify the degrees of substitution obtained in any individual product by varying the reaction conditions employed. This approach has been previously demonstrated in WO2006032882. Thus, for example when preparing the amino PolyPZs: 28, 29, 30, 31 & 32, variations in the reaction times/temperatures employed for the substitution reaction and changes to the aminoalkoxide/polyPZ-12 ratio, will produce polyphosphazene products containing different ratios of aminoalkoxide: 2,2,2-trifluroethan-1-oxy side groups. Higher temperatures, longer reaction times and increased concentrations of the aminoalkoxide will favour the incorporation of increased proportions of this side group. The side group ratios achieved by these means in these aminoalkyl polyphosphazenes will subsequently be carried through to their respective ammonium salts (PolyPZs: 35, 36, 37, 38, 39, 40, 41, 42, 43 & 44) and acetate derivatives (PolyPZs: 33 and 34) when these are prepared from the free amines using procedures analogous to those described above. It can be advantageous to vary the different percentages of individual side groups which are present, because the physical properties of individual polyphosphazenes change as the ratios of these side chains is varied.

B.1. Synthesis of PolyPZ-35 [P-(2,2,2-trifluoroethan-1-oxy/2-methylammonium(dinitramide)ethan-1-oxy)polyphosphazene]

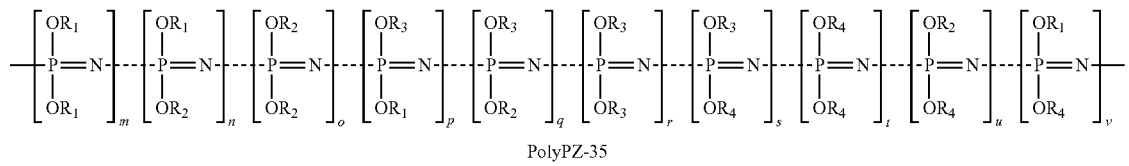

PolyPZ-35

$R_1 = $ —CH$_2$CF$_3$, $R_2 = $ —(CH$_2$)$_2$NH$_2^+$[N(NO$_2$)$_2$]$^-$CH$_3$,
$p = q = r = s = t = u = v = 0$

To a solution of PolyPZ-28 [P-(2,2,2-trifluoroethan-1-oxy (5%)/2-methylaminoethan-1-oxy (95%)) polyphosphazene] (990 mg, monomer unit: molecular weight 196, 5.05 mmol) in water (20 ml) was added ammonium dinitramide (ADN, 3.0 g, 24.2 mmol) with stirring. The ADN dissolved rapidly imparting a light green tinge to the solution and there was an immediate smell of ammonia. The water was removed by evaporation and the residue was re-dissolved in water (10 ml). The solution was then again evaporated to dryness (50° C.) under reduced pressure (water pump) to ensure a stoichiometric loss of ammonia. The residue was re-dissolved in a minimum volume of water (3 ml) and then precipitated into methanol (100 ml). The suspension was stirred using a magnet stirrer for 1 hour to coagulate the polymer particles, which adhered to the walls of the flask. The supernatant liquid was decanted off and the polymeric salt, re-dissolved in water (3 ml) and re-precipitated into acetone (100 ml) to yield a very fine suspension, which failed to coagulate after 16 hours (a second precipitation into methanol yielded a clear solution. The product was separated by centrifugation and given a final rinse with fresh acetone (2×5 ml). Residual solvent was removed under high vacuum at 50° C. for 2 hours to yield PolyPZ-35 [P-(2,2,2-trifluoroethan-1-oxy (5%)/2-methylammonium(dinitramide)ethan-1-oxy (95%)) polyphosphazene] as a brown gum. Yield: 839 mg (2.10 mmols, monomer unit molecular weight=398.8, 42%).

B.2. Synthesis of PolyPZ-36 [P-(2,2,2-trifluoroethan-1-oxy/2-methylammonium(nitrate)ethan-1-oxy) polyphosphazene]

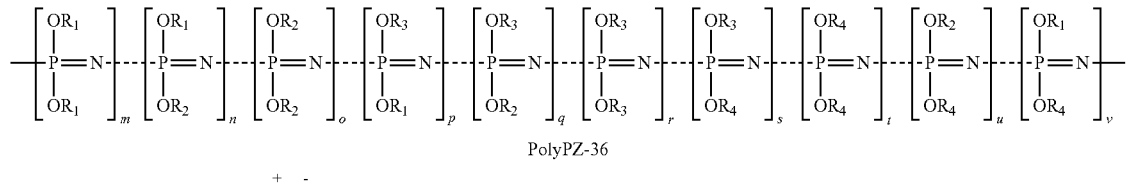

PolyPZ-36

$R_1 = $ —CH$_2$CF$_3$, $R_2 = $ —(CH$_2$)$_2$N(NO$_3$)CH$_3$,
$p = q = r = s = t = u = v = 0$

To a solution of PolyPZ-28 [P-(2,2,2-trifluoroethan-1-oxy (5%)/2-methylaminoethan-1-oxy (95%)) polyphosphazene] (100 mg, 0.51 mmol) in water (2 ml) was added ammonium nitrate (200 mg, 2.5 mmol) with stirring. There was an immediate smell of ammonia. The water was evaporated off and the residue re-dissolved in water (2 ml). The solution was then again evaporated to dryness (50° C.) under reduce pressure (water pump) to ensure a stoichiometric loss of ammonia. The residue was dissolved in a minimum volume of water (0.5 ml) and precipitated into acetone (20 ml). The suspension was stirred for 1 hour using a magnetic stirrer to coagulate the polymer particles, which adhered to the flask walls. The polymeric salt was re-dissolved in water (0.3 ml) and precipitated into a mixture of methanol/acetone (8:2 by vol). The resultant suspension was stirred to coagulate the polymer, which adhered to the flask walls. The clear supernatant was discarded and the sticky polymeric salt rinsed with fresh methanol/acetone mixture (2×3 ml) and finally with acetone (2×5 ml). Residual solvent was removed in-vacuo at 50° C. for 2 hours to yield PolyPZ-36 [P-(2,2,2-trifluoroethan-1-oxy (5%)/2-methylammonium (nitrate) ethan-1-oxy (95%)) polyphosphazene], as a brown gum. Yield: 48 mg (monomer unit molecular weight=315.2, 0.15 mmol, 30%).

B.3. Synthesis of PolyPZ-37 [P-(2,2,2-trifluoroethan-1-oxy/3-ammonium(dinitramide)propan-1-oxy) polyphosphazene]

To PolyPZ-32 [P-(2,2,2-trifluoroethan-1-oxy (19%)/3-aminopropan-1-oxy (81%)) polyphosphazene], 670 mg, (monomer unit molecular weight: 203.1; 3.30 mmol) dissolved into methanol (12 ml) was added ADN (1.24 g, 10 mmol) with stirring. There was an immediate smell of ammonia and a precipitate quickly formed. This coagulated to form a sticky yellow agglomerate of polymer. The supernatant liquid was discarded and the polymeric salt added to water (5 ml) to yield (after ~10 minutes) a swollen hydrogel. Continued stirring for 30 minutes caused this gel to dissolve completely. This polymer solution was re-precipitated into methanol (100 ml); the methanol was then removed and discarded, the product re-dissolved in water (3 ml) and re-precipitated into diethyl ether (100 ml). The resulting suspension was stirred using a magnet stirrer to coagulate the polymer salt onto the glass walls of the flask. After decanting the supernatant liquid, the polymeric salt was rinsed with fresh diethyl ether (2×10 ml). Residual solvent was then removed from the product in-vacuo at 50° C. to yield PolyPZ-37 [P-(2,2,2-trifluoroethan-1-oxy (19%)/3-ammonium(dinitramide)propan-1-oxy (81%)) polyphosphazene] as a malleable, hygroscopic yellow gum. Yield: 538 mg (monomer unit molecular weight=375.8, 1.43 mmol, 43%).

B.4. Synthesis of PolyPZ-38 [P-(2,2,2-trifluoroethan-1-oxy/3-ammonium(nitrate)propan-1-oxy)polyphosphazene]

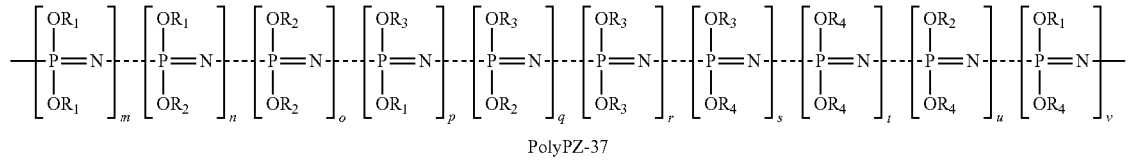

PolyPZ-37

$R_1 = $ —CH$_2$CF$_3$, $R_2 = $ —(CH$_2$)$_3$NH(NNO$_2$)
$p = q = r = s = t = u = v = 0$

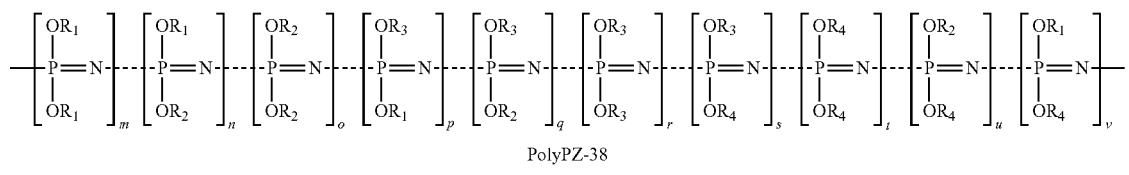

PolyPZ-38

$R_1 = $ —$CH_2CF_3$, $R_2 = $ —$(CH_2)_3\overset{+}{N}H_3(\overset{-}{N}O_3)$
$p = q = r = s = t = u = v = 0$ To a solution of PolyPZ-32 [P-(2,2,2-trifluoroethan-1-oxy (19%)/3-aminopropan-1-oxy (81%)) polyphosphazene], (100 mg, 0.49 mmol) in water (2 ml) was added ammonium nitrate (200 mg, 2.5 mmol) with stirring. A smell of ammonia was detected immediately. The water was evaporated off and the residue re-dissolved in water (2 ml). The solution was then evaporated to dryness again (50° C.) under reduced pressure (water pump) to ensure quantitative removal of ammonia. The residue was added to the minimum volume of water (0.5 ml) and the polymeric salt left to swell to a hydrogel (~5 minutes). This gel was then removed from the flask and added, without stirring, to methanol (10 ml), which caused the polymer to shrink immediately. The methanol was decanted off and the sticky polymeric salt rinsed with fresh methanol (2×10 ml). Residual solvent was removed in-vacuo at 50° C. to yield PolyPZ-38 [P-(2,2,2-trifluoroethan-1-oxy/3-ammonium(nitrate) propan-1-oxy)polyphosphazene], as a brown gum. Yield: 50 mg (monomer unit molecular weight: 304.5, 0.16 mmol, 34%).

B.5. Synthesis of PolyPZ-39 [P-(2,2,2-trifluoroethan-1-oxy/2-butylammonium(dinitramide)ethan-1-oxy)polyphosphazene]

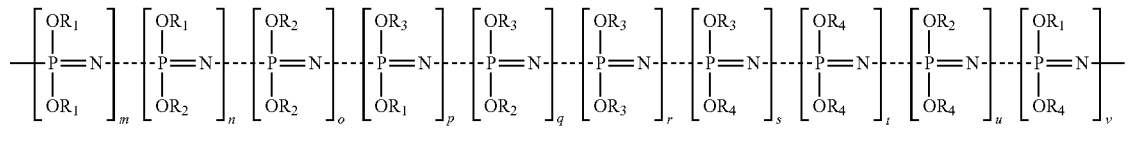

PolyPZ-39

$R_1 = $ —$CH_2CF_3$, $R_2 = $ —$(CH_2)_2\overset{+}{N}H_2[\overset{-}{N}(NO_2)_2](CH_2)_3CH_3$
$p = q = r = s = t = u = v = 0$ To a solution of PolyPZ-31 [P-(2,2,2-trifluoroethan-1-oxy (18%)/2-butylaminoethan-1-oxy (82%)) polyphosphazene] (250 mg, 2.45 mmol) in acetone (5 ml) was added ADN (500 mg, 4.0 mmol) with stirring. A smell of ammonia was immediately apparent. The solvent was evaporated off and the residue re-dissolved in acetone (5 ml). The solution was then evaporated to 'dryness' again (50° C.) under reduced pressure (water pump), to ensure quantitative removal of ammonia and the residue added to a minimum volume of acetone (0.5 ml) which was precipitated into water (25 ml). Stirring the resultant suspension for 40 minutes caused coagulation of the polymeric salt onto the glass walls of the flask. The aqueous layer was decanted and the polymeric salt re-dissolved in acetone (3 ml) and re-precipitated into water (60 ml). The fine suspension which resulted was extracted with ethyl acetate (2×50 ml). (ADN is not soluble in ethylacetate.) The organic phase was dried ($MgSO_4$), filtered and evaporated to dryness to yield PolyPZ-39 [P-(2,2,2-trifluoroethan-1-oxy (18%)/2-butylammonium(dinitramide) ethan-1-oxy (82%)) polyphosphazene] as a light brown gum. Yield: 113 mg (monomer unit molecular weight: 446.3, 0.25 mmol, 10%).

B.6. Synthesis of PolyPZ-40 [P-(2,2,2-trifluoroethan-1-oxy/2-butylammonium(nitrate)ethan-1-oxy) polyphosphazene]

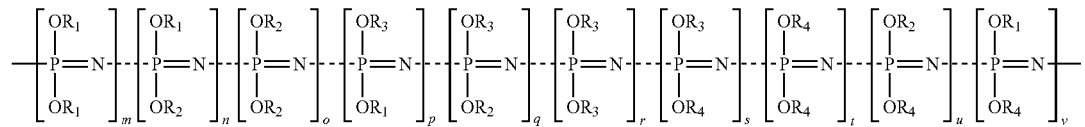

PolyPZ-40

$R_1 = $ —$CH_2CF_3$,
$R_2 = $ —$(CH_2)_2\overset{+}{N}H_2(\overset{-}{N}O_3)(CH_2)_3CH_3$,
$p = q = r = s = t = u = v = 0$ To a solution of PolyPZ-31 [P-(2,2,2-trifluoroethan-1-oxy (18%)/2-butylaminoethan-1-oxy (82%)) polyphosphazene] (75 mg, 0.28 mmol) in acetone (2 ml) was added ammonium nitrate (100 mg, 1.2 mmol) with stirring. A smell of ammonia was immediately apparent. Water (0.5 ml) was then added to the suspension to dissolve the ammonium nitrate; this yielded a clear solution. The solvent was evaporated off and the sticky residue re-dissolved in water (2 ml); the solution was then evaporated to dryness again (50° C.) under reduced pressure (water pump) to ensure quantitative removal of ammonia. The residue was dissolved in a minimum amount of acetone (0.5 ml) and precipitated into water (10 ml). The polymeric salt was dried in-vacuo at 50° C. to yield: PolyPZ-40 [P-(2,2,2-trifluoroethan-1-oxy (18%)/2-butylammonium(nitrate)ethan-1-oxy (82%)) polyphosphazene]. Yield: 92 mg, (monomer unit molecular weight: 374.2, 0.25 mmol, 88%).

B.7. Synthesis of PolyPZ-41 [P-(2,2,2-trifluoroethan-1-oxy/2-ethylammonium(dinitramide)ethan-1-oxy)polyphosphazene]

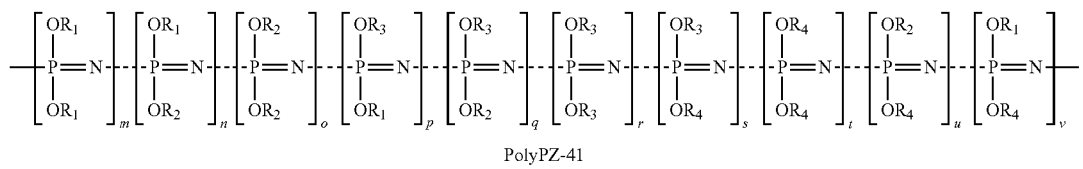

PolyPZ-41

$R_1 = \text{—CH}_2\text{CF}_3$,
$R_2 = \text{—(CH}_2)_2\overset{+}{\text{NH}}_2[\text{N}(\overset{-}{\text{NO}}_2)_2]\text{CH}_2\text{CH}_3$
$p = q = r = s = t = u = v = 0$ To a solution of PolyPZ-29 [P-(2,2,2-trifluoroethan-1-oxy (14%)/2-ethylaminoethan-1-oxy (86%)) polyphosphazene] (460 mg, 2.5 mmol) in acetone (10 ml) was added ammonium dinitramide (930 mg, 7.5 mmol), with stirring. A smell of ammonia was immediately apparent. The solvent was evaporated and the residue was re-dissolved in acetone (5 ml). The solution was evaporated once again (50° C.) under reduced pressure (water pump) to ensure a stoichiometric loss of ammonia. The residue was then re-dissolved in acetone (3 ml) and precipitated into water (50 ml, twice). Stirring the suspension did not cause coagulation of the product, which was instead isolated by centrifugation (the polymer salt is insoluble in ethyl acetate, diethyl ether and chloroform). The product was rinsed with solvent (2×5 ml) and dried to yield PolyPZ-41 [P-(2,2,2-trifluoroethan-1-oxy (14%)/2-ethylammonium (dinitramide)ethan-1-oxy (86%)) polyphosphazene] as a brown gum. Yield: 450 mg, (monomer unit molecular weight: 408.1, 1.10 mmol, 44%).

B.8. Synthesis of PolyPZ-42 [P-(2,2,2-trifluoroethan-1-oxy/2-propylammonium(dinitramide)ethan-1-oxy)polyphosphazene]

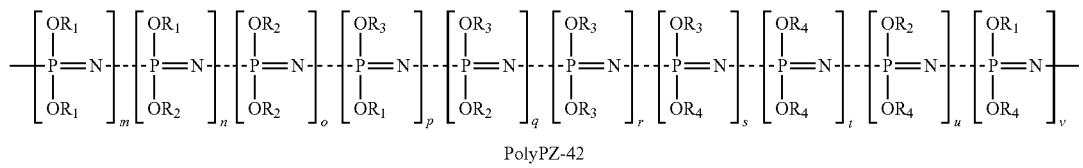

PolyPZ-42

$R_1 = \text{—CH}_2\text{CF}_3$,
$R_2 = \text{—(CH}_2)_2\overset{+}{\text{NH}}_2[\text{N}(\overset{-}{\text{NO}}_2)_2](\text{CH}_2)_2\text{CH}_3$,
$p = q = r = s = t = u = v = 0$ To a solution of PolyPZ-30 [P-(2,2,2-trifluoroethan-1-oxy (15%)/2-propylaminoethan-1-oxy (85%))/polyphosphazene] (560 mg, 2.26 mmol) in acetone (10 ml) was added ammonium dinitramide (840 mg, 6.8 mmol) with stirring. A smell of ammonia was immediately apparent. The solvent was evaporated and the residue re-dissolved in acetone (5 ml). This solvent was then evaporated (to ensure a stoichiometric loss of ammonia). The residue was re-dissolved in acetone (1 ml) and precipitated into water (100 ml, twice) to give a fine suspension. As stirring the suspension did not cause coagulation of the product, it was isolated by centrifugation and rinsed with water (2×5 ml). Residual water was then removed (50° C.) under reduced pressure (water pump) to yield PolyPZ-42 [P-(2,2,2-trifluoroethan-1-oxy (15%)/2-propylammonium(dinitramide)ethan-1-oxy (85%)) polyphosphazene].

B.9. Synthesis of PolyPZ-43 [P-(2,2,2-trifluoroethan-1-oxy/2-ethylammonium(nitrate)ethan-1-oxy) polyphosphazene]

B.10. Properties of Polyphosphazenes

Properties of polyphosphazenes were investigated. The results are shown in Tables 1 to 3.

TABLE 1

| | Solubility | | |
|---|---|---|---|
| Parent Polymer | Soluble in | Polymeric salt [HN(NO$_2$)$_2$] | Soluble in |
| PolyPZ-31 | Acetone, CHCl$_3$, Et$_2$O, CH$_3$CN, MeOH | PolyPZ-39 | Acetone, MeOH |
| PolyPZ-30 | MeOH, water, acetone, ethyl acetate | PolyPZ-42 | Acetone, MeOH |
| PolyPZ-29 | MeOH, acetone, ethyl acetate | PolyPZ-41 | Acetone, |
| PolyPZ-28 | MeOH, water | PolyPZ-35 | Water |

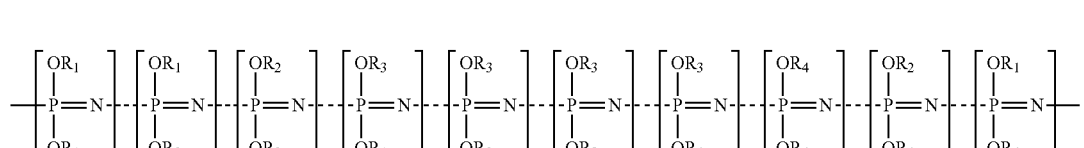

PolyPZ-43

$R_1 = \text{---CH}_2\text{CF}_3$,
$R_2 = \text{---(CH}_2)_2\overset{+}{\text{NH}}_2(\text{N}\overset{-}{\text{O}}_3)\text{CH}_2\text{CH}_3$,
$p = q = r = s = t = u = v = 0$ and PolyPZ-44 [P-(2,2,2-trifluoroethan-1-oxy/2-propylammonium(nitrate)ethan-1-oxy)polyphosphazene]:

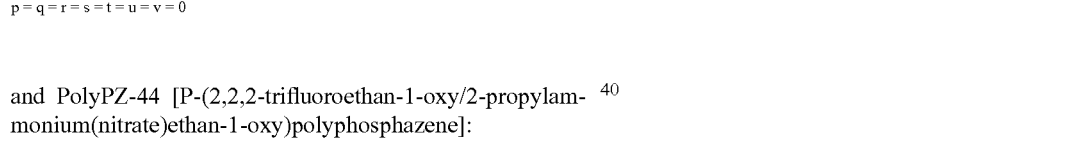

PolyPZ-44

$R_1 = \text{---CH}_2\text{CF}_3$,
$R_2 = \text{---(CH}_2)_2\overset{+}{\text{NH}}_2(\text{N}\overset{-}{\text{O}}_3)(\text{CH}_2)_2\text{CH}_3$,
$p = q = r = s = t = u = v = 0$ PolyPZ-43 [P-(2,2,2-trifluoroethan-1-oxy/2-ethylammonium(nitrate)ethan-1-oxy)polyphosphazene] may be prepared by the reaction of ammonium nitrate with Poly-PZ-29 [P-(2,2,2-trifluoroethan-1-oxy/2-ethylaminoethan-1-oxy) polyphosphazene] and PolyPZ-44 [P-(2,2,2-trifluoroethan-1-oxy/2-propylammonium(nitrate)ethan-1-oxy)polyphosphazene] by the reaction of polyphosphazene] using procedures analogous to those described above.

TABLE 1-continued

| | Solubility | | |
|---|---|---|---|
| Parent Polymer | Soluble in | Polymeric salt [HN(NO$_2$)$_2$] | Soluble in |
| PolyPZ-32 | MeOH, water | PolyPZ-37 | water |

TABLE 2

Thermal Stability

| Polymeric salt | Oxygen balance (to $H_3PO_4$, HF, $CO_2$ and $H_2O$) | Tg by DSC (° C.) | DSC ($N_2$ purge, 20 ml min$^{-1}$), range 30-350° C. at 5 K min$^{-1}$ | | | |
|---|---|---|---|---|---|---|
| | | | Sample mass (mg) | Decomp. onset (° C.) | Decomp. peak (° C.) | Decomp. Energy (J g$^{-1}$) |
| PolyPZ-39 | −94.5 | −15 | 0.510 | 172 | 175 | 1250 |
| PolyPZ-42 | −104.6 | −25 | 0.392 | 155 | 184 | 853 |
| PolyPZ-41 | −85.0 | −28 | 0.650 | 156 | 198 | 1012 |
| PolyPZ-35 | −57.1 | +22 | 0.513 | 178 | 190 | 1131 |
| PolyPZ-37 | −52.6 | −12 | 0.499 | 161 | 175 | 1762 |

TABLE 3

Density values (by gas pycnometry)

| Dinitramide salt of | Measured density [g cm$^{-3}$] |
|---|---|
| PolyPZ-39 | 1.4136 ± 0.0012 (±0.08%) |
| PolyPZ-42 | 1.4256 ± 0.0012 (±0.08%) |
| PolyPZ-41 | 1.4619 ± 0.0018 (±0.12%) |
| PolyPZ-35 | 1.6025 ± 0.0034 (±0.21%) |
| PolyPZ-37 | 1.5526 ± 0.0019 (±0.12%) |

B.11 Synthesis of PolyPZ-45 [P-(2,2,2-trifluoroethan-1-oxy/3-ammonium(3-nitro-5-oxo-1,2,4-triazolonate)propan-1-oxy)polyphosphazene]

polyphosphazene] as a bright yellow, brittle foam. Yield: 1.8 g (29%). Evaporation of methanol from the supernatant solution yielded an orange, brittle residue (1.9 g) which was identified as PolyPZ-46 [P-(2,2,2-trifluoroethan-1-oxy (19%)/3-aminopropan-1-oxy/3-ammonium(3-nitro-5-oxo-1,2,4-triazolonate)propan-1-oxy)polyphosphazene](total amino and ammonium groups: 81%). NMR (DMSO-d6): 19F (no internal standard, PolyPZ-45): −75.33 ppm, (PolyPZ-46): −75.08 ppm; 13C: (PolyPZ-45): 31.0 (C-2 3-aminopropoxy), 39.6 (C-3 3-aminopropoxy), 66.8 (C-1 3-aminopropoxy), 161.3 (C-1 NTO) and 167.2 ppm (C-5 NTO).

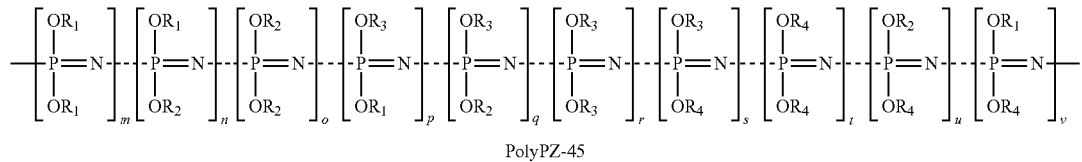

PolyPZ-45

$R_1 = $ —$CH_2CF_3$,

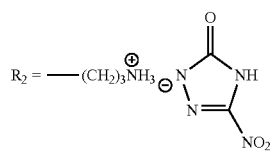

$p = q = r = s = t = u = v = 0$

A solution of PolyPZ-32 [P-(2,2,2-trifluoroethan-1-oxy (19%)/3-aminopropan-1-oxy (81%)) polyphosphazene] (3.0 g, 14.9 mmol) was added drop-wise to a stirred solution of 3-nitro-1,2,4-triazol-5-one, (NTO, 2.14 g, 16.5 mmol) in warm methanol (50 ml). A bright yellow precipitate appeared immediately. As more NTO solution was added, the precipitated particles coagulated into a large sticky agglomerate. Once all of the NTO solution had been added, the orange supernatant liquid was decanted off and residual solvent removed from the polymeric salt in vacuo, to yield PolyPZ-45 [P-(2,2,2-trifluoroethan-1-oxy (19%)/3-ammonium(3-nitro-5-oxo-1,2,4-triazolonate)propan-1-oxy (81%))

To a solution of the orange residue from above (PolyPZ-46, 550 mg, ~2.7 mmol) in methanol (30 ml) was added, drop-wise, a solution of NTO (360 mg, 2.7 mmol) in methanol (10 ml). A yellow precipitate appeared immediately. The precipitate was filtered off and residual solvent removed under reduced pressure to yield PolyPZ-45 [P-(2,2,2-trifluoroethan-1-oxy (19%)/3-ammonium(3-nitro-5-oxo-1,2,4-triazolonate)propan-1-oxy (81%)) polyphosphazene] as a bright yellow brittle powder (610 mg). Evaporation of solvent from the filtrate yielded a yellowish white residue, which contained a mixture of NTO and PolyPZ-46 (450 mg).

B.12. Synthesis of PolyPZ-53 [P-(2,2,2-trifluoroethan-1-oxy/3-ammonium (1'-amino-1'-hydrazino-2', 2'-dinitroethenate)propan-1-oxy)polyphosphazene]

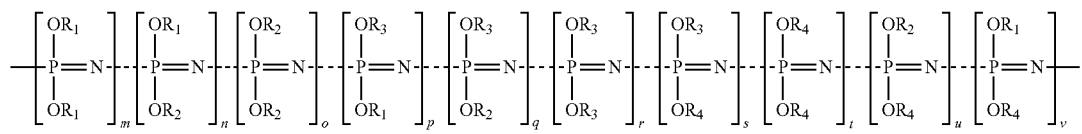

PolyPZ-53

$R_1$ = —CH$_2$CF$_3$,

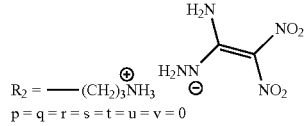

$R_2$ = —(CH$_2$)$_3$NH$_3$ ⊕  ⊖ p = q = r = s = t = u = v = 0

To a stirred solution of PolyPZ-32 [P-(2,2,2-trifluoroethan-1-oxy (19%)/3-aminopropan-1-oxy (81%)) polyphosphazene] (100 mg, 0.50 mmol) in methanol (2 ml) was added in a single portion, 1-amino-1-hydrazino-2,2-dinitroethene (hydrazo-FOX-7, 81 mg, 0.5 mmol—see below for preparation). The hydrazo-FOX-7 dissolved slowly, imparting a yellow-to-orange colour to the solution. After 10 minutes the polymeric salt precipitated as a yellow gum. This was filtered off and residual solvent removed in-vacuo to yield PolyPZ-53 [P-(2,2,2-trifluoroethan-1-oxy/3-ammonium (1'-amino-1'-hydrazino-2',2'-dinitroethenate)propan-1-oxy)polyphosphazene as a yellow brittle foam. Yield: 45 mg (monomer unit molecular weight: 466.5, 0.096 mmol, 19%). NMR (DMSO-d$_6$): $^{19}$F (no internal standard): −73.84 ppm, $^{13}$C:127.6 and 151.2 ppm (ionised hydrazo-FOX-7); the signals of the pendent 3-aminopropoxy chains were weak, broad humps at 30, 35 and 65 ppm (accumulation: 10000 pulses).

For the preparation of Hydrazo-FOX-7,1,1-Diamino-1,2-dinitroethene (FOX-7, 1.0 g, 6.75 mmol) was added to a solution of hydrazine hydrate (670 mg, 13.4 mmol) in water (7.0 ml) with vigorous stirring. The mixture was boiled under reflux for 30 minutes during which time a red colour developed and the FOX-7 dissolved completely. After cooling, the solution was poured into ethanol (35 ml); orange crystals began to separate after one day. After two days the product, hydrazo-FOX-7, was filtered off, washed with ethanol (2×10 ml) and dried in a desiccator over calcium chloride, for 48 hours. Yield: 625 mg, 57%. $^{13}$C NMR (DMSO-d6): 158.0 and 126.7 ppm.

Caution:
The crystalline form of this intermediate product is not stable and may decompose violently without warning.

B.13. Synthesis of PolyPZ-47 [P-(2,2,2-trifluoroethan-1-oxy/3-ammonium(5-aminotetrazolate)propan-1-oxy)polyphosphazene]

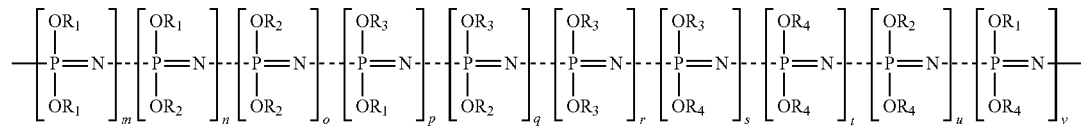

PolyPZ-47

$R_1$ = —CH$_2$CF$_3$,

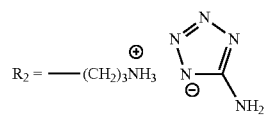

$R_2$ = —(CH$_2$)$_3$NH$_3$ ⊕ p = q = r = s = t = u = v = 0

B.13.i In Methanol

5-Aminotetrazole monohydrate (51 mg, 0.49 mmol) was dissolved in warm (40° C.) methanol (5 ml). This solution was then added with stirring to a solution of PolyPZ-32 [P-(2,2,2-trifluoroethan-1-oxy (19%)/3-aminopropan-1-oxy (81%)) polyphosphazene] (100 mg, 0.49 mmol) in methanol (2 ml). The resulting clear, colourless solution was evaporated to yield PolyPZ-47 [P-(2,2,2-trifluoroethan-1-oxy (19%)/3-ammonium(5-aminotetrazolate)propan-1-oxy (81%)) polyphosphazene] as a clear, colourless, wax. Yield: 162 mg (monomer unit molecular weight: 340.2, 97%).

B.13.ii In Water

5-Aminotetrazole monohydrate (125 mg, 1.2 mmol) was dissolved in water (5 ml) and added with stirring to a solution of PolyPZ-32 [P-(2,2,2-trifluoroethan-1-oxy (19%)/3-aminopropan-1-oxy (81%)) polyphosphazene] (200 mg, 1.0 mmol) in water (3 ml). This yielded a colourless solution which was volume reduced by evaporation to produce a more concentrated solution of the polymeric salt (final volume ~2 ml). This solution was precipitated drop-wise into warm (40° C.) acetone (30 ml) causing the product to coagulate onto the walls of the flask. The supernatant liquid was decanted off and the polymer rinsed with fresh acetone. Residual solvent was removed in-vacuo at 50° C. to yield PolyPZ-47 [P-(2,2,2-trifluoroethan-1-oxy (19%)/3-ammonium(5-aminotetrazolate)propan-1-oxy (81%)) polyphosphazene] as a colourless, clear waxy gum. Yield: 260 mg (80%). NMR: $^{13}$C (product obtained from water, DMSO-$d_6$, 10000 pulses): 30, 34.8, 63.3 (broad, weak signals of C-3, C-2 and C-1 of 3-aminopropoxy unit respectively) and 161.8 (5-aminotetrazolate).

B.14. Synthesis of PolyPZ-48 [P-(2,2,2-trifluoroethan-1-oxy/2-ethylammonium(5-aminotetrazolate)ethan-1-oxy)polyphosphazene]

[P-(2,2,2-trifluoroethan-1-oxy/2-propylammonium(5-aminotetrazolate)ethan-1-oxy)polyphosphazene], by scaling the volumes of methanol used to the quantity of amino polymer employed.

B14.i. PolyPZ-48

PolyPZ-29 [P-(2,2,2-trifluoroethan-1-oxy/2-ethylaminoethan-1-oxy)polyphosphazene] (212 mg, 0.95 mmol)+5-aminotetrazole monohydrate (98 mg, 0.95 mmol) gave, after work-up and drying: PolyPZ-48 [P-(2,2,2-trifluoroethan-1-oxy/2-ethylammonium(5-aminotetrazolate)ethan-1-oxy)polyphosphazene], yield: 301 mg (102%).

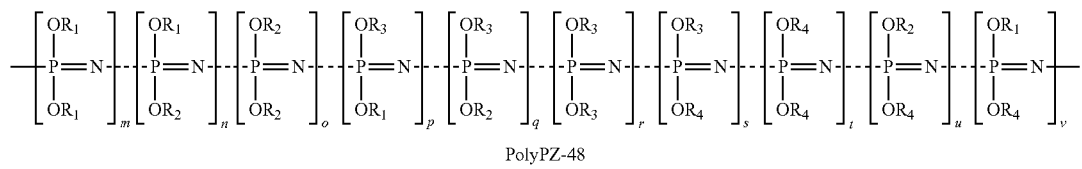

PolyPZ-48

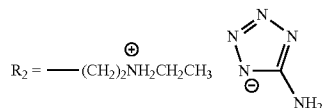

$p = q = r = s = t = u = v = 0$ and PolyPZ-49 [P-(2,2,2-trifluoroethan-1-oxy/2-propylammonium(5-aminotetrazolate)ethan-1-oxy)polyphosphazene]:

B14.ii. PolyPZ-49

PolyPZ-30: [P-(2,2,2-trifluoroethan-1-oxy/2-propylaminoethan-1-oxy)polyphosphazene] (372 mg, 1.50 mmol)+5-

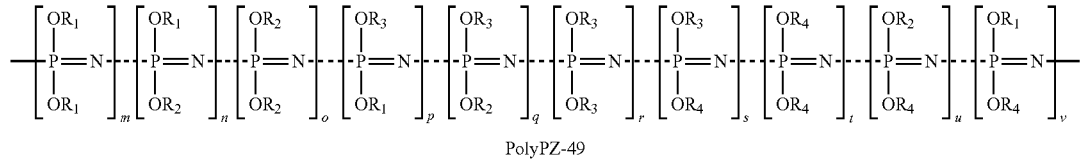

PolyPZ-49

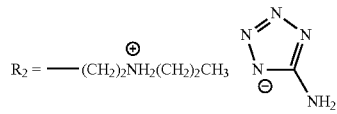

$p = q = r = s = t = u = v = 0$

The method described above for the preparation of PolyPZ-47 in methanol was used to make both PolyPZ-48 [P-(2,2,2-trifluoroethan-1-oxy/2-ethylammonium(5-aminotetrazolate)ethan-1-oxy)polyphosphazene] and PolyPZ-49 aminotetrazole monohydrate (155 mg, 1.50 mmol) gave, after work up and drying: PolyPZ-49 [P-(2,2,2-trifluoroethan-1-oxy/2-propylammonium(5-aminotetrazolate)ethan-1-oxy)polyphosphazene], yield: 509 mg (101%).

B.15. Synthesis of PolyPZ-50 [P-(2,2,2-trifluoroethan-1-oxy/3-ammonium(picrate)propan-1-oxy)polyphosphazene]

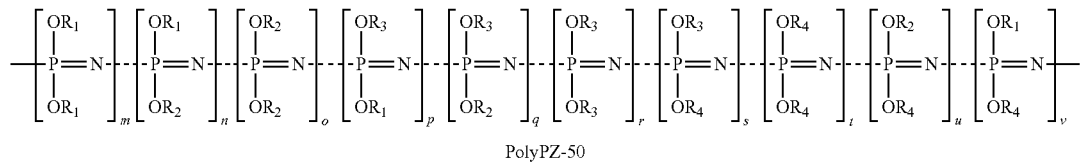

PolyPZ-50

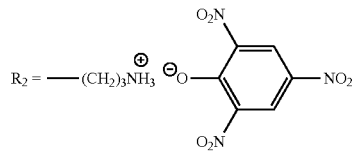

$p = q = r = s = t = u = v = 0$

A solution of dry picric acid (166 mg, 0.72 mmol) in methanol (3 ml) was added drop-wise to a rapidly stirring solution of dry, PolyPZ-32 [P-(2,2,2-trifluoroethan-1-oxy (19%)/3-aminopropan-1-oxy (81%)) polyphosphazene] (150 mg, 0.72 mmol) in methanol (5 ml). A yellow precipitate appeared almost immediately. The suspension was left stirring at room temperature for 10 minutes, after which time the polymeric salt coagulated onto the walls of the flask. The clear yellow supernatant liquid was discarded and the product rinsed several times with fresh methanol, then dried to constant weight in-vacuo at 50° C. This yielded: PolyPZ-50 [P-(2,2,2-trifluoroethan-1-oxy (19%)/3-ammonium(picrate)propan-1-oxy (81%)) polyphosphazene] as a dark orange, brittle powder (181 mg, monomer unit molecular weight: 573.5, 0.31 mmol, 44%), which was soluble in DMSO.

Synthesis of PolyPZ-51 [P-(2,2,2-trifluoroethan-1-oxy/3-ammonium(3,5-diaminopicrate)propan-1-oxy) polyphosphazene]

Solid, dry 3,5-diaminopicric acid (190 mg, 0.72 mmol) was added in one portion to a rapidly stirring solution of dry, basic PolyPZ-32 [P-(2,2,2-trifluoroethan-1-oxy (19%)/3-aminopropan-1-oxy (81%)) polyphosphazene] (150 mg, 0.72 mmol) in methanol (5 ml). Bright yellow globules of the polymeric salt soon started to coagulate onto the glass walls of the flask. The suspension was left stirring at room temperature for a further 10 minutes, after which time the clear yellow supernatant liquid was discarded and the product rinsed several times with fresh methanol. Residual solvent was removed in-vacuo at 50° C. to yield PolyPZ-51 [P-(2,2,2-trifluoroethan-1-oxy (19%)/3-ammonium(3,5-diaminopicrate)propan-1-oxy (81%)) polyphosphazene] as a bright yellow, brittle powder, 200 mg (monomer molecular weight: 622.1, 0.32 mmol, 44%), which was soluble in DMSO.

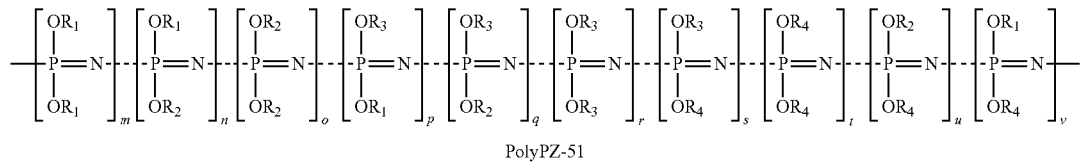

PolyPZ-51

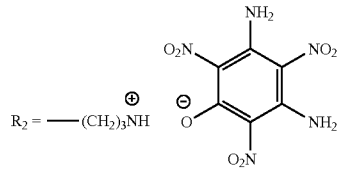

$p = q = r = s = t = u = v = 0$

B.16 Synthesis of PolyPZ-52
[P-bis(3-nitro-3-azabutan-1-oxy)polyphosphazene]

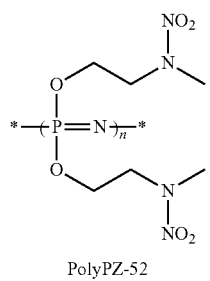

PolyPZ-52

This reaction was carried out under a nitrogen atmosphere. Sodium hydride as a 60% w/w dispersion in protecting mineral oil, (311 mg, 7.77 mmol of NaH) was freed from oil by washing with dry hexane (3×10 ml) in a 20 ml test tube with the aid of a thin glass rod. After washing with each aliquot of hexane the suspended sodium hydride was precipitated by centrifugation and the clear supernatant liquid decanted. Dry THF (10 ml) was added to the oil-free NaH and the resulting suspension transferred to a nitrogen-flushed 50 ml three-necked round bottomed flask (connected to a nitrogen line). Dry THF (10 ml) was added to this flask to increase the total volume of solvent to 20 ml. 3-Nitro-3-azabutan-1-ol (933 mg, 7.77 mmol) in dry THF (5 ml) was added slowly via syringe and the mixture vigorously stirred at room temperature for 30 hours. Hydrogen evolution was observed during the first 5 minutes after the alcohol addition. The grey suspension thickened considerably after 10 minutes.

A solution of polydichlorophosphazene (PDCP; see WO2006/032882) in THF (3.1 ml, 97 mg PDCP/ml, ~2.59 mmol) was slowly added to the alkoxide suspension prepared in the previous step, using a glass syringe. A small exotherm was detected. The reaction mixture was then boiled under reflux for 21 hours. The solvent was removed by evaporation and the residual brown wax added, with stirring, to water (15 ml) to yield a yellow suspension. This was extracted without acidification using $CHCl_3$ (2×50 ml) to remove as much residual 3-nitro-3-azabutan-1-ol as possible. The aqueous phase was evaporated to dryness to leave a yellow waxy residue. This was triturated in acetone (5 ml), the resulting suspension being filtered to eliminate sodium chloride and the solvent evaporated to leave a sticky yellow residue. The $^1H$ NMR of this material showed it to be PolyPZ-52 contaminated with the free nitramino alcohol. This viscous liquid was dissolved in water (20 ml) to yield a basic, clear yellow solution (pH 10) which was acidified to pH 2 (aqueous 18% HCl, ~0.5 ml) to precipitate the (purified) polymer, which, upon stirring, coagulated onto the glass walls of the flask as a white swollen gum. The material was rinsed with water to neutral pH and dried in-vacuo at 50° C. to yield PolyPZ-52 [P-bis(3-nitro-3-azabutan-1-oxy)polyphosphazene] as a clear, brown, viscous liquid. On cooling to room temperature the viscosity of the material increased to give a waxy consistency, yield: 243 mg (monomer unit molecular weight: 283.0, yield: 33%). NMR (acetone-de): $^1H$: 3.51 (br s, 3.14H, N-Me), 4.18 (br s, 2.29H, $CH_2N(NO_2)Me$) and 4.31-4.42 ppm (br m, 2.00H, $POCH_2$).

C. Synthesis of Readily Curable Polyphosphazenes

To modify or further enhance the physical properties of polyphosphazenes, for example those described above, a further aspect of the invention relates to curing the polyphosphazenes so that they overcome particular problems associated with the prior art. Curing the prepolymer greatly broadens the range of applicability of these materials as it improves their mechanical properties.

A number of cure techniques can be used to cure the polyphosphazenes described above. For example, one can use permanent chemical cure using isocyanates, catalysed or uncatalysed epoxy cure and a novel reversible cure system wherein the polymer's molecular structure is modified such that it is more easily able to convert reversibly between the solid and liquid state when a thermal stimulation is applied.

An advantage of using cure techniques which do not involve isocyanate is that some advantageous new energetic materials are incompatible with isocyanate cures. Furthermore, reversible cure binders are highly desirable in their own right in order to reduce toxicity and to minimise waste during manufacture and to facilitate materials pre-processing or demilitarisation.

Examples of the synthesis of readily curable polyphosphazenes are described below.

C.1. Two-Step Method for Synthesis of PolyPZ-3
[P-(2,2,2-trifluoroethan-1-oxy/5,6-dinitratohexan-1-oxy/3-ammonium (nitrate) propan-1-oxy)polyphosphazene]

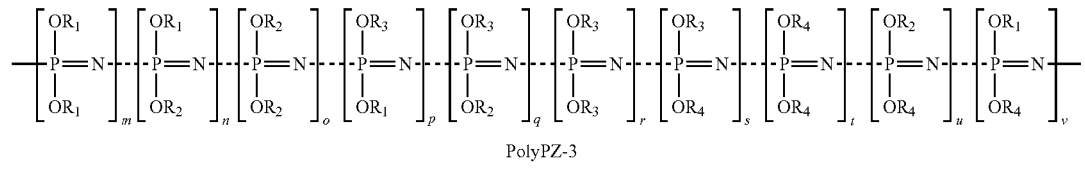

PolyPZ-3

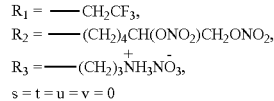

$R_1 = —CH_2CF_3$,
$R_2 = —(CH_2)_4CH(ONO_2)CH_2ONO_2$,
$R_3 = —(CH_2)_3\overset{+}{N}H_3\overset{-}{N}O_3$,
$s = t = u = v = 0$ via preparation of PolyPZ-2 [P-(2,2,2-trifluoroethan-1-oxy/4-(2',2'-dimethyl-1',3'-dioxolan-4'-yl)butan-1-oxy)/3-aminopropan-1-oxy polyphosphazene]

C.1.i. Method 1

Step 1: Alkoxylation of PolyPZ-1 to PolyPZ-2 in THF

This procedure was carried out under a nitrogen atmosphere: sodium hydride (60 wt % suspension in mineral oil, 1.73 g, 1.04 g of pure NaH, 43.3 mmol, without prior washing with hexane), was suspended in dry THF (60 ml), in a 150 ml three-necked round-bottomed flask. The flask was immersed in a cold water bath (~5° C.). A solution of 3-aminopropan-1-ol (3.25 g, 43.3 mmol) in dry THF (15 ml) was added drop-wise over 20 minutes using a pressure equalizing funnel. Hydrogen evolution was observed. The bath was removed and the mixture was stirred at room temperature for 1.5 h. A solution of dry PolyPZ-1 [P-((2,2,2-trifluoroethan-1-oxy (18%)/4-(2',2'-dimethyl-1',3'-dioxolan-4'-yl)-butan-1-oxy (82%)) polyphosphazene, 3.0 g, 8.65 mmol, monomer unit MW=347] in dry THF (60 ml) was added to the stirring alkoxide suspension over 5 minutes using a pressure equalizing funnel. The mixture was then boiled under reflux for 24 h. The solvent was eliminated by evaporation and water (300 ml) was added to the brown viscous liquid residue to yield a uniform, fine suspension (pH~14) which was transferred to a 500 ml separating funnel. Acidification to pH 2 (aqueous HCl 18.5 wt %, ~1 ml) caused immediate coagulation of the product on the glass walls of the funnel. The sticky polymer was extracted with chloroform (3×200 ml), the various aliquots being combined and washed with water (3×100 ml) and brine (200 ml) to eliminate the excess of 3-aminopropan-1-ol. After drying ($MgSO_4$), filtering and concentration this yielded crude PolyPZ-2 [P-(2,2,2-trifluoroethan-1-oxy (9%)/4-(2',2'-dimethyl-1',3'-dioxolan-4'-yl)-butan-1-oxy (82%)/3-aminopropan-1-oxy (9%)) polyphosphazene] product as a viscous brown liquid (3.10 g), still contaminated with mineral oil. Because this product was soluble in hexane, purification by precipitation (from acetone into hexane) was impracticable at this stage, so the product was purified later, after subsequent nitration (see below).

Step 2: Nitration of PolyPZ-2 to PolyPZ-3

The crude PolyPZ-2 product from above (3.10 g) was dissolved in acetone (5 ml) and transferred to a 250 ml round bottomed flask. The solvent was then removed, using a rotary evaporator, to leave a thin film of polymer spread around the inside of the flask. This flask was cooled to 0° C. by immersion in an ice-water bath. 95% Nitric acid (70 ml) was pre-cooled to 0° C. and added to the polymer in one portion, with vigorous stirring. The resulting solution was stirred for a further 10 minutes and then quenched in cold water (500 ml) in a large beaker, to yield a milky-white suspension of the nitrated product. Stirring of this suspension using a magnetic stirrer promoted coagulation. After 30 minutes the polymer had coalesced on the bottom and walls of the beaker, to leave a clear, pale yellow supernatant liquor, which was discarded. The wet, swollen polymer was rinsed with water (3×50 ml) and dried in vacuo at 50° C. for 3 h. This product was re-dissolved in acetone (5 ml) and re-precipitated drop-wise into hexane (150 ml) to eliminate the mineral oil. The nitrated polymer precipitated almost immediately from the hexane. The supernatant liquid was decanted to leave the polymer which was rinsed with fresh hexane (2×10 ml) and dried at 50° C. under high vacuum (~1 mm Hg) for 2 hours. The isolated PolyPZ-3 [P-(2,2,2-trifluoroethan-1 oxy (9%)/5,6-dinitratohexan-1-oxy (82%)/3-ammonium (nitrate) propan-1-oxy (9%)) polyphosphazene] was obtained as a brown viscous liquid. Yield: 3.07 g, overall 78% (monomer unit MW 453.2). NMR (acetone-$d_6$): 1.49-1.91 (br m, 6.37H, $(CH_2)_3$), 2.20 (br s, 0.41H, C2 $CH_2$ aminopropoxy), 3.33 (br s, 0.32H, C3-$CH_2$ aminopropoxy), 4.10 (br m, 2.64H, $POCH_2$ 5,6-dinitratohexoxy+C1 $CH_2$ aminopropoxy), 4.48 (br s, 0.75H, trifluoroethoxy), 4.70-4.75 (br m, 0.1.03H, $CHHONO_2$), 4.99-5.04 (br m, 0.99H, $CHHONO_2$), 5.51 (br s, 1.00H, $CHONO_2$) and 8.24 ppm (br s, 0.29H, $RNH_3^+$). $^{19}F$: −75.7 ppm (br s, trifluoroethoxy).

C.2.ii. Method 2

Step 1: Alkoxylation of PolyPZ-1 [P-(2,2,2-trifluoroethan-1-oxy/4-(2',2'-dimethyl-1',3'-dioxolan-4'-yl) butan-1-oxy)polyphosphazene] to PolyPZ-2 in diglyme This procedure was carried out under a nitrogen atmosphere. Sodium hydride (60 wt % suspension in mineral oil, 1.73 g, 1.04 g NaH, 43.3 mmol) was washed free of mineral oil using dry hexane (3×5 ml) in a sealed tube. After elimination of the hexane by decantation, the NaH was suspended in anhydrous 2-methoxyethyl ether, 'diglyme' (30 ml) inside a 150 ml 3-necked round-bottomed flask. The flask was immersed in a cold water bath (~10° C.). A solution of 3-aminopropan-1-ol (3.25 g, 43.3 mmol) in anhydrous diglyme (15 ml) was added during 20 minutes via a pressure equalising funnel. At the end of the addition, the flask was removed from the water bath and the mixture was stirred for 3 h at room temperature (~17° C.). A solution of PolyPZ-1 [P-(2,2,2-trifluoroethan-1-oxy (30%)/4-(2',2'-dimethyl-1',3'-dioxolan-4'-yl)-butan-1-oxy (70%)) polyphosphazene, 3.0 g, 8.60 mmol] in anhydrous diglyme (30 ml) was then added over 5 minutes via a pressure equalising funnel. The mixture was heated at 85° C. for 24 h and then left to cool to room temperature, after which it was poured as a single addition, into excess aqueous sodium chloride (~10 g/L). The resulting warm suspension was stirred for 30 minutes using a magnetic stirrer, but the product did not coagulate effectively. Addition of HCL to bring the pH to 2 (HCl 18.5 wt %, ~0.4 ml) caused complete dissolution of the product to yield a clear, pale yellow solution. Rotary evaporation at 60° C. under reduced pressure (water pump) eliminated most of the diglyme and all of the water (diglyme/water azeotrope b.p. 99.9° C., at atmospheric pressure). The sticky residue (containing NaCl, the polymeric product and diglyme) was triturated in methanol (50 ml) and the suspension filtered to eliminate NaCl. The filtrate was evaporated to leave a viscous solution of the product in residual diglyme (~5 ml). Hexane (50 ml, miscible with diglyme and 3-aminopropan-1-ol) was added and the resulting suspension was stirred overnight using a, magnetic stirrer. By next morning the polymer was adhering to the glass walls of the flask. The clear hexane-diglyme solution was decanted and the PolyPZ-2 hydrochloride salt [P-(2,2,2-trifluoroethan-1-oxy (10%)/4-(2',2'-dimethyl-1',3'-dioxolan-4'-yl)-butan-1-oxy (70%)/3-ammonium (chloride) propan-1-oxy (20%)) polyphosphazene] rinsed with fresh hexane (2×10 ml) before residual solvent was removed under reduced pressure at 50° C.

Step 2: Nitration of PolyPZ-2 to PolyPZ-3

The flask containing the impure PolyPZ-2 hydrochloride from above (which was still contaminated with (protonated) 3-aminopropan-1-ol) was cooled to ~0° C. by immersion in an ice-water bath. Nitric acid (95%, 50 ml), pre-cooled to ~0° C., was added to the flask in one portion, with vigorous stirring. The polymer dissolved almost immediately. The solution was stirred for a further 10 minutes and then quenched by adding it to cold water (250 ml) to yield a milky-white suspension of the nitrated product. After 30 minutes, the product had coalesced on the bottom and walls of the flask to leave a clear, pale yellow supernatant liquor. This contained partial nitration products from the residual 3-aminopropan-1-ol and the last traces of diglyme and was discarded. The pure, swollen polymer was rinsed with water (3×10 ml) and dried in vacuo at 50° C. for 3 h. A final re-precipitation from acetone (5 ml) into hexane (50 ml), followed by removal of solvent from the isolated product (2 hours, 50° C., vacuum ~1 mm Hg) yielded PolyPZ-3 [P-(2, 2,2-trifluoroethan-1-oxy (10%)/5,6-dinitratohexan-1-oxy (70%)/3-ammonium (nitrate) propan-1-oxy (20%)) polyphosphazene] as a brown waxy solid. Yield: 2.78 g, 75% overall (monomer unit molecular weight: 432). NMR (acetone-$d_6$): consistent with previous batches of analogous materials (e.g. above).

C.2. Synthesis of PolyPZ-4: [P-(2,2,2-trifluoroethan-1-oxy/5,6-dinitratohexan-1-oxy/3-aminopropan-1-oxy)polyphosphazene]

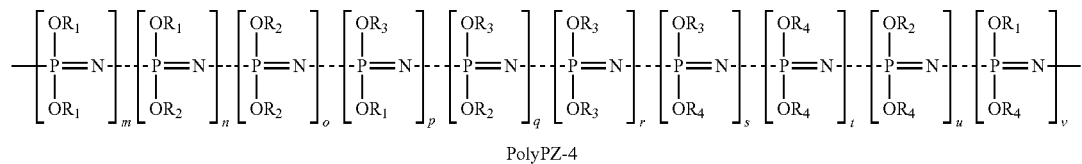

PolyPZ-4

$R_1 = $ —$CH_2CF_3$,
$R_2 = $ —$(CH_2)_4CH(ONO_2)CH_2ONO_2$,
$R_3 = $ —$(CH_2)_3NH_2$,
$s = t = u = v = 0$

The neutralisation of PolyPZ-3 to yield PolyPZ-4 is described later.

C.3 Two-step method for the synthesis of PolyPZ-10 [P-(2,2,2-trifluoroethan-1-oxy/2,3-dinitratopropan-1-oxy/3-ammonium (nitrate)propan-1-oxy)polyphosphazene]

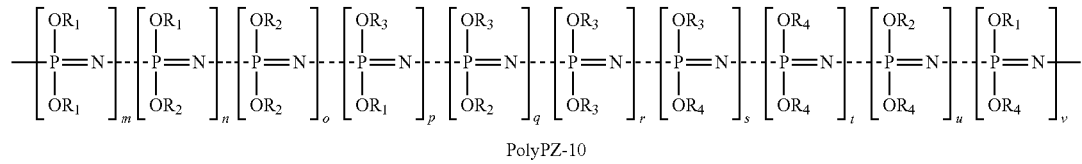

PolyPZ-10

$R_1 = $ —$CH_2CF_3$,
$R_2 = $ —$CH_2CH(ONO_2)CH_2ONO_2$,
$R_3 = $ —$(CH_2)_3NH_3^+NO_3^-$,
$s = t = u = v = 0$

C.3.i Step 1: Synthesis of PolyPZ-9 [P-(2,2,2-trifluoroethan-1-oxy/4-(2',2'-dimethyl-1',3'-dioxolan-4'-yl)-methan-1-oxy/3-aminopropan-1-oxy)polyphosphazene]-Alkoxylation of PolyPZ-8 [P-(2,2,2-trifluroethan-1-oxy/4-(2',2'-dimethyl-1',3'-dioxolan-4'yl)-methan-1-oxy)polyphosphazene] to PolyPZ-9

This procedure was carried out under a nitrogen atmosphere: sodium hydride (60 wt % suspension in mineral oil, 2.10 g, 1.26 g of pure NaH, 52.4 mmol without prior washing with hexane), was suspended in dry THF (60 ml), in a 150 ml three-necked round-bottomed flask. The flask was immersed in a cold water bath (~5° C.) and a solution of 3-aminopropan-1-ol (3.94 g, 52.4 mmol) in dry THF (15 ml) added drop-wise over 20 minutes using a pressure equalizing funnel. Hydrogen evolution was observed. The bath was removed and the mixture was stirred at room temperature for 1.5 h. A solution of dry PolyPZ-8 [P-((2,2, 2-trifluoroethan-1-oxy (33%)/(2,2-dimethyl-1,3-dioxolan-4-yl)-methan-1-oxy (67%)) polyphosphazene, 3.0 g, 10.49 mmol, monomer unit MW=285.9] in dry THF (60 ml) was added over 5 minutes using a pressure equalizing funnel to the stirring alkoxide suspension. The mixture, was boiled under reflux for 24 h. The solvent was eliminated by evaporation under reduced pressure and water (300 ml) was added to the brown viscous liquid residue to yield a uniform, fine suspension (pH~14) which was transferred to a 500 ml separating funnel. Acidification to pH 2 (aqueous HCl, 18.5 wt %, ~1 ml) caused immediate coagulation of the product onto the glass walls of the funnel. The sticky polymer was extracted with chloroform (3×200 ml) and the chloroform phases were combined, washed with water (3×100 ml) and brine (200 ml) [to eliminate the excess of 3-aminopropan-1-ol], dried (MgSO$_4$) and filtered. After removal of the solvent the crude PolyPZ-9 [P-(2,2,2-trifluoroethan-1-oxy (20%)/(2,2-dimethyl-1,3-dioxolan-4-yl)-methan-1-oxy (67%)/3-aminopropan-1-oxy (13%)) polyphosphazene] was isolated as a solid wax (2.58 g), still contaminated with mineral oil. As the product was soluble in hexane, removal of this oil was effected after nitration (below).

C.3.ii Step 2: Nitration of PolyPZ-9 to PolyPZ-10 [P-(2,2,2-trifluoroethan-1-oxy/2,3-dinitratopropan-1-oxy/3-ammonium (nitrate) propan-1-oxy)polyphosphazene]

The crude PolyPZ-9 from above (2.58 g) was dissolved in acetone (5 ml) and transferred to a 250 ml round bottomed flask. The solvent was then removed using a rotary evaporator to leave a thin film of polymer spread around the inside of the flask. This flask was cooled to 0° C. by immersion in an ice-water bath and nitric acid (95%, 70 ml) was pre-cooled to 0° C. and added to the polymer in one portion with vigorous stirring. The resulting solution was stirred for a further 10 minutes and then quenched into cold water (500 ml) in a large beaker, to yield a milky-white suspension of the nitrated product. The suspension was stirred using a magnetic stirrer to promote coagulation. After 30 minutes the polymer had coalesced on the bottom and walls of the beaker to leave a clear, pale yellow supernatant liquor which was discarded. The wet, swollen polymer was rinsed with water (3×50 ml) and dried in vacuo at 50° C. for 3 h. The product was re-dissolved in acetone (5 ml) and re-precipitated drop-wise into hexane (150 ml) to eliminate the residual mineral oil. The nitrated polymer precipitated almost immediately from the hexane. The supernatant liquid was decanted and the product rinsed with fresh hexane (2×10 ml), then residual solvent was removed at 50° C. under high vacuum (~1 mm Hg) for 2 h to yield PolyPZ-10 [P-(2,2,2-trifluoroethan-1-oxy (13%)/1,2-dinitratopropan-1-oxy (67%)/3-ammonium (nitrate) propan-1-oxy (20%)) polyphosphazene] as a brittle glass which reversibly melted into a viscous liquid at 60° C. Yield: 1.20 g, (monomer unit MW 368.1, overall yield: 31%). NMR (acetone-$d_6$): 2.25 (br s, 0.81H, C-2 $CH_2$ aminopropoxy), 3.36 (br s, C-3 $CH_2$ aminopropoxy), 4.31 (br s, 0.96H, C-1 $CH_2$ aminopropoxy), 4.52-5.11 (br m, 5.60H, $CH_2ONO_2$+$POCH_2$+trifluoroethoxy), 5.79 (br s, 1.00H, $CHONO_2$) and 8.10 ppm (br s, 0.94H, $RNH_3^+$). $^{19}F$: −74.9 ppm (br s, trifluoroethoxy).

C.4. Synthesis of PolyPZ-11 [P-(2,2,2-trifluoroethan-1-oxy/1,2-dinitratopropan-1-oxy/3-aminopropan-1-oxy)polyphosphazene]

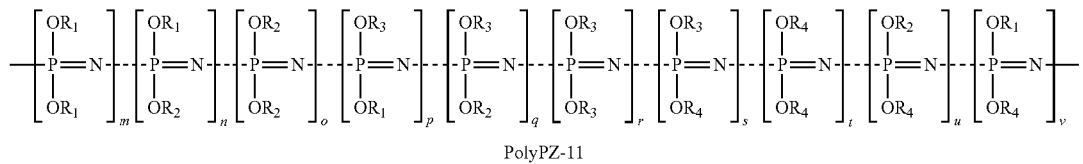

PolyPZ-11

$R_1$ = —$CH_2CF_3$,
$R_2$ = —$CH_2CH(ONO_2)CH_2ONO_2$,
$R_3$ = —$(CH_2)_3NH_2$,
s = t = u = v = 0

The free amine PolyPZ-11 may be generated from PolyPZ-10 using a similar process to that employed to convert PolyPZ-3 to PolyPZ-4.

C.5. One-Pot Method for the Preparation of PolyPZ-9 [P-(2,2,2-trifluoroethan-1-oxy/(2,2-dimethyl-1,3-dioxolan-4-yl)-methan-1-oxy/3-aminopropan-1-oxy)polyphosphazene]

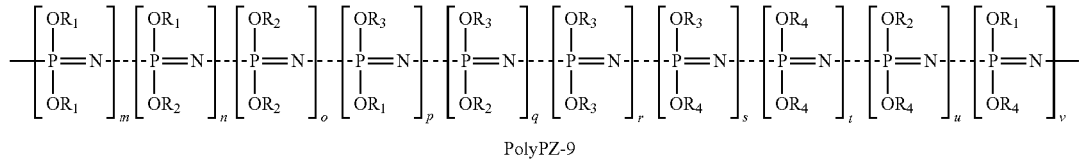

PolyPZ-9

$R_1$ = —$CH_2CF_3$, $R_2$ = —$CH_2\underset{H}{C}$—$CH_2$ (with O—C(CH_3)_2—O ring), $R_3$ = —$(CH_2)_3NH_2$,
s = t = u = v = 0

(as its hydrochloride salt) from PolyPZ-12 [P-bis(2,2,2-trifluoroethan-1-oxy)polyphosphazene]

This reaction was carried out under a nitrogen atmosphere. Sodium hydride, as a 60% w/w dispersion in protecting mineral oil (412 mg, 10.28 mmol NaH), was freed from mineral oil by manual washing with dry hexane (3×5 ml) inside a 10 ml test tube, with the aid of a thin glass rod. Between each wash the suspension was sedimented by centrifugation and the clear supernatant solution removed. Dry THF (10 ml) was added to the oil-free NaH and the resulting suspension transferred to a nitrogen-flushed, 100 ml three-necked round bottom flask, connected to a nitrogen line. A solution of 3-aminopropan-1-ol (155 mg, 2.06 mmol) and 2,2-dimethyl-1,3-dioxolan-4-ylmethanol (1.09 g, 8.24 mmol) in dry THF (15 ml) was added dropwise to the hydride suspension using a glass syringe. The reaction mixture was vigorously stirred at room temperature for 2 h to yield a grey suspension of mixed alkoxide in THF.

This reaction was carried out under a nitrogen atmosphere. Linear [P-bis(2,2,2-trifluoroethan-1-oxy)polyphosphazene](PolyPZ-12, 500 mg, 2.06 mmol) in dry THF (10 ml) was slowly added to the mixed alkoxide suspension prepared in the previous step, using a glass syringe. The reaction mixture was refluxed at 75° C. for 24 h and then cooled to ambient temperature. The THF was evaporated and water (60 ml) was added to the residual brown wax to give a brown basic solution (pH 13-14). This was acidified to pH 2 (HCl 18.5 wt %, ~1 ml) to precipitate the product, which was extracted into chloroform (3×50 ml). The chloroform extracts were combined, washed with water (3×100 ml) and brine (50 ml), dried (MgSO$_4$), filtered and evaporated to yield PolyPZ-9 [P-(2,2,2-trifluoroethan-1-oxy (31%)/(2,2-dimethyl-1,3-dioxolan-4-yl)-methan-1-oxy (60%)/3-aminopropan-1-oxy (9%)) polyphosphazene] as the hydrochloride salt], as a brown, viscous liquid. Yield: 480 mg (average mixed substituted unit monomer MW: 276.7, yield: 84%). NMR (acetone-d$_6$): 1.33 (s, 3.00H, Me), 1.41 (s, 3.00H, Me), 2.25 (br s, 0.38H, C-2 CH$_2$ aminopropoxy), 3.25 (br s, 0.29H, C-3 CH$_2$ aminopropoxy), 3.87-4.54 ppm (m, 6.34H, POCH$_2$CH(ONO$_2$)CH$_2$ONO$_2$ and C-1 CH$_2$ aminopropoxy); $^{19}$F: (no internal standard): −75.47 ppm, trifluoroethoxy.

The hydrochloride salt of PolyPZ-9 may be converted to the free amine PolyPZ-9 using a similar method to that used to convert PolyPZ-3 to PolyPZ-4.

C.6. Nitration of PolyPZ-9 (Prepared by One Pot Synthesis from PolyPZ-12) to PolyPZ-10 [P-(2,2,2-trifluoroethan-1-oxy/1,2-dinitratopropan-1-oxy/3-ammonium (nitrate) propan-1-oxy)polyphosphazene]

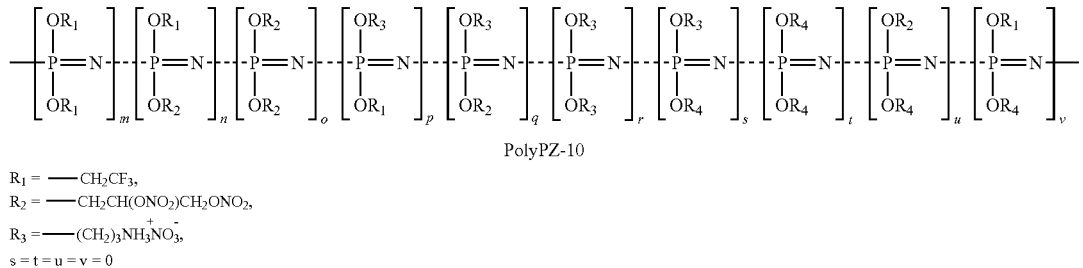

PolyPZ-10

R$_1$ = —CH$_2$CF$_3$,
R$_2$ = —CH$_2$CH(ONO$_2$)CH$_2$ONO$_2$,
R$_3$ = —(CH$_2$)$_3$NH$_3^+$NO$_3^-$,
s = t = u = v = 0

PolyPZ-9 (480 mg, 2 mmol), prepared above in a one pot synthesis from PolyPZ-12, was spread as a thin film inside a 100 ml round bottomed flask by dissolution in acetone, addition to the flask and subsequent removal of the solvent by rotary evaporation. Cold nitric acid (95%, 0° C., 30 ml, 660 mmol) was added to the flask in one portion and the mixture stirred for 15 minutes at 0° C., before being quenched into ice-cold distilled water (50 ml). The resulting white suspension was stirred for 30 minutes using a magnetic stirrer, during which time the nitrated polymer coalesced on the walls of the flask and the magnetic stirring bar. The clear supernatant liquid was decanted. The wet, swollen polymer was rinsed with water (3×50 ml) to a final pH of 6 and then dried in vacuo at 50° C. for 2 h, followed by 24 h in a desiccator over drying agent to yield PolyPZ-10, [P-(2,2,2-trifluoroethan-1-oxy (31%)/1,2-dinitratopropan-1-oxy (60%)/3-ammonium (nitrate)-propan-1-oxy (9%)) polyphosphazene] as a brown, viscous liquid (unit molecular weight for nitrated monomer: 305.9). Yield: 284 mg (54%). NMR (DMSO-d$_6$): 1.91 (br s, 0.38H, C-2 CH$_2$ aminopropoxy), 2.89 (br s, C-3 CH$_2$ aminopropoxy), 4.00-4.97 (m, 8.80H, C-1 CH$_2$ aminopropoxy, (CH$_2$)$_2$ of 2,3-dinitratopropoxy and CH$_2$ trifluoroethoxy), 5.63 (br s, 1.00H CH of 2,3-dinitratopropoxy) and 7.85 ppm (br s, 0.43H, RNH$_3^+$ NO$_3^-$).

C.7. Synthesis of PolyPZ-13 [P-(2,2,2-trifluoroethan-1-oxy/2,3-dihydroxypropan-1-oxy/3-aminopropan-1-oxy)polyphosphazene]

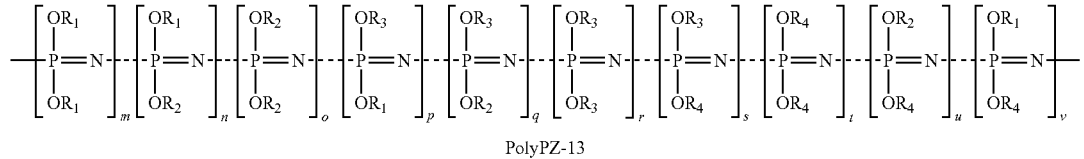

PolyPZ-13

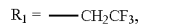
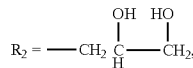
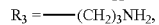

$s = t = u = v = 0$ by a one pot synthesis of PolyPZ-9 with 'in-situ' hydrolysis This reaction was carried out under a nitrogen atmosphere. Sodium hydride, (60 wt % dispersion in mineral oil, 412 mg, 10.28 mmol NaH), was freed from the mineral oil by manually washing with dry hexane (3×5 ml) inside a 10 ml test tube with the aid of a thin glass rod. Between each wash the suspension was sedimented by centrifugation and the clear supernatant solution removed. Dry THF (10 ml) was added to the oil-free NaH and the resulting suspension transferred to a nitrogen-flushed, 100 ml three-necked, round bottom flask (connected to a nitrogen line). A solution of 3-aminopropan-1-ol (694 mg, 9.25 mmol) and 2,2-dimethyl-1,3-dioxolan-4-ylmethanol (138 mg, 1.04 mmol) in dry THF (15 ml) was added dropwise to the hydride suspension using a glass syringe. The reaction mixture was vigorously stirred at room temperature for 2 hours to yield a grey suspension of mixed alkoxide in THF.

Linear PolyPZ-12 [P-bis(2,2,2-trifluoroethan-1-oxy)polyphosphazene] (500 mg, 2.06 mmol) in dry THF (15 ml) was slowly added to the mixed alkoxide suspension prepared in the previous step, using a glass syringe. The reaction mixture was boiled under reflux at 75° C. for 24 h and then cooled to ambient temperature. The THF was evaporated and water (60 ml) added to the residual brown wax to give a brown basic solution (pH 13-14). This was acidified to pH 2 (HCl 18.5 wt %, ~1.5 ml) and evaporated to dryness. The last traces of water were eliminated under high vacuum. The residue was dissolved in methanol (5 ml) and the resulting suspension (of NaCl) filtered off. The clear filtrate was added drop-wise into methylated spirit (60 ml), where the polymeric salt precipitated immediately. The suspension was stirred using a magnetic stirrer to promote coagulation. After 30 minutes the clear supernatant liquid was decanted, the product rinsed with fresh methylated spirits (3×10 ml) and dissolved in water (2 ml). The solution was adjusted to pH13 by the addition of aqueous NaOH 30 wt % (3 drops).

This basic solution was evaporated to dryness and the residue re-dissolved in methanol (2 ml) before being filtered. Evaporation of the filtrate yielded PolyPZ-13 [P-(2,2,2-trifluoroethan-1-oxy (18%)/2,3-dihydroxypropan-1-oxy (10%)/3-aminopropan-1-oxy (72%)) polyphosphazene] as a yellow waxy solid, yield: 210 mg (produced by in-situ hydrolysis of PolyPZ-9). $^1$H NMR (D$_2$O): 1.78 (br s, 2.08H, C-2 CH$_2$ aminopropoxy), 2.71 (br s, 2.00H, C-3 CH$_2$ aminopropoxy), 3.61-3.94 ppm (m, 0.46H, POCH$_2$CH$_2$(OH) CH$_2$OH) and 4.04 ppm (br s, C-1 CH$_2$ aminopropoxy); $^{19}$F: (no internal standard): −74.72 ppm, trifluoroethoxy.

C.8. One-pot method for the Synthesis of PolyPZ-14 [P-(2,2,2-trifluoroethan-1-oxy/5,6-dihydroxyhexan-1-oxy/3-aminopropan-1-oxy)polyphosphazene]

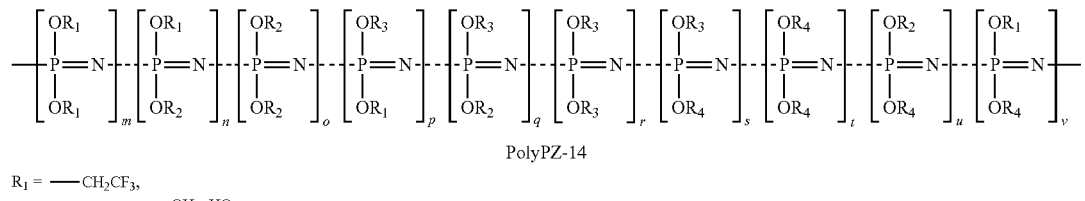

PolyPZ-14

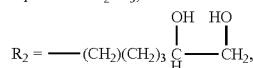
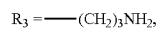

$s = t = u = v = 0$ by a one-pot synthesis from PolyPZ-12 (via synthesis of PolyPZ-2 and 'in-situ' hydrolysis)

This reaction was carried out under a nitrogen atmosphere. Sodium hydride as a 60% w/w dispersion in protecting mineral oil (1.64 g, 41.1 mmol of NaH) was freed from oil by washing with dry hexane (3×10 ml), followed by removal of the hexane by decantation. The sodium hydride was then suspended in dry THF (50 ml) and a solution of 2,2-dimethyl-4-(4'-hydroxybutyl)-1,3-dioxolan (3.58 g, 20.6 mmol) in dry THF (20 ml) added drop-wise. After 5 minutes, a solution of 3-aminopropan-1-ol (1.54 g, 20.6 mmol) in dry THF (20 ml) was added. The mixture was stirred at room temperature for 1.5 h, after which time a solution of linear PolyPZ-12 [P-bis(2,2,2-trifluoroethan-1-oxy)polyphosphazene] (2.0 g, 8.23 mmol) in dry THF (30 ml) was added in a single portion. The reaction mixture was boiled under reflux at 75° C. for 22 h and then cooled to ambient temperature. The solvent was evaporated and the residual brown waxy residue vigorously stirred in water (100 ml) in which it readily dissolved. The solution was acidified to pH 2 (18.5 wt % aq. HCl, ~5 ml) and the water eliminated by evaporation. The residue was dissolved in methanol (15 ml) and the sodium chloride filtered off. The filtrate was added drop-wise to methylated spirit (100 ml) to precipitate the product, which coagulated during 30 minutes of stirring. The clear supernatant solution was decanted and discarded. The swollen polymer was rinsed with fresh methanol (2×10 ml) and dried at 50° C. under high vacuum to yield PolyPZ-14 [P-(2,2,2-trifluoroethan-1-oxy) (23%)/5,6-dihydroxyhexan-1-oxy (27%)/3-aminopropan-1-oxy (50%)) polyphosphazene] as its hydrochloride, yield: 2.21 g.

C.8. Preparation of PolyPZ-3 [P-(2,2,2-trifluoroethan-1-oxy/5,6-dinitratohexan-1-oxy/3-ammonium (nitrate) propan-1-oxy)polyphosphazene]

by Nitration of PolyPZ-14

PolyPZ-14 [P-(2,2,2-trifluoroethan-1-oxy (23%)/5,6-dihydroxyhexan-1-oxy (27%)/3-aminopropan-1-oxy (50%)) polyphosphazene] as its hydrochloride (100 mg, prepared above in a one pot synthesis from PolyPZ-12), was spread as a thin film inside a 25 ml round bottomed flask by dissolution in solvent, addition to the flask and subsequent removal of solvent by rotary evaporation. The flask was then cooled to 0° C. and cold nitric acid (95%/0° C., 10 ml) added in one portion, with vigorous stirring. The resulting solution was maintained at 0° C. for 5 minutes, with stirring, after which it was quenched by pouring into cold water (50 ml). The resultant suspension was stirred to coagulate the nitrated polymer, which was rinsed with water (3×20 ml) and dried in vacuo at 50° C. $^1$H NMR spectroscopy confirmed the product as PolyPZ-3 [P-(2,2,2-trifluoroethan-1-oxy (23%)/5,6-dinitratohexan-1-oxy (27%)/3-ammonium (nitrate) propan-1-oxy (50%)) polyphosphazene].

The proportion of the different side groups contained within PolyPZ-3 was varied (see Table 4) by repeating the above procedures using different ratios of: 2,2-dimethyl-4-(4'-hydroxybutyl)-1,3-dioxolan (DMHBD) to 3-aminopropan-1-ol (3-AP), during the conversion of PolyPZ-12 to PolyPZ-14 and subsequently nitrating the products to PolyPZ-3.

Table 4 summarises the degrees of substitution (%) achieved in PolyPZ-14 (and hence PolyPZ-3) using the 'one-pot' synthesis of PolyPZ-14 (from PolyPZ-12) and subsequent nitration.

TABLE 4

| Nucleophile molar ratio | Degrees of PolyPZ-3 substitution (%) obtained by one-pot synthesis from PolyPZ-12 (via PolyPZ-2, 'in-situ' hydrolysis and subsequent nitration) | | |
|---|---|---|---|
| DMHBD : 3-AP | C6-side chain | 3-aminopropoxy | trifluoroethoxy |
| 1:1 | 27 | 50 | 23 |
| 2:1 | 30 | 32 | 38 |
| 4:1 | 45 | 26 | 29 |
| 4.8:0.2 | 65 | 7 | 28 |

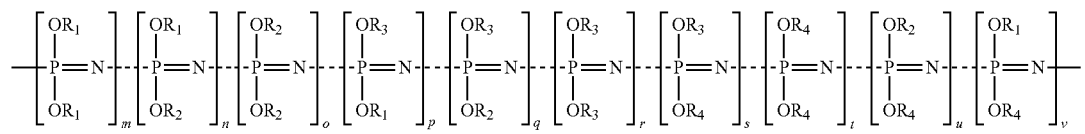

PolyPZ-3

$R_1 = $ —CH$_2$CF$_3$,
$R_2 = $ —(CH$_2$)$_4$CH(ONO$_2$)CH$_2$ONO$_2$,
$R_3 = $ —(CH$_2$)$_3$N$^+$H$_3$N$^-$O$_3$,
s = t = u = v = 0

C.9. Synthesis of PolyPZ-15 [P-(2,2,2-trifluoroethan-1-oxy/5,6-dinitratohexan-1-oxy/3-ammonium (3-nitro-5-oxo-1,2,4-triazolonate) propan-1-oxy) polyphosphazene]

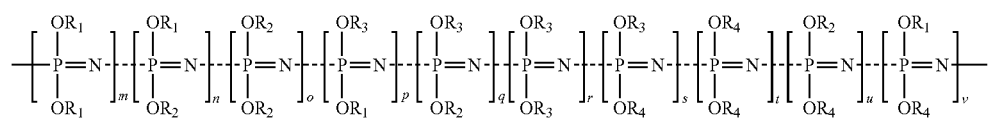

PolyPZ-15

$R_1 = $ —CH$_2$CF$_3$,  $R_2 = $ —(CH$_2$)$_4$CH(ONO$_2$)CH$_2$ONO$_2$,

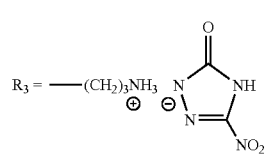

s = t = u = v = 0

PolyPZ-1 [P-(2,2,2-trifluoroethan-1-oxy (48%)/4-(2',2'-dimethyl-1',3'-dioxolan-4'-yl) butan-1-oxy (52%)) polyphosphazene] was prepared as previously described from PolyPZ-12 using a 3:1 ratio of 2,2-dimethyl-4-(4'-hydroxybutyl)-1,3-dioxolan to PolyPZ-12 and boiling under reflux in THF for 3 hours. A subsequent similar reaction yielded PolyPZ-1 [P-2,2,2-trifluoroethan-1-oxy (45%)/4-(2',2'-dimethyl-1',3'-dioxolan-4'-yl) (55%) butan-1-oxy polyphosphazene].

PolyPZ-2 [P-(2,2,2-trifluoroethan-1-oxy (28%)/4-(2',2'-dimethyl-1',3'-dioxolan-4'-yl)butan-1-oxy (52%)/3-aminopropan-1-oxy (20%)) polyphosphazene] was prepared from PolyPZ-1 [P-(2,2,2-trifluoroethan-1-oxy (48%)/4-(2',2'-dimethyl-1',3'-dioxolan-4'-yl)butan-1-oxy (52%)) polyphosphazene] as described above using a 5:1 ratio of 3-aminopropan-1-ol to PolyPZ-1 and boiling under reflux for 24 hours in THF. PolyPZ-1 [P-(2,2,2-trifluoroethan-1-oxy (45%)/4-(2',2'-dimethyl-1',3'-dioxolan-4'-yl)butan-1-oxy (55%)) polyphosphazene] similarly yielded PolyPZ-2 [P-(2,2,2-trifluoroethan-1-oxy (32%)/4-(2',2'-dimethyl-1',3'-dioxolan-4'-yl)butan-1-oxy (55%)/3-aminopropan-1-oxy (13%)) polyphosphazene] using a two-fold excess of sodium 3-amino propan-1-ol to PolyPZ-1 and boiling under reflux for 60 minutes in THF. The same reaction sequence but using equimolar quantities of 3-aminopropan-1-ol and PolyPZ-1 and boiling under reflux for 30 minutes yielded PolyPZ-2 [P-(2,2,2-trifluoroethan-1-oxy (39%)/4-(2',2'-dimethyl-1',3'-dioxolan-4'-yl)butan-1-oxy (55%)/3-aminopropan-1-oxy (6%)) polyphosphazene].

PolyPZ-3 was prepared by the nitration of PolyPZ-2 as described above. PolyPZ-3 [P-(2,2,2-trifluoroethan-1-oxy (28%)/5,6-dinitratohexan-1-oxy (52%)/3-ammonium (nitrate) propan-1-oxy (20%)) polyphosphazene] (677 mg, monomer unit MW 388, 1.75 mmol) was dissolved in dry THF (10 ml). The solution was passed, with the aid of slight positive gas pressure, through a small fritted glass column packed with dry Amberlyst A-26 in the OH form (~2 ml, exchange capacity of the dry resin 4.4 mmol/ml, hence ~3-fold excess). The column was rinsed with fresh THF (2×5 ml) and the eluted washings combined with the main eluate. This combined solution was added drop-wise to a stirring solution of 3-nitro-1,2,4-triazol-5-one (NTO, 900 mg, 7 mmol, ~3-fold excess) in dry THF (20 ml). A bright yellow colour developed immediately. The THF was removed from the product solution by evaporation to leave a pale yellow residue which was extracted with warm (~40° C.) methanol. This dissolved the excess NTO immediately, leaving the polymeric NTO salt, which coagulated into a single yellow globule. The supernatant solution was discarded and the polymer rinsed with fresh methanol (2×5 ml). The product was re-dissolved in acetone (2 ml) and the solution added drop-wise to propan-2-ol (20 ml) to give a fine white suspension which could be partially coagulated by centrifugation to yield the viscous yellow liquid product. The supernatant solution was again discarded and the product rinsed with methanol (2×3 ml) and dried in vacuo at 50° C. to give pure PolyPZ-15 [P-(2,2,2-trifluoroethan-1-oxy (28%)/5,6-dinitratohexan-1-oxy (52%)/3-ammonium (3-nitro-5-oxo-1,2,4-triazolonate) propan-1-oxy (20%)) polyphosphazene] as a bright yellow, brittle solid, which softened to a rubbery consistency at around 50° C. without liquefying. Yield 281 mg (overall 32%). NMR (DMSO-$d_6$): 1.43-1.73 (br m, 6.75H, (CH$_2$)$_3$), 1.96 (br s, 0.98H, C-2 CH2 aminopropoxy), 2.88 (br s, 0.89H, C-3 CH$_2$ aminopropoxy), 3.89 (br m, 3.11H, POCH$_2$ 5,6-dinitratohexoxy+C-1 CH$_2$ aminopropoxy), 4.37 (br s, 1.32H, CH$_2$ trifluoroethoxy), 4.71 (br s, 1.07H, CHHONO$_2$), 4.92 (br m, 1.01H, CHHONO$_2$), 5.40 (br s, 1.00H, CHONO$_2$) and 8.27 ppm (br s, 1.21H, RNH$_3^+$ NTO$^-$). $^{19}$F: −75.6 ppm (br s, trifluoroethoxy). $^{13}$C (nitrotriazolonate only): 156.7 and 162.0 ppm. (DMSO-$d_6$ is preferred for NMR characterisation of PolyPZ-15 because it produces better peak resolution than acetone-$d_6$.) DSC decomposition energy: 2270 Jg$^{-1}$.

Similar procedures applied to PolyPZ-3 [P-(2,2,2-trifluoroethan-1-oxy (32%)/5,6-dinitratohexan-1-oxy (55%)/3-ammonium (nitrate) propan-1-oxy (13%)) polyphosphazene] and P-(2,2,2-trifluoroethan-1-oxy (39%)/5,6-dinitratohexan-1-oxy (55%)/3-ammonium (nitrate) propan-1-oxy (6%)) polyphosphazene] yielded the PolyPZ-15 triazonolate salts with corresponding degrees of side chain substitution, the physical properties of which are captured in Table 5.

Table 5 shows physical properties of PolyPZ-15 [P-2,2,2-trifluoroethan-1-oxy/5,6-dinitratohexan-1-oxy/3-ammonium (3-nitro-5-oxo-1,2,4-triazolonate) propan-1-oxy polyphosphazene] as a function of 3-ammonium (3-nitro-5-one-1,2,4-triazolonate) content

TABLE 5

| 3-ammonium (3-nitro-5-one-1,2,4-triazolonate) propan-1-oxy groups (%) | Physical appearance* at room temperature |
|---|---|
| 20 | Yellow brittle solid (softens to rubbery consistency at 50° C.) |
| 13 | Yellow wax |
| 6 | Yellow viscous liquid |

*All samples unchanged (and still fully soluble in acetone) after 4 weeks at 65° C.

Thus the physical properties of PolyPZ-15 may be varied significantly according to the percentage of 3-ammonium (3-nitro-5-one-1,2,4-triazolonate) propan-1-oxy groups which are present in the molecule. The attainment of rubbery characteristics by the sample containing 20% of such groups (above 50° C.) indicates that this material is cross-linked; however, its complete solubility in solvent indicates that this cross-linking is reversible. Individual variants of PolyPZ-15 containing different percentages of side chains (e.g. those listed in table 5) may be blended together and/or with other additives such as small molecule plasticisers, to achieve the desired physical properties. All such materials may be solvent processed, that is dissolved in solvent, then coating onto solid fillers by agitation during gradual removal of the solvent, to yield a moulding powder, suitable for further processing. Such processing might for example include pressing into solid form. A final product (e.g. a pressed solid) may be optionally disassembled by dissolution in a solvent which dissolves the binder. This procedure may be useful, for example, in reprocessing defective items or for disposal at end of life. PolyPZ-45 may also be utilised in this fashion, including blending with other PolyPZs and/or small molecule plasticisers.

C.9. Preparation of More Readily Curable Variants of PolyPZs: 35, 36, 37, 38, 39, 40, 41, 42, 43 and 44; Preparation of PolyPZs: 0.73d, 73n, 74d, 74n, 75d, 75n, 76d, 76n, 77d, 77n, 78d, 78n, 79d, 79n, 80d, 80n, 81d, 81n, 82d and 82n If during the quaternisation of PolyPZs: 28, 29, 30, 31 and 32, using the procedures described elsewhere in this document, the quantity of ammonium dinitramide or ammonium nitrate employed in the respective reactions is limited to slightly sub-stoichiometric quantities, the isolated polymers will retain small (but controllable) quantities of unquater- D. Cytosine Based "Reversible Cure" Polyphosphazenes Examples of synthesis of Cytosine based, 'reversible cure' thermoplastic polyphosphazenes are given below.

D.1 Synthesis of PolyPZ-16 [P-(2,2,2-trifluoroethan-1-oxy (11%)/5,6-dinitratohexan-1-oxy (80%)/ 6-(1',2'-dihydro-1'-methyl-2'-oxopyrimidin-4'yl)-4,6-diaza-5-oxo-hexan-1-oxy (9%)) polyphosphazene]

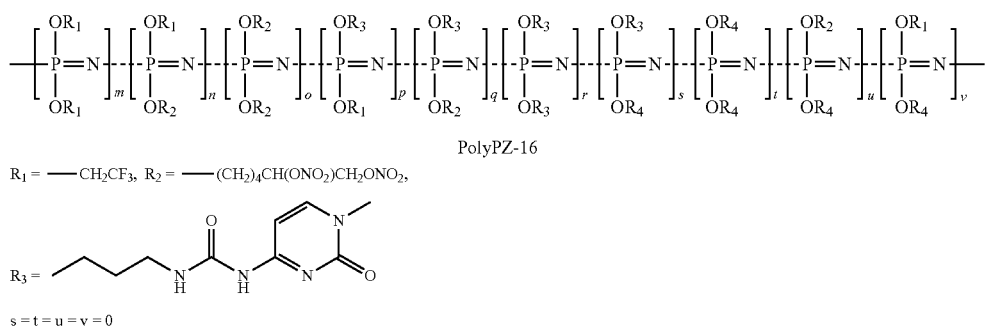

PolyPZ-16

$R_1 = $ —$CH_2CF_3$, $R_2 = $ —$(CH_2)_4CH(ONO_2)CH_2ONO_2$, $R_3 = $ [structure]

$s = t = u = v = 0$ nised (amino) side chains. By this means PolyPZs: 73d, 73n, 74d, 74n, 75d, 75n, 76d, 76n, 77d and 77n may be prepared. The percentage of free amines generated at this stage will determine the cure characteristics of the resultant polymers. The required percentage of side chains containing free amino groups will vary according to the application (i.e. in relation to the physical properties required in the eventual product). For curing purposes polymers containing from 1 to 25% of side chains possessing free amine groups are preferable. The free amines present in the side chains of PolyPZs: 73d to 77d and 73n to 77n renders these polymers directly curable using, for example, diisocyanates or diepoxides.

However, the free amino functionalities in PolyPZs: 73d to 77d and 73n to 77n bestow two potential disadvantages on these polymers. Firstly they may make the PolyPZs relatively unstable (unless stored in solution) and secondly they could render them incompatible with certain energetic compounds. Such effects could limit the utility of these polymers. These problems may be overcome by converting the amino functionalised side chains of these PolyPZs to analogous hydroxyl functionalised side chains, using the procedures described elsewhere in this document. Thus, PolyPZs: 73d to 77d and 73n to 77n may be respectively reacted initially with carbonyl 1,1'diimidazole and then with ethylene glycol, using an analogous procedure to that described for the conversion of PolyPZ-3 to PolyPZ-22 and then PolyPZ-23 (or that for PolyPZ-10 to PolyPZ-25 and then PolyPZ-26). This yields PolyPZs: 78d, 78n, 79d, 79n, 80d, 80n 81d, 81n, 82d and 82n. It is not necessary to convert PolyPZs: 73d to 77d and 73n to 77n (which contain free amines) to their nitrate salts prior to reaction with carbonyl 1,1' diimidazole (CDI) (cf PolyPZ-3 and PolyPZ-10 which are both quaternised), because the free amine will react directly with CDI. However, the reaction conditions described for use with the nitrate salts (PolyPZ-3 and PolyPZ-10) will need to be modified somewhat to accommodate the different reactivity of the current substrates, which contain free amines.

D.1.i. Synthesis of: N-(1',2'-dihydro-1'-methyl-2'-oxopyrimidin-4'yl)-imidazole-1-carboxamide N-(1',2'-dihydro-1'-methyl-2'-oxopyrimidin-4'yl)-imidazole-1-carboxamide (the activated derivative of 1-methyl cytosine) was prepared by reaction of carbonyl-1,1'-diimidazole with 1-methyl cytosine in dichloromethane at room temperature (16 h). Purification of the product was effected by repeated washing with chloroform to eliminate most of the imidazole and any residual CDI. However, as 1-methyl cytosine is only marginally soluble in chloroform, this material could not be entirely eliminated from the product by this means. The product was therefore used as isolated, slightly contaminated with 1-methyl cytosine.

D.1.ii. Reaction of N-(1',2'-dihydro-1'-methyl-2'-oxopyrimidin-4'yl)-imidazole-1-carboxamide (the activated derivative of 1-methyl cytosine) with PolyPZ-3

Solid N-(1',2'-dihydro-1'-methyl-2'-oxopyrimidin-4'yl)-imidazole-1-carboxamide 1.12 g, (95%, contaminated with 1-methycytosine, hence containing 1.06 g of pure carboxamide, 1.1 eq) was added as a single portion to a stirred solution of PolyPZ-3 [P-2,2,2-trifluoroethan-1-oxy (11%)/ 5,6-dinitratohexan-1-oxy (80%)/3-ammonium (nitrate) propan-1-oxy (9%) polyphosphazene] (2.0 g, 4.41 mmol) in dry THF (100 ml). The suspension was boiled under reflux for 17 h. The solvent was eliminated by rotary evaporation, the solid residue triturated with acetone (30 ml) and the resulting suspension filtered. The clear yellow filtrate was added drop-wise to a mixture of EtOH:CHCl$_3$:H$_2$O (150:20:2 ml) to yield a milky-white suspension. (EtOH dissolves imidazole and 1-methylcytosine, CHCl$_3$ removes any oil from the previous step and water promotes precipitation and coagulation of the product.) Stirring did not induce coagulation of the product even after 12 h, so the flask was heated to 50°

C. with rotation in the water-bath of a rotary evaporator. Coagulation commenced immediately. After rotating for 1.5 h at 50° C. a clear supernatant liquor was obtained. The latter was decanted and the polymer rinsed with fresh EtOH (2×20 ml) and then dried under high vacuum at 50° C. for 2 h, to afford PolyPZ-16 [P-(2,2,2-trifluoroethan-1-oxy (11%)/5,6-dinitratohexan-1-oxy (80%)/6-(1',2'-dihydro-1'-methyl-2'-oxopyrimidin-4'yl)-4,6-diaza-5-oxo-hexan-1-oxy (9%)) polyphosphazene] as a transparent, yellow, hard wax. Yield: 1.57 g. The material exhibited reversible melting at 81-85° C. using a melting point apparatus. (No endothermic peaks were observed by DSC). NMR (DMSO-$d_6$): 1.42-1.71 (br m, 6.67H, $(CH_2)_3$+C2 $CH_2$ aminopropoxy), 2.84-3.38 (br m, overlapping to water signal, Me and C-2 $CH_2$ aminopropoxy), 3.87 (br s, 2.56H, $POCH_2$+C1 $CH_2$ aminopropoxy), 4.34-4.92 (br m, 2.48H, trifluoroethoxy+$CH_2ONO_2$), 5.37 (br s, 1.00H, $CHONO_2$), 6.18 (br s, 0.11H, H-5 pyrimidinone ring), 7.89 (br d, J=5.5 Hz, 0.16H, H-6 pyrimidinone ring), 8.86 (very br s, 0.13H, NH) and 10.0 ppm (br s, 0.12H, NH). $^{19}$F: −75.12 ppm (br s, trifluoroethoxy).

D.2 Synthesis of PolyPZ-17 [P-(2,2,2-trifluoroethan-1-oxy (13%)/2,3-dinitratopropan-1-oxy (67%)/6-(1',2'-dihydro-1'-methyl-2'-oxopyrimidin-4'yl)-4,6-diaza-5-oxo-hexan-1-oxy (20%)) polyphosphazene]

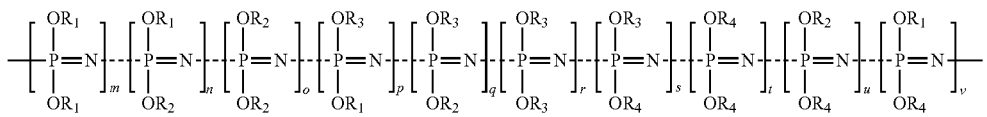

PolyPZ-17

$R_1 =$ —$CH_2CF_3$, $R_2 =$ —$CH_2CH(ONO_2)CH_2ONO_2$,

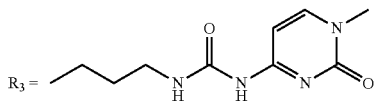

$R_3 =$ $s = t = u = v = 0$

Solid N-(1',2'-dihydro-1'-methyl-2'-oxopyrimidin-4'yl)-imidazole-1-carboxamide 345 mg, (95% pure, contaminated with 1-methycytosine, hence containing 328 mg of pure carboxamide, 1.1 eq) was added as a single portion to a stirred solution of PolyPZ-10 [P-(2,2,2-trifluoroethan-1-oxy (13%)/1,2-dinitratopropan-1-oxy (67%)/3-ammonium (nitrate) propan-1-oxy (20%)) polyphosphazene] (500 mg, 1.36 mmol) in dry THF (50 ml). The suspension was boiled under reflux for 16 h (some polymeric product precipitated after only 1 h). The solvent was then eliminated by rotary evaporation and the solid residue dispersed in acetone (30 ml) and the resulting suspension filtered. The clear filtrate was poured into water (50 ml) to yield a white suspension. The flask containing the suspension was rotated at 50° C. on a rotary evaporator until the polymer started to coagulate, then ethanol (10 ml) was added and the flask was stirred at 50° C. for 1 h. Only partial coagulation of the product was obtained. The turbid supernatant liquid was decanted and the coagulated material was rinsed with fresh ethanol (2×10 ml) and dried under high vacuum at 50° C. to yield a yellow, brittle solid PolyPZ-17 [P-(2,2,2-trifluoroethan-1-oxy (13%)/2,3-dinitratopropan-1-oxy (67%)/6-(1',2'-dihydro-1'-methyl-2'-oxopyrimidin-4'yl)-4,6-diaza-5-oxo-hexan-1-oxy (20%)) polyphosphazene] (214 mg). After a week, further material coagulated from the suspension (69 mg). The product exhibited reversible melting at 79-85° C. (melting point apparatus) but no endothermic peaks were observable by DSC. NMR (acetone-$d_6$): 1.77 (br s, 2.00H, C2 $CH_2$ aminopropoxy), 3.23 (br m, overlapping with water signal, Me and C3 $CH_2$ aminopropoxy), 3.86-5.00 (br m, C1 $CH_2$ aminopropoxy, $POCH_2$+$CH_2ONO_2$), 5.63 (br s, 2.55H, $CHONO_2$), 6.17 (br s, 0.76H, H-5 pyrimidinone ring), 7.89 (br d, J~5 Hz, 0.98H, H-6 pyrimidinone ring), 8.84 (br s, 0.78H, NH) and 9.84 ppm (br s, 0.67H, NH). $^{19}$F: −74.9 ppm (br s, trifluoroethoxy).

E. Isocyanate-Curable Polyphosphazenes

E.1. Synthesis of PolyPZ-19 [P-(2,2,2-trifluoroethan-1-oxy/5,6-dinitratohexan-1-oxy/5-hydroxy-6-nitrato-hexan-1-oxy/6-hydroxy-5-nitrato-hexan-1-oxy/5,6-dihydroxy-hexan-1-oxy)polyphosphazene], PolyPZ-20 [P-(2,2,2-trifluoroethan-1-oxy/5,6-dinitratohexan-1-oxy/5,6-oxiranohexan-1-oxy)polyphosphazene] and PolyPZ-21 [P-(2,2,2-trifluoroethan-1-oxy/5,6-dinitratohexan-1-oxy/5,6-dihydroxyhexan-1-oxy)polyphosphazene] and curing

E.1.i. Partial formyl-denitration of PolyPZ-7 to PolyPZ-18 18 [P-(2,2,2-trifluoroethan-1-oxy (30%)/5,6-dinitratohexan-1-oxy (39%)/5-formyl-6-nitratohexan-1-oxy/6-formyl-5-nitratohexan-1-oxy/5,6-diformyl-hexan-1-oxy))polyphosphazene, where total formylated substituents=31%]

PolyPZ-7 [P-(2,2,2-trifluoroethan-1-oxy (30%)/5,6-dinitratohexan-1-oxy (70%)) polyphosphazene]² (2.0 g, MW: 367, 5.45 mmol) was dissolved in dry THF (100 ml); formic acid (99%, 200 ml) was added slowly to this solution, with stirring. A mild exotherm was observed. The mixture was heated at (nominally) 100° C. for 18 hours in a flask equipped with a water condenser. (The mixture temperature during this procedure was measured as 90° C.). After this period volatile materials were eliminated by rotary evaporation to leave a brown viscous liquid. This was diluted with acetone (5 ml) and the solution poured into water (200 ml) with vigorous stirring. The product precipitated and coagulated almost immediately. The supernatant liquid was discarded. ¹H NMR spectroscopy showed the product to be contaminated with a by-product resulting from the ring-opening of THF by HCOOH (tentatively identified as butane-1,4-diol monoformate). The impure polymer was re-dissolved in acetone (5 ml) and re-precipitated into water (100 ml) with stirring. After elimination of the clear supernatant liquid, the wet, swollen product was finally dried in vacuo at 60° C. for 3 h to yield PolyPZ-18 [P-(2,2,2-trifluoroethan-1-oxy (30%)/5,6-dinitratohexan-1-oxy (39%)/5-formyl-6-nitratohexan-1-oxy/6-formyl-5-nitrato-hexan-1-oxy/5,6-diformyl-hexan-1-oxy))polyphosphazene, where total formylated substituents=31%], as a brown viscous liquid (yield:1.71 g). Degree of conversion of nitrate to formate ester: 31%. NMR (acetone-$d_6$): 1.62-1.90 (br m, 8.14H, $(CH_2)_3$), 4.10-5.05 (br m, 6.75H, $CH_2ONO_2$+$POCH_2$+trifluoroethoxy+$CH_2OCOH$), 5.40 (br s, 0.27H, $CH_2OCOH$), 5.51 (br s, 1.00H, $CHONO_2$) and 8.12-8.23 (br m, 0.46H, OCOH). ¹⁹F (no internal standard): −75.8 ppm (br s, trifluoroethoxy).

Figure 1:
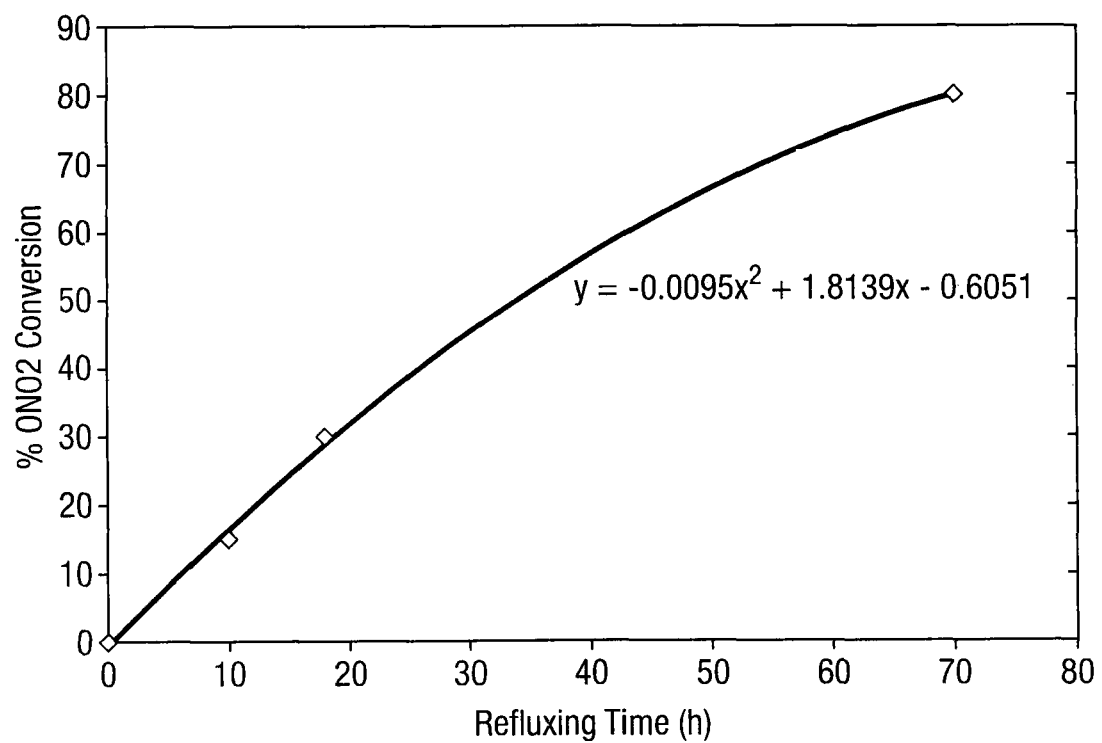
FIG. 1 shows the relationship between reaction time and degree of conversion of nitrate ester to formate when converting PolyPZ-7 to PolyPZ-18 using excess HCOOH/THF 2:1 v/v.

A number of similar experiments were conducted using different conditions, to yield products with varying degrees of formyl-denitration. (See Table 6 and FIG. 1 which show the relationship between reaction time and degree of conversion of the nitrate ester to formate when converting PolyPZ-7 to PolyPZ-18 using excess HCOOH/THF 2:1 v/v.) The degree of formyl-denitration is important in determining the degree of hydroxylation achieved in the subsequent solvolysed product and hence the cure characteristics of the final product.

Table 6 shows the degree of formyl-denitration achieved when converting PolyPZ-7 to PolyPZ-18 under different nitration conditions.

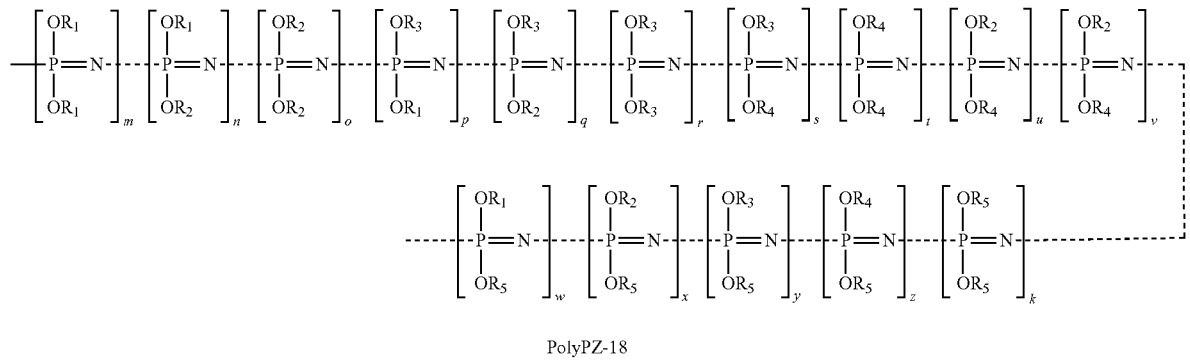

PolyPZ-18

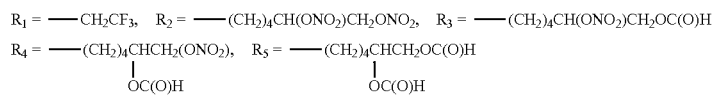

$R_1 = -CH_2CF_3$, $R_2 = -(CH_2)_4CH(ONO_2)CH_2ONO_2$, $R_3 = -(CH_2)_4CH(ONO_2)CH_2OC(O)H$
$R_4 = -(CH_2)_4CHCH_2(ONO_2)$, $R_5 = -(CH_2)_4CHCH_2OC(O)H$
         |                              |
         OC(O)H                         OC(O)H

TABLE 6

| Conditions | % $ONO_2$ group conversion | Comments |
|---|---|---|
| Excess neat HCOOH, heated, 100° C., 70 h | Total formate ester formed | Polymer backbone oligomerised |
| Excess HCOOH/THF (2:1 vol), heated, 100° C., 70 h | 80 | Traces of trifluoroethanol visible in $^{19}F$ spectrum |
| HCOOH/THF (2:1 vol) refluxed, 100 C., 18 h | 30 | No chain cleavage |
| Excess HCOOH/THF (2:1 vol), refluxed, 100° C., 10 h | 15 | No chain cleavage |
| HCOOH/THF (1:1 vol), refluxed, 100 C., 5 h | 5 | No chain cleavage |
| Excess HCOOH/THF (2:3 vol), refluxed, 100° C., 16 h | 2 | No chain cleavage |
| Excess HCOOH/THF (1:3 vol), refluxed, 100° C., 16 h | 0.5 | No chain cleavage |

A larger-scale conversion of PolyPZ-7 to PolyPZ-18 [P-(2,2,2-trifluoroethan-1-oxy/5,6-dinitratohexan-1-oxy/5-formyl-6-nitrato-hexan-1-oxy/6-formyl-5-nitrato-hexan-1-oxy/5,6-diformyl-hexan-1-oxy)polyphosphazene] was undertaken using the same procedure as that described above, but using 45.6 g of PolyPZ-7, 227 ml of THF and 453 ml of formic acid, reacted at 92° C. for one hour. The product was isolated as previously, but the purification by solvent precipitation employed 50 ml of acetone and one liter of water (twice). The product isolated after this purification was dissolved in acetone (50 ml) dried ($MgSO_4$), filtered and the solvent removed by evaporation. The resultant product, a brown viscous liquid, was dried under high vacuum for 3 hours to yield PolyPZ-18, ([P-(2,2,2-trifluoroethan-1-oxy (24%)/5,6-dinitratohexan-1-oxy (72%)/5-formyl-6-nitrato-hexan-1-oxy/6-formyl-5-nitrato-hexan-1-oxy/5,6-diformyl-hexan-1-oxy)polyphosphazene, where total formylated substituents=4%, 37.1 g].

This larger-scale procedure was repeated using a reaction time of 2.5 hours at 92° C. to produce PolyPZ-18 ([P-(2,2,2-trifluoroethan-1-oxy (24%)/5,6-dinitratohexan-1-oxy (69%)/5-formyl-6-nitrato-hexan-1-oxy/6-formyl-5-nitrato-hexan-1-oxy/5,6-diformyl-hexan-1-oxy)polyphosphazene, where total formylated substituents=7%, 39.6 g]. No traces of the by-product from the ring opening reaction of THF with formic acid were observed in either of these larger scale products.

E.1.ii Solvolysis of PolyPZ-18 to PolyPZ-19 [P-(2,2,2-trifluoroethan-1-oxy/5,6-dinitratohexan-1-oxy/5-hydroxy-6-nitrato-hexan-1-oxy/6-hydroxy-5-nitrato-hexan-1-oxy/5,6-dihydroxy-hexan-1-oxy) polyphosphazene]

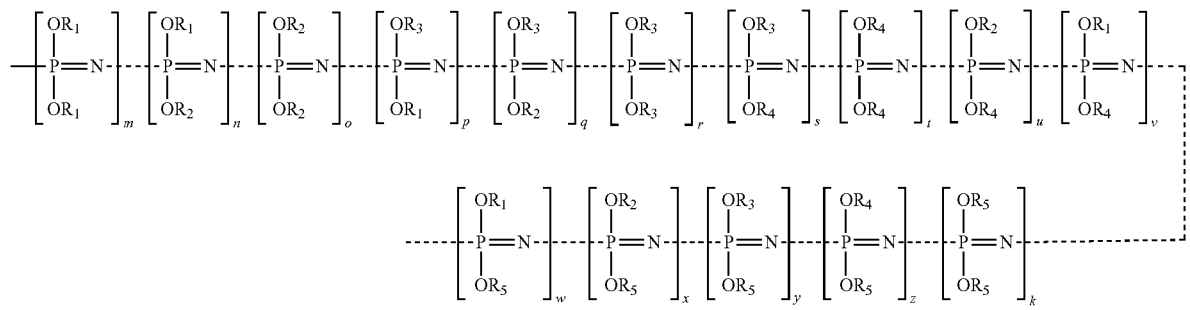

PolyPZ-19

$R_1 =$ —$CH_2CF_3$, $R_2 =$ —$(CH_2)_4CH(ONO_2)CH_2ONO_2$, $R_3 =$ —$(CH_2)_4CH(ONO_2)CH_2OC(O)H$
$R_4 =$ —$(CH_2)_4CHCH_2(ONO_2)$, $R_5 =$ —$(CH_2)_4CHCH_2OC(O)H$
　　　　　|　　　　　　　　　　　　　|
　　　OC(O)H　　　　　　　　　　OC(O)H

PolyPZ-18 from the previous step [P-(2,2,2-trifluoroethan-1-oxy (30%)/5,6-dinitratohexan-1-oxy (39%)/5-formyl-6-nitrato-hexan-1-oxy/6-formyl-5-nitrato-hexan-1-oxy/5,6-diformyl-hexan-1-oxy))polyphosphazene, where total formylated substituents=31%, 1.71 g] was dissolved in dry THF (100 ml) and dry methanol (160 ml) added to the solution to yield a white suspension. This was boiled under reflux for 140 h. (The suspension converted to a clear solution at 65° C.). At the end of this period volatile materials were removed using rotary-evaporation and the crude product re-dissolved in acetone (5 ml) and precipitated into hexane (100 ml). The material was then rinsed with fresh hexane (2×10 ml) and dried under high vacuum at 50° C. for 4 h to yield brown, viscous liquid which comprised partially formylated PolyPZ-19, Yield: 1.56 g. (Given 31% conversion of $ONO_2$ to OH, monomer unit molecular weight=327.0, hence yield: 89%.) However $^1$H NMR spectroscopy indicated that ~4% of the formate ester groups were still present. NMR (acetone-$d_6$): 1.60-1.90 (br m, 8.20H, $(CH_2)_3$), 3.73-5.03 (br m, 6.01H, $POCH_2$+trifluoroethoxy+$CH_2ONO_2$+$CH_2OH$), 5.18 (br s, 0.22H, CHOH), 5.50 (br s, 1.00H, $CHONO_2$) and 8.19-8.22 (br m, 0.05H, residual OCOH). $^{19}$F NMR (no internal standard): −75.8 ppm (br s, trifluoroethoxy). If required, the residual formate ester groups may be progressively hydrolysed (see on) by repeating the above procedure for variable periods of time, to ultimately yield PolyPZ-19 [P-(2,2,2-trifluoroethan-1-oxy (30%)/5,6-dinitratohexan-1-oxy (39%)/5-hydroxy-6-nitrato-hexan-1-oxy/6-hydroxy-5-nitrato-hexan-1-oxy/5,6-dihydroxy-hexan-1-oxy)polyphosphazene, total hydroxylated substituents=31%].

Solvolysis of PolyPZ-18 [P-(2,2,2-trifluoroethan-1-oxy (24%)/5,6-dinitratohexan-1-oxy (72%)/5-formyl-6-nitrato-hexan-1-oxy/6-formyl-5-nitrato-hexan-1-oxy/5,6-diformyl-hexan-1-oxy)polyphosphazene, where total formylated substituents=4%, 2 g) prepared above (at the ~45 g scale) was effected using the above procedure, but with 50 ml of THF, 80 ml of methanol and boiling under reflux until complete deformylation had been achieved (7 days—monitored by NMR). Purification employed dissolution in 5 ml of acetone and precipitation into 50 ml of hexane. Yield of PolyPZ-19 [P-(2,2,2-trifluoroethan-1-oxy (24%)/5,6dinitratohexan-1-oxy (72%)/5-hydroxy-6-nitrato-hexan-1-oxy/6-hydroxy-5-nitrato-hexan-1-oxy/5,6-dihydroxy-hexan-1-oxy)polyphosphazene, total hydroxylated substituents=4%, 1.62 g, 4.51 mmol, unit molecular weight 359.4].

This reaction was repeated using PolyPZ-18 [P-(2,2,2-trifluoroethan-1-oxy (24%)/5,6-dinitratohexan-1-oxy (69%)/5-formyl-6-nitrato-hexan-1-oxy/6-formyl-5-nitrato-hexan-1-oxy/5,6-diformyl-hexan-1-oxy)polyphosphazene, where total formylated substituents=7%, 2 g] prepared above (at the ~45 g scale). Yield of PolyPZ-19 [P-(2,2,2-trifluoroethan-1-oxy (24%)/5,6-dinitratohexan-1-oxy (69%)/5-hydroxy-6-nitrato-hexan-1-oxy/6-hydroxy-5-nitrato-hexan-1-oxy/5,6-dihydroxy-hexan-1-oxy)polyphosphazene, total hydroxylated substituents=7%, 1.74 g, 4.87 mmol, unit molecular weight 357.6].

Samples of PolyPZ-19 may be cured directly using a diisocyanate such as 1,6-diisocyanatohexane (HMDI)—see table in Curing Section—but superior results are obtained by converting PolyPZ-19 to PolyPZ-20 (next section) and curing this product.

E.1.iii Epoxidation of PolyPZ-19 to PolyPZ-20 [P-(2,2,2-trifluoroethan-1-oxy/5,6-dinitratohexan-1-oxy/5,6-oxiranohexan-1-oxy)polyphosphazene]

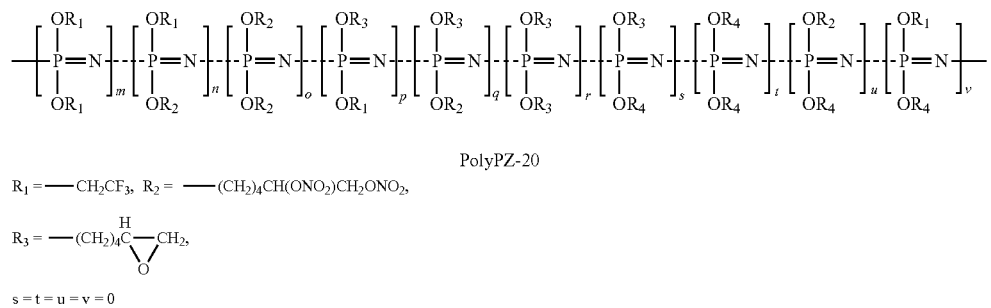

PolyPZ-20

$R_1 = $ ——$CH_2CF_3$, $R_2 = $ ——$(CH_2)_4CH(ONO_2)CH_2ONO_2$, $R_3 = $ ——$(CH_2)_4\overset{H}{\underset{\diagdown O \diagup}{C}}$—$CH_2$, $s = t = u = v = 0$ PolyPZ-19 [P-(2,2,2-trifluoroethan-1-oxy (30%)/5,6-dinitratohexan-1-oxy (27%)/5-hydroxy-6-nitrato-hexan-1-oxy/6-hydroxy-5-nitrato-hexan-1-oxy/5,6-dihydroxy-hexan-1-oxy))polyphosphazene, total hydroxylated substituents=43%](340 mg, unit monomer molecular weight 362.6, 0.94 mmol, prepared using the above procedures) was dissolved in THF (10 ml) and methylated spirit (5 ml) added with stirring. Solid KOH (85 wt %, 62 mg, ~1 eq. KOH) was then added; the solid dissolved completely within ~2 minutes [Alternatively the KOH may be dissolved in the methylated spirit before addition to the THF]. After boiling the clear solution under reflux for 24 h, volatile materials were eliminated by evaporation to obtain the epoxidised intermediate PolyPZ-20 [P-(2,2,2-trifluoroethan-1-oxy (30%)/5,6-dinitratohexan-1-oxy (27%)/5,6-oxiranohexan-1-oxy (43%)) polyphosphazene], contaminated with $KNO_3$. NMR (acetone-de, oxirane moiety only): $^1$H: 2.42 (br s, 1.00H, CHH), 2.67 (br s, 1.00H, CHH) and 2.88 ppm (br s, 1.27H, CH methyne). $^{13}$C: 46.90 ($CH_2$) and 52.35 ppm (CH). [NB. The presence of a small residual degree of formylation in the PolyPZ-19 substrate does not prevent this procedure from epoxidising the 1,2-hydroxyl-nitrato functionalities in this polymer.]

E.1.iv Conversion of PolyPZ-20 to PolyPZ-21 [P-(2,2,2-trifluoroethan-1-oxy/5,6-dinitratohexan-1-oxy/5,6-dihydroxyhexan-1-oxy)polyphosphazene]

6-hydroxy-5-nitrato-hexan-1-oxy/5,6-dihydroxy-hexan-1-oxy)polyphosphazene) total hydroxylated substituents=7%] (340 mg, ~0.94 mmol) prepared by flow nitration, was

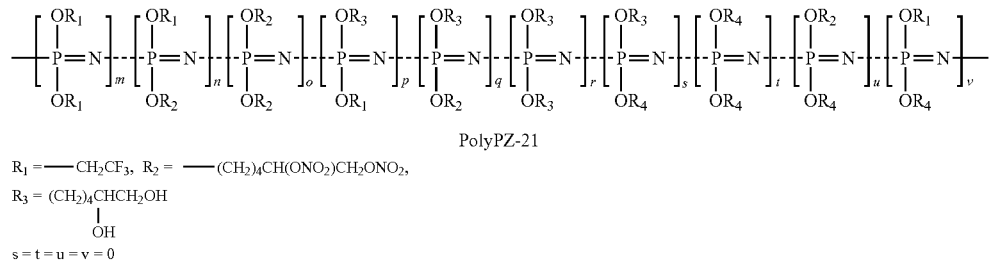

PolyPZ-21

$R_1 = $ —CH$_2$CF$_3$, $R_2 = $ —(CH$_2$)$_4$CH(ONO$_2$)CH$_2$ONO$_2$, $R_3 = $ (CH$_2$)$_4$CHCH$_2$OH
             |
             OH s = t = u = v = 0

The viscous residue from above, containing PolyPZ-20 [P-(2,2,2-trifluoroethan-1-oxy (30%)/5,6-dinitratohexan-1-oxy (27%) (/5,6-oxiranohexan-1-oxy (43%)) polyphosphazene], was re-dissolved in THF (5 ml) and the solution added drop-wise, during 1 h, to a mixture of THF and aqueous 1M H$_2$SO$_4$ (80:20 vol, 20 ml). At the end of this addition the solution was boiled under reflux for 3 h. The product was isolated by adding the solution to water (100 ml). The resultant suspension was stirred vigorously to coagulate the polymer which was separated and dried under vacuum at 50° C. The product PolyPZ-21 [P-(2,2,2-trifluoroethan-1-oxy (30%)/5,6-dinitratohexan-1-oxy (27%)/5,6-dihydroxy-hexan-1-oxy (43%)) polyphosphazene] was completely soluble in acetone and THF. NMR (acetone-d6, new diol moiety only): 1H: 3.47 (br s, 1.55H, CH$_2$OH) and 5.18 (br s, 0.89H, CHOH). 13C: 69.97 (CH$_2$OH) and 76.63 ppm (CHOH). A small quantity of residual formylation in the substrate PolyPZ-20 (carried through from earlier stages) does not prevent this procedure from opening oxirane rings in the polymer, to yield dihydroxy functionalities.

PolyPZ-21 may also be prepared by applying this epoxidation/ring opening procedure to PolyPZ-19 obtained by the partial nitration of PolyPZ-1, using flow nitration (see below). It is also effective at converting partially nitrated PolyPZ products which still contain residual dioxolanyl protected hydroxyl groups into their dihydroxy analogues. Such materials may for example be obtained when partial nitration is effected via flow nitration, without the use of ultrasound. Analogous dihydroxy substituted materials may also be prepared from other dinitrato polyphosphazene substrates for example PolyPZ-8c [P-(2,2,2-trifluoroethan-1-oxy/2,3-dinitratopropan-1-oxy/2-hydroxy-3-nitrato-propan-1-oxy/3-hydroxy-2-nitrato-propan-1-oxy/2,3-dihydroxy-propan-1-oxy)polyphosphazene] may be prepared either via formyl denitration of PolyPZ-8b [P-2,2,2-trifluoroethan-1-oxy/2,3-dinitratopropan-1-oxy polyphosphazene] or partial flow nitration of PolyPZ-8 [P-(2,2,2-trifluroethan-1-oxy/(2',2'-dimethyl-1',3'-dioxolan-4'yl)-methan-1-oxy)polyphosphazene]. This PolyPZ-8c may then be epoxidised to PolyPZ-8d [P-(2,2,2-trifluoroethan-1-oxy/5,6-dinitratopropan-1-oxy/5,6-oxiranopropan-1-oxy)polyphosphazene] and hydrolysed to PolyPZ-8e using one of the procedures detailed in this section for the conversion of PolyPZ-19 to PolyPZ-20 and subsequently to PolyPZ-21.

E.1.v Alternative: Epoxidation of PolyPZ-19 Obtained by Flow Nitration: Conversion to PolyPZ-20 and Subsequently PolyPZ-21

PolyPZ-19 [P-(2,2,2-trifluoroethan-1-oxy (27%)/5,6-dinitratohexan-1-oxy (66%)/5-hydroxy-6-nitrato-hexan-1-oxy/ dissolved in THF (10 ml) and methylated spirit (5 ml) added with stirring. Solid KOH (85 wt %, 62 mg, ~1 eq. KOH) was then added. The solid dissolved completely within ~2 min. After boiling the clear solution under reflux for 24 hours the volatiles were removed by evaporation to obtain PolyPZ-20 [P-(2,2,2-trifluoroethan-1-oxy (27%)/5,6-dinitratohexan-1-oxy (66%)/5,6-oxiranohexan-1-oxy (7%)) polyphosphazene] contaminated with KNO$_3$. NMR (acetone-de, oxirane moiety only): $^1$H: 2.42 (br s, 1.00H, CHH), 2.67 (br s, 1.00H, CHH) and 2.88 ppm (br s, 1.27H, CH). $^{13}$C: 46.90 (CH$_2$) and 52.35 ppm (CH)—see FIG. 14a.

The viscous residue from above containing PolyPZ-20 [P-(2,2,2-trifluoroethan-1-oxy (27%)/5,6-dinitratohexan-1-oxy (66%)/5,6-oxiranohexan-1-oxy (7%)) polyphosphazene] was re-dissolved in THF (5 ml) and the solution added drop-wise, during 1 hour, to a mixture of THF and aqueous 1M H$_2$SO$_4$ (80:20 vol, 20 ml). Once the addition was complete, the solution was boiled under reflux for 3 hours. The product was isolated by adding this solution to water (100 ml). The resultant suspension was stirred vigorously to coagulate the polymer, which was separated and dried under vacuum at 50° C. to yield: PolyPZ-21[P-(2,2,2-trifluoroethan-1-oxy (27%)/5,6-dinitratohexan-1-oxy (66%)/5,6-dihydroxyhexan-1-oxy (7%)) polyphosphazene] (300 mg). This material was completely soluble in acetone and THF. NMR (acetone-d$_6$, new diol moiety only): $^1$H: 3.47 (br s, 1.55H, CH$_2$OH) and 5.18 (br s, 0.89H, CHOH). $^{13}$C: 69.97 (CH$_2$OH) and 76.63 ppm (CHOH)—see FIG. 14b.

E.1.vi Curing with 1,6-diisocyanatohexane (Hexamethylene diisocyanate, HMDI)

The PolyPZ-21 [P-(2,2,2-trifluoroethan-1-oxy (30%)/5,6-dinitratohexan-1-oxy (27%)/5,6-dihydroxyhexan-1-oxy (43%)) polyphosphazene] prepared in the previous step [1.56 g, 4.77 mol](which had been kept in vacuo over drying agent for 1 week with no detected mass loss) was dissolved in dry acetone (5 ml). A solution of 1,6-diisocyanatohexane in dry acetone (101.5 mg/ml, 4.0 ml, 406 mg diisocyanatohexane, 2.41 mmol, 0.5 eq) was added to the solution with stirring, under positive nitrogen pressure. A solution (dry acetone) of the curing catalyst dibutyltindilaurate (DBTDL, 1.25 mg/ml, 160 μl, 0.20 mg, ~0.01 wt % of neat mixture) was then added with an Eppendorf pipette. The clear solution was stirred using a magnetic stirrer for 5 minutes to ensure homogenization. The solvent was then removed by rotary evaporation under high vacuum at 40° C., until the weight of the neat viscous mixture attained the anticipated combined weight of: polymer+diisocyanatohexane+catalyst. $^1$H NMR analysis confirmed that only traces of acetone were left in the mixture. A small amount (~1 mg) of the neat mixture was spread between NaCl plates in order to monitor the cure reaction by IR spectroscopy (by measuring the decreasing intensity of the strong NCO elongation band at ~2250 cm$^{-1}$). The bulk mixture and the IR sample (still between NaCl plates) were both placed inside an oven, pre-heated to 60° C. FTIR spectra, were recorded after 0, 3, 18 and 24 h. The degree of conversion of isocyanate to urethane was measured (by IR spectroscopy) as 43% after only 3 hours, 78% after 18 hours and 85% after 24 hours. After 3 hours, the viscous mixture would no longer flow when the flask was turned upside down; by 24 hours the liquid mixture had turned into a soft, sticky, rubbery solid. A small sample of the cured rubber was left in the oven for a further 48 h, after which it became a much tougher, but flexible and non-sticky rubber.

E.2. Synthesis of PolyPZ-23 [P-(2,2,2-trifluoroethan-1-oxy/5,6-dinitratohexan-1-oxy/4-aza-5-oxo-6-oxa-8-hydroxyoctan-1-oxy)polyphosphazene]

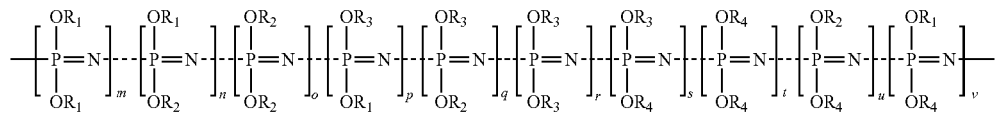

PolyPZ-23

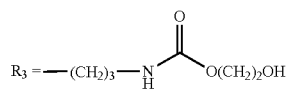

s = t = u = v = 0

(Hydroxy functionalisation of PolyPZ-3 via its 3-aminopropoxide functionalities)

E.2.i Activation with 1,1'-carbonyldiimidazole (CDI)

1,1'-Carbonyldiimidazole (90 mol %, containing imidazole 10 mol %), 3.84 g, (14.2 mmol of active CDI) was added to a stirred solution of PolyPZ-3 [P-2,2,2-trifluoroethan-1-oxy (23%)/5,6-dinitratohexan-1-oxy (61%)/3-ammonium (nitrate) propan-1-oxy (16%)) polyphosphazene] 5.71 g (monomer unit molecular weight: 407.5, 14.2 mmol) in dry THF (100 ml) and the mixture boiled under reflux for 24 hours. The THF was removed by evaporation and the residue re-dissolved in acetone (20 ml). This solution was solvent precipitated drop-wise into CHCl$_3$ (200 ml, twice) and the solvent decanted from the product. The last traces of chloroform were eliminated from the product by evaporation at 50° C. under vacuum, to yield PolyPZ-22 [P-(2,2,2-trifluoroethan-1-oxy/5,6-dinitratohexan-1-oxy/4-aza-5-(1') imidazyl-5-oxopentan-1-oxy)polyphosphazene] as a viscous, dark brown liquid. More product precipitated from the supernatant liquor after 48 h. The solids were combined and washed with CHCl$_3$ (2×30 ml) and dried under vacuum at 50° C. Combined yield: 4.55 g mg (76%). NMR (actone-d$_6$):

$^1$H: (carbonylimidazole moiety only): 6.98 (br s, 1.30H, C-4 CH of imidazoyl residue and CONH), 7.68 (br s, 1.04H, C-5 CH of imidazoyl residue), and 8.32 (br s, 1.50H, overlapping to signal of residual free imidazole, C-2 CH of imidazoyl residue).

E.2.ii. Reaction of Activated Polymer with Ethylene Glycol (E.G.)

A solution of anhydrous ethylene glycol (3.10 g, 50 mmol) in dry THF (10 ml) was added to a solution of PolyPZ-22 [P-(2,2,2-trifluoroethan-1-oxy (23%)/5,6-dinitratohexan-1-oxy (61%)/4-aza-5-(1')-imidazyl-5-oxopentan-1-oxy (16%)) polyphosphazene](obtained in the previous step) 2.49 g, 5.9 mmol in dry THF (30 ml) and the mixture was boiled under reflux for 48 hours. (After 24 hours only ~77% of the carbonylimidazole units had reacted.) The solvent was eliminated by rotary evaporation to leave the viscous product submerged within the excess of liquid ethylene glycol. Most of the latter was eliminated by decantation/use of a Pasteur pipette followed by rinsing the product with water (2×10 ml). [Elimination of most ethylene glycol at this stage facilitates product coagulation and isolation in the next step, without the need for centrifugation]. The washed product was dissolved in acetone (3 ml) and the solution added drop-wise to water (100 ml). The suspension was left standing for 24 h to allow the polymer to coagulate onto the glass walls of the flask. The almost clear supernatant solution was decanted and the product rinsed with water (2×10 ml) and dried under vacuum at 60° C. for 3 h to yield PolyPZ-23 [P-(2,2,2-trifluoroethan-1-oxy (23%)/5,6-dinitratohexan-1-oxy (61%)/4-aza-5-oxo-6-oxa-8-hydroxyoctan-1-oxy (16%)) polyphosphazene] as an amber viscous liquid. Yield: 1.73 g (49%). NMR (acetone-d$_6$): 1.41-1.89 (br m, 8.52H, 3×CH$_2$ $_{[5,6}$-dinitratohexan-1-oxy]+C-2 CH$_2$ (aminopropoxy), 3.28 (br s, ~1.6H overlapping to HDO peak, CH$_2$NH (aminopropoxy), 3.70 (br s, 1.17H, CH$_2$CH$_2$OH), 4.10-4.99 (br m, OCH$_2$+CH$_2$ONO$_2$ $_{[5,6}$-dinitratohexan-1-oxy]+OCH$_2$ (aminopropoxy)+CH$_2$CH$_2$OH+ CH$_2$ (trifluoroethoxy), 5.49 (br s, 1.00H, CHONO$_2$) and 6.30 ppm (br s, 0.02H, but exchanging with HDO, HNCOOR). $^1$H-$^1$H (COSY45) correlation spectroscopy confirmed the above assignments.

E.2.iii. Preparation of PolyPZ-24 [P-(2,2,2-trifluoroethan-1-oxy/5,6-dinitratohexan-1-oxy/4-aza-10-hydroxy-5-oxo-6-oxa-8,8,9,9-tetrafluorodecan-1-oxy/4-aza-5-hydroxy-5-oxopentan-1-oxy) polyphosphazene]

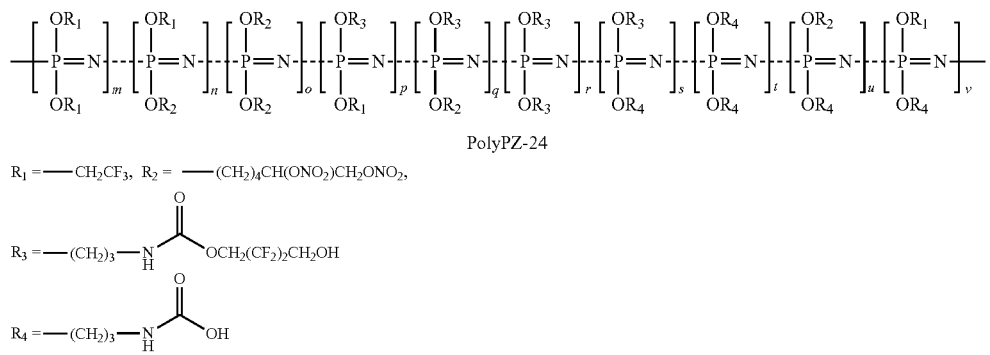

PolyPZ-24 via reaction with 2,2,3,3-tetrafluorobutane-1,4-diol:

Solid 2,2,3,3-tetrafluorobutane-1,4-diol (1.45 g, 8.9 mmol, approximately 5 equivalents) was added in a single portion to a solution of PolyPZ-22 [P-(2,2,2-trifluoroethan-1-oxy (27%)/5,6-dinitratohexan-1-oxy (44%)/4-aza-5-(1')-imidazyl-5-oxopentan-1-oxy (29%)) polyphosphazene]700 mg, (monomer unit molecular mass: 391.9, 1.8 mmol) in dry THF (15 ml). The clear mixture was boiled under reflux for 60 h, after which time the solvent was removed by evaporation and the residue dissolved in dry acetone (2 ml). The solution was poured into water (50 ml) to precipitate the product. Only partial coagulation occurred at this stage with fine suspended material being recovered subsequently by centrifugation. The product was dried under reduced pressure to yield PolyPZ-24 [P-(2,2,2-trifluoroethan-1-oxy (27%)/5,6-dinitratohexan-1-oxy (44%)/4-aza-10-hydroxy-5-oxo-6-oxa-8,8,9,9-tetrafluorodecan-1-oxy (15%)/4-aza-5-hydroxy-5-oxopentan-1-oxy (14%)) polyphosphazene]. [$^{19}$F NMR spectroscopy of the dry product indicated that only 15% of the carbonylimidazole groups had reacted with the 2,2,3,3-tetraflurobutane-1-4-diol, the remainder having hydrolysed during work-up. NMR (acetone-d6): $^{19}$F (no internal reference): −75.1 (br s, 1.00F, trifluoroethoxy), −122.2 (br s, 0.11F, NH(CO)OCH$_2$CF$_2$) and −124.3 ppm (br s, 0.13F, CF$_2$CH$_2$OH).

E.2.iv. Curing in Sheet Form

Dry PolyPZ-23 [P(-2,2,2-trifluoroethan-1-oxy (23%)/5,6-dinitratohexan-1-oxy (61%)/4-aza-5-oxo-6-oxa-8-hydroxyoctan-1-oxy (16%) polyphosphazene]2.26 g, (monomer unit molecular mass: 414.4, 5.44 mmol) was added to a 10 ml round bottomed flask with the aid of a micrometric pipette. Neat 1,6-diisocyanatohexane (440 µL, 458 mg, 2.72 mmol) was then dispensed into the flask, together with dibutyltin dilaurate (DBTDL) catalyst (0.5 mg, 0.02 wt %). This was achieved by weighing the required DBTDL directly inside the disposable plastic nozzle of the pipette, prior to dispensing the isocyanate. (The required DBTDL was placed into the nozzle by touching its inside surface with a thin glass rod carrying neat catalyst on the tip.) Discharge of the isocyanate from the nozzle caused immediate dissolution of the catalyst droplet into the isocyanate, thus depositing a ready-mixed solution of isocyanate and catalyst directly into the polymer. The resulting mixture was homogenised manually using a small glass rod; however, it proved necessary to heat the (closed) flask to approximately 50° C. in a water bath to render the mixture sufficiently free flowing to allow ready homogenisation. (This overall procedure avoided the need to use solvents.) The polymer mixture was then poured into a small mould and carefully spread over the available surface area using a spatula. After degassing under high vacuum for 10 minutes, the mould was sealed with a rubber gasket and Perspex lid and transferred to an oven pre-heated to 65° C. After 5 days at this temperature the mould was opened and the light brown transparent rubber sheet (which was tough, but flexible) was peeled off the PTFE base.

E.3. Synthesis of PolyPZ-25 [P-(2,2,2-trifluoroethan-1-oxy/-2,3-dinitrato-propan-1-oxy/4-aza-5-(1')-imidazoyl-5-oxopentan-1-oxy)polyphosphazene]

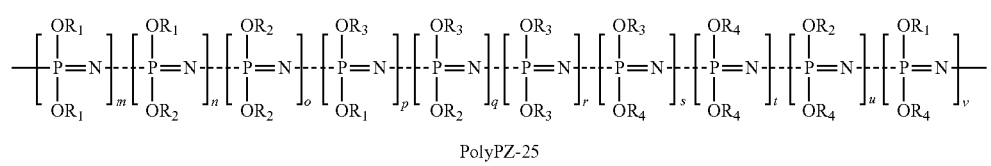

PolyPZ-25

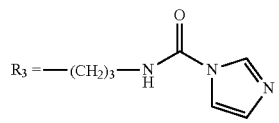

s = t = u = v = 0 via activation of PolyPZ-10 with CDI

The above general procedure for activation of a polyphosphazene bearing a 3-aminopropan-1-oxy side chain, using CDI followed by reaction with ethylene glycol, may be used to generate an extensive range of different mixed substituent polyphosphazenes in which either or both of the alkylaminoalkoxy and energetic groups differ from those used above. The key common feature of such materials being their functionalisation with pendant hydroxyl groups (from the ethylene glycol), in order to render them curable using polyfunctional isocyanates or polyfunctional epoxides. One such additional example would be the activation of PolyPZ-10 with CDI to yield PolyPZ-25 (described below) and subsequent reaction of this with ethylene glycol to yield PolyPZ-26. A wide range of alternative diols may also be used instead of ethylene glycol.

1,1'-Carbonyldiimidazole ['CDI', (90 mol %, 10% imidazole), 195 mg, 1.08 mmol of pure CDI], was added to a stirred solution of PolyPZ-10 [P-(2,2,2-trifluoroethan-1-oxy (60%)/1,2-dinitratopropan-1-oxy (20%)/3-ammonium (nitrate) propan-1-oxy (20%)) polyphosphazene] (200 mg, unit monomer molecular weight: 368, 0.54 mmol) in dry THF (10 ml). The mixture was boiled under reflux for 16 h, after which time the THF was removed by evaporation. The brown residue was dissolved in acetone (3 ml) and the solution added drop-wise to chloroform (20 ml). The suspension was stirred magnetically for 30 minutes to coagulate the product. The yellow supernatant liquor was decanted off from the reddish brown product and residual solvent removed from this product in-vacuo at 50° C., for 1 hour to yield: PolyPZ-25 [P-(2,2,2-trifluoroethan-1-oxy/-2,3-dinitrato-propan-1-oxy/4-aza-5-(1')-imidazoyl-5-oxopentan-1-oxy)polyphosphazene], still containing a little free imidazole. Yield: 85 mg, (unit monomer molecular weight: 380.5, ~40%). NMR (acetone-d$_6$): $^1$H: 2.02 (br s, 1.64H overlapping to solvent signal, C-2 CH$_2$ aminopropoxy), 3.51 (br s, 3.51H, CH$_2$NH aminopropoxy unit), 4.23 (br s, 2.70H, partially overlapping to signal of OCH$_2$CF$_3$ unit, C-1 CH$_2$ aminopropoxy), 4.51-5.08 (br m, 15.9H, OCH$_2$CF$_3$ and 2×CH$_2$ of 2,3-dinitratopropoxy), 5.75 (br s, 3.01H, CH of 2,3-dinitratopropoxy), 6.97 (br s, 1.37H, C-4 CH of imidazoyl residue and CONH), 7.70 (br s, 1.14H, C-5 CH of imidazoyl residue), and 8.32 (br s, ~1.5H, overlapping to signal of residual free imidazole, C-2 CH of imidazoyl residue). $^{13}$C: 38.4 (C-2 aminoporopoxy), 64.0 (OCH$_2$ 2,3-dinitratopropoxy overlapping to CH$_2$CF$_3$, but CF$_3$ not observed), 66.0 (CH$_2$NH aminopropoxy unit), 70.6 (CH$_2$ONO$_2$ 2,3-dinitratopropoxy unit), 72.6 (OCH$_2$ aminopropoxy unit), 79.23 (CH 2,3-dinitratopropoxy unit), 117.4 (C-4 imidazoyl residue), 130.3 (C-5 imidazoyl residue), 137.1 (NHCO), 150.3 (C-2 imidazoyl residue). The carbon-13 signals were positively assigned with the results of a $^{13}$C DEPT135 experiment.

The above product may reacted with ethylene glycol (without further purification) using a procedure analogous to that described above for the conversion of PolyPZ-22 to PolyPZ-23. This procedure will convert PolyPZ-25 into PolyPZ-26 [P-(2,2,2-trifluoroethan-1-oxy/5,6-dinitratopropan-1-oxy/4-aza-5-oxo-6-oxa-8-hydroxyoctan-1-oxy)polyphosphazene]:

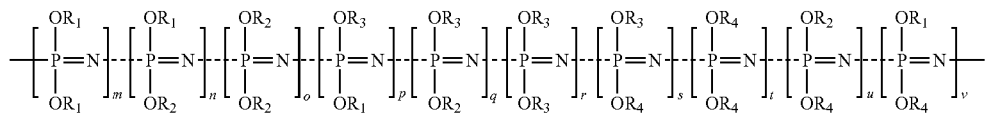

PolyPZ-26

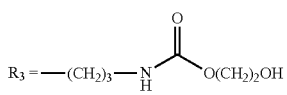

s = t = u = v = 0 which will (in common with PolyPZ-23) be functionalised with hydroxyl groups to facilitate its subsequent curing with polyfunctional isocyanates or epoxides.

E.4. Synthesis of a covalently-curable pre-polymer PolyPZ-27 [P-(2,2,2-trifluoroethan-1-oxy (10%)/5, 6-dinitratohexan-1-oxy (70%)/4-aza-5-oxa-8-hydroxyoctan-1-oxy/6-(1',2'-dihydro-1'-methyl-2'-oxopyrimidin-4'yl)-4,6-diaza-5-oxo-hexan-1-oxy (20%)) polyphosphazene]

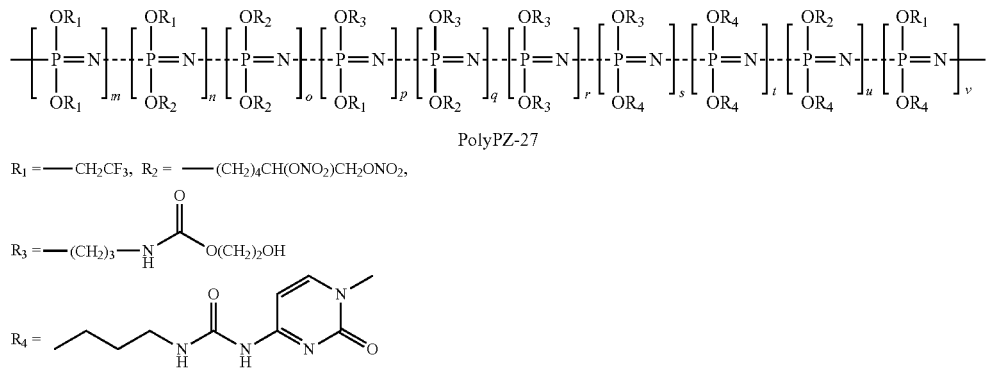

PolyPZ-27

$R_1$ = —CH$_2$CF$_3$, $R_2$ = —(CH$_2$)$_4$CH(ONO$_2$)CH$_2$ONO$_2$, $R_3$ = —(CH$_2$)$_3$—NH—C(=O)—O(CH$_2$)$_2$OH $R_4$ = [butyl-NH-C(=O)-NH-(1-methylpyrimidin-2-one-4-yl)]

to obtain a thermoplastic rubber

E.4.i. Activation of PolyPZ-3 with CDI 1,1'-Carbonyldiimidazole 2.32 g, (90 mol %, 10 mol % imidazole) (12.9 mmol CDI) was added to a stirred solution of PolyPZ-3 [P-2,2,2-trifluoroethan-1-oxy (10%)/5,6-dinitratohexan-1-oxy (70%)/3-ammonium (nitrate) propan-1-oxy (20%)) polyphosphazene]2.78 g, [monomer unit molecular weight: 432, 6.4 mmol] in dry THF (75 ml). The mixture was boiled under reflux for 16 h and the solvent removed by evaporation. The residue was re-dissolved in acetone (25 ml) and precipitated drop-wise into CHCl$_3$ (150 ml, twice) to provide the activated product. After decantation of the clear, brown supernatant liquid, the dark brown activated product was freed of solvent in-vacuo at 50° C. to yield: PolyPZ-22 [P-(2,2,2-trifluoroethan-1-oxy/5,6-dinitratohexan-1-oxy/4-aza-5-(1')-imidazyl-5-oxopentan-1-oxy) polyphosphazene] Yield: 2.50 g 88%, (with slight contamination by imidazole). Slight contamination by imidazole does not prevent this product being used in the next step.

E.4.ii Reaction of PolyPZ-22 [P-(2,2,2-trifluoroethan-1-oxy/5,6-dinitratohexan-1-oxy/4-aza-5-(1')-imidazyl-5-oxopentan-1-oxy)polyphosphazene] with 1-methylcytosine and ethylene glycol Solid 1-methylcytosine (354 mg, 2.8 mmol) was added in a single portion to a stirred solution of PolyPZ-22 [P-(2,2,2-trifluoroethan-1-oxy (10%)/5,6-dinitratohexan-1-oxy (70%)/4-aza-5-(1')-imidazyl-5-oxopentan-1-oxy (20%)) polyphosphazene] (2.50 g, ~5.6 mmol) in dry THF (60 ml). [NB: The polymer was not entirely soluble in this volume of solvent at room temperature.] The mixture was boiled under reflux for 5 h. A solution of anhydrous ethylene glycol (3.49 g, 56.3 mmol) in dry THF (20 ml) was then added in a single portion and the homogeneous solution boiled under reflux for a further 48 h. Once the reaction mixture had cooled to room temperature, the suspension of unreacted 1-methylcytosine (which had precipitated during cooling) was filtered off. The filtrate was volume reduced by evaporation and then added to water (100 ml) with stirring. The suspension did not coagulate, but the addition of brine (0.5 ml) immediately initiated coagulation, leaving a clear supernatant liquid within one hour. The liquor was decanted off and the product rinsed with water and dried under vacuum at 60° C. for 3 hours to yield: PolyPZ-27 [P-(2,2,2-trifluoroethan-1-oxy (10%)/5,6-dinitratohexan-1-oxy (70%)/4-aza-5-oxo-6-oxa-8-hydroxyoctan-1-oxy/6-(1',2'-dihydro-1'-methyl-2'-oxopyrimidin-4'yl)-4,6-diaza-5-oxo-hexan-1-oxy (20%)) polyphosphazene] as a hard, waxy solid with a reversible melting interval at 73-76° C. Yield: 1.24 g (unit monomer molecular weight: 445.7, 50%). NMR (DMSO-d$_6$): $^1$H: 1.02-1.58 (br m, 8.29H, 3×CH$_2$ C6 unit+C-2 CH$_2$ aminopropoxy unit), 3.05 (br.s, 0.93H, C-3 CH$_2$ 3-aminopropoxy unit), 3.31 (br s, ~0.25H, CH$_3$ 1-methycytosine), 3.52 (br s, 1.12H, OCOCH$_2$CH$_2$OH), 3.91 (br m, 4.40H, OCH$_2$ C6 unit+C-1 CH$_2$ 3-aminopropoxy+OCOCH$_2$CH$_2$OH), 4.20 (br s, 0.82H, CH$_2$ trifluoroethoxy), 4.34 (br s, 1.16H, CHHONO$_2$), 4.90 (br s, 1.02H, CHHONO$_2$), 5.39 (br s, 1.00H, CHONO$_2$), 7.00 (br s, 0.30H, CH$_2$OCONH), 7.87 (br d, J=5.5 Hz, 0.08H, CH pyrimidinone ring) and 9.7 ppm (br s, 0.02H, CH$_2$NHCONH urea link to pyrimidinone ring). $^{19}$F (no internal standard): −75.3 ppm (br s, trifluoroethoxy).

E.4.iii. Curing of PolyPZ-27 [P-(2,2,2-trifluoroethan-1-oxy/5,6-dinitratohexan-1-oxy/4-aza-5-oxo-6-oxa-8-hydroxyoctan-1-oxy/6-(1',2'-dihydro-1'-methyl-2'-oxopyrimidin-4'yl)-4,6-diaza-5-oxo-hexan-1-oxy)polyphosphazene] with 1,6-diisocyanatohexane (HMDI)

Small pieces of PolyPZ-27 [P-(2,2,2-trifluoroethan-1-oxy (10%)/5,6-dinitratohexan-1-oxy (70%)/4-aza-5-oxo-6-oxa-8-hydroxyoctan-1-oxy/6-(1',2'-dihydro-1'-methyl-2'-oxopyrimidin-4'yl)-4,6-diaza-5-oxo-hexan-1-oxy (20%)) polyphosphazene] from above (878 mg, ~2 mmol) in the form of a hard waxy solid were heated in a 50 ml round-bottomed flask at 60° C., using a glycerine bath, until they melted and coalesced into a viscous liquid. Neat 1,6-diisocyanatohexane (79 μl, 82 mg, 0.49 mmol, 0.5 equivalents) was added using a micrometric pipette. The mixture was manually stirred at 60° C. using a small glass rod, onto the tip of which had been applied the catalyst, DBTDL (0.5 mg, 0.05 wt %). Stirring was continued for 5 minutes, until the isocyanate and catalyst had completely dissolved into the polymer, yielding a considerably less viscous liquid. The PTFE base of the mould was pre-heated to about 60° C. using a heat gun and the mixture quickly transferred into the mould and spread over the available area using a spatula. The mould was then sealed with a rubber gasket and Perspex lid and placed in an oven at 65° C. for curing. The reaction was complete within 24 h as determined by FT-IR. The cured product was a tough but flexible rubber that reversibly softened above ~50° C.

E.5. Isocyanate Curable Variants of Dinitramide and Nitrate PolyPZ Products

Isocyanate curable variants of the energetic PolyPZs: 35, 36, 37, 38, 39, 40, 41, 42, 43, and 44 may be prepared by means of the procedures detailed herein for the conversion of PolyPZ-3 to PolyPZ-23 via PolyPZ-22 and the conversion of PolyPZ-10 to PolyPZ-26 via PolyPZ-25. However, when synthesising curable variants of PolyPZs 35 to 44 it is necessary to apply these procedures to inert precursors. This leads both to the curable inert intermediate PolyPZs-57 and the final curable energetic PolyPZs: 63, 64, 65, 66, 67, 68, 69, 70, 71 and 72.

In a first method, the first step is to produce PolyPZ-32 analogues containing relatively low proportions of 3-aminopropoxy side groups. This is achieve using the preparation detailed for the 81% substituted material [P-(2,2,2-trifluoroethan-1-oxy (19%)/3-aminopropan-1-oxy (81%)) polyphosphazene], but reducing the quantity of 3-aminopropoxide (i.e. 3-aminopropanol) employed in the synthesis and by modifying the reaction time. The exact percentage of such side chains required will vary according to the application (i.e. in relation to the physical properties required in the eventual product) but for curing purposes it is preferable to employ 3-aminopropoxy functionalities in the range of 1-25%. This percentage controls the number of hydroxyl sites which are available in the final products for cure reactions. During the synthesis of PolyPZ-32 using the provided method, the first product isolated is PolyPZ-55, which is the chloride salt of the target material. For current purposes this material may be used directly, after solvent precipitation, for the subsequent reactions (below); it is unnecessary to add base/liberate the free amine before proceeding.

The next step is to react this PolyPZ-55 with carbonyl 1,1'-di-imidazole followed by ethylene glycol, using analogous procedures to those detailed for the conversion of PolyPZ-3 to PolyPZ-22 and then PolyPZ-23 (or that for PolyPZ-10 to PolyPZ-25 and then PolyPZ-26). This reaction sequence produces initially PolyPZ-56 which after reaction with ethylene glycol yields PolyPZ-57, the latter being an inert hydroxyl substituted polyphosphazene, which can be cured using difunctional isocyanates or difunctional epoxides.

The synthesis of PolyPZs 63, 64, 65; 66, 67, 68, 69, 70, 71 and 72 next involves following the respective reaction sequences employed for the preparation of PolyPZs: 35, 36, 37, 38, 39, 40, 41, 42, 43 and 44 respectively, but starting with PolyPZ-57 as the initial substrate, instead of PolyPZ-12.

The next step is to substitute PolyPZ-57 (in 5 separate reactions) using the amino propoxides: 2-(methylamino) ethoxide, 2-(ethylamino)ethoxide, 2-(propylamino)ethoxide, 2-(N-butylamino)ethoxide and 3-aminopropoxide, respectively using reaction conditions analogous to those employed in the preparation of PolyPZs: 28, 29, 30, 31, and 32. This yields products PolyPZ 58, 59, 60, 61 and 62 respectively which are then quaternised with either ammonium dinitramide or ammonium nitrate, using analogous procedures to those employed to produce PolyPZs: 35, 36, 37, 38, 39, 40, 41, 42, 43 and 44. The procedure adopted for each product should be the one used previously to produce a PolyPZ containing the equivalent quaternised amino side chain. The products of these reactions are PolyPZs: 63, 64, 65, 66, 67, 68, 69, 70, 71 and 72 which are curable using, for example diisocyanates or diepoxides. In order to optimise the preparation of PolyPZs: 58 to 62 and PolyPZs: 63 to 72, some modifications will be required to the amine substitution conditions specified for the preparation of PolyPZs: 28 to 32 and the respective quaternisation conditions used to prepare PolyPZs: 35 to 44. NB. It is advisable to keep the intermediate PolyPZs 58 to 62 in solution as far as possible until the products have been fully quaternised to yield: PolyPZs 63 to 72. This should minimise the tendency of these intermediates to undergo unwanted cross-linking/other side reactions.

When preparing curable variants of PolyPZ-37 and PolyPZ-38, because only one type of amino side chain is required (3-aminopropoxide) it should, in principle, be possible to synthesise PolyPZ-62 using a single amine substitution reaction. Thus, starting from a sample of highly substituted PolyPZ-32 [eg P-(2,2,2-trifluoroethan-1-oxy (19%)/3-aminopropan-1-oxy (81%)) polyphosphazene](or its quaternised salt PolyPZ-55), a limited quantity of these 3-aminopropoxy side chains could be reacted by employing limited quantities of carbonyl 1,1'-diimidazole and, ethylene glycol, in order to produce the requisite degree of hydroxyl functionalisation, whilst still preserving a substantial percentage of (unreacted) 3-aminopropoxy side chains. However, in practice the high concentration of primary amino groups present when trying to react carbonyl 1,1'-diimidazole is likely to cause significant cross-linking/side reactions. Thus, although such a procedure is in principle quicker and easier to perform than that outlined above, it is difficult to establish the precise conditions necessary to yield any specific product and in practice, not all desired products will be accessible by this route.

E.6. Isocyanate Curable Variants of Triazolate, Tetrazolate, Picrate, Diamino Picrate and 1-Amino-1-hydrazino-2,2-dinitroethanate PolyPZ products Preparation of PolyPZ-56 and PolyPZ-57 using the above procedures also allows the preparation of curable analogues of PolyPZs: 47, 48, 49, 50, 51 and 53. The synthesis of these curable materials is effected using similar reaction sequences to those described for the preparation of the parent materials (PolyPZs: 47-53) but using PolyPZ-57 as the initial substrate. Thus, PolyPZ-57 will become variously substituted by side chains bearing the: 5-aminotetrazolate (PolyPZs: 47, 48 and 49), picrate (PolyPZ-50), 3,5-diaminopicrate (PolyPZ-51) and 1-amino-1-hydrazino-2,2-dinitroethenate (PolyPZ-53) counter ions. Some optimisation of reaction conditions will be required. The presence in each of these products of hydroxylated side chains (originating from PolyPZ-57) will render them all individually curable using polyfunctional isocyanates or polyfunctional epoxides.

E.7. Isocyanate Curable Variant of Nitramino PolyPZ-52

An isocyanate/epoxide curable variant of PolyPZ-52 may be prepared through the introduction of a hydroxyl bearing side chain. This can be achieved by preparing the sodium salt of a monoprotected diol using a base resistant protecting group. For example the sodium salt of 2-pyranyl ethanol may be suitable (see: WO2006/032882) although a longer chain analogue such as the sodium salt of 6-pyranyl hexanol would be better suited to the current application. The reaction of a limited quantity of this material with polydichlorophosphazene in THF would result in the substitution of a modest percentage of the chlorine substituents. The exact percentage of these side chains required will vary according to the application (i.e. in relation to the physical properties required in the eventual product) but for curing purposes it is preferable to introduce around 1-25% of hydroxylated side chains. The product obtained from this step would be subsequently reacted with a larger quantity of sodium 3-nitro-3-azabutan-1-oxide, using conditions broadly similar to those employed for the preparation of PolyPZ-52, but optimised to suit the modified substrate. Upon completion of this second substitution reaction, the pyranyl protecting group may be cleaved using appropriate acidic (but not nitrating) conditions. Once the hydroxyl groups have been de-protected in this fashion, the product comprises a variant of PolyPZ-52 in which a controlled percentage of the 3-nitro-3-azabutan-1-oxy side chains have effectively been replaced by hydroxylated side chains which are curable using either a polyfunctional isocyanate or polyfunctional epoxide. For example, if the sodium salt of 6-pyranyl hexanol was employed in the above reaction, a 6-hydroxyhexan-1-oxy side chain would be present.

Even without modification, PolyZ-52 has inherent reversible cure characteristics. If unmodified PolyZ-52 is mixed with polymers containing hydrogen atoms which are capable of H-bonding, the nitramine groups in PolyPZ-52 will form reversible (H-bond) cross-links with such molecules. Thus, by blending PolyPZ-52 with a suitable polymer it may be cured. Materials by which this might be achieved may include, but not be limited to, those PolyPZs containing H-bondable, hydrogen atoms.

F. Curing of Hydroxylated or Amino Side Chain Polyphosphazenes

Various polyphosphazene samples containing different proportions of either hydroxylated or amino side chains, were individually dissolved in tetrahydrofuran or acetone (2.5 ml-15 ml) in small pear shaped 'quick fit' flasks. The required cross-linker was added to each of the polymers (together with catalyst, if required) to provide pre-cure mixtures with the desired stoichiometry (see tables). These mixtures were transferred to a rotary evaporator for solvent removal, then the (typically) viscous yellow coloured liquids were left under high vacuum for 3 h at room temperature to drive off the last traces of solvent and to degas any trapped air. The mixtures (in air) still within their individual flasks were then capped (ground glass stoppers) and placed inside a thermostatically controlled oven which was maintained at the desired temperature (typically 70° C.) for the necessary period. Gelation of the mixtures usually occurred over 2-5 days. Curing of the (typically) transparent yellow-orange coloured mixtures was monitored both visually and via periodic probing of the material using a metal spatula. Further analysis was completed in most cases using NMR (nuclear magnetic resonance spectroscopy). Thus, either a small sample was dissolved from each cured/partially cured mixture (acetone-$d_6$, 24 h, room temperature) or unreacted material was extracted from partially cross-linked polymer, using hot acetone (24 h). In each case insoluble residual gels were dried, weighed and characterised by DSC (differential scanning calorimetry). The curing time of the mixtures (~10 h-20 days) was strongly dependant upon the percentage of functional groups present in the sample (i.e. $NH_2$ or OH). The fully cured samples were characterised by DSC and DMA. The various experimental parameters are captured in Tables 7 and 8.

F.1. Synthesis of Triethylene Glycol Diglycidyl Ether (TEGDGE)

Sodium hydroxide (80.0 g, 2 mol) in water (50 ml), tetrabutylammonium bromide (1.19 g, 7.4 mmol) and epichlorohydrin (92.7, 1 mol) were introduced into a three-necked round bottom flask equipped with mechanical stirrer, condenser and pressure equalising funnel. The reaction mixture was maintained with stirring for one hour and then triethyleneglycol (25.6 g, 0.17 mol) was added dropwise at room temperature, with vigorous mechanical stirring for three hours. The reaction mixture was then stirred at 40° C. for one more hour before it was allowed to cool to room temperature and filtered. The liquid phase was collected, dried overnight on sodium sulphate and the excess epichlorohydrin removed by evaporation to leave, after several hours under high vacuum, triethylene glycol diglycidyl ether as yellow-orange coloured viscous liquid (26.7 g, 60%) characterised by $^1$H and $^{13}$C and $^{13}$C dept35 NMR spectroscopy in chloroform-d and acetone-$d_6$.

$^1$H-NMR (CDCl$_3$): 4.00-3.30 (m, 16H, $CH_2$—O), 3.15 (m, 2H, CH), 2.79 and 2.62 ppm (2m, 4H, $CH_2$—CH).

$^1$H-NMR (acetone-$d_6$): 3.90-3.28 (m, 16H, $CH_2$—O), 3.07 (m, 2H, CH), 2.72 and 2.54 ppm (2m, 4H, $CH_2$—CH).

$^{13}$C-NMR (CDCl$_3$): 71.99 ($CH_2$—O), 70.90, 70.66 and 70.63 (CH—$CH_2$—O), 50.81 (CH ring) and 44.4 ppm ($CH_2$ ring).

$^{13}$C-NMR (acetone-$d_6$): 72.0 ($CH_2$—O), 71.5 (CH—$CH_2$—O), 50.8 (CH ring) and 44.2 ppm ($\underline{CH}_2$ ring).

$^{13}$C dept35-NMR (CDCl$_3$): 72.0 ($CH_2$—O), 71.5 (CH—$CH_2$—O), 50.8 (CH ring) and 44.2 ppm ($CH_2$ ring).

$^{13}$C dept35-NMR (acetone-$d_6$): 72.0 ($CH_2$—O), 71.5 (CH—$CH_2$—O), 50.8 (CH ring) and 44.2 ppm ($CH_2$ ring).

F.2. Curing of Amino Substituted Polyphosphazenes

Amino substituted polyphosphazenes were cured using epoxides using DGEBA or TEGDGE as cross-linkers and triethylamine and triethanolamine as catalysts:

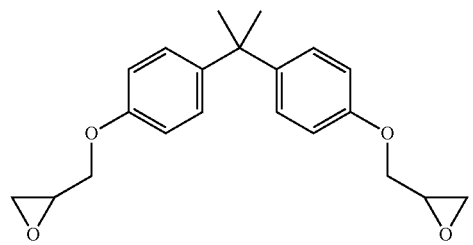

Diglycidyl ether of Bisphenol A (DGEBA)

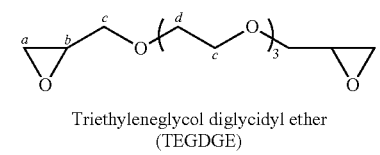

Triethyleneglycol diglycidyl ether (TEGDGE)

The results, including details of cure procedures, are shown in table 7 below.

TABLE 7

| Sample | Polymer | Cross-linker | Polymer:cross-linker (mol/mol) | Polymer:cross-linker (wt/wt) | Required Cross-linker/g of OH functionalities theoretical (wt/wt) | Cross-linker/g of OH functionalities used[5] (wt/wt) |
|---|---|---|---|---|---|---|
| AC5 | PolyPZ-2 67-19-14[1] | DGEBA | 1:1 | 0.84/0.43 = 2 | 0.19 | (×2.7) 0.51 |
| AC6 | PolyPZ-2 67-19-14[1] | DGEBA | 1:1 | 0.84/0.43 = 2 | 0.19 | (×2.7) 0.51 |
| AC7 | PolyPZ-4 73-7-20[1] | DGEBA | 1:0.50 | 1.63/0.65 = 2.5 | 0.06 | (×6.7) 0.40 |
| AC8 | PolyPZ-4 70-6-24[1] | DGEBA | 1:0.25 | 0.16/0.06 = 2.7 | 0.046 | (×8) 0.37[2] |
| AC9 | PolyPZ-4 73-7-20[1] | DGEBA | 1:1 | 1.63/0.65 = 2.7 | 0.06 | (×6.7) 0.40[3] |
| AC10 | PolyPZ-4 73-7-20[1] | DGEBA | 1:0.75 | 1.63/0.65 = 2.7 | 0.06 | (×6.7) 0.40[4] |
| AC11 | PolyPZ-4 67-19-14[1] | DGEBA | 1:1 | 1.0/0.43 = 2.3 | 0.16 | (×2.7) 0.43[3] |
| AC12 | PolyPZ-4 67-19-14[1] | DGEBA | 1:0.75 | 1.0/0.32 = 3.1 | 0.16 | (×2.0) 0.32[3] |
| AC13 | PolyPZ-4 67-19-14[1] | DGEBA | 1:0.50 | 1.0/0.21 = 4.7 | 0.16 | (×1.3) 0.21[3] |
| AC14 | PolyPZ-4 67-19-14[1] | DGEBA | 1:0.25 | 1.0/0.11 = 9.4 | 0.16 | (×0.7) 0.11[3] |
| ED130 | PolyPZ-2 67-19-14[1] | TEGDGE | 1:2 | 1.0/1.5 = 0.67 | 0.15 | (×10) 1.5 |
| ED134 | PolyPZ-4 60-2-38[1] | TEGDGE | 1:1 | 1.15/0.74 = 1.55 | 0.013 | (×49) 0.64 |

[1]Relative percentages of side chains: 5,6-Dinitratohexan-1-oxy:3-Aminopropan-1-oxy:2,2,2-Trifluoroethan-1-oxy
[2]Catalyst used 1 wt % triethylamine
[3]Catalyst used 0.1 wt % triethanolamine
[4]Catalyst used 1 wt % triethanolamine
[5]The figures in brackets indicate the excess of cross-linker used Table 8 describes the physical appearance of the cured products.

TABLE 8

| Sample | Polymer | Cross-linker | Polymer/cross-linker (mol/mol) | Curing time (days) at 70° C. | Product physical appearance Colour | Product physical appearance Texture |
|---|---|---|---|---|---|---|
| AC5 | PolyPZ-2 67-19-14[1] | DGEBA | 1:1 | 3 | Orange | Soft malleable rubber |
| AC5 | PolyPZ-2 67-19-14[1] | DGEBA | 1:1 | 5 | Orange | Hardened rubber |
| AC6 | PolyPZ-2 67-19-14[1] | DGEBA | 1:1 | ½ | Orange | Gel |
| AC7 | PolyPZ-4 73-7-20[1] | DGEBA | 1:0.50 | ½ | Orange | No cure |
| AC8 | PolyPZ-4 70-6-24[1] | DGEBA | 1:0.25 | 2[2] | Orange | Hard rubber |
| AC9 | PolyPZ-4 73-7-20[1] | DGEBA | 1:1 | 4[3] | Orange | Tough rubber |
| AC10 | PolyPZ-4 73-7-20[1] | DGEBA | 1:0.75 | 4[4] | Orange | Tough rubber |
| AC11 | PolyPZ-4 67-19-14[1] | DGEBA | 1:1 | 3[3] | Orange | Gel |
|  |  |  |  | 7[3] | Orange | Hard rubber |
| AC12 | PolyPZ-4 67-19-14[1] | DGEBA | 1:0.75 | 3[3] | Orange | Hard rubber |
| AC13 | PolyPZ-4 67-19-14[1] | DGEBA | 1:0.05 | 3[3] | Orange | Hard rubber |
| AC14 | PolyPZ-4 67-19-14[1] | DGEBA | 1:0.25 | 3[3] | Orange | Hard rubber |

TABLE 8-continued

| Sample | Polymer | Cross-linker | Polymer/cross-linker (mol/mol) | Curing time (days) at 70° C. | Product physical appearance Colour | Texture |
|---|---|---|---|---|---|---|
| ED130 | PolyPZ-2 67-19-14[1] | TEGDGE | 1:2 | 3 | Dark orange | Soft rubber |
| ED134 | PolyPZ-4 60-2-38[1] | TEGDGE | 1:1 | 5 | Orange | Gel |
| ED134 | PolyPZ-4 60-2-38[1] | TEGDGE | 1:1 | 7 | Dark orange | Soft rubber |
| ED134 | PolyPZ-4 60-2-38[1] | TEGDGE | 1:1 | 12 | Dark orange | Soft rubber |

[1]Relative percentages of side chains: 5,6-Dinitratohexan-1-oxy:3-Aminopropan-1-oxy:2,2,2-Trifluoroethan-1-oxy
[2]Catalyst used 1 wt % triethylamine
[3]Catalyst used 0.1 wt % triethanolamine
[4]Catalyst used 1 wt % triethanolamine The physico-chemical properties of the cured products are shown below in table 9.

TABLE 9

| Sample | Polymer | Cross-linker | Polymer/cross-linker (mol/mol) | Curing time (days) at 70° C. | $T_g$ (° C.) | $T_d$ (° C.) | $\Delta H_d$ ($Jg^{-1}$) |
|---|---|---|---|---|---|---|---|
| AC5 | PolyPZ-2 67-19-14[1] | DGEBA | 1:1 | — | — | — | — |
| AC6 | PolyPZ-2 67-19-14[1] | DGEBA | 1:1 | — | — | — | — |
| AC7 | PolyPZ-4 73-7-20[1] | DGEBA | 1:0.50 | — | — | — | — |
| AC8 | PolyPZ-4 70-6-24[1] | DGEBA | 1:0.25 | — | — | — | — |
| AC9 | PolyPZ-4 73-7-20[1] | DGEBA | 1:1 | — | — | — | — |
| AC10 | PolyPZ-4 73-7-20[1] | DGEBA | 1:0.75 | — | — | — | — |
| AC11 | PolyPZ-4 67-19-14[1] | DGEBA | 1:1 | 3[3] | −39 | — | — |
| AC12 | PolyPZ-4 67-19-14[1] | DGEBA | 1:0.75 | 3[3] | −35 | — | — |
| AC13 | PolyPZ-4 67-19-14[1] | DGEBA | 1:0.5 | 3[5] | — | — | — |
| AC14 | PolyPZ-4 67-19-14[1] | DGEBA | 1:0.25 | 3[3] | −29.6 | — | — |
| ED130 | PolyPZ-2 67-19-14[1] | TEGDGE | 1:2 | 3 | −71 | 284 | — |
| ED130 | PolyPZ-2 67-19-14[1] | TEGDGE | 1:2 | 3 (washed-cold) | −58 | — | — |
| ED134 | PolyPZ-4 60-2-38[1] | TEGDGE | 1:1 | 7 | −51 | 181 | 1460 |
| ED134 | PolyPZ-4 60-2-38[1] | TEGDGE | 1:1 | 8 | −40 | — | — |
| ED134 | PolyPZ-4 60-2-38[1] | TEGDGE | 1:1 | 12 | −46 | 179 | 1253 |
| ED134 | PolyPZ-4 60-2-38[1] | | 1:1 | 12 | −43 | 180 | 1510 |

[1]Relative percentages of side chains: 5,6-Dinitratohexan-1-oxy:3-Aminopropan-1-oxy:2,2,2-Trifluoroethan-1-oxy
[2]Catalyst used 1 wt % triethylamine
[3]Catalyst used 0.1 wt % triethanolamine
[4]Catalyst used 1 wt % triethanolamine

F.3. Curing of hydroxyl substituted polyphosphazenes

Hydroxyl substituted polyphosphazenes were cured with epoxides and isocyanates and the cross-linkers used were:

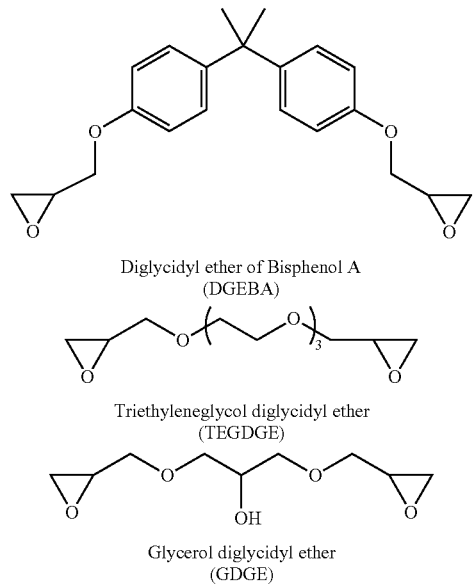

Diglycidyl ether of Bisphenol A
(DGEBA)

Triethyleneglycol diglycidyl ether
(TEGDGE)

Glycerol diglycidyl ether
(GDGE)

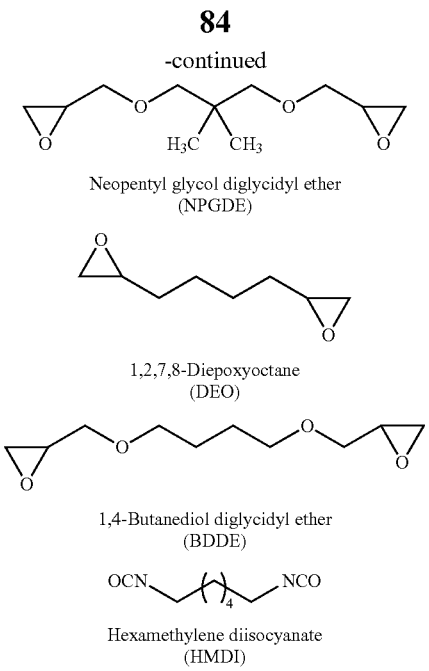

Neopentyl glycol diglycidyl ether
(NPGDE)

1,2,7,8-Diepoxyoctane
(DEO)

1,4-Butanediol diglycidyl ether
(BDDE)

Hexamethylene diisocyanate
(HMDI)

Preparation of the curing mixtures is shown in table 10 below.

TABLE 10

| Sample | Polymer | Cross-linker | Polymer: cross-linker (mol/mol) | Polymer: cross-linker (wt/wt) | Cross-linker/g of OH functionalities theoretical (wt/wt) | Cross-linker/g of OH functionalities Used[9] (wt/wt) |
|---|---|---|---|---|---|---|
| AC1 | PolyPZ-23 67-19-14[1] | DGEBA | 1:1 | 1.0/0.392 = 2.5 | 0.134 | (×2.9) 0.392 |
| AC2 | PolyPZ-23 67-19-14[1] | DGEBA | 1:0.75 | 1.0/0.293 = 3.4 | 0.134 | (×2.2) 0.293 |
| AC3 | PolyPZ-23 67-19-14[1] | DGEBA | 1:0.50 | 1.0/0.196 = 5.10 | 0.134 | (×1.5) 0.196 |
| AC4 | PolyPZ-23 67-19-14[1] | DGEBA | 1:0.25 | 1.0/0.098 = 10.2 | 0.134 | (×0.7) 0.098 |
| ED131 | PolyPZ-23 65-3-32[1] | TEGDGE | 1:1 | 0.95/0.61 = 1.06 | 0.0128 | (×50) 0.642 |
| ED132 | PolyPZ-23 65-3-32[1] | TEGDGE | 1:0.5 | 0.95/0.305 = 3.11 | 0.0128 | (×25) 0.321 |
| ED133 | PolyPZ-23 67-16-17[1] | TEGDGE | 1:1 | 1.0/0.61 = 1.64 | 0.098 | (6.2) 0.61 |
| ED135 | PolyPZ-23 67-16-17[1] | TEGDGE | 1:0.50 | 1.08/0.328 = 3.29 | 0.098 | (3.1) 0.304 |
| ED136 | PolyPZ-23 67-16-17[1] | TEGDGE | 1:0.25 | 1.08/0.164 = 6.58 | 0.098 | (1.6) 0.152 |
| ED142 | PolyPZ-23 60-9-31[1] | TEGDGE | 1:1 | 2/1.30 = 1.54 | 0.059 | (11) 0.650 |
| ED143 | PolyPZ-23 60-9-31[1] | TEGDGE | 1:0.50 | 2/0.65 = 3.08 | 0.059 | (5.5) 0.325 |
| ED144 | PolyPZ-23 60-9-31[1] | TEGDGE | 1:0.25 | 2/0.33 = 6.06 | 0.059 | (2.8) 0.165 |
| ED145 | PolyPZ-23 60-9-31[1] | NPGDE | 1:0.25 | 2.0/0.268 = 7.5 | 0.048 | (×2.8) 0.134 |
| ED146 | PolyPZ-23 60-9-31[1] | NPGDE | 1:0.25 | 0.8/0.10 = 8.0 | 0.046 | (×2.7) 0.125 |
| ED147 | PolyPZ-23 60-9-31[1] | DEO | 1:0.25 | 0.8/0.07 = 11.4 | 0.032 | (×2.8) 0.088 |
| ED148 | PolyPZ-23 60-9-31[1] | BDDE | 1:0.25 | 0.8/0.10 = 8.0 | 0.045 | (×2.8) 0.125 |
| ED151 | PolyPZ-23 58-7-35[1] | TEGDGE | 1:1 | 3.0/2.0 = 1.5 | 0.047 | (×14.3) 0.67 |
| ED152 | PolyPZ-23 58-7-35[1] | TEGDGE | 1:0.50 | 3.0/1.0 = 3.0 | 0.047 | (×7) 0.33 |

TABLE 10-continued

| Sample | Polymer | Cross-linker | Polymer:cross-linker (mol/mol) | Polymer:cross-linker (wt/wt) | Cross-linker/g of OH functionalities theoretical (wt/wt) | Cross-linker/g of OH functionalities Used[9] (wt/wt) |
|---|---|---|---|---|---|---|
| ED153 | PolyPZ-23 58-7-35[1] | TEGDGE | 1:0.25 | 3.0/0.5 = 6.0 | 0.047 | (×3.5) 0.17 |
| ED155 | PolyPZ-19[3] 52-12-36[2] | TEGDGE | 1:0.25 | 1.0/0.163 = 6.1 | 0.075 | (×2) 0.163 |
| ED156 | PolyPZ-19[3] 60-4-36[2] | DEO | 1:0.25 | 1.0/0.088 = 11.36 | 0.011 | (×8) 0.088 |
| ED157 | PolyPZ-19[3] 60-4-36[2] | TEGDGE | 1:0.08 | 1.53/0.082 = 18.7 | 0.029 | (×1.9) 0.054 |
| ED178 | PolyPZ-19[3] 40-24-36[2] | DEO | 1:0.25 | 3.51/0.31 = 11.32 | 0.0086 | (×1) 0.088 |
| ED181 | PolyPZ-19[3] 67-5-28[2] | DEO | 1:0.25 | 5.35/0.468 = 11.43 | 0.0178 | (×5) 0.088 |
| AC-BDDE | PolyPZ-19[3] 67-5-28[2] | BDDE | 1:0.25 | 2.0/0.243 = 8.2 | 0.018 | (×6.8) 0.122 |
| AC1-CNO | PolyPZ-19[6,7] 72-4-24 | HMDI | | 1.5/0.38 3.95 | | |
| AC2-CNO | PolyPZ-19[6,7] 69-7-24 | HMDI | | 1.5/0.41 3.66 | | |
| AC3-CNO | PolyPZ-21[6,7,8] 27:43:30[2] | HMDI | | 1.56/0.41 3.8 | | |
| ED211 | PolyPZ-19[10,11] 65:5:30[2] | DEO | 1:0.25 | | | |

[1]Relative percentages of side chains: 5,6-Dinitratohexan-1-oxy:4-Aza-5-one-6-oxa-8-hydroxyoctan-1-oxy:2,2,2-Trifluoroethan-1-oxy
[2]Relative percentages of side chains: 5,6-Dinitratohexan-1-oxy:nitrohydroxylated/dihydroxylated hexan-1-oxy (combined): 2,2,2-Trifluoroethan-1-oxy
[3]Purified after flow nitration by twice re-precipitating from acetone into n-hexane
[4]Purified after flow nitration by twice re-precipitating from acetone into water, then re-precipitating from acetone into n-hexane
[5]Purified after flow nitration by treatment with THF/$H_2O$/$CaCO_3$ twice and by subsequent re-precipitation from acetone in n-hexane
[6]Catalyst = 0.01 wt % dibutyl tin dilaurate
[7]Cure temperature = 60° C.
[8]For cure method see main experimental section
[9]Figure in brackets is the excess of cross-linker used
[10]Catalyst = 1 wt % 2-ethylimidazole
[11]Prepared via formyl denitration The physical appearances of the curing mixtures are shown in table 11 below.

TABLE 11

| Sample | Polymer | Cross-linker | Polymer/cross-linker (mol/mol) | Curing time (days) at 70° C. | Product physical appearance Colour | Product physical appearance Texture |
|---|---|---|---|---|---|---|
| AC1 | PolyPZ-23 67-19-14[1] | DGEBA | 1:1 | 2 | Orange | Soft malleable rubber |
| AC2 | PolyPZ-23 67-19-14[1] | DGEBA | 1:0.75 | 2 | Orange | Soft malleable rubber |
| AC3 | PolyPZ-23 67-19-14[1] | DGEBA | 1:0.50 | 2 | Orange | Soft malleable rubber |
| AC4 | PolyPZ-23 67-19-14[1] | DGEBA | 1:0.25 | 2 | Orange | Soft malleable rubber |
| ED131 | PolyPZ-23 65-3-32[1] | TEGDGE | 1:1 | 4 | Yellow-orange | Transparent soft rubber |
| | | | | 17 | Yellow-orange | Transparent soft rubber |
| ED132 | PolyPZ-23 65-3-32[1] | TEGDGE | 1:0.5 | 4 | Yellow-orange | Transparent soft rubber |
| | | | | 17 | Yellow-orange | Transparent soft rubber |
| ED133 | PolyPZ-23 67-16-17[1] | TEGDGE | 1:1 | 2 | Yellow-orange | Transparent soft rubber |
| | | | | 5 | Orange | Soft rubber |
| | | | | 12 | Orange | Soft rubber |

TABLE 11-continued

| Sample | Polymer | Cross-linker | Polymer/cross-linker (mol/mol) | Curing time (days) at 70° C. | Product physical appearance Colour | Texture |
|---|---|---|---|---|---|---|
| ED135 | PolyPZ-23 67-16-17[1] | TEGDGE | 1:0.50 | 2 | Yellow-orange | Transparent soft rubber |
| | | | | 5 | Orange | Soft rubber |
| | | | | 12 | Orange | Soft rubber |
| ED136 | PolyPZ-23 67-16-17[1] | TEGDGE | 1:0.25 | 2 | Yellow-orange | Transparent soft rubber |
| | | | | 5 | Orange | Soft rubber |
| | | | | 12 | Orange | Soft rubber |
| ED142 | PolyPZ-23 60-9-31[1] | TEGDGE | 1:1 | 2 | Yellow-orange | Transparent soft rubber |
| | | | | 8 | Orange | Soft rubber |
| ED143 | PolyPZ-23 60-9-31[1] | TEGDGE | 1:0.50 | 2 | Yellow-orange | Transparent soft rubber |
| | | | | 8 | Orange | Soft rubber |
| ED144 | PolyPZ-23 60-9-31[1] | TEGDGE | 1:0.25 | 2 | Yellow-orange | Transparent soft rubber |
| | | | | 8 | Orange | Soft rubber |
| ED145 | PolyPZ-23 60-9-31[1] | NPGDE | 1:0.25 | 2 | Dark orange | Soft flexible rubber |
| | | | | 8 | Dark orange | Harder rubber than with TEGDGE |
| ED146 | PolyPZ-23 60-9-31[1] | NPGDE | 1:0.25 | 2 | Dark orange | Soft flexible rubber |
| | | | | 8 | Dark orange | Hard rubber than equivalent with TEGDGE |
| ED147 | PolyPZ-23 60-9-31[1] | DEO | 1:0.25 | 2 | Dark orange | Soft flexible rubber |
| | | | | 8 | Dark orange | Harder rubber than the one with TEGDGE |
| ED148 | PolyPZ-23 60-9-31[1] | BDDE | 1:0.25 | 2 | Dark orange | Soft flexible rubber |
| | | | | 8 | Dark orange | Harder rubber than equivalent using TEGDGE |
| ED151 | PolyPZ-23 58-7-35[1] | TEGDGE | 1:1 | 2 | Yellow-orange | Transparent soft rubber |
| | | | | 10 | Orange | Soft rubber |
| ED152 | PolyPZ-23 58-7-35[1] | TEGDGE | 1:0.50 | 2 | Yellow-orange | Transparent soft rubber |
| | | | | 10 | Orange | Soft rubber |
| ED153 | PolyPZ-23 58-7-35[1] | TEGDGE | 1:0.25 | 2 | Yellow-orange | Transparent soft rubber |
| | | | | 10 | Orange | Soft rubber |
| ED155 | PolyPZ-19[3] 52-12-36[2] | TEGDGE | 1:0.25 | 2 | Yellow-orange | Viscous liquid |
| | | | | 4 | Yellow-orange | Sticky rubber |
| | | | | 7 | Yellow-orange | Rubber |
| ED156 | PolyPZ-19[3] 60-4-36[2] | DEO | 1:0.25 | 2 | Yellow-orange | Viscous liquid |
| | | | | 4 | Yellow-orange | Rubber |
| | | | | 7 | Orange | Stiff rubber |
| ED157 | PolyPZ-19[3] 60-4-36[2] | TEGDGE | 1:0.08 | 2 | Orange | Viscous liquid |
| | | | | 5 | Orange | Viscous liquid |
| | | | | 20 | Orange | Viscous liquid (chain extension only) |
| ED178 | PolyPZ-19[3] 40-24-36[2] | DEO | 1:0.25 | 2 | Dark orange | Rubber |
| | | | | 20 | Dark orange | Rubber |
| ED181 | PolyPZ-19[3] 67-5-28[2] | DEO | 1:0.25 | 1, 2 | Dark orange | Fluid |
| | | | | 4, 7, 14, 18 | Dark orange | Viscous fluid |
| | | | | 23 | Dark orange | Gel |
| | | | | 39 | Dark orange | Rubber |
| AC-BDDE | PolyPZ-19[3] 67-5-28[2] | BDDE | 1:0.25 | 0 | Orange | Fluid |
| | | | | 5 | Orange | Fluid |
| | | | | 9 | Orange | Viscous fluid |
| | | | | 14 | Orange | Rubber |

TABLE 11-continued

| Sample | Polymer | Cross-linker | Polymer/cross-linker (mol/mol) | Curing time (days) at 70° C. | Product physical appearance Colour | Texture |
|---|---|---|---|---|---|---|
| AC1-CNO | PolyPZ-19[6,7] 72-4-24 | HMDI | | 28 | | Soft rubber |
| AC2-CNO | PolyPZ-19[6,7] 69-7-24 | HMDI | | 28 | | Rubber-firmer than equivalent from 4% OH |
| AC3-CNO | PolyPZ-21[6,7,8] 27:43:30[2] | HMDI | | 1 (60° C.) | | Soft, sticky rubber |
| | | | | 2 (60° C.) | | Tough flexible rubber |
| ED211 | PolyPZ-19[9,10] 65:5:30[2] | DEO | | 7[11] | | Rubber |

[1] Relative percentages of side chains: 5,6-Dinitratohexan-1-oxy:4-Aza-5-one-6-oxa-8-hydroxyoctan-1-oxy:2,2,2-Trifluoroethan-1-oxy
[2] Relative percentages of side chains: 5,6-Dinitratohexan-1-oxy:nitrohydroxylated/dihydroxylated hexan-1-oxy (combined):2,2,2-Trifluoroethan-1-oxy
[3] Purified after flow nitration by twice re-precipitating from acetone into n-hexane
[4] Purified after flow nitration by twice re-precipitating from acetone into water, then re-precipitating from acetone into n-hexane
[5] Purified after flow nitration by treatment with THF/H$_2$O/CaCO$_3$ twice and by subsequent re-precipitation from acetone in n-hexane
[6] Catalyst = 0.01 wt % dibutyl tin dilaurate
[7] Cure temperature = 60° C.
[8] For cure method see main experimental section
[9] Catalyst = 1 wt % 2-ethylimidazole
[10] Prepared via formyl denitration
[11] Cure time without catalyst = 25 days The physico-chemical properties of the curing mixtures is given in table 12 below.

TABLE 12

| Sample | Polymer | Cross-linker | Polymer/cross-linker (mol/mol) | Curing time (days) at 70° C. | $T_g$ (° C.) | $T_d$ (° C.) | $\Delta H_d$ (Jg$^{-1}$) |
|---|---|---|---|---|---|---|---|
| AC1 | PolyPZ-23 67-19-14[1] | DGEBA | 1:1 | 2 | −23.6 | — | — |
| AC2 | PolyPZ-23 67-19-14[1] | DGEBA | 1:0.75 | 2 | −22.0 | — | — |
| AC3 | PolyPZ-23 67-19-14[1] | DGEBA | 1:0.50 | 2 | −29.9 | — | — |
| AC4 | PolyPZ-23 67-19-14[1] | DGEBA | 1:0.25 | 2 | −30.6 | — | — |
| ED131 | PolyPZ-23 65-3-32[1] | TEGDGE | 1:1 | 4 | −63 | 177 | 1123 |
| | | | | 7 | −61 | 178 | 1010 |
| | | | | 12 (soxhlet extracted) | −42 | — | — |
| | | | | 17 | −54 | 183 | 985 |
| ED132 | PolyPZ-23 65-3-32[1] | TEGDGE | 1:0.5 | 4 | — | — | — |
| | | | | 4 (soxhlet extracted) | −55 | — | — |
| | | | | 17 | −48 | 194 | 1400 |
| ED133 | PolyPZ-23 67-16-17[1] | TEGDGE | 1:1 | 4 | −53 | 179 | 1490 |
| | | | | 4 (soxhlet extracted) | −50 | 181 | 1787 |
| | | | | 12 | −41 | 192 | 1215 |
| ED135 | PolyPZ-23 67-16-17[1] | TEGDGE | 1:0.50 | 5 | −44 | — | — |
| | | | | 12 | −35 | 187 | 1194 |
| ED136 | PolyPZ-23 67-16-17[1] | TEGDGE | 1:0.25 | 5 | −27 | — | — |
| | | | | 12 | −25 | 190 | 1590 |
| ED142 | PolyPZ-23 60-9-31[1] | TEGDGE | 1:1 | 2 | −52 | 177 | 1090 |
| | | | | 8 | −42 | 179 | 1020 |
| | | | | 8 (soxhlet extracted) | −26 | 177 | 1470 |

TABLE 12-continued

| Sample | Polymer | Cross-linker | Polymer/cross-linker (mol/mol) | Curing time (days) at 70° C. | $T_g$ (° C.) | $T_d$ (° C.) | $\Delta H_d$ (Jg$^{-1}$) |
|---|---|---|---|---|---|---|---|
| ED143 | PolyPZ-23 60-9-31[1] | TEGDGE | 1:0.5 | 2 | −46 | 183 | 1400 |
| | | | | 8 | −40 | 179 | 815 |
| | | | | 8 (soxhlet extracted) | −24 | 179 | 1540 |
| ED144 | PolyPZ-23 60-9-31[1] | TEGDGE | 1:0.25 | 2 | −32 | 190 | 1310 |
| | | | | 8 | −28 | 177 | 1730 |
| | | | | 8 (soxhlet extracted) | −48 | 193 | 1500 |
| ED145 | PolyPZ-23 60-9-31[1] | NPGDE | 1:0.25 | 2 | −28 | 203 | 1520 |
| | | | | 8 | −27 | 201 | 1560 |
| | | | | 8 (soxhlet extracted) | −25 | 204 | 1560 |
| ED146 | PolyPZ-23 60-9-31[1] | NPGDE | 1:0.25 | 2 | −29 | 197 | 1360 |
| | | | | 8 | −25 | 209 | 1420 |
| | | | | 8 (soxhlet extracted) | −23 | 204 | 1780 |
| ED147 | PolyPZ-23 60-9-31[1] | DEO | 1:0.25 | 2 | −39 | 194 | 1680 |
| | | | | 8 | −34 | 193 | 1950 |
| | | | | 8 (soxhlet extracted) | −31 | 205 | 1920 |
| ED148 | PolyPZ-23 60-9-31[1] | BDDE | 1:0.25 | 2 | −38 | 195 | 1760 |
| | | | | 8 | −33 | 202 | 1420 |
| | | | | 8 (soxhlet extracted) | −32 | 200 | 1660 |
| ED151 | PolyPZ-23 58-7-35[1] | TEGDGE | 1:1 | 10 | −45 | 203 | 870 |
| | | | | 10 (soxhlet extracted) | −27 | 199 | 1450 |
| ED152 | PolyPZ-23 58-7-35[1] | TEGDGE | 1:0.50 | 10 | −35 | 183 | 1100 |
| | | | | 10 (soxhlet extracted) | −29 | 179 | 1220 |
| ED153 | PolyPZ-23 58-7-35[1] | TEGDGE | 1:025 | 10 | −33 | 179 | 1760 |
| | | | | 10 (soxhlet extracted) | −31 | 190 | 1270 |
| ED155 | PolyPZ-19[3] 52-12-36[2] | TEGDGE | 1:0.25 | 4 | −47 | — | — |
| | | | | 7 | — | 203 | 1760 |
| | | | | 9 | −41 | — | — |
| | | | | 14 | −38 | — | — |
| ED156 | PolyPZ-19[3] 60-4-36[2] | DEO | 1:0.25 | 12 | −47 | — | — |
| | | | | 27 | −43 | — | — |
| | | | | 40 | −40 | — | — |
| ED157 | PolyPZ-19[3] 60-4-36[2] | TEGDGE | 1:0.08 | — | — | — | — |
| ED178 | PolyPZ-19[3] 40-24-36[2] | DEO | 1:0.25 | — | — | — | — |
| ED181 | PolyPZ-19[3] 67-5-28[2] | DEO | 1:0.25 | — | — | — | — |
| AC-BDDE | PolyPZ-19[3] 67-5-28[2] | BDDE | 1:0.25 | — | — | — | — |
| AC1-CNO | PolyPZ-19[6,7] 72-4-24 | HMDI | | 28 (60° C.) | | | |
| AC2-CNO | PolyPZ-19[6,7] 69-7-24 | HMDI | | 28 (60° C.) | | | |
| AC-CNO | PolyPZ-21[6,7,8] 27:43:30[2] | HMDI | | 1 (60° C.) 2 (60° C.) | | | |

TABLE 12-continued

| Sample | Polymer | Cross-linker | Polymer/cross-linker (mol/mol) | Curing time (days) at 70° C. | Physico-chemical properties | | |
|---|---|---|---|---|---|---|---|
| | | | | | $T_g$ (° C.) | $T_d$ (° C.) | $\Delta H_d$ (Jg$^{-1}$) |
| ED211 | PolyPZ-19[9,10] 65:5:30[2] | DEO | 1:0.25 | 7 | −45 | | |

[1]Relative percentages of side chains: 5,6-Dinitratohexan-1-oxy:4-Aza-5-one-6-oxa-8-hydroxyoctan-1-oxy:2,2,2-Trifluoroethan-1-oxy
[2]Relative percentages of side chains: 5,6-Dinitratohexan-1-oxy:nitrohydroxylated/dihydroxylated hexan-1-oxy (combined):2,2,2-Trifluoroethan-1-oxy
[3]Purified after flow nitration by twice re-precipitating from acetone into n-hexane
[4]Purified after flow nitration by twice re-precipitating from acetone into water, then re-precipitating from acetone into n-hexane
[5]Purified after flow nitration by treatment with THF/H$_2$O/CaCO$_3$ twice and by subsequent re-precipitation from acetone in n-hexane
[6]Catalyst = 0.01 wt % dibutyl tin dilaurate
[7]Cure temperature = 60° C.
[8]For cure method see main experimental section
[9]Catalyst = 1 wt % 2-ethylimidazole
[10]Prepared via formyl denitration

G. Flow Nitration Processes

In a further aspect of the invention, the energetic, curable polyphosphazenes can be synthesised using flow nitration. Embodiments of the invention making use of flow nitration will now be described.

Figure 2:
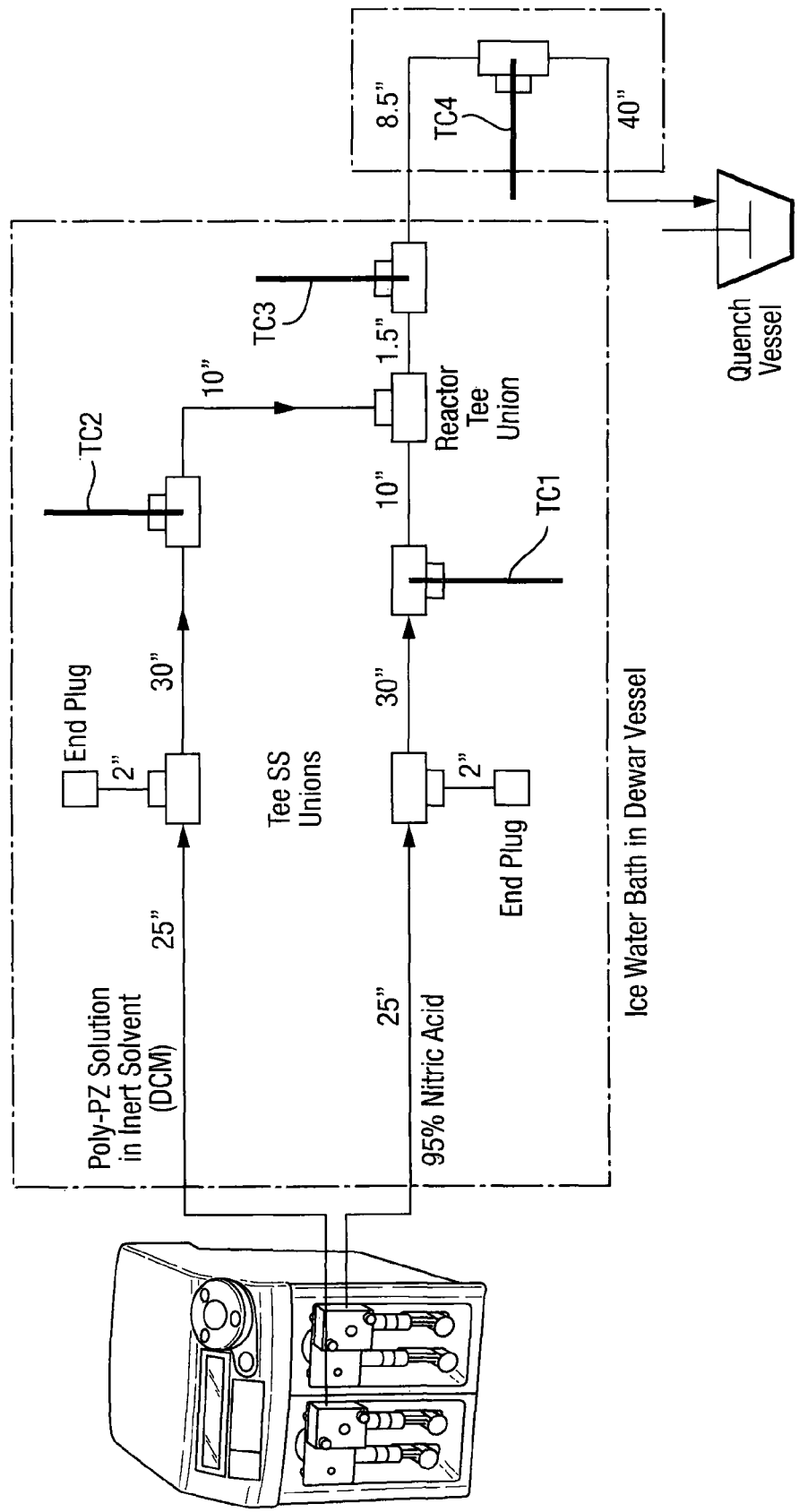
FIG. 2 is a schematic view of a flow nitrator in accordance with an embodiment of the invention.

Polymer nitration was conducted using a flow nitration procedure as summarised in FIG. 2. The two reagent streams: i) polymer in dichloromethane (DCM) and ii) 95% nitric acid were pumped independently using a chemically resistant Syrris 'ASIA' reciprocating double syringe pump which was continuously replenished respectively from two separate reservoirs of a) polymer solution and b) concentrated nitric acid. These inputs were fed from a Syrris 'input store' essentially comprising two 300 ml toughened glass bottle reservoirs pressurised to 1.1 bar using nitrogen gas and located in a PTFE coated bund. The polymer solution was fed into the nitric acid flow, at 90°, using the 'T-piece' (6×1/16" 316 stainless steel Tee). The two feed lines and the reactor 'T-piece' were cooled by immersion in an ice water bath, contained within a Dewar flask. All lines comprised 0.8 mm ID/1.58 mm OD PTFE tubing. Each pre-reactor feed line was fitted with a 'pressure safety line' comprising a dead end branch of PTFE tubing capped with a stainless steel end plug. These lines each provided a compressible air cushion in case of a blockage in the residence line. Thus, observation of these short sections of tube during operation of the equipment gave early warning of a potential blockage, before the syringe safety switches functioned. Two separate experimental arrangements were available for the reaction/output line, as detailed below.

Option 1: 'Nitrator A'

The reaction/output line passed through a second ice/water cooling bath containing a 20 KHz ultrasonic probe (XL-series 'ultrasonic liquid processor'—Heat Systems Inc, USA) before being injected into the quench vessel which also contained ice/water. The ultrasonics probe was operated in continuous mode throughout the duration of the flow nitration experiment. The power level was adjusted until visible cavitation was just evident in the water immediately underneath the residence line. The residence line required folding in order to fit into the water bath. This was achieved by weaving the line through a plastic mesh cylinder. Once located, the line was not moved, because it was found that the configuration of this line (relative to the ultrasound probe) could affect the course of the reaction. This set up was designated 'Nitrator A'.

Option 2: 'Nitrator B'

Given that the relative positions of the reaction/outlet line and ultrasonic transducer in 'Nitrator A' were found to significantly influence the progress of reaction, an alternative sonication procedure was devised to better control these factors. In this arrangement the reaction/output line was passed through a standard ultrasonic bath operating at 35 KHz. (Camlab Transsonic ultrasound bath, Model T700-35 kH fixed frequency) instead of the ultrasonic probe/Dewar flask employed in 'Nitrator A'. The position of the coiled residence line within the ultrasonics bath was fixed by attaching it to an immersed steel mesh basket (provided as part of the unit) using copper wire. This ensured that the line remained in a fixed position relative to the piezoelectric transducers during operation. The coiled residence line was held approximately 6 cm above the bottom of the bath in order to avoid cavitation-induced heating effects which are likely to occur close to the base of the bath, where the transducers are located. Additional ice was added to the bath as necessary to keep the reaction cool. This set up was designated 'Nitrator B'. The schematic arrangement of 'Nitrator B' otherwise remained unchanged from that of 'Nitrator A' (FIG. 2).

Three experiments were carried out to compare the product yields and degree of product nitration achievable with this 'Nitrator B' with those observed with the earlier 'Nitrator A'. The results in tables 13 and 14 show that although the yields were slightly lower for 'Nitrator B', the extent of product nitration was significantly higher at all flow rates.

Table 13 shows the extent nitration achieved with PolyPZ-1 [P-(2,2,2-trifluoroethan-1-oxy (36%)./4-(2',2'-dimethyl-1',3'-dioxolan-4'-yl)butan-1-oxy (64%)) polyphosphazene] as substrate, by varying acid flow rate values. Product=PolyPZ-19 The duration of each experiment was 1 hour; 50 inch residence line.

TABLE 13

| Flow rate (ml/h) | | Contact time (s) | Extent[#] of product nitration 'Nitrator A' | Product hourly yield ('Nitrator A') | |
|---|---|---|---|---|---|
| 95 wt % HNO$_3$ | 124 mg/mL precursor solution in DCM | | | Mass (g) | % |
| 50.0 | 50.0 | 24 | 80 | 7.18 | 97.3 |
| 75.0 | 50.0 | 20 | 90 | 7.08 | 96.0 |

TABLE 13-continued

| Flow rate (ml/h) | | Contact time (s) | Extent[#] of product nitration 'Nitrator A' | Product hourly yield ('Nitrator A') | |
|---|---|---|---|---|---|
| 95 wt % HNO₃ | 124 mg/mL precursor solution in DCM | | | Mass (g) | % |
| 90.0 | 50.0 | 19 | 95 | 6.71 | 91.0 |
| 100.0 | 50.0 | 18 | 97 | 7.26 | 98.5 |

[#]As a percentage of the total amount of OH available

Table 14 shows the degrees of nitration achieved for Poly-PZ-1 [P-(2,2,2-trifluoroethan-1-oxy (36%)/4-(2',2'-dimethyl-1',3'-dioxolan-4'-yl)butoxy (64%)) polyphosphazene] as substrate using 'Nitrator A' or 'Nitrator B'. Product=PolyPZ-19 (or PolyPZ-7 for 100% nitration). The duration of each experiment was 1 hour; 50 inch residence line.

TABLE 14

| Flow rate (ml/h) | | | Extent[#] of product nitration | | Product | |
|---|---|---|---|---|---|---|
| 95 wt % HNO₃ | Polymer Solution in DCM (124 mg/ml) | Contact time (s) | 'Nitrator A' (20 KHz, horn) | 'Nitrator B' (35 KHz bath)-In duplicate- | Hourly yield ('Nitrator B') Mass (g) | % |
| 35.00 | 50.00 | 27 | — | 62 74 | 7.02 | 95 |
| 40.00 | 50.00 | 26 | — | 76 81 | 7.06 | 96 |
| 45.00 | 50.00 | 25 | — | ** 83 | 7.52 | 102* |
| 50.00 | 50.00 | 24 | 80 | 94 87 | 6.56 | 89 |
| 60.00 | 50.00 | 22 | — | 94 95 | 6.35 | 86 |
| 75.00 | 50.00 | 20 | 90 | 97 95 | 6.50 | 88 |
| 100.0 | 50.00 | 18 | 97 | 100 100 | 6.28 | 85 |

[#]As a percentage of the total amount of OH available
*Contained some residual solvent General Procedure for the Preparation of PolyPZ-19 [P-(2,2,2-trifluoroethan-1-oxy/5,6-dinitrohexan-1-oxy/5-hydroxy-6-nitrato-hexan-1-oxy/6-hydroxy-5-nitrato-hexan-1-oxy/5,6-dihydroxy-hexan-1-oxy) polyphosphazene]

Prior to undertaking a nitration experiment the pump was primed with 95% nitric acid and the acid lines flushed with this material, whilst the outlet line was directed to a 500 ml 'waste' beaker containing stirred ice-cold water to 'quench' the pumped acid. The acid flow rate was initiated at 0.25 ml/min, then gradually increased to the required value (maximum: 2.5 ml/min; 150 ml/h). After priming, the acid-pumping channel was left running until a steady flow of acid appeared at the exit of the residence line. At this point pumping of the dichloromethane/polymer precursor PolyPZ-1 [P-(2,2,2-trifluoroethan-1-oxy/4-(2',2'-dimethyl-1',3'-dioxolan-4'-yl)butan-1-oxy)polyphosphazene] solution was started at the desired flow rate (Tables N1/N2). Solute concentration was varied from run to run, according to the experimental requirements. Using 0.8 mm ID PTFE tubing a concentration of around 124 mg/ml was found to provide a good compromise between the rate of substrate throughput and the solution viscosity/its potential for generating blockages. (This figure will obviously vary with the precise design of the nitrator, particularly the tube diameter.) Once the nitrated product began to emit from the outlet of the sonicated reaction/output line, this pipe was transferred from the 'waste' beaker into a 'collection' beaker (1000 ml) which was partly filled with iced water. Ultrasonication proved important both to attain efficient reaction and avoid blockages in the flow nitrator.

Contact of the reaction mixture with the cold water in the quench vessel caused the product to precipitate and subsequently to coagulate and adhere to the glass walls of the beaker. Over time the glass beaker walls became covered with swollen, sticky polymeric product, so it was advantageous to utilise multiple collection vessels when longer duration experiments were undertaken. Further work-up details for the product are given below.

A similar procedure may be employed to nitrate/partially nitrate other Polyphosphazene products which contain suitable free or protected hydroxyl groups, for example PolyPZ-8.

The temperature of the feed solutions and post-reactor mixture were monitored throughout the flow nitration procedure at 3 second intervals, by 4 type-T (IEC 584, mineral insulated, MI sheath 316 SS, Restek, UK) thermocouples positioned in the system as shown in Fig. N1 Continuous monitoring/logging of the system's thermal status was achieved via an 8-channel digital thermometer/data logger (L200 USB, Labfacility, Ltd., UK), interfaced to a PC (only 4 channels utilised). The typical reaction exotherm observed as a result of the nitration process was less than 0.50° C., although as the experiment proceeded the temperature of the sonicated water bath tended to drift up. The highest temperature differential observed as a result of this (between the input reagent streams and the exiting reaction mixture) was 2° C., provided that all residence lines were submerged in crushed ice/water. See FIGS. 3A and 3B.

At the end of the experiment the pumps were switched off, both reservoir bottles replaced, with clean bottles containing only dichloromethane and the system flushed with DCM (ca. 30 min) to remove any residual nitric acid and substrate solution from the syringes and the PTFE lines.

Work Up of the Isolated Product

Once the product had adhered to the sides of the beaker the supernatant liquor was poured off and the swollen polymer rinsed repeatedly with water. At this stage the product contained ca 3 wt % of nitric acid. If required, most of this excess acid could be removed from the polymer by dissolving it in ethyl acetate and washing the resultant solution with saturated aqueous sodium bicarbonate, then water. [More rigorous elimination of acid could be effected using the procedure detailed below.] Purification of the crude product was achieved by its dissolution into a minimum quantity of acetone followed by re-precipitation into water, then similar dissolution/re-precipitation from acetone into hexane (which removes traces of water and hexane-1,2,6-triol trinitrate. Tables N1 & N2 detail the product masses of PolyPZ-19 or PolyPZ-7 (100% nitration) isolated after this purification procedure. Yields were calculated by assuming complete nitration (for simplicity) and using monomer unit molecular mass values of 337.72 and 401.72 for the polymeric precursor and nitrated product respectively.

More Rigorous Neutralisation of Hydroxylated PolyPZ-19

Dry PolyPZ-19 (~100 g, 95% nitrated) was dissolved in a minimum volume of acetone, re-precipitated from water (twice), then dissolved in THF (300 ml). Sufficient water was added to this solution (~11 ml) to just make it opalescent, then a few drops of THF (~1 ml) were added until transparency was restored. A universal indicator strip indicated this solution to be pH 3. Dry CaCO₃ (35 g, analytical grade powder,) was slowly added to the solution until effervescence ceased; application of universal indicator strip now showed pH 6.5. Additional CaCO₃ (10 g) was added and the suspension left stirring for 30 min. The solid was then filtered off using a No. 3 glass frit and the filtrate dried over MgSO₄ (overnight). The solution was decanted from the magnesium sulphate and removed by evaporation. The polymer was re-dissolved in acetone, re-precipitated from hexane and dried under high vacuum at 40° C. for 5 h. Yield: 97.0 g. DSC (10° C./min) gave decomposition onset at 186° C., peak at 209° C.

Similar isolation and neutralisation procedures are suitable for the work up of other nitrated PolyPZ products, for example the partially or fully nitrated product derived from PolyPZ-8.

Longer Duration Flow Nitration Experiments

A continuous five hour flow nitration experiment was conducted using the 'Nitrator B', to demonstrate the longer term performance of the system. The substrate used was PolyPZ-1 [P-(2,2,2-trifluoroethan-1-oxy (27%)/4-(2',2'-dimethyl-1',3'-dioxolan-4'-yl)butan-1-oxy (73%)) polyphosphazene] initially at a concentration of 167 mg/mi. Similar reaction conditions were employed to those above, but the ice-water collection beaker was replaced every hour in order to sample individual product batches. The target was to prepare a product with ~95% nitration to render it suitable for curing. Product yields and the degrees of polymer nitration achieved during each complete hour of operation are detailed in Table 13.

Product analysis (Table 15) showed that hourly product, yield decreased significantly in the third and subsequent hours of operation, whilst the degree of nitration reduced during the fourth and fifth hours. NMR spectra showed the presence of small amounts of unreacted ketal protecting groups in these latter products (FIG. 4), thereby confirming a degree of under-nitration. These changes are believed to have resulted from the build-up of rubbery polymeric deposits within the reaction line, which impeded the mixing and flow of reactants. Removal of these deposits, (either mechanically or by prolonged flushing of the residence line with 95% nitric acid at the end of each nitration experiment) restored the efficient operation of the equipment. Lower substrate concentrations (e.g. ~124 mg/ml) were found to help in minimising the formation of such deposits in subsequent experiments. Relocation of the 'T' reactor into the sonication zone also helps to minimise such blockages.

Table 15 shows the nitration of PolyPZ-1 [P-(2,2,2-trifluoroethan-1-oxy (27%)/4-(2',2'-dimethyl-1,3-dioxolan-4'-yl)butan-1-oxy (73%)), results from first 5 hour 'continuous operation' experiment using 'Nitrator B'

TABLE 15

| Time of continuous operation (hours)* | Yield of dry product (g) | % Yield | Extent of nitration (%) by NMR |
|---|---|---|---|
| 1 | 8.13 | 81 | 94 |
| 2 | 9.20 | 91 | 96 |
| 3 | 5.99 | 59 | 94 |
| 4 | 7.45 | 74 | 90 |
| 5 | 6.10 | 61 | 89 |

*Precursor DCM solution concentration = 167 mg/ml. Precursor ES% (by ¹H NMR) = 73. Nitric acid flow rate set at 105 ml/h.

Using 'Nitrator B' and a similar procedure, 18 grams of PolyPZ-1 [P-(2,2,2-trifluoroethan-1-oxy (32%)/4-(2',2'-dimethyl-1',3'-dioxolan-4'-yl)butan-1-oxy (68%)) polyphosphazene] was nitrated over 3 hours. (Polymer concentration: 120 mg/ml in DCM, flow rate: 0.833 ml/min; nitric acid: 95 wt %, flow rate: 1.17 ml/min). This reaction yielded 21.23 g of dry PolyPZ-19, 95% nitrated (by NMR).

Characterisation of Free Hydroxyl Groups in PolyPZ-19

The presence of free hydroxyl groups in the partially-nitrated products was indicated by a signal at 3.95 ppm in the ¹H NMR spectra. The extent of polymer nitration was estimated from the integral ratios of the signal at 5.50 ppm and the multiplet $(CH_2)_n$ signal at 1.63-1.90 ppm.

As Table 14 shows ('Nitrator B') it was possible to produce highly (~90%) nitrated product at relatively low acid flow rates (50 ml/h); such a procedure would be economical in the use of nitric acid. Whilst increasing the acid flow rate from 50 to 75 ml/h produced an increased degree of product nitration, a flow rate of 100 ml/h was required to fully nitrate the product.

In a further embodiment of the flow nitration, ultrasound is used. An example of this is given below.

Elimination of Dichloromethane During Flow Nitration Using Ultrasound:

During the preparation of PolyPZ-19/PolyPZ-7 by flow nitration, quenching of the reactant stream into iced water was expected to yield—in addition to the desired nitrated polymer—a two phase supernatant liquor, comprising an upper aqueous phase and a lower organic phase containing primarily dichloromethane. Unexpectedly, no heavy organic phase was formed, even after standing the liquor overnight. (Around 50 ml/hr of dichloromethane should have been expelled by the equipment.) NMR spectroscopic analysis of the crude aqueous solution revealed only traces of dichloromethane to be present. It is believed that sonication of dichloromethane in presence of nitric acid had resulted in its oxidation to gaseous/water soluble products. The addition of aqueous silver nitrate solution to the crude quench solution produced a precipitate, which is consistent with the formation of chloride ions (most likely as hydrochloric acid or sodium chloride if neutralised). Other likely by-products are water and oxides of carbon, but the production of these materials has not been specifically identified. Given that the disposal of organo-chorine compounds as waste can be expensive and problematic and that dichloromethane is a fairly cheap commodity, this procedure offers a unique and cost effective way of disposing of this material in the form of water soluble (e.g. chloride) and, most likely, gaseous products.

Preliminary Small-Scale Flow Nitration Experiments Showing the Influence of Ultrasound:

Conversion of PolyPZ-1 to PolyPZ-19 or PolyPZ-7 (100% nitration):

Early experiments to effect the flow nitration of PolyPZ-1 to PolyPZ-19/PolyPZ-7 utilised a set up similar to that described above (FIG. 2), but with a KDS series 100 syringe pump driving two (25 ml) glass/PTFE syringes, in place of the Syrris ASIA pump; these experiments were initially conducted without the use of ultrasound. The results shown in Table 16 indicate that at low polymer concentrations (~30 mg/ml) and relatively long contact times (>90 s) it is possible to achieve efficient (100%) nitration to produce PolyPZ-7, albeit with only moderate yields (~50%). However, higher concentrations of substrate and shorter nitration contact times are both desirable if equipment throughput is to be optimised. Results obtained under such conditions (solute concentrations 124 mg/ml and contact times 10-52 seconds) employing the same equipment proved variable and failed to achieve adequate nitration of the substrate (Table 17). Thus, using equal volumes of nitric acid and polymer solution, yields of up to 62% PolyPZ-19 were isolated, with a degree of nitration of up to 82%. But the best results (61% yield—though still only 90% nitration—and 78% yield at 89% nitration) were obtained by doubling the nitric acid flow rate. However, such a procedure is relatively inefficient in its use of nitric acid.

Further experiments using the same equipment, but now with the application of ultrasound from an ultrasonic 'horn' (XL-series 'ultrasonic liquid processor') applied in the same fashion as 'Nitrator A' (above) yielded improved results (Table 18) with 100% nitration achieved at 68% yield. Use of a 50 inch residence line still produced fully nitrated PolyPZ-7 (100% nitration, Table 19) at 64% yield; alternatively, slight under nitration (93%) could be effected at increased yield (71%) by reducing the nitric acid flow rate relative to that of the polymer. This arrangement both improves nitric acid utilisation and yields a product containing sufficient residual free hydroxyl groups to render it directly suitable for curing. Further increasing the polymer concentration to 256 mg/ml produced quite similar results (Table 20) with 100% nitration achieved at 61% yield or lower degrees of nitration (97% to 93%) being accompanied by yields of up to 74%. Again these partially nitrated products are suitable for subsequent curing. Clearly use of these higher solute concentrations offers the potential to substantially increase the throughput attainable with a given reactor. It was on the basis of these results that the Syrris fed 'Nitrator A' and 'Nitrator B' experimental set ups (above) were commissioned. Data produced using this revised set up has been presented above (Tables 13, 14 and 15).

Table 16 shows nitration of PolyPZ-1:—a) [P-(2,2,2-trifluoroethan-1-oxy (53%)/4-(2',2'-dimethyl-1',3'-dioxolan-4'-yl)butan-1-oxy (47%)) polyphosphazene]b) [P-(2,2,2-trifluoroethan-1-oxy (24%)/4-(2',2'-dimethyl-1',3'-dioxolan-4'-yl)butan-1-oxy (76%)) polyphosphazene] Results obtained without ultrasound.

TABLE 16

| Flow rate (ml/h) | | Residence | | | | Product Hourly Yield | |
|---|---|---|---|---|---|---|---|
| | Polymer | Line | | | | | |
| 95 wt % | Solution in | Length | Contact | Extent of Nitration | | Mass | |
| $HNO_3$ | DCM (30 mg/ml) | (inches) | time (s) | (%) | Substrate | (g) | % |
| 30 | 25 | 40 | 150 | 100 | a | 0.46 | 50.3 |
| 15 | 25 | | 180 | 100 | a | 0.49 | 48 |
| 50 | 25 | | 90 | 100 | b | 0.19 | 51.2 |

Bath temperature ~5° C.; no ultrasound

Table 17 shows nitration of PolyPZ-1 [P-(2,2,2-trifluoroethan-1-oxy (36%)/4-(2',2'-dimethyl-1',3'-dioxolan-4'-yl)butan-1-oxy (64%)) polyphosphazene]. Results obtained without ultrasound

TABLE 17

| Flow rate (ml/h) | | Residence | | Product | | Hourly Yield | |
|---|---|---|---|---|---|---|---|
| | Polymer | Line | | Extent of | | | |
| 95 wt % | Solution in | Length | Contact | Nitration | | Mass | |
| $HNO_3$ | DCM (124 mg/ml) | (inches) | time (s) | (%) | Comment | (g) | % |
| 15 | 15 | 15 | 52 | 82 | Soluble | 0.57 | 62 |
| 25 | 25 | | 15 | 64 | Partially Soluble | 0.90 | 48 |
| 50 | 50 | | 10 | Not Measurable | Insoluble | 1.19 | 43 |
| 50 | 25 | 25 | 18 | 90 | Soluble | 1.13 | 61 |
| 50 | 50 | | 10 | 64 | Partially Soluble | 1.79 | 55 |
| 50 | 50 | 35 | 18 | 61 | Partially Soluble | 1.72 | 62 |
| 100 | 50 | | 10 | 89 | Soluble | 1.44 | 78 |

Bath temperature ~0° C.; no ultrasound

Table 18 shows nitration of PolyPZ-1 [P-(2,2,2-trifluoroethan-1-oxy (36%)/4-(2',2'-dimethyl-1',3'-dioxolan-4'-yl)butan-1-oxy (64%)) polyphosphazene] to PolyPZ-19/PolyPZ-7 (100% nitration). Results obtained using ultrasound.

TABLE 18

| Flow rate (ml/h) | | Residence | | Product | | Hourly yield | |
|---|---|---|---|---|---|---|---|
| | Precursor | Line | | Extent of | | | |
| 95 wt % | Solution | Length | Contact | Nitration | | Mass | |
| $HNO_3$ | in DCM (124 mg/ml) | (inches) | time (s) | (%) | Comment | (g) | % |
| 50 | 50 | 35 | 18 | 82 | Soluble | 1.50 | 60 |
| 100 | 50 | | 10 | 100 | Soluble | 1.30 | 68 |

Bath temperature ~0° C., with ultrasound

Table 19 shows nitration of PolyPZ-1 [P-(2,2,2-trifluoroethan-1-oxy (36%)/4-(2',2'-dimethyl-1',3'-dioxolan-4'-yl)butan-1-oxy (64%)) polyphosphazene]. Results obtained using ultrasound.

TABLE 19

| Flow rate (ml/h) | | | | | | | |
|---|---|---|---|---|---|---|---|
| Precursor Solution 95 wt % HNO₃ (124 mg/ml) | in DCM | Residence Line Length (inches) | Contact time (s) | Extent of Nitration (%) | Comment | Product Hourly yield Mass (g) | % |
| 50 | 50 | 50 | 24 | 88 | Soluble | 1.70 | 61 |
| 75 | 50 | | 20 | 93 | Soluble | 1.49 | 71 |
| 100 | 50 | | 18 | 100 | Soluble | 1.18 | 64 |

Bath temperature ~0° C., with ultrasound

Table 20 shows nitration of PolyPZ-1 [P-(2,2,2-trifluoroethan-1-oxy (36%)/4-(2',2'-dimethyl-1',3'-dioxolan-4'-yl) butan-1-oxy (64%)) polyphosphazene]. Results obtained using ultrasound.

TABLE 20

| Flow rate (ml/h) | | | | | | | |
|---|---|---|---|---|---|---|---|
| Precursor Solution 95 wt % HNO₃ (256 mg/ml) | in DCM | Residence Line Length (inches) | Contact time (s) | Extent of Nitration (%) | Comment | Product Hourly yield Mass (g) | % |
| 100 | 50 | 50 | 18 | 93 | Soluble | 2.83 | 74 |
| 100 | 40 | | 19 | 97 | Soluble | 2.44 | 71 |
| 100 | 35 | | 20 | 100 | Soluble | 1.74 | 61 |

Bath temperature ~0° C., with ultrasound

Post Nitration Treatment of Curable Products:

The hydroxylated products obtained directly from flow nitration or ultrasonicated flow nitration of protected polyphosphazenes (e.g. PolyPZ-19 when-using the substrate PolyPZ-1) may be cured directly using the procedures described elsewhere in this document. However, if the Polyphosphazenes generated by this technique contain 1,2-hydroxynitrato functionalities in their side chains it is most beneficial to post treat these products prior to curing them. This post treatment involves epoxidising any 1,2-hydroxynitrato functionalities which are present in the molecule and then subsequently ring open the epoxide rings which have been formed, to generate analogous 1,2-dihydroxy moieties. Full details of this synthetic procedure are given in the experimental section (for the conversion of PolyPZ-19 to PolyPZ-21). However, the same procedure may equally be applied to other PolyPZ substrates containing 1,2-hydroxynitrato functionalities, thereby converting them to the equivalent dihydroxy compounds. The main reasons to employ this procedure for all such PolyPZs are:— i) The products produced via the epoxidation and ring opening process are easier to cure and show significantly better long term stability, post cure ii) When effecting partial flow nitration of substrates such as PolyPZ-19 using useful substrate concentrations and throughput rates, it is difficult to eliminate all of the (2,2-dimethyl-1,3-dioxolan-4-yl) protecting groups whilst maintaining the desired level of product hydroxylation. The use of ultrasound, as disclosed in this document is very effective at achieving complete removal of these functionalities, as detailed above. However, in absence of ultrasound a significant percentage of (2,2-dimethyl-1,3-dioxolan-4-yl) protected functionalities are typically retained in the product. These functionalities are not hydrolysed at isolation because the nitrated product is insoluble in water. In the case of the substrate PolyPZ-1 the residual (unwanted) functionalities would be: (2,2-dimethyl-1,3-dioxolan-4-yl)-butan-1-oxy groups. Such residual (2,2-dimethyl-1,3-dioxolan-4-yl) functionalities would be carried through into any cured product, where they are likely to cause long term chemical instability.

iii) The post treatment process described in the synthetic section for the epoxidation and ring opening of 1,2-hydroxynitrato functionalities has the additional benefit of hydrolysing any residual (2,2-dimethyl-1,3-dioxolan-4-yl) functionalities to yield the corresponding dihydroxy compound. Such dihydroxy substituted functionalities (e.g. as in PolyPZ-21) yield the most stable cured products.

This process overcomes the problems which arise when using the method as disclosed in a paper by Arber et al presented at the 39$^{th}$ International Conference of ICT in June 2008. The products made using the method in the 2008 paper were unstable.

H. Optically Sensitised Polyphosphazene

A further aspect of the invention relates to optically sensitised binders which are energetic polyphosphazenes tailored at the molecular level to achieve enhanced absorption of electromagnetic radiation. Organic energetic materials have tended to show little absorption and therefore respond poorly to the radiation from lasers. This problem has previously been addressed through the addition of Carbon Black to the energetic material to enhance its optical absorption. However, such addition is inconvenient and can increase processing costs, reduce the energy density available from the formulation and potentially modify its combustion characteristics in an adverse fashion. Also the consequences of carbon black addition can be difficult to predict, because they are dependent upon various factors including the relative physical characteristics of the carbon black and the energetic material.

In order to overcome this problem, a chromophore can be attached to the polyphosphazene to absorb light and therefore ignite the binder. The inventors have made energetic polyphosphazenes which can be ignited from sources such as laser generated light or flash tubes without the need to add other optical sensitisers. The application of laser ignition to energetic materials potentially offers a number of advantages, including circumvention of electrostatic sensitivity issues and avoidance of the need to use high sensitivity (e.g. primary explosive) ingredients. Although high power UV or IR lasers can be effective at directly igniting energetic materials, such lasers tend to be unattractive due to their relatively high cost, large size and energy requirements. It is possible to use any wavelength of light to trigger the ignition whether it be from a flash tube or a laser. Smaller lasers may be required for applications where space is of a premium and near-IR (NIR) diode lasers represent a practical solution for this type of application. Thus small, NIR diode lasers operating at modest power levels are both cheap and readily available.

H.1. Synthesis of the Optically Ignitable Polyphosphazenes PolyPZ-5 and PolyPz-6

H.1.a. Preparation of leucoquinizarin (LQ) from Quinizarin (Q)

Potassium carbonate (1.34 g, 9.6 mmol) was added to stirred water (20 ml) inside a 50 ml 3-necked round bottomed flask. After heating to 80° C., the solution was deaerated by bubbling nitrogen gas through it for 30 minutes (at 80° C.). Keeping the solution under positive nitrogen pressure (but without further bubbling), sodium dithionite (1.16 g, 6.7 mmol) and then 1,4-dihydroxyanthracene-9,10-dione (Quinizarin, Aldrich, 97%, 1.0 g, 4.13 mmol) were added. After 1 hour more sodium dithionite (0.67 g, 3.87 mmol) was added and the mixture was kept at 80° C. for 16 hours with vigorous stirring and a reflux condenser in place. The dark yellow suspension was filtered off under a nitrogen stream and thoroughly washed with degassed, warm (50° C.) water (3×20 ml). The red filtrate was discarded. The wet yellow solid was dried in a dessicator over drying agent to give 2,3-dihydroquinizarin, leucoquinizarin (LQ) as a canary yellow powder. Yield: 866 mg (86%). NMR (CDCl$_3$): 1H: 3.05 (s, 4.00H, C-2 CH$_2$ and C-3 CH$_2$), 7.71-7.78 (m, 1.97H, C-6 CH and C-7 CH), 8.40-8.46 (m, 1.96H, C-5 CH and C-8 CH) and 13.56 ppm (s, 1.99H, 2×OH). $^{13}$C: 35.99 (C-2 and C-3), 107.6, 124.8, 129.5, 130.6, 155.4 and 201 ppm (carbonyl).

H.1.b. Preparation of Rubbery PolyPZ-5 [P-(2,2,2-trifluoroethan-1-oxy/(5,6-dinitratohexan-1-oxy/3-amino propan-1-oxy/N-(1'-hydroxyanthracene-9', 10'-dione-4'-yl)-3-aminopropan-1-oxy) polyphosphazene]

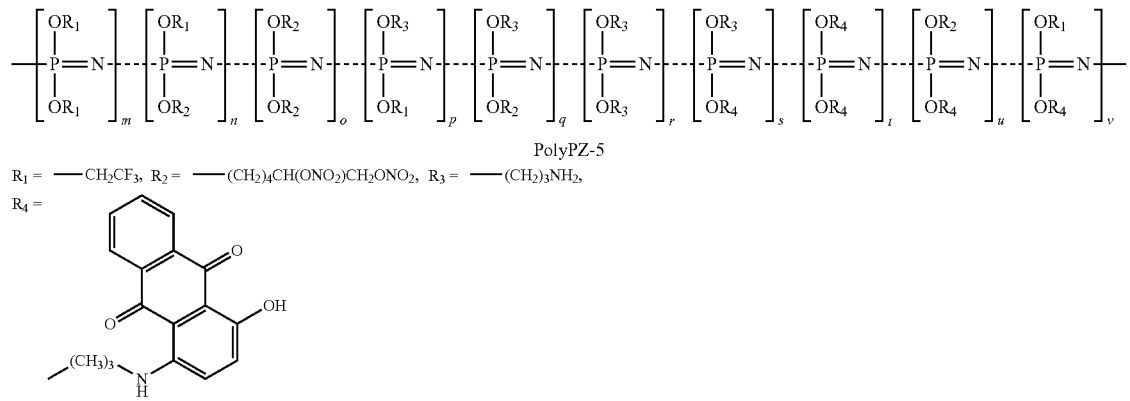

H.1.b.i Preparation of PolyPZ-2 (2,2,2-trifluoroethan-1-oxy (14%)/2,2-dimethyl-[1,3]-dioxolan-4-yl) butoxy (75%)/3-aminopropoxy (11%)) polyphosphazene The reaction was carried out under a nitrogen atmosphere. Sodium hydride as a 60% w/w dispersion in mineral oil (23.0 g, 0.57 mol NaH) was suspended in dry THF (700 ml) in a three-necked 3 L round bottomed flask, fitted with mechanical stirring. The mineral oil was not eliminated at this stage. A solution of 3-aminopropan-1-ol (43.2 g, 0.57 mol) in dry THF (100 ml) was added during 30 minutes via a pressure equalising funnel and the mixture was vigorously stirred at room temperature for 1.5 h, during which time hydrogen evolution took place. A solution of PolyPZ-1 [P-(2,2,2-trifluoroethan-1-oxy (25%)/4-(2',2'-dimethyl-1',3'-dioxolan-4'-yl)-butan-1-oxy (75%)) polyphosphazene, monomer unit molecular weight (MW): 346.5], (40.0 g, 0.12 mmol) in dry THF (700 ml) was added in a single portion and the mixture was refluxed for 24 h. The solvent was evaporated and the residual yellow product was mechanically stirred in water (3 L) inside a 5 L glass beaker. The resulting suspension was acidified to pH~2 (aq. HCl 18.5 wt %, ~120 ml) and CHCl$_3$ (1 L) was added. The mixture was stirred for 5 minutes to extract the product; phase separation took place overnight. The following morning the aqueous phase was siphoned off and the organic phase washed with water (3×1 L) and brine (500 ml) with mechanical stirring. It was then left to phase separate, after which the brine was siphoned off and the organic solution dried (MgSO4, 200 g), filtered and evaporated to yield crude PolyPZ-2 [P-(2,2,2-trifluoroethan-1-oxy (14%)/4-(2',2'-dimethyl-1',3'-dioxolan-4'-yl)butan-1-oxy (75%)/3-aminopropan-1-oxy (11%)) polyphosphazene] which still contained free 3-aminopropan-1-ol and mineral oil as contaminants. (These were removed in the next step.)

H.1.b.ii. Nitration of PolyPZ-2 to Yield PolyPZ-3 [P-(2,2,2-trifluoroethan-1-oxy (14%)/5,6-dinitratohexan-1-oxy (75%)/3-ammonium (nitrate) propan-1-oxy (11%)) polyphosphazene]

All of the crude PolyPZ-2 product obtained above was dissolved in acetone (100 ml) and the solution divided into three equal volumetric portions, each of which was transferred into a 1 L round bottomed flask. Each aliquot was evaporated to leave a film of polymer on the inside of the flask, which was then pre-cooled to ~0° C. inside a large ice/water bath. Then to each of the three flasks was added pre-cooled (also at ~0° C.) 95% nitric acid (150 ml) in a swift, single addition. The flasks were manually swirled in the cold bath for 10 minutes, after which time the polymer had dissolved in the acid. The content of each flask was quenched into water (1 L) inside a 3 L beaker. The suspensions were mechanically stirred to coagulate the nitrated product. The clear supernatant liquors were discarded and the swollen products rinsed with fresh water (2×250 ml) and dried in vacuo at 50° C. The three aliquots were combined, after NMR analysis, as solutions in acetone (50 ml). Precipitation into hexane (twice, 500 ml) eliminated the mineral oil. The supernatant solution was decanted and the hexane recycled by distillation. Solvent removal was effected under high vacuum at 50° C. for 1 h. This yielded PolyPZ-3 [P-(2,2,2-trifluoroethan-1-oxy (14%)/5,6-dinitratohexan-1-oxy (75%)/3-ammonium (nitrate) propan-1-oxy (11%)) polyphosphazene], yield: 41.4 g. NMR spectroscopic analysis confirmed the absence of any residual oil and indicated that the polymer had been fully nitrated.

H.1.b.iii. Preparation of PolyPZ-4 [P-(2,2,2-trifluoroethan-1-oxy (14%)/5,6-dinitratohexan-1-oxy (75%)/3-aminopropan-1-oxy (11%)) polyphosphazene]

The nitrated PolyPZ-3 (41.4 g, monomer unit MW: ~445, 90 mmol) was dissolved in THF (500 ml) and the solution gravity percolated through a 10 cm diameter and 30 cm tall column of dry Amberlyst A-26 anion exchange resin (Aldrich, OH— form, 1200 ml, exchange capacity ~4 mmol/ml) which had been dried under high vacuum (~1 mmHg) at 40° C. for 2 h. The column was fitted at the bottom with a No. 3 frit filter to retain the resin beads and also with a glass tap with stopcock to control the vacuum in the next stage of the work. The resin was first wetted and compacted by flushing it with THF (500 ml). After closing the bottom tap, a second aliquot of THF (500 ml) was added to 'saturate' the packing. Then the polymer solution was added with the aid of a 25 ml pipette, to avoid disturbing the packing. The solution accumulated on the top of the saturated bed of resin, slowly diffusing into the column. (This facilitated the generation of a relatively 'sharp' eluent front.) The stopcock was then opened and the solution allowed to elute under gravity. Finally application of mild vacuum from a water pump to the bottom tap effected removal of all the residual liquid, which was collected in a large Erlenmeyer flask fitted with rubber bung and vacuum outlet. [NB: If time is available it can be beneficial to omit final application of vacuum to the column, to avoid generating channels through the packing.] The vacuum was released and the column flushed with more THF (2×250 ml), all eluates [containing PolyPZ-4 (P-(2,2,2-trifluoroethan-1-oxy (14%)/5,6-dinitratohexan-1-oxy (75%)/3-aminopropan-1-oxy (11%)) polyphosphazene)] being combined (~1.5 L) for use in the next step.

H.1.b.iv. Reaction of PolyPZ-4 with LQ to yield Rubbery PolyPZ-5 [P-(2,2,2-trifluoroethan-1-oxy (14%)/(5,6-dinitratohexan-1oxy (75%)/3-amino propan-1-oxy (9%)/N-(1'-hydroxyanthracene-9',10'-dione-4'-yl)-3-aminopropan-1-oxy (2%)) polyphosphazene]

The solution containing PolyPZ-4 was transferred to a 3 L round bottomed flask fitted with a water condenser and mechanical stirring. Leucoquinizarin (LQ, 15.0 g) was added with vigorous stirring. This immediately dissolved imparting a bright orange colour to the clear solution. The mixture was boiled under reflux under a nitrogen atmosphere for 48 h. (The deep purple colour characteristic of mono-alkylaminoanthracenediones developed almost immediately when heat was applied.) The solvent was then eliminated by evaporation at 50° C. The dark gummy product was re-dissolved in acetone (100 ml) and the solution twice precipitated drop-wise into $CHCl_3$ (500 ml) to remove residual quinizarin and leucoquinizarin. The second precipitation required seeding with a small amount of solid product from the first precipitation to encourage coagulation [NB: the dark $CHCl_3$ supernatant washings should be kept standing for at least 10 days, to allow further product precipitation as this improves the yield compared to that initially obtained (below)]. The purple supernatant solution was decanted and the product re-dissolved in acetone (20 ml). Removal of this solvent by evaporation under high vacuum at 50° C. yielded PolyPZ-5 [P-(2,2,2-trifluoroethan-1-oxy (14%)/(5,6-dinitratohexan-1 oxy (75%)/3-amino propan-1-oxy (9%)/N-(1'-hydroxyanthracene-9',10'-dione-4'-yl)-3-aminopropan-1-oxy (2%)) polyphosphazene] as a deep purple rubbery solid (yield: 17.2 g), but simultaneously promoted some cross-linking yielding 1.2 g of a DMSO insoluble purple black solid. It was subsequently established (after re-dissolving the product in acetone and filtering off the insoluble product) that solvent evaporation performed at ambient temperature did not cause the generation of insoluble matter; consequently this is the preferred procedure. The final yield of soluble PolyPZ-5 was only 16.0 g (25.0 g expected).

H.1.c. Preparation of Brittle-solid PolyPZ-5, [P-(2,2,2-trifluoroethan-1-oxy (8%)/(5,6-dinitratohexan-1-oxy (55%)/3-amino propan-1-oxy (30%)/N-(1'-hydroxyanthracene-9',10-dione-4'-yl)-3-aminopropan-1-oxy (7%)) polyphosphazene]

PolyPZ-3 [P-(2,2,2-trifluoroethan-1-oxy (8%)/5,6-dinitratohexan-1-oxy (55%)/3-ammonium (nitrate) propan-1-oxy (37%)) polyphosphazene] (300 mg, unit monomer MW: 407.5, 0.74 mmol) was dissolved in anhydrous THF (5 ml). The clear yellow solution was stirred and then filtered through a pad of dry Amberlyst A26 resin (OH— form, exchange capacity 4.4 meq ml-1, 10 ml, measured in a small graduated cylinder). To the filtrate, containing the neutralised polymer (PolyPZ-4), was added 2,3-dihydro-1,4-dihydroxyanthracene-9,10-dione, leucoquinizarin, LQ (132 mg, 0.55 mmol, 2 equivalents/aminopropoxy unit). The clear orange solution was boiled under reflux under a nitrogen blanket for 48 hours, after which time the THF was eliminated by evaporation. The dark purple residue was dissolved in acetone (2 ml) and re-precipitated drop-wise into chloroform (50 ml, twice). After decanting the supernatant liquor from the second precipitation, the last traces of chloroform were eliminated by evaporation under high vacuum at ambient temperature. The PolyPZ-5 product [P-(2,2,2-trifluoroethan-1-oxy (8%)/(5,6-dinitratohexan-1-oxy (55%)/3-amino propan-1-oxy (30%)/N-(1'-hydroxyanthracene-9',10'-dione-4'-yl)-3-aminopropan-1-oxy (7%)) polyphosphazene] was obtained as a black, hard, brittle solid (177 mg) which softened to a rubbery consistency at 60° C. The material dissolved readily in acetone and THF, giving deep purple solutions. NMR (acetone-$d_6$): 1H: 1.29-1.88 (br m, 9.8H, 3×$CH_2$ of energetic C6 substituent), 2.17-3.80 (br m, 3.37H, 3×$CH_2$ of functionalised and un-functionalised aminopropoxy units), 4.06-5.02 (br m, 9.6H, energetic C6 substituent: $OCH_2$+$CHONO_2$+$CH_2ONO_2$, $CH_2$ trifluoroethoxy), 5.33 (br s, 0.17H, suspected CHOH arising from partial reduction of energetic C6 substituent), 5.50 (br s, 1.00H, $CHONO_2$ energetic C6 substituent) and 7.75-8.36 ppm (br m, 0.99H, indistinct collection of aromatic CH signals assigned to polymeric anthraquinoid units in slightly different environments. $^{19}F$: (no internal standard): −76.4 ppm (trifluoroethoxy), $^{13}C$ (10000 pulses): only the energetic C6 substituent carbons (minus $CHONO_2$) were observed.

As PolyPZ-5 slowly self-cures once solvent has been removed, it is convenient to formulate this polymer using a solvent process. If long term stability is required in the absence of solvent, this material should be converted to PolyPZ-6.

H.1.d. Con version of PolyPZ-5 to PolyPZ-6 [P-(2,2,2-trifluoroethan-1-oxy/(5,6-dinitratohexan-1-oxy/4,6-diaza-5-oxododecan-1-oxy/N-(1'-hydroxyanthracene-9',10'-dione-4'-yl)-3-aminopropan-1-oxy) polyphosphazene]

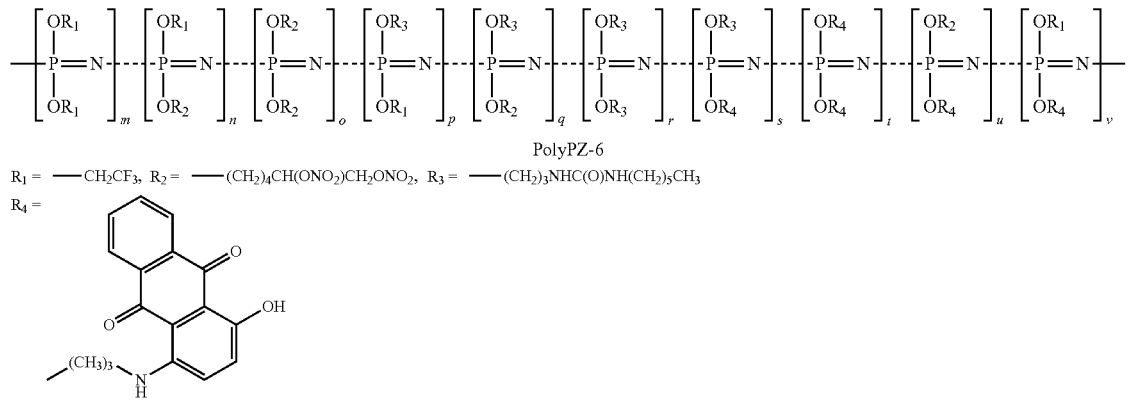

PolyPZ-6

$R_1 =$ —CH$_2$CF$_3$, $R_2 =$ —(CH$_2$)$_4$CH(ONO$_2$)CH$_2$ONO$_2$, $R_3 =$ —(CH$_2$)$_3$NHC(O)NH(CH$_2$)$_5$CH$_3$ $R_4 =$

1-Isocyanatohexane (367 µl, 322 mg, 2.54 mmol) was added to a solution of PolyPZ-5 [P-(2,2,2-trifluoroethan-1-oxy (14%)/(5,6-dinitratohexan-1 oxy (75%)/3-aminopropan-1-oxy (9%)/N-(1'-hydroxyanthracene-9',10'-dione-4'-yl)-3-aminopropan-1-oxy (2%)) polyphosphazene] (1.10 g, 2.54 mmol) in dry THF (30 ml). The solution was boiled under reflux for 16 h; the solvent was then eliminated by evaporation. Drop wise re-precipitation of the product from acetone (4 ml) into hexane (50 mil) removed any unreacted isocyanate. After rinsing the product with fresh hexane (2×10 ml) and removing residual solvent under vacuum at 50° C., PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%)) polyphosphazene] was isolated as a dark, purple gummy solid. Yield: 560 mg. This product remained readily soluble in acetone, MEK, THF and EtOAc, even after ageing at 70° C. for 48 h (which produced no insoluble particulate matter in suspension). NMR (acetone-d$_6$): $^1$H (hexylcarboxamide visible signals only): 0.89 (br s, 3.00H, Me), 1.31 (br m, ~6.95H partially overlapping, 3×CH$_2$) and 3.81 ppm CH$_2$NHCO. As PolyPZ-6 is energetic, its decomposition under the influence of the laser decreases the total energy required from the laser to effect ignition.

If it is desired to subsequently cure this material a slight deficit of mono-isocyanate may be employed in this reaction, leaving just sufficient free NH$_2$ groups to achieve the desired physical properties via a cure reaction with a polyfunctional isocyanate or polyfunctional epoxide.

H.1.e. Materials Data

PolyPZ-1 [P-(2,2,2-trifluoroethan-1-oxy)/4-(2',2'-dimethyl-1',3'-dioxolan-4'-yl)-butan-1-oxy)polyphosphazene] and PolyPZ-7 [P-(2,2,2-trifluoroethan-1-oxy (30%)/5,6-dinitratohexan-1-oxy (70%)) polyphosphazene] were prepared as previously described (WO2006/032882). PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%) polyphosphazene] was prepared as detailed above and stored in acetone solution. The molecular weight (Mn) of the former polymer was approximately 20,000 g mol$^{-1}$ (polystyrene equivalent). Given that PolyPZ-6 was derived from the same precursor polymer as PolyPZ-7 and that substitution reactions have been found to have only a minor impact on the molecular weight distribution of these polymers, the former material is believed to possess a broadly similar molecular weight to the latter. The HNS IV (EURENCO) had a mean particle size of 2.33 µm.

H.2. Sample Preparation

PolyPZ-6 mixtures: Two stock solutions were prepared in acetone, one of PolyPZ-7 at 210 µg/µl and the other of PolyPZ-6 at 42 µg/µl. The former solution was then used to dilute the latter (in the optical sense) in order to produce a range of samples possessing different concentrations of the two polymers ranging from 1 wt % PolyPZ-6 (Q1) to 95 wt % PolyPZ-6 (Q95). After mixing each sample the acetone was removed under reduced pressure (60° C., water pump), then the sample was degassed for a period of 3-4 hours using a vacuum pump at ambient temperature.

HNS IV/PolyPZ-6: Approximately 90 wt % HNS (Hexanitrostilbene) (0.45 g) and 10 wt % PolyPZ-6 (0.05 g) were mixed until uniform in solid phase using a glass stirring rod. Mixing was facilitated by the addition of approximately 0.5 ml acetone, which was subsequently allowed to evaporate under the airflow in a fume cupboard. Further samples were prepared using the same method, but with different PolyPZ-6 contents, up to 30 wt %.

The laser ignition apparatus is shown schematically in FIG. 5. The diode laser (Laser Electronics, Germany) equipped with a LDC1000 controller, provided a maximum output power of 44.5 W at 801 nm wavelength. Pulse duration was varied in the range 10-500 ms, with firing times in excess of 500 ms achieved using continuous wave (CW) mode. The laser beam was focused using two plano-convex quartz lenses having an effective aperture of 50 mm and a combined focal length of 25 mm (f/0.5). This produced a nominal beam spot size of 0.3 mm diameter on the sample surface (0.8 mm diameter for HNS/PolyPZ-6 formulations). The test samples were held semi-confined within holes drilled into an aluminium block (~3 mm deep, diameter ~3 mm). The ignition process was recorded using a photodiode detector (OSRAM Silicone PIN Photodiode: BPX 65, rise time ~12 ns) in the vicinity of the sample holder. A NIR filter placed in front of the detector blocked out any reflected or scattered laser radiation. A fast amplifier (Oriel 70710)

having a bandwidth of 80 KHz and a gain of $10^6$ volts/amp was used to enhance the photodiode signal arising from sample ignition. The temporal history of the ignition process was recorded using a digitizing oscilloscope (DSO5054A, Agilent Technologies, USA) having a bandwidth of 500 MHz. When-determining ignition delay time, in order to avoid difficulties in identifying the precise moment of ignition—which is not always well defined—ignition of the sample was assumed when its optical output reached 10% of the maximum flame intensity. Unexpectedly, the ignition efficiency of the binder mixed with HNS is much greater than that of the binder alone. Such synergy will facilitate a reduction in the quantity of "deadweight", i.e. energetically inert, chromophore which has to be added to a system to effect ignition.

Since the PolyPZ-6 formulations undergo laser supported ignition at certain power levels, but sustainable laser ignition at higher power levels, there is a potential here to design a solid propellant which possesses (laser) switchable burn rates which is widely desired.

Given that low laser energies cause PolyPZ-6 to burn in an unsustainable fashion leaving unconsumed explosive filler, whilst higher energies achieve sustainable burn of the binder and filler together, there is a potential here for benign safing of an energetic formulation. (i.e. high energy laser ignites the formulation normally to give a complete (high energy) burn, whilst low energy laser causes combustion of just the binder (with minimal energy release) leaving the filler largely unconsumed.

Incorporation of PolyPZ-6 into a formulation facilitates its laser ignitability, without significant modification of the thermal conductivity of the system. This is a considerable advantage over the currently used compositions with carbon black. This should make it possible to control burn rate independently of the percentage of optical sensitizer added.

Previous examination of the laser ignition of PolyPZ-7 [P-(2,2,2-trifluoroethan-1-oxy (30%)/5,6-dinitratohexan-1-oxy (70%)) polyphosphazene] has shown that an optical sensitizer is necessary to achieve effective deflagration of this product. The current work has confirmed this observation as even the maximum available laser power of 44.5 W failed to ignite this material. Such results are attributed to the poor optical absorption of this polymer in the NIR (FIG. 6). The structure of PolyPZ-7 has been modified to incorporate a quinizarin based chromophore. PolyPZ-6 is a random mixed substituent polymer based upon the structure of PolyPZ-7, but with approximately 2% of the side chain functionalities replaced by quinizarin moieties. The introduction of these side groups has a dramatic effect upon the absorption spectrum of the material. Thus, whilst the precursor PolyPZ-7 displays a translucent reddish-brown colouration, PolyPZ-6 is a very deep, virtually opaque purple.

A number of blends of PolyPZ-6 with a PolyPZ-7 as a diluent were prepared. This latter material was ideal for reducing the optical density of PolyPZ-6 because its chemical structure was closely related to that of PolyPZ-6, but it exhibited negligible absorption within the region of interest. Mixtures were defined by their PolyPZ-6 content; thus a blend containing 1 wt % of PolyPZ-6 is designated Q1, that containing 50 wt % as Q50 and pure PolyPZ-6 as Q100 (etc). The resultant spectra recorded across a range of concentrations of PolyPZ-6 are presented in FIG. 6. The spectra show that PolyPZ-6 has a broad absorption band in the vicinity of 800 nm which becomes particularly noticeable at higher concentrations, although its absorption across the visible region is considerably stronger. The absorption of different blends of PolyPZ-6 (1-100%) with PolyPZ-7 was also measured at the specific laser wavelength of 801 nm (FIG. 7). Although NIR absorption is the focus for the current work, the strong absorption of PolyPZ-6 in the visible waveband suggests that this material should respond readily to stimulation in this region (e.g. by a flash tube).

H.3. Laser Ignition Tests

Laser ignition tests on pure PolyPZ-6 (Q100) were carried out using the apparatus depicted in FIG. 6. Key parameters explored were the laser powers and pulse durations required to achieve self-sustaining combustion. Flames arising from sample ignitions were detected optically and recorded by an oscilloscope. Selected oscilloscope traces depicting the temporal histories of ignition events for PolyPZ-6 at two different laser power levels and pulse durations are presented in FIG. 8.

Figure 8A:
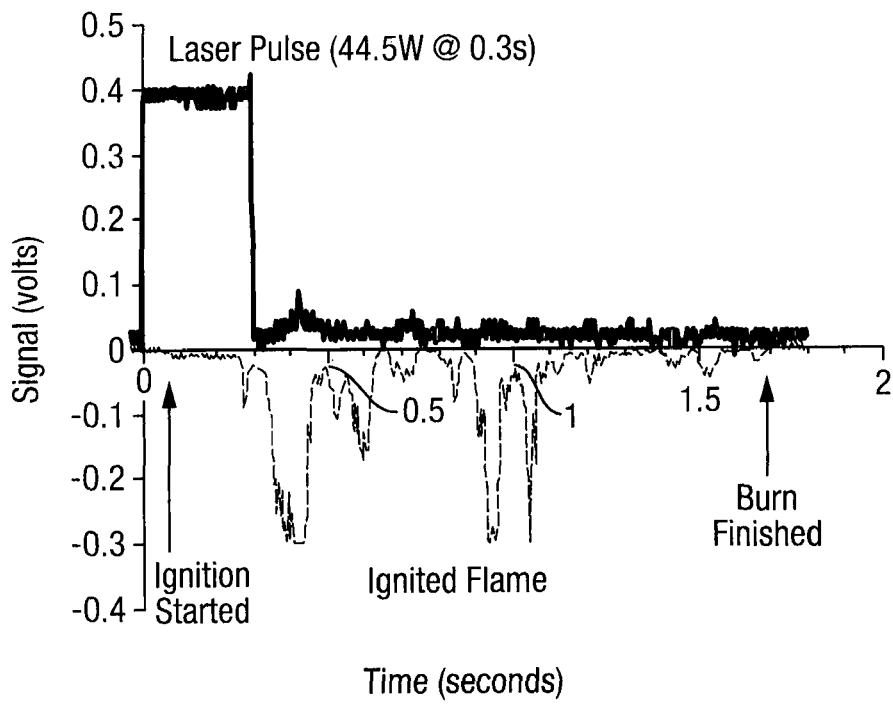
Figure 8B:
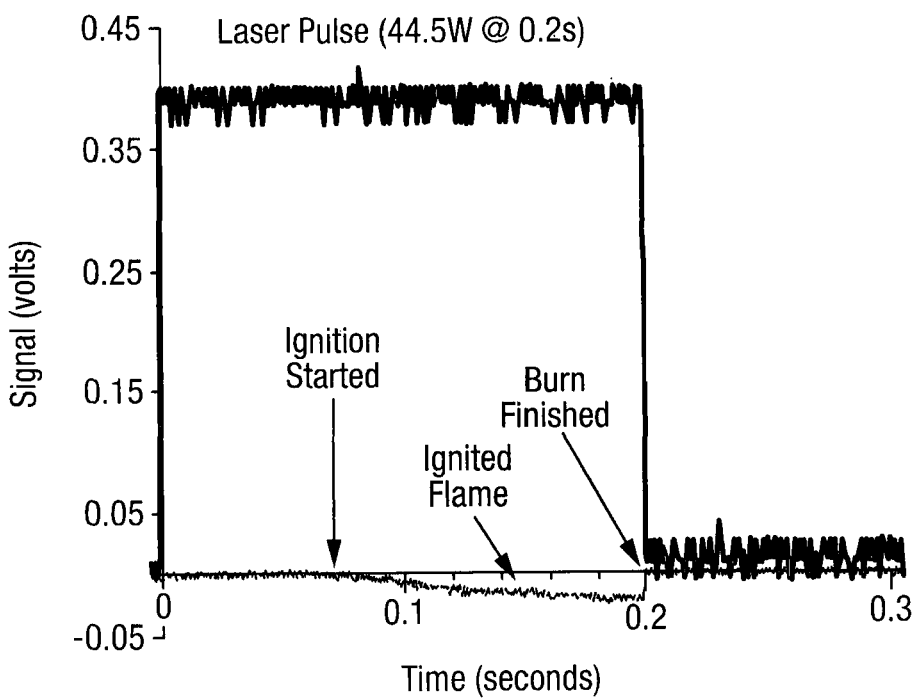
Figure 8C:
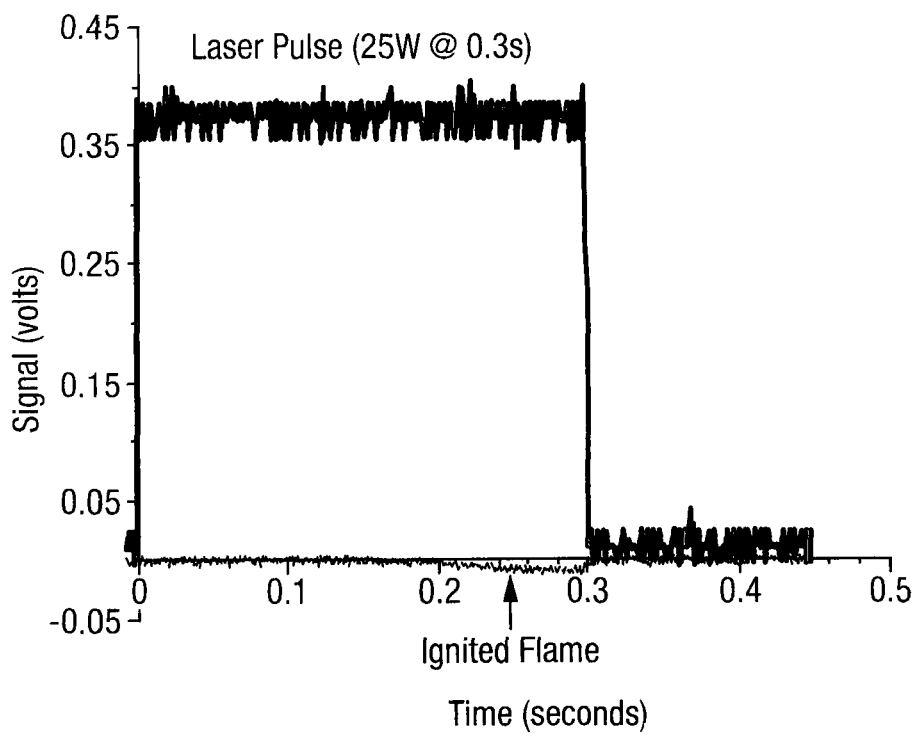
Figure 8D:
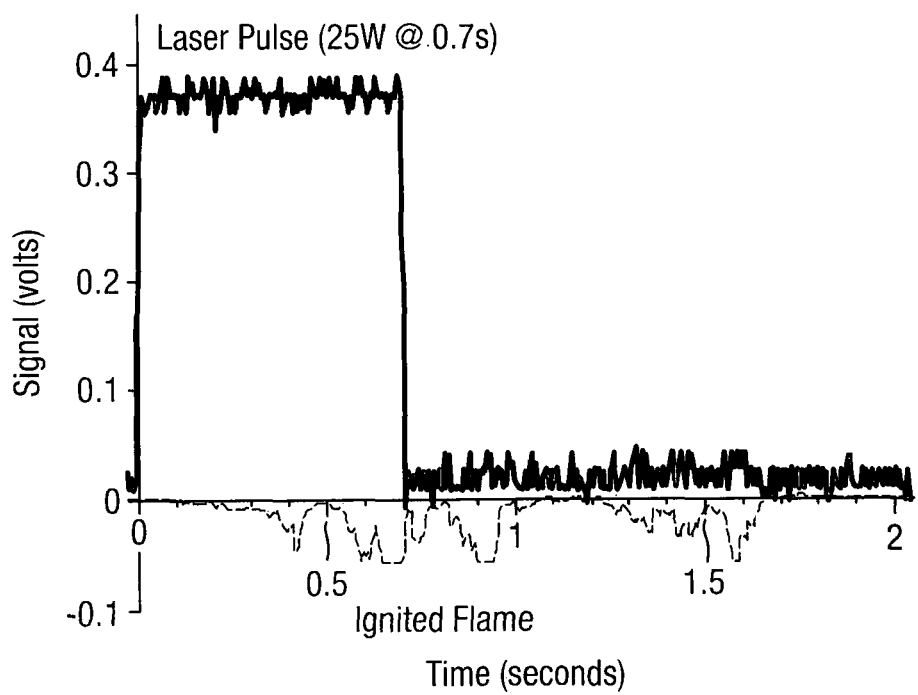

For these experiments we define self-sustaining ignition as being when the resultant flame continues after termination of the laser pulse. FIG. 8a indicates that this occurred for a laser power of 44.5 W with a pulse duration of approximately 0.3 s (equivalent to ~13 J at 0.3 mm spot diameter); shorter laser pulses (≤0.2 s) at this power level did not achieve self-sustaining combustion (FIG. 8b). Reduction of the laser power to 25 W at a pulse duration of 0.3 s (~7.5 J, FIG. 8c) did not produce a self-sustaining burn (cf FIG. 8a). However, extending the pulse duration to 0.7 s at the same power (~17.5 J, FIG. 5d) re-established self-sustaining combustion. Thus, as would be expected, above a threshold laser power the self-sustainability of PolyPZ-6 ignition depends upon the total energy deposited into the sample (i.e. the product of the pulse duration and its intensity).

Nevertheless, we have observed a trade-off between laser power and pulse duration, which can facilitate ignition at lower overall energy levels. Data expressed in terms of total delivered energy (FIG. 9 & Table 21) show that the minimum pulse energy required for self-sustaining ignition reduces drastically with increasing laser power up to a value of ~30 W. Above this level the threshold for self-sustaining ignition settles at ~10 J, becoming largely independent of laser power. The increased threshold energy required at lower powers is attributed to the fact that a thermal equilibrium (between laser heating and heat loss) predominates at lower laser power levels.

Table 21 shows the duration and energy of laser pulse required for sustainable ignition at different laser powers.

TABLE 21

| | Laser power (W) | | | | | |
|---|---|---|---|---|---|---|
| | 44.5 | 40 | 35 | 30 | 28 | 25 |
| Pulse duration (ms) | 230 | 250 | 280 | 300 | 500 | 600 |
| Delivered energy (J) | 10.2 | 10 | 9.8 | 9 | 14 | 15 |

It is noted that using the maximum power available from the present laser (44.5 W) the minimum pulse duration to achieve a self-sustaining burn was ~225 ms (63 kWcm$^{-2}$). Conversely, the minimum laser power at which self-sustaining ignition could be achieved was ~25 W using a pulse duration of ≥600 ms (21 kWcm$^{-2}$, ~15 J), with a focussed beam diameter of ~0.3 mm on the target. Furthermore, it was observed that at laser powers ≤25 W, even when self-sustained flame was not observed, the sample continued to react after termination of the laser pulse such that the entire sample 'cooked off' slowly, without flame. This distinct mode of burning yields a voluminous quantity of rigid grey-black ash.

The ignition characteristics of PolyPZ-6/PolyPZ-7 blends have been quantified over a range of concentrations using the ignition delay time parameter, $T_d$, which is defined as the period between the start of the laser pulse and ignition of the sample. However, to avoid difficulties in identifying the precise point of ignition—which is not always well defined—the current work has assumed ignition of the sample when its optical output reaches 10% of the maximum flame intensity.

FIG. 10 records the responses of pure PolyPZ-6 (Q100) and Q50 under comparable experimental conditions across a range of power densities. The Figure shows that the ignition delay time reduces significantly as laser power density increases, particularly for Q50. For both samples increases in laser power eventually caused the ignition delay time to asymptote towards 90 ms, a figure which was achieved from power densities of ~60 KWcm$^{-2}$. However, the rate of change of ignition delay time with power density—between threshold and saturation conditions—was different for the two materials, being estimated as ~18 ms·cm$^2$ kW$^{-1}$ and 3 ms·cm$^2$ kW$^{-1}$ for the Q50 and Q100 samples respectively. Q50 samples produced a much longer ignition delay than Q100 samples, as would be expected from its lower optical density at 801 nm. Nevertheless, the Q50 sample was deemed to demonstrate an acceptable level of sensitization, requiring a threshold power density of ~24.8 KWcm$^{-2}$ with a minimum pulse duration of ~60 ms for sustainable ignition (17.5 W laser/0.3 mm diameter spot). It should be noted that the energy required to ignite PolyPZ-6 when formulated with an explosive is likely to be very much lower than that required to ignite the pure polymer (vide infra). As the concentration of PolyPZ-6 was further reduced, increased energy was required to ignite the binder, but at very low levels the ignition process became erratic. Thus for example Q1 containing the smallest proportion of PolyPZ-6 and hence also the lowest optical density at 801 nm would not undergo consistent ignition even at the highest available laser power level. Also, when ignition did occur, the ignition delay times were found to vary randomly from shot to shot. The minimum laser power which achieved ignition was ~30 W (~42.5 KW/cm$^2$) but the burn did not self-sustain. From these data it is concluded that the absorption of Q1 at 801 nm is insufficient to reliably sensitize this material towards laser ignition at the laser power levels employed, but it is sufficient to achieve sample heating.

Table 22 shows ignition data for sample Q1 at different laser power levels (pulse duration 10 s). Triplicate tests were performed at each power level

TABLE 22

| | Laser power (W) | | | | | | | | | | | | | |
|---|---|---|---|---|---|---|---|---|---|---|---|---|---|---|
| | 44.5 | | | 40 | | | 35 | | | 30 | | | 25 | |
| Ignition delay (s.) | 3.3 | 1.7 | * | 0.7 | 5.5 | 0.5 | 0.7 | * | 0.2 | 7.1 | 6.2 | * | * | * |

* Ignition did not take place.

Overall these results demonstrate that PolyPZ-6 has sufficient absorption at 801 nm to facilitate its laser ignition without the need for a separate optical sensitizer, but a reasonable concentration of this material is required to effect reliable ignition. Unsurprisingly Q100, which contains the highest concentration of these chromophores shows the greatest responsiveness towards laser ignition at 801 nm, whilst Q1, with the lowest concentration, possesses such limited absorption at 801 nm that it fails to respond reproducibly to laser ignition. Nevertheless, the above data suggest that Q50 could be a practical material to employ for laser ignition. Whilst the absorbance of PolyPZ-6 at 801 nm could be enhanced by increasing the percentage of quinizarin side groups present in the polymer, thereby enhancing the ignitability of this binder, the introduction of such additional quinizarin side groups would adversely affect the oxygen balance/energy content of the polymer. However, we have found that this is likely to be unnecessary because, unexpectedly, formulations of PolyPZ-6 with HNS are much more susceptible to laser ignition than is pure PolyPZ-6 itself.

H.4. Laser Ignition of HNS IV/PolyPZ-6 Formulations

A key purpose in developing PolyPZ-6 was to utilise this material to facilitate the laser ignition of high explosives, without the need to add other optical sensitizers. In the current work we have examined the effectiveness of this binder for igniting HNS IV. Thus the laser ignitabilities of three PolyPZ-6/HNS IV formulations (containing 10 wt %, 20 wt % and 30 wt % of binder) were examined, by recording ignition delay times across a range of laser power densities (FIG. 11). Whilst pure (unsensitized) HNS IV would not ignite even at the maximum available laser power (44.5 W), its formulations with PolyPZ-6 did ignite across a range of power densities to leave a soft black powder as residue. All three HNS/PolyPZ-6 formulations showed similar ignition threshold power densities of ~2.5 kWcm$^{-2}$. The shortest ignition delay time was achieved at ~7 kW cm$^{-2}$ with all, three formulations and was estimated from the asymptotes (FIG. 8) to be ~35 msec. Unexpectedly, both of these parameters are significantly lower than those observed for pure PolyPZ-6 (threshold: ~35 kWcm$^{-2}$ and minimum delay time: 225 ms at 63 kWcm$^{-2}$). Although the data for pure PolyPZ-6 and its formulations with HNS are not directly comparable, due to a change in laser spot size (PolyPZ-6: 0.3 mm, PolyPZ-6/HNS: 0.8 mm), it is clear that the PolyPZ-6/HNS formulation requires much less energy to ignite it than does pure PolyPZ-6.

H.5. Confined Ignition Tests on HNS/PolyPZ-6 Formulations

The ignition tests discussed above were all carried out under normal laboratory conditions, with only marginal confinement due to the recesses of the sample holder. Given that the combustion of most energetic materials is strongly pressure dependent, it was considered important to undertake some additional experiments under confined conditions. Thus, ignition tests were undertaken on an HNS IV/PolyPZ-6 (80/20 wt %) formulation within a confinement chamber, which as described in S. R. Ahmad and D. A. Russell, 'Studies into Laser Ignition of Confined Pyrotechnics', Propellants, Explos. Pyrotech., 33, 396, 2008.

Under confined conditions this formulation underwent complete combustion (44.5 W laser), but with a shorter ignition delay time (7 ms) than that observed using unconfined conditions (35 ms). After the firing a carbonaceous residue was observed in the firing chamber, but this was a soft black material unlike the rigid ashes associated with the combustion of pure PolyPZ-6. The formation of this residue reflects the relatively poor oxygen balance of the formulation. Flame intensity measurements were recorded using an oscilloscope during both confined and unconfined events; in addition pressure was also monitored during the confined burn (FIG. 12). Comparison of the traces for these confined and unconfined ignitions shows that (as expected) combustion occurs much more quickly under confined conditions. These two experiments were conducted in the same confinement chamber, but respectively with and without the sealing cap in place. Table 23 shows ignition delay and pressure peak time under confined ignition

TABLE 23

| Laser power (W) | 45 | 35 | 25 | 15 | 8 |
|---|---|---|---|---|---|
| Ignition delay (ms) | 6.8 | 25 | 22 | — | — |

Additional confined tests were undertaken across a range of laser powers. However, lower power levels produced slower ignitions, which under confined conditions lead to obstruction of the optical fibre by black smoke. This made it impossible to observe the ignition effectively. Table 23 records the ignition delay times observed at various laser powers. The time taken to achieve peak pressure was found to decrease linearly with increasing power density (FIG. 13).

The optical absorption of PolyPZ-6 at 801 nm and the susceptibility of this material to laser ignition are both strongly dependant upon the concentration of quinizarin functionalities present in the binder. Consequently pure PolyPZ-6 (Q100) is the most responsive to laser ignition at this wavelength, but Q50 (equivalent to a molecule possessing ~1% quinizarin moieties in the backbone) is thought to offer acceptable ignition performance. Where the concentrations of PolyPZ-6/quinizarin functionalities fall significantly below those present in Q50, the binder produces significant heating of the formulation, but tends to produce erratic ignition behaviour when using the laser power densities available with the current experimental equipment. (Higher power lasers should produce sustainable ignition at lower concentrations of PolyPZ-6/quinizarin functionalities.)

Unexpectedly, much less energy is required to ignite PolyPZ-6 when it is formulated with HNS (~0.4 J), than when it is present as the pure binder (~10 J). This means that the ignition of PolyPZ-6/HNS formulations is much more energy efficient than that of pure PolyPZ-6 alone. This feature offers a clear advantage when seeking to ignite an explosive material in a practical weapon system. As would be expected both ignition delay and combustion times are shorter when the sample is confined than when it is unconfined.

Such a material may equally be used to ignite other explosive compounds including propellants and pyrotechnics. PolyPZ-6 is the first example of an energetic binder with these characteristics.

H.5. Alternative Materials and Examples

PolyPZ-5 [P-(2,2,2-trifluoroethan-1-oxy/(5,6-dinitratohexan-1 oxy/3-amino propan-1-oxy/N-(1'-hydroxyanthracene-9',10'-dione-4'-yl)-3-aminopropan-1-oxy)polyphosphazene] possesses similar properties to PolyPZ-6 with respect to laser ignition, for example by a NIR laser. However, as this material slowly self-cures once the solvent has been removed it is convenient to formulate this polymer using a solvent. This capability to self-cure can beneficially promote cross-linking in blends of PolyPZ-5 with other binders (e.g. with PolyPZ-7). However, if such a curing functionality is not required, the reactive amine groups present in PolyPZ-5 may be 'capped off' using the procedure described in this patent, to yield PolyPZ-6. The same objective may be achieved by using a similar procedure, with a variety of alternative isocyanates.

It should be noted that whilst PolyPZ-6 [P-(2,2,2-trifluoroethan-1-oxy (14%)/(5,6-dinitratohexan-1-oxy (75%)/4,6-diaza-5-oxododecan-1-oxy (9%)/N-(1'-hydroxyanthracene-9',10'-dione-4'-yl)-3-aminopropan-1-oxy (2%)) polyphosphazene] contains only 2% of the optically active quinizarin structure, it is possible to incorporate higher proportions of this functionality by increasing the proportion of leucoquinizarin reacted with PolyPZ-4/extending the reaction times used (and also optionally by increasing the degree of 3-aminopropan-1-oxy side group substitution in the PolyPZ-4). The degree of substitution by quinizarin moieties is also affected by the relative proportions of other substituents and the preparation of one sample of PolyPZ-5 having enhanced quinizarin content is described in the experimental section. (Brittle solid, [P-(2,2,2-trifluoroethan-1-oxy (8%)/(5,6-dinitratohexan-1-oxy (55%)/3-amino propan-1-oxy (30%)/N-(1'-hydroxyanthracene-9',10'-dione-4'-yl)-3-aminopropan-1-oxy (7%) polyphosphazene]. This material which is the precursor to PolyPZ-6, contains a much higher percentage of quinizarin functionality and will therefore demonstrate significantly higher optical absorption, leading to more effective laser ignition.) However, because this material is a solid, its application as an optical sensitizer is best effected by dissolving it in solvent, such as acetone or THF, and then coating this solution onto, for example, explosives and then evaporating the solvent before use. Alternatively this polymer may be blended with other energetic binders, such as, PolyPZ-7 in presence of a solvent (which is subsequently removed); this blended binder can then be used to formulate with explosives etc. thereby causing optical sensitisation. PolyPZ-5 may of course be converted to PolyPZ-6 and used in a similar fashion if it is desired to employ a product which does not undergo self-cure.

H.6. Confined Ignition of GUDN/PolyPZ-6

Pure GUDN (Guanylurea Dinitramide, FOX-12, GUDN—Class 2 (NSG 120, mean particle size 147 μm, EURENCO Bofors, Sweden) would not ignite even at the highest available laser power (44.5 W). This material was therefore formulated with 20 wt % of PolyPZ-6 (i.e. Q100) using the same procedure as described above for HNS. When this formulation was exposed to laser radiation (801 nm) under confined conditions (laser power 44.5 W, 0.8 mm dia spot size) the formulation ignited in the region where the laser impinged upon the sample, but there was no propagation of combustion through the remainder of the material. This result indicates the attainment of laser supported combustion—where the composition only burns sustainable whilst it is illuminated by the laser beam. This result probably reflects (in part) the high stability of GUDN, which makes it difficult to achieve sustainable ignition. The use of a higher power laser and/or an increased level of quinizarin substitution within the PolyPZ-6 should improve the ignitability of this formulation.

H.7. PolyPZ-15 [P-(2,2,2-trifluoroethan-1-oxy/5,6-dinitratohexan-1-oxy/3-ammonium (3-nitro-5-oxo-1,2,4-triazolonate) propan-1-oxy)polyphosphazene]

PolyPZ-15 [P-(2,2,2-trifluoroethan-1-oxy/5,6-dinitratohexan-1-oxy/3-ammonium (3-nitro-5-oxo-1,2,4-triazolonate) propan-1-oxy)polyphosphazene] represents another polyphosphazene which is able to undergo direct laser ignition, without the addition of a further optical sensitizer. This characteristic makes PolyPZ-15 capable of facilitating the laser ignition of high explosives when it is formulated with them. Thus, PolyPZ-15 [P-(2,2,2-trifluoroethan-1-oxy (25%)/5,6-dinitratohexan-1-oxy (55%)/3-ammonium (3-nitro-5-oxo-1,2,4-triazolonate) propan-1-oxy (20%)) polyphosphazene] ignited (unconfined) when irradiated for 100 ms at 801 nm, at a flux density of 3.9 kWcm$^{-2}$ without the addition of a further optical sensitizer. Similarly when GUDN was formulated with PolyPZ-15 [P-(2,2,2-trifluoroethan-1-oxy (25%)/5,6-dinitratohexan-1-oxy (55%)/3-ammonium (3-nitro-5-oxo-1,2,4-triazolonate) propan-1-oxy (20%)) polyphosphazene](80:20 w/w %) using a similar procedure to that described above for HNS and irradiated under the same conditions employed with the pure binder, the sample ignited, although the combustion did not propagate beyond the region illuminated by the laser beam. When this experiment was repeated using a 60:40 w/w % formulation of the same GUDN and PolyPZ-15 under similar conditions, the result was the same. In contrast, when pure GUDN was irradiated under these conditions it did not ignite. Thus laser supported combustion of these two GUDN formulations was achieved under these conditions due to the presence of PolyPZ-15. When a further sample of the same GUDN/PolyPZ-15 (80:20 wt %) formulation was confined within the apparatus detailed in FIG. 9 and irradiated for 300 ms (801 nm) again at a flux density of 3.9 kWcm$^{-2}$ a hole was burnt right through the sample, but the combustion still did not propagate into the bulk of the formulation. Thus laser supported combustion was again demonstrated with this sample, on this occasion under confined conditions. As in the case of GUDN/PolyPZ-6 the lack of propagation probably reflects the high intrinsic stability of GUDN. Higher flux densities and/or an increase in the percentage of NTO functionalities present within the polymer should promote the improved combustion of GUDN.

HNS IV was formulated with between 2.5 wt % and 20 wt % of PolyPZ-15 [P-(2,2,2-trifluoroethan-1-oxy (14%)/5,6-dinitratohexan-1-oxy (75%)/3-ammonium (3-nitro-5-oxo-1,2,4-triazolonate) propan-1-oxy (11%)) polyphosphazene using the same procedure employed above with PolyPZ-6. Laser ignition of these samples (unconfined) was achieved at 801 nm, although there was poor ignition reproducibility at the available power densities (Table 24). Nevertheless, once ignited combustion was found to be fully sustainable, with the sample continuing to burn after the end of the laser pulse. Improved reproducibility will require either an increase in the incident laser power or in the percentage of NTO functionalities present within the polymer. FIG. 14 compares the absorption at 801 nm of PolyPZ-15 [P-(2,2,2-trifluoroethan-1-oxy (14%)/5,6-dinitratohexan-1-oxy (75%)/3-ammonium (3-nitro-5-oxo-1,2,4-triazolonate) propan-1-oxy (11%)) polyphosphazene with that of PolyPZ-7 and its blends with PolyPZ-6. This figure clearly shows the reduced absorption of this PolyPZ-15 at 801 nm relative to that of the PolyPZ-6 blends. However, PolyPZ-15 derives its optical absorption (within the context of laser ignition) primarily from its NTO functionalities, which are also responsible for its energetic properties. Thus increasing the percentage of NTO groups present in this polymer in order to enhance its absorption is perfectly feasible, because this will simultaneously improve the binder's energy content. This is the opposite situation to that which prevails for PolyPZ-6, where the chromophoric groups are energetically 'inert' so increasing the percentage of these groups will detract from the binder's performance. Alternatively, a visible light source (e.g. a flash tube) which produces an output at shorter wavelength, where PolyPZ-15 has much higher absorption, would be much more effective at igniting this polymer. Table 24 shows data on the laser ignitibility parameters of HNS IV/PolyPZ-15

TABLE 24

| Weight % of PolyPZ-15 | Min. power density (kW cm$^{-2}$) | Ignition success rate (%) | Ignition delay (ms) | Sustainability |
|---|---|---|---|---|
| 2.5% | ~7.0 | ~20 | ~110 | yes |
| 5% | ~5.0 | ~20 | ~110 | yes |
| 10% | ~5.5 | ~30 | ~120 | yes |
| 20% | ~5.5 | ~30 | ~110 | yes |

I. Stab Sensitive Foam

A yet further embodiment of the present invention relates to the provision of a stab sensitive foam or delay fuse with benign hazard properties. Existing stab-sensitive compounds and formulations are usually very hazardous materials demonstrating primary explosive hazard sensitivity, whilst delay fuses typically employ gunpowder, which is highly spark sensitive, has limited intrinsic stability and is very sensitive to 'duding' by water.

Energetic polyphosphazenes described above can be made into a benign impact/stab sensitive ignitable foam. An example of this is foamed rubber-PolyPZ-23 which also has a progressive burn ('fuse') capability A sample of the product FR-PolyPZ-23, a moderately soft, flexible (water resistant) foamed rubber, with relatively small bubble size was cut into 25 mm by 10 mm strips (thickness ca 1.5 mm). Unexpectedly, when impacted with a hammer these strips ignited spontaneously and once ignited burnt progressively along their length to yield an expanded (rigid) black ash.

Thus, when strips of the foamed rubber FR-PolyPZ-23 (above) were hit vigorously at one end using a carpenter's hammer (with a soft steel striking head ca 800 g, 35 mm square) the rubber ignited in response to the impacts and burned progressively along its full length, at a rate of approximately one centimeter per second. Although smoke was evolved, no visible flame was produced during this combustion and after combustion an expanded (rigid) black ash remained. Several samples of FR-PolyPZ-23 were tested in this way and all ignited consistently under these conditions. Variation of this burn rate should be possible and the rate is most likely to be dependent upon a combination of the bubble size and the chemical composition of the rubber, particularly the intrinsic energy available from the FR-PolyPZ-23 formulation. This will be determined predominantly by the stoichiometry of the precursor PolyPZ-23, particularly the number of energetic groups (e.g. nitrate ester groups) present in this material. (An estimate of the available energy might usefully be determined, for example, by DSC).

During storage in the laboratory FR-PolyPZ-23 appeared stable and did not show any signs of instability or spontaneous reactivity. This observation, together with the requirement for vigorous impacting to effect ignition of FR-PolyPZ-23 indicates that this is a relatively safe compound which would be suitable as a benign impact/stab sensitive ignitable material. The steady combustion achieved once this material has been ignited implies that it could also be used as a fuse to provide a variable delay function. Ignition of FR-PolyPZ-23 was also effected using a hot Nichrome wire (0.2 mm diameter, ca 20 mm long, using a current of 2 amps at 12 volts—wire was glowing orange). In this case the material ignited and burnt with an extensive (luminous) flame front. Again combustion progressed steadily along the length of the sample, with a velocity similar to that previously observed from impact ignition. Application of a naked flame to FR-PolyPZ-23 also ignited the material, causing similar progressive combustion with a luminous flame front.

J. Direct Optically Ignitable Fuse

Because of the similarity of chemical routes employed in the preparation of precursors to PolyPZ-5/PolyPZ-6 and PolyPZ-23 it is possible to combine the direct optical ignitability functionality of PolyPZ-5/PolyPZ-6 with the progressive burn (and impact/stab sensitive ignitability) of PolyPZ-23, within a single polyphosphazene molecule. Thus, (for example) sequential reaction of PolyPZ-4 with i) 1,1'-carbonlydiimidazole/ethylene glycol (cf preparation of PolyPZ-23) in order to convert a limited proportion of the available free amino groups to hydroxyl groups and ii) leucoquinizarin (to react with the residual amine groups of preparation of PolyPZ-5 & PolyPZ-6) would yield a product possessing both optical sensitization (due to the presence of the 1-hydroxyanthracene-9,10-dione-4-yl moiety) and urethane curability via hydroxyl groups (cf PolyPZ-23). Any unused free amino groups could be 'capped off' using an isocyanate (cf conversion of PolyPZ5 to PolyPZ-6) if desired. Once cured into a foam (cf preparation of FR-PolyPZ-23 this material would be amenable to direct optical ignition (by laser or flash tube), or impact/stab ignition and would also provide a progressive burn (fuse) capability. Thus a single compound could provide both benign impact/stab ignitability, optical ignitability and a fuse function.

K. Summary of Compounds

The inventors have demonstrated inter alia: the synthesis of novel polyphosphazenes, some, of which are precursors to energetic polyphosphazenes, others are energetic polyphosphazenes. Also shown is how to cure some of these polyphosphazenes and a novel method of flow nitration with ultrasound. Furthermore, polyphosphazenes which are ignitable by light, such as laser light, have been made. Further still, a stab sensitive, foamed rubber polyphosphazene has been demonstrated.

For ease of reference, a list of the names of the polyphosphazenes referred to in this application are given below along with their chemical structures.

Structure, Designation and Name

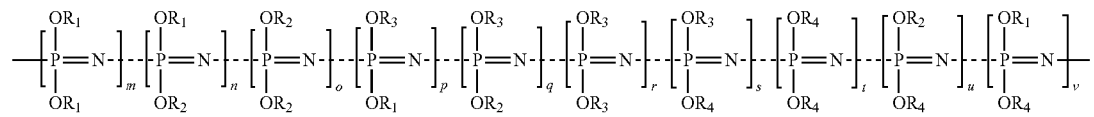

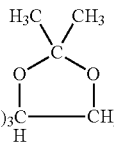

$R_1 = $ —$CH_2CF_3$,  $R_2 = $ —$(CH_2)(CH_2)_3C$—$CH_2$   $p = q = r = s = t = u = v = 0$

PolyPZ-1
[P-((2,2,2-trifluoroethan-1-oxy/4-(2',2'-dimethyl-1',3'-dioxolan-4'-yl)-butan-1-oxy)]

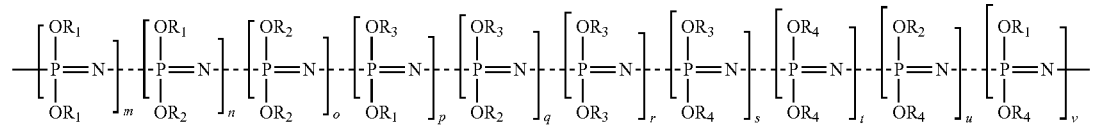

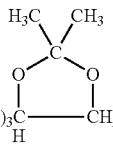

$R_1 = $ —$CH_2CF_3$,  $R_2 = $ —$(CH_2)(CH_2)_3C$—$CH_2$,  $R_3 = $ —$(CH_2)_3NH_2$,  $s = t = u = v = 0$

PolyPZ-2
[P-(2,2,2-trifluoroethan-1-oxy/4-(2',2'-dimethyl-1',3'-dioxolan-4'-yl)butan-1-oxy)/3-aminopropan-1-oxy polyphosphazene]

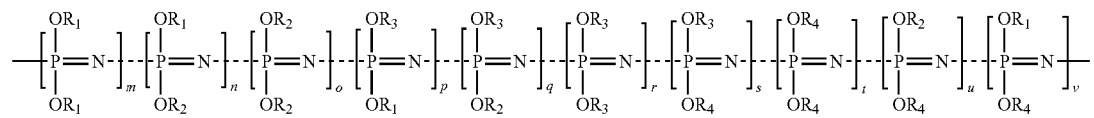

| Structure, Designation and Name |
|---|

$R_1 =$ —$CH_2CF_3$, $R_2 =$ —$(CH_2)_4CH(ONO_2)CH_2ONO_2$, $R_3 =$ —$(CH_2)_3\overset{+}{N}H_3\overset{-}{N}O_3$, $s = t = u = v = 0$ PolyPZ-3
[P-(2,2,2-trifluoroethan-1-oxy/5,6-dinitratohexan-1-oxy/3-ammonium(nitrate)propan-1-oxy)polyphosphazene]

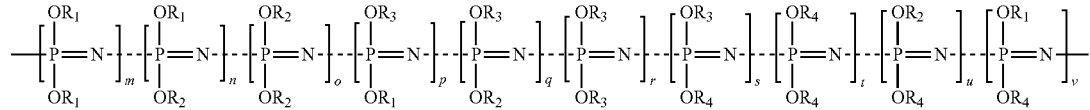

$R_1 =$ —$CH_2CF_3$, $R_2 =$ —$(CH_2)_4CH(ONO_2)CH_2ONO_2$, $R_3 =$ —$(CH_2)_3NH_2$, $s = t = u = v = 0$

PolyPZ-4
[P-(2,2,2-trifluoroethan-1-oxy/5,6-dinitratohexan-1-oxy/3-aminopropan-1-oxy)polyphosphazene]

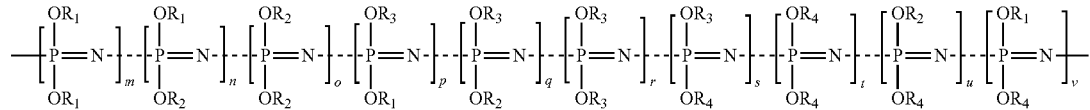

$R_1 =$ —$CH_2CF_3$, $R_2 =$ —$(CH_2)_4CH(ONO_2)CH_2ONO_2$, $R_3 =$ —$(CH_2)_3NH_2$, $R_4 =$

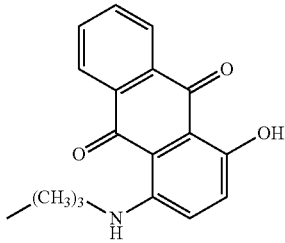

PolyPZ-5
[P-(2,2,2-trifluoroethan-1-oxy/(5,6-dinitratohexan-1-oxy/3-aminopropan-1-oxy/N-(1'-hydroxyanthracene-9',10'-dione-4'-yl)-3-aminopropan-1-oxy)polyphosphazene]

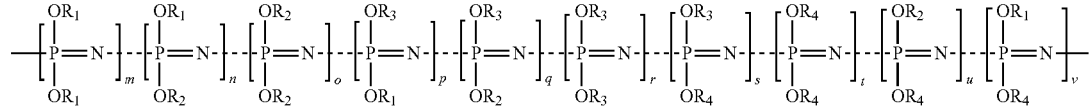

$R_1 =$ —$CH_2CF_3$, $R_2 =$ —$(CH_2)_4CH(ONO_2)CH_2ONO_2$, $R_3 =$ —$(CH_2)_3NHC(O)NH(CH_2)_5CH_3$ $R_4 =$

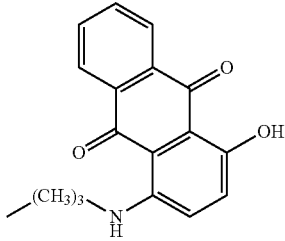

PolyPZ-6
[P-(2,2,2-trifluoroethan-1-oxy/(5,6-dinitratohexan-1-oxy/4,6-diaza-5-oxododecan-1-oxy/N-(1'-hydroxyanthracene-9',10'-dione-4'-yl)-3-aminopropan-1-oxy)polyphosphazene]

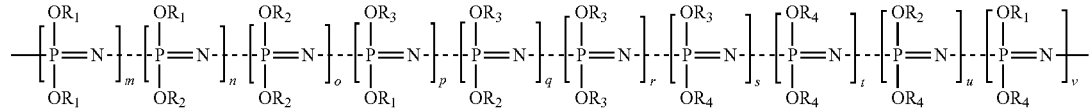

$R_1 =$ —$CH_2CF_3$, $R_2 =$ —$(CH_2)_4CH(ONO_2)CH_2ONO_2$, $p = q = r = s = t = u = v = 0$

PolyPZ-7
[P-(2,2,2-trifluoroethan-1-oxy/5,6-dinitratohexan-1-oxy)polyphosphazene]

-continued

Structure, Designation and Name $$-\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v-$$

$R_1 = -CH_2CF_3$, $R_2 = -CH_2C\underset{H}{\overset{\phantom{|}}{\phantom{C}}}\underset{\phantom{|}}{\overset{H_3C\phantom{xx}CH_3}{\underset{O\phantom{xxx}O}{\overset{\diagdown\phantom{x}\diagup}{C}}}}CH_2$, $p = q = r = s = t = u = v = 0$ PolyPZ-8
[P-(2,2,2-trifluroethan-1-oxy/4-(2',2'-dimethyl-1',3'-dioxolan-4'yl)-methan-1-oxy)
polyphosphazene]

$$-\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v-$$

$R_1 = -CH_2CF_3$, $R_2 = -CH_2CH(ONO_2)CH_2ONO_2$, $p = q = r = s = t = u = v = 0$

PolyPZ-8b
PolyPZ-8b [P-2,2,2-trifluoroethan-1-oxy/2,3-dinitratopropan-1-oxypolyphosphazene]

$$-\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v-$$

$$-\left[\begin{array}{c}OR_1\\|\\P=N\\|\\OR_5\end{array}\right]_w\left[\begin{array}{c}OR_2\\|\\P=N\\|\\OR_5\end{array}\right]_x\left[\begin{array}{c}OR_3\\|\\P=N\\|\\OR_5\end{array}\right]_y\left[\begin{array}{c}OR_4\\|\\P=N\\|\\OR_5\end{array}\right]_z\left[\begin{array}{c}OR_5\\|\\P=N\\|\\OR_5\end{array}\right]_k$$

$R_1 = -CH_2CF_3$, $R_2 = -CH_2CH(ONO_2)CH_2ONO_2$, $R_3 = -CH_2CH(ONO_2)CH_2OH$ $R_4 = -CH_2\underset{OH}{\overset{\phantom{|}}{C}H}CH_2(ONO_2)$, $R_5 = -CH_2\underset{OH}{\overset{\phantom{|}}{C}H}CH_2OH$ PolyPZ-8c
PolyPZ-8c [P-(2,2,2-trifluoroethan-1-oxy/2,3-dinitratopropan-1-oxy/2-hydroxy-3-nitrato-propan-1-
oxy/
3-hydroxy-2-nitrato-propan-1-oxy/2,3-dihydroxy-propan-1-oxy)polyphosphazene]

$$-\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v-$$

$R_1 = -CH_2CF_3$, $R_2 = -CH_2CH(ONO)_2CH_2ONO_2$, $R_3 = -CH_2\overset{H}{\underset{O}{\overset{\diagup\diagdown}{C}}}CH_2$, $s = t = u = v = 0$ PolyPZ-8d
PolyPZ-8d [P-(2,2,2-trifluoroethan-1-oxy/2,3-dinitratopropan-1-oxy/2,3-oxiranopropan-1-oxy)
polyphosphazene]

$$-\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v-$$

$R_1 = -CH_2CF_3$, $R_2 = -CH_2CH(ONO)_2CH_2ONO_2$, $R_3 = -CH_2\underset{OH}{\overset{\phantom{|}}{C}H}CH_2OH$  $s = t = u = v = 0$

| Structure, Designation and Name |
|---|

PolyPZ-8e
PolyPZ-8e [P-(2,2,2-trifluoroethan-1-oxy/2,3-dinitratopropan-1-oxy/2,3-dihydroxypropan-1-oxy)
polyphosphazene]

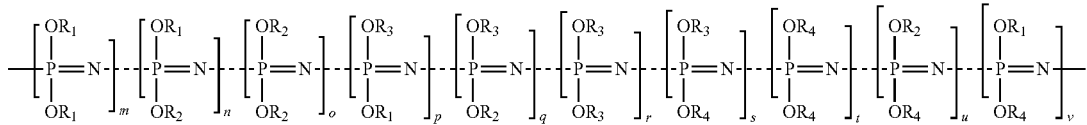

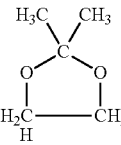

$R_1 = $ —CH$_2$CF$_3$,  $R_2 = $ —CH$_2$C(H)(—CH$_2$)—  (dioxolane),  $R_3 = $ —(CH$_2$)$_3$NH$_2$,  $s = t = u = v = 0$ PolyPZ-9
[P-(2,2,2-trifluoroethan-1-oxy/4-(2',2'-dimethyl-1',3'-dioxolan-4'-yl)-methan-1-oxy/3-aminopropan-
1-oxy)polyphosphazene]

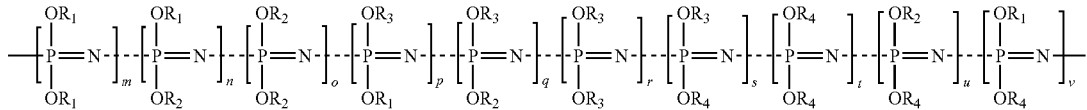

$R_1 = $ —CH$_2$CF$_3$,  $R_2 = $ —CH$_2$CH(ONO$_2$)CH$_2$ONO$_2$,  $R_3 = $ —(CH$_2$)$_3$NH$_3^+$NO$_3^-$,  $s = t = u = v = 0$

PolyPZ-10
[P-(2,2,2-trifluoroethan-1-oxy/2,3-dinitratopropan-1-oxy/3-ammonium(nitrate)propan-1-oxy)
polyphosphazene]

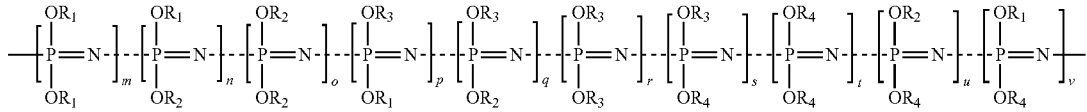

$R_1 = $ —CH$_2$CF$_3$, $R_2 = $ —CH$_2$CH(ONO$_2$)CH$_2$ONO$_2$, $R_3 = $ —(CH$_2$)$_3$NH$_2$, $s = t = u = v = 0$

PolyPZ-11
[P-(2,2,2-trifluoroethan-1-oxy/1,2-dinitratopropan-1-oxy/3-aminopropan-1-oxy)polyphosphazene]

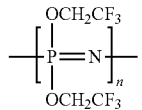

PolyPZ-12
PolyPZ-12 [P-bis(2,2,2-trifluoroethan-1-oxy)polyphosphazene]

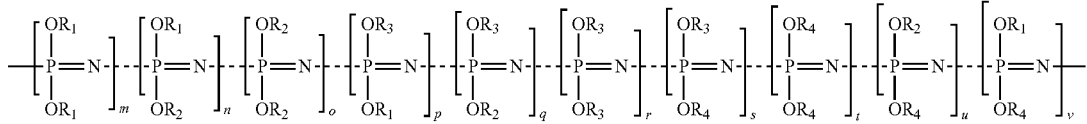

$R_1 = $ —CH$_2$CF$_3$,  $R_2 = $ —CH$_2$C(H)(OH)—CH$_2$(OH),  $R_3 = $ —(CH$_2$)$_3$NH$_2$,  $s = t = u = v = 0$

PolyPZ-13
[P-(2,2,2-trifluoroethan-1-oxy/2,3-dihydroxypropan-1-oxy/3-aminopropan-1-oxy)
polyphosphazene]

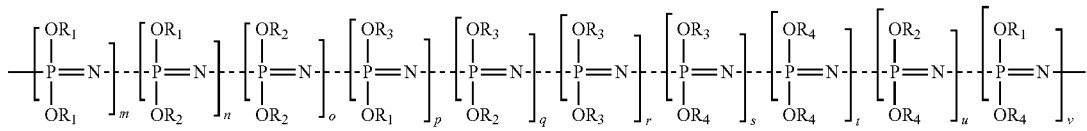

| Structure, Designation and Name |
|---|
| $R_1 = $ —CH$_2$CF$_3$, $R_2 = $ —(CH$_2$)(CH$_2$)$_3$C(H)(OH)—CH$_2$(OH), $R_3 = $ —(CH$_2$)$_3$NH$_2$, $s=t=u=v=0$ |
| PolyPZ-14 |
| [P-(2,2,2-trifluoroethan-1-oxy/5,6-dihydroxyhexan-1-oxy/3-aminopropan-1-oxy)polyphosphazene] |
| 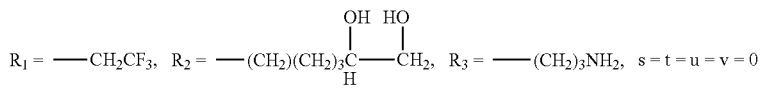 |
| $R_1 = $ —CH$_2$CF$_3$, $R_2 = $ —(CH$_2$)$_4$CH(ONO$_2$)CH$_2$ONO$_2$, $R_3 = $ —(CH$_2$)$_3$NH$_3^\oplus$ · [triazolonate]$^\ominus$, $s=t=u=v=0$ |
| PolyPZ-15 |
| [P-(2,2,2-trifluoroethan-1-oxy/5,6-dinitratohexan-1-oxy/3-ammonium (3-nitro-5-oxo-1,2,4-triazolonate)propan-1-oxy)polyphosphazene] |
| 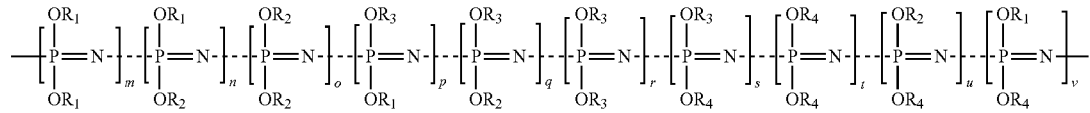 |
| $R_1 = $ —CH$_2$CF$_3$, $R_2 = $ —(CH$_2$)$_4$CH(ONO$_2$)CH$_2$ONO$_2$, $R_3 = $ [butyl-urea-methylpyrimidinone] |
| $s=t=u=v=0$ |
| PolyPZ-16 |
| [P-(2,2,2-trifluoroethan-1-oxy/5,6-dinitratohexan-1-oxy/6-(1',2'-dihydro-1'-methyl-2'-oxopyrimidin-4'yl)-4,6-diaza-5-oxo-hexan-1-oxy)polyphosphazene] |
| 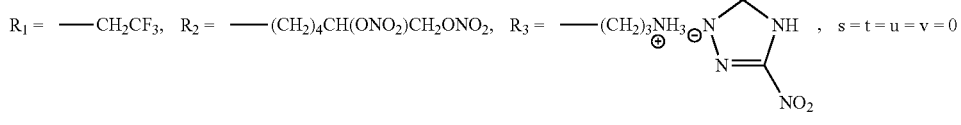 |
| 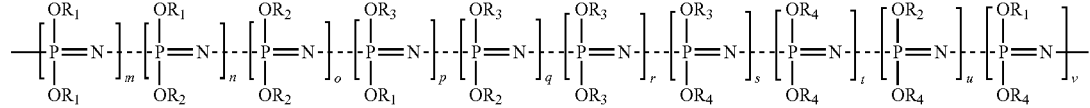 |
| $R_1 = $ —CH$_2$CF$_3$, $R_2 = $ —CH$_2$CH(ONO$_2$)CH$_2$ONO$_2$, $R_3 = $ [butyl-urea-methylpyrimidinone] |
| $s=t=u=v=0$ |
| PolyPZ-17 |
| [P-(2,2,2-trifluoroethan-1-oxy/2,3-dinitratopropan-1-oxy/6-(1',2'-dihydro-1'-methyl-2'-oxopyrimidin-4'yl)-4,6-diaza-5-oxo-hexan-1-oxy)polyphosphazene] |
| 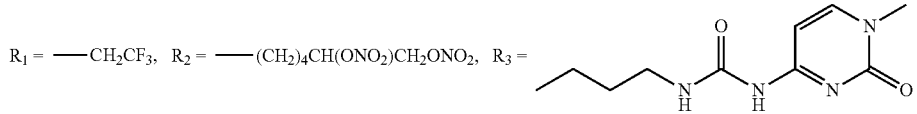 |
| 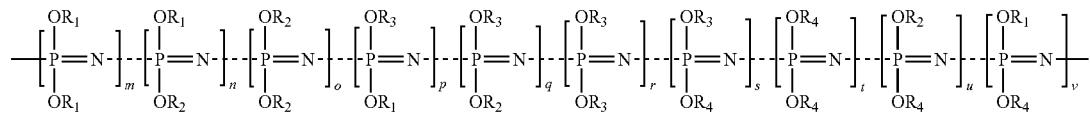 |
| 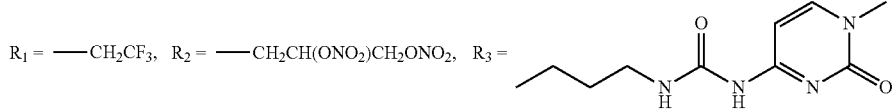 |
| 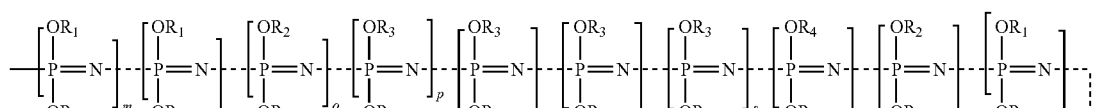 |
| 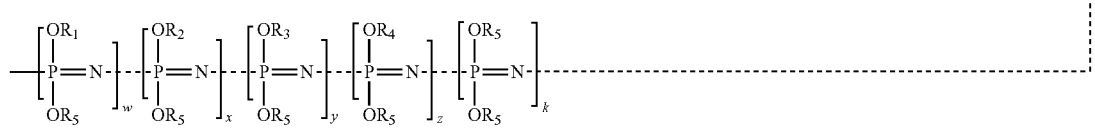 |

| Structure, Designation and Name |
|---|

$R_1 =$ —$CH_2CF_3$, $R_2 =$ —$(CH_2)_4CH(ONO_2)CH_2ONO_2$, $R_3 =$ —$(CH_2)_4CH(ONO)_2CH_2OC(O)H$ $R_4 =$ —$(CH_2)_4CHCH_2(ONO_2)$, $R_5 =$ —$(CH_2)_4CHCH_2OC(O)H$
    　　　　　|　　　　　　　　　　　　　　　　|
    　　　OC(O)H　　　　　　　　　　　　OC(O)H

PolyPZ-18
[P-(2,2,2-trifluoroethan-1-oxy/5,6-dinitratohexan-1-oxy/5-formyl-6-nitrato-hexan-1-oxy/
6-formyl-5-nitrato-hexan-1-oxy/5,6-diformyl-hexan-1-oxy)polyphosphazene]

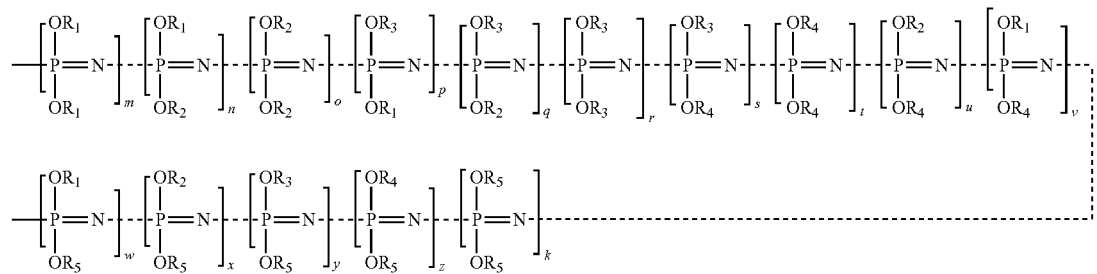

$R_1 =$ —$CH_2CF_3$, $R_2 =$ —$(CH_2)_4CH(ONO_2)CH_2ONO_2$, $R_3 =$ —$(CH_2)_4CH(ONO)_2CH_2OH$ $R_4 =$ —$(CH_2)_4CHCH_2(ONO_2)$, $R_5 =$ —$(CH_2)_4CHCH_2OH$
    　　　　　|　　　　　　　　　　　　　　　　|
    　　　　OH　　　　　　　　　　　　　　OH

PolyPZ-19
[P-(2,2,2-trifluoroethan-1-oxy/5,6-dinitratohexan-1-oxy/5-hydroxy-6-nitrato-hexan-1-oxy/
6-hydroxy-5-nitrato-hexan-1-oxy/5,6-dihydroxy-hexan-1-oxy)polyphosphazene]

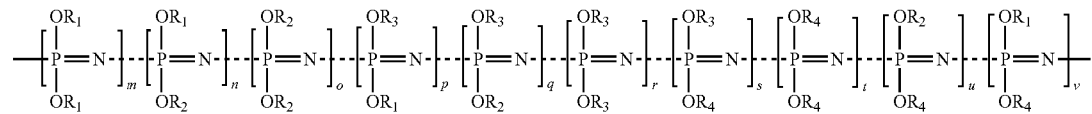

$R_1 =$ —$CH_2CF_3$, $R_2 =$ —$(CH_2)_4CH(ONO_2)CH_2ONO_2$, $R_3 =$ —$(CH_2)_4\overset{H}{C}\!\!-\!\!\underset{O}{\overset{\diagdown\diagup}{\phantom{O}}}\!\!CH_2$, $s = t = u = v = 0$ PolyPZ-20
[P-(2,2,2-trifluoroethan-1-oxy/5,6-dinitratohexan-1-oxy/5,6-oxiranohexan-1-oxy)
polyphosphazene]

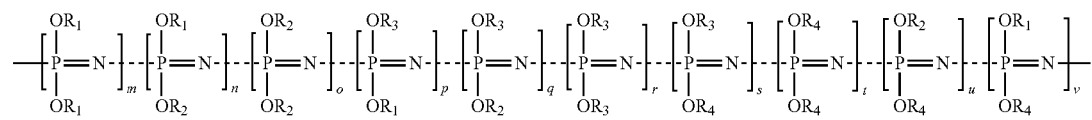

$R_1 =$ —$CH_2CF_3$, $R_2 =$ —$(CH_2)_4CH(ONO)_2CH_2ONO_2$, $R_3 =$ —$(CH_2)_4CHCH_2OH$  $s = t = u = v = 0$
　　　　　　　　　　　　　　　　　　　　　　　　　　　　　　　　　　　　　　　　　　　　　|
　　　　　　　　　　　　　　　　　　　　　　　　　　　　　　　　　　　　　　　　　　　　　OH

PolyPZ-21
[P-(2,2,2-trifluoroethan-1-oxy/5,6-dinitratohexan-1-oxy/5,6-dihydroxyhexan-1-oxy)
polyphosphazene]:

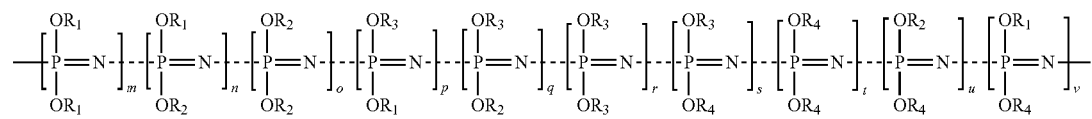

$s = t = u = v = 0$ $R_1 =$ —$CH_2CF_3$, $R_2 =$ —$(CH_2)_4CH(ONO_2)CH_2ONO_2$, $R_3 =$ —$(CH_2)_3$—$\underset{H}{N}$—$\overset{O}{\overset{\|}{C}}$—$\underset{\phantom{N}}{N}\!\!\diagdown\!\!\underset{N}{\phantom{N}}$

| Structure, Designation and Name |
|---|

PolyPZ-22
PolyPZ-22 [P-(2,2,2-trifluoroethan-1-oxy/5,6-dinitratohexan-1-oxy/
4-aza-5-(1')-imidazyl-5-oxopentan-1-oxy)polyphosphazene]

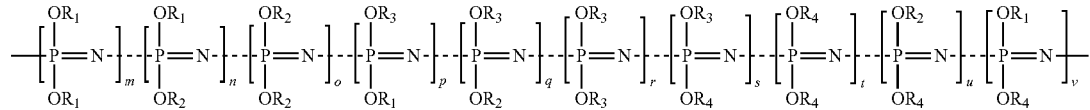

$s = t = u = v = 0$

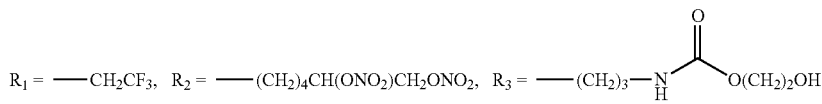

PolyPZ-23
[P-(2,2,2-trifluoroethan-1-oxy/5,6-dinitratohexan-1-oxy/4-aza-5-oxo-6-oxa-8-hydroxyoctan-1-oxy)
polyphosphazene]

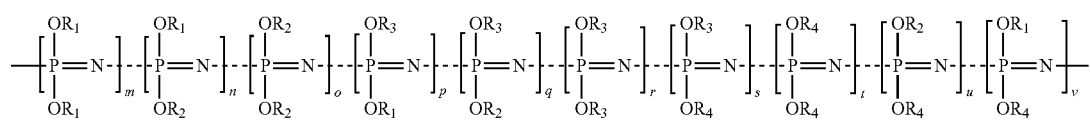

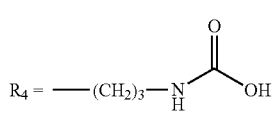

PolyPZ-24
P-(2,2,2-trifluoroethan-1-oxy/5,6-dinitratohexan-1-oxy/4-aza-10-hydroxy-5-oxo-6-oxa-8,8,9,9-
tetrafluorodecan-1-oxy/
4-aza-5-hydroxy-5-oxopentan-1-oxy)polyphosphazene]

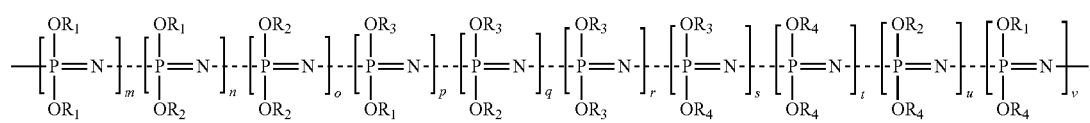

$s = t = u = v = 0$

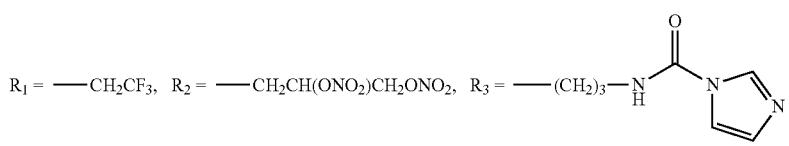

PolyPZ-25
[P-(2,2,2-trifluoroethan-1-oxy/-2,3-dinitrato-propan-1-oxy/4-aza-5-(1')-imidazoyl-5-oxopentan-1-
oxy)polyphosphazene]

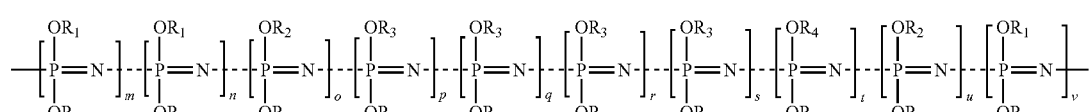

$s = t = u = v = 0$

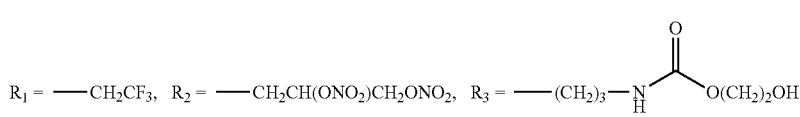

| Structure, Designation and Name |
|---|

PolyPZ-26
[P-(2,2,2-trifluoroethan-1-oxy/5,6-dinitratopropan-1-oxy/4-aza-5-oxo-6-oxa-8-hydroxyoctan-1-oxy) polyphosphazene]

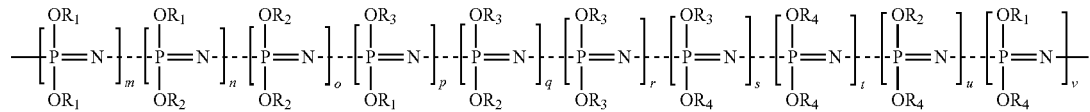

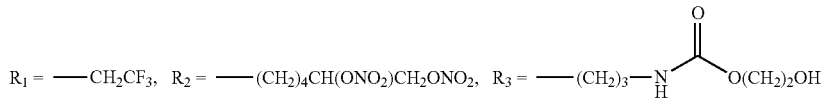

$R_4 =$

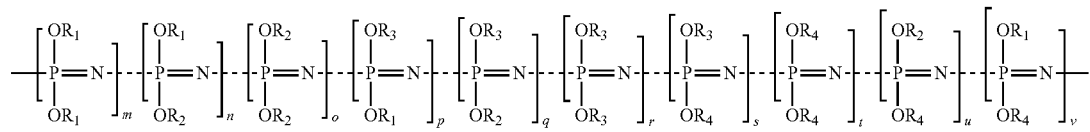

PolyPZ-27
[P-(2,2,2-trifluoroethan-1-oxy/5,6-dinitratohexan-1-oxy/4-aza-5-oxo-6-oxa-8-hydroxyoctan-1-oxy/ 6-(1',2'-dihydro-1'-methyl-2'-oxopyrimidin-4'yl)-4,6-diaza-5-oxo-hexan-1-oxy)polyphosphazene]

$R_1 = \text{—CH}_2\text{CF}_3$, $R_2 = \text{—(CH}_2)_2\text{NHCH}_3$, $p = q = r = s = t = u = v = 0$ PolyPZ-28
[P-(2,2,2-trifluoroethan-1-oxy/2-(methylamino)ethan-1-oxy)polyphosphazene]

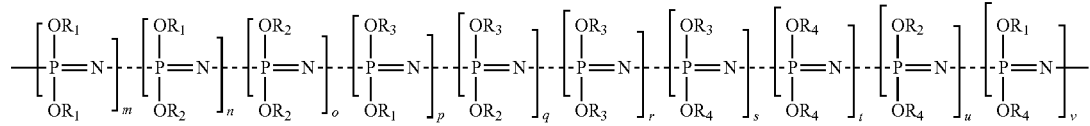

$R_1 = \text{—CH}_2\text{CF}_3$, $R_2 = \text{—(CH}_2)_2\text{NHCH}_2\text{CH}_3$, $p = q = r = s = t = u = v = 0$ PolyPZ-29
[P-(2,2,2-trifluoroethan-1-oxy/2-(ethylamino)ethan-1-oxy)polyphosphazene]

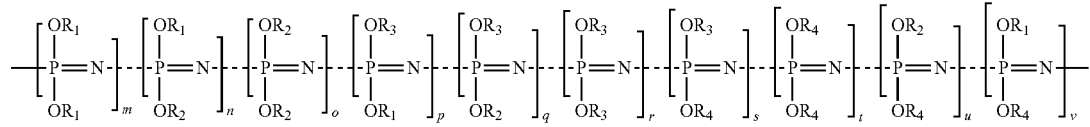

$R_1 = \text{—CH}_2\text{CF}_3$, $R_2 = \text{—(CH}_2)_2\text{NH(CH}_2)_2\text{CH}_3$, $p = q = r = s = t = u = v = 0$ PolyPZ-30
[P-(2,2,2-trifluoroethan-1-oxy/2-(propylamino)ethan-1-oxy)polyphosphazene]

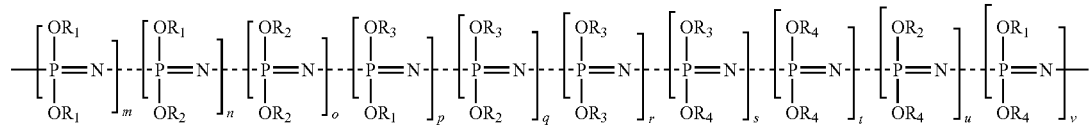

$R_1 = \text{—CH}_2\text{CF}_3$, $R_2 = \text{—(CH}_2)_2\text{NH(CH}_2)_3\text{CH}_3$, $p = q = r = s = t = u = v = 0$ PolyPZ-31
[P-(2,2,2-trifluoroethan-1-oxy/2-butylaminoethan-1-oxy)polyphosphazene]

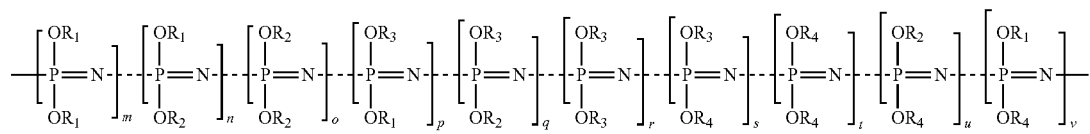

| Structure, Designation and Name |
|---|

$R_1 = $ —$CH_2CF_3$, $R_2 = $ —$(CH_2)_3NH_2$, $p = q = r = s = t = u = v = 0$

PolyPZ-32

[P-(2,2,2-trifluoroethan-1-oxy/3-aminopropan-1-oxy)polyphosphazene]

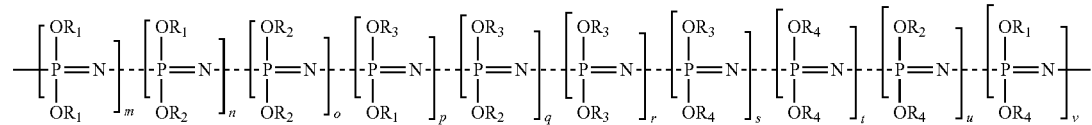

$R_1 = $ —$CH_2CF_3$, $R_2 = $ —$(CH_2)_3NHC(O)CH_3$ $p = q = r = s = t = u = v = 0$

PolyPZ-33

[P-(2,2,2-trifluoroethan-1-oxy/N-acetyl-3-aminopropan-1-oxy)polyphosphazene]

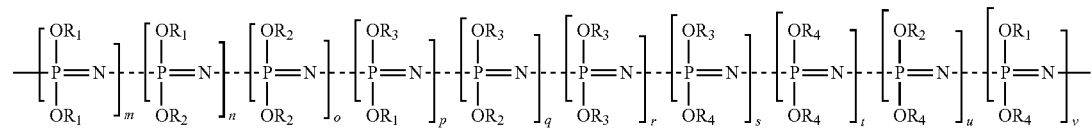

$R_1 = $ —$CH_2CF_3$, $R_2 = $ —$(CH_2)_2N(CH_3)C(O)CH_3$, $p = q = r = s = t = u = v = 0$

PolyPZ-34

[P-(2,2,2-trifluoroethan-1-oxy/N-acetyl-2-(methylamino)ethan-1-oxy)polyphosphazene]

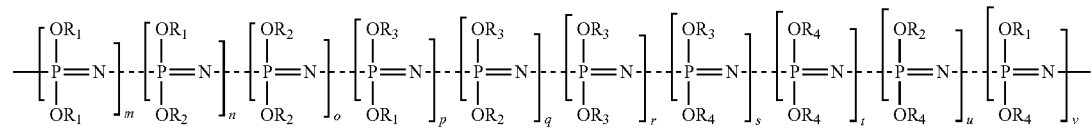

$R_1 = $ —$CH_2CF_3$, $R_2 = $ —$(CH_2)_2\overset{+}{N}H_2[N(NO_2)_2^-]CH_3$, $p = q = r = s = t = u = v = 0$ PolyPZ-35

[P-(2,2,2-trifluoroethan-1-oxy/2-methylammonium(dinitramide)ethan-1-oxy)polyphosphazene]

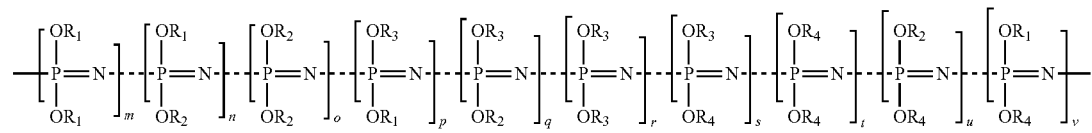

$R_1 = $ —$CH_2CF_3$, $R_2 = $ —$(CH_2)_2\overset{+}{N}H_2(NO_3^-)CH_3$, $p = q = r = s = t = u = v = 0$ PolyPZ-36

[P-(2,2,2-trifluoroethan-1-oxy/2-methylammonium(nitrate)ethan-1-oxy)polyphosphazene]

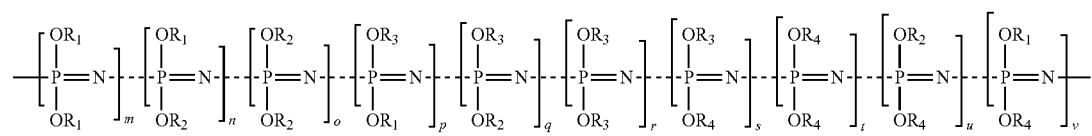

$R_1 = $ —$CH_2CF_3$, $R_2 = $ —$(CH_2)_3\overset{+}{N}H_3[N(NO_2)_2]^-$ $p = q = r = s = t = u = v = 0$ PolyPZ-37

[P-(2,2,2-trifluoroethan-1-oxy/3-ammonium(dinitramide)propan-1-oxy)polyphosphazene]

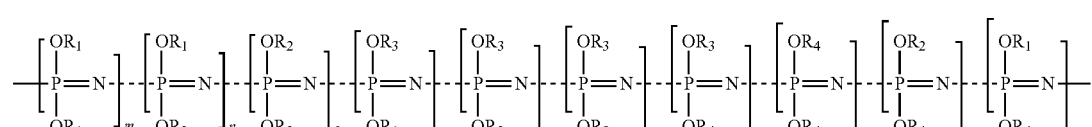

$R_1 = $ —$CH_2CF_3$, $R_2 = $ —$(CH_2)_3\overset{+}{N}H_3(NO_3^-)$ $p = q = r = s = t = u = v = 0$ -continued

| Structure, Designation and Name |
|---|

PolyPZ-38
[P-(2,2,2-trifluoroethan-1-oxy/3-ammonium(nitrate)propan-1-oxy)polyphosphazene]:

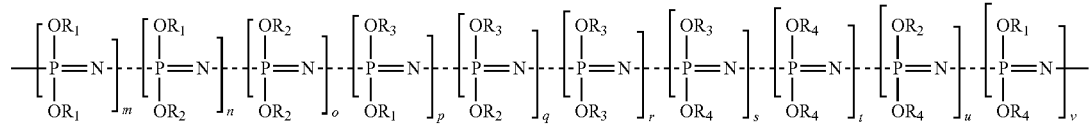

$R_1 = $ —CH$_2$CF$_3$,   $R_2 = $ —(CH$_2$)$_3$$\overset{+}{N}$H$_2$[N($\overset{-}{NO_2}$)$_2$](CH$_2$)$_3$CH$_3$   $p = q = r = s = t = u = v = 0$ PolyPZ-39
[P-(2,2,2-trifluoroethan-1-oxy/2-butylammonium(dinitramide)ethan-1-oxy)polyphosphazene]

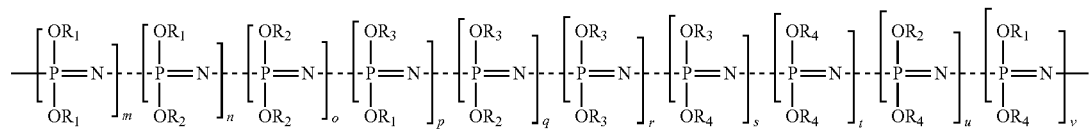

$R_1 = $ —CH$_2$CF$_3$,   $R_2 = $ —(CH$_2$)$_3$$\overset{+}{N}$H$_2$($\overset{-}{NO_3}$)(CH$_2$)$_3$CH$_3$,   $p = q = r = s = t = u = v = 0$ PolyPZ-40
[P-(2,2,2-trifluoroethan-1-oxy/2-butylammonium(nitrate)ethan-1-oxy)polyphosphazene]

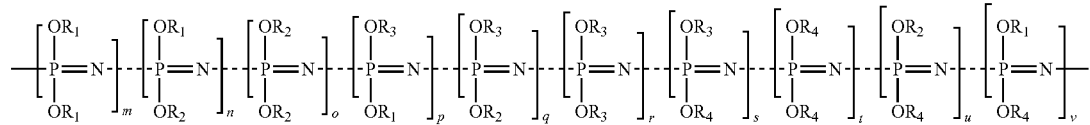

$R_1 = $ —CH$_2$CF$_3$,   $R_2 = $ —(CH$_2$)$_2$$\overset{+}{N}$H$_2$[N($\overset{-}{NO_2}$)$_2$]CH$_2$CH$_3$   $p = q = r = s = t = u = v = 0$ PolyPZ-41
[P-(2,2,2-trifluoroethan-1-oxy/2-ethylammonium(dinitramide)ethan-1-oxy)polyphosphazene]

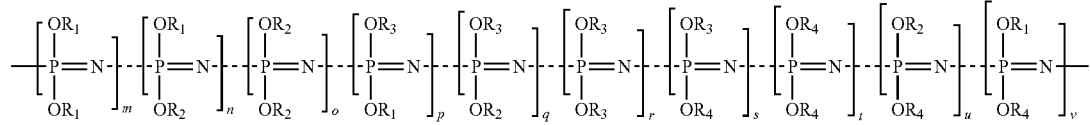

$R_1 = $ —CH$_2$CF$_3$,   $R_2 = $ —(CH$_2$)$_2$$\overset{+}{N}$H$_2$[N($\overset{-}{NO_2}$)$_2$](CH$_2$)$_2$CH$_3$,   $p = q = r = s = t = u = v = 0$ PolyPZ-42
[P-(2,2,2-trifluoroethan-1-oxy/2-propylammonium(dinitramide)ethan-1-oxy)polyphosphazene]

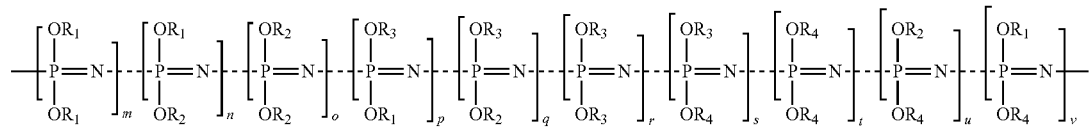

$R_1 = $ —CH$_2$CF$_3$,   $R_2 = $ —(CH$_2$)$_2$$\overset{+}{N}$H$_2$($\overset{-}{NO_3}$)CH$_2$CH$_3$,   $p = q = r = s = t = u = v = 0$ PolyPZ-43
[P-(2,2,2-trifluoroethan-1-oxy/2-ethylammonium(nitrate)ethan-1-oxy)polyphosphazene)

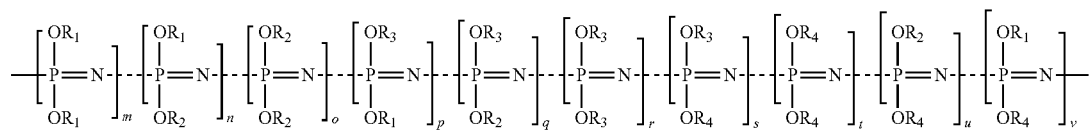

$R_1 = $ —CH$_2$CF$_3$,   $R_2 = $ —(CH$_2$)$_2$$\overset{+}{N}$H$_2$($\overset{-}{NO_3}$)(CH$_2$)$_2$CH$_3$,   $p = q = r = s = t = u = v = 0$

| Structure, Designation and Name |
|---|

PolyPZ-44
[P-(2,2,2-trifluoroethan-1-oxy/2-propylammonium(nitrate)ethan-1-oxy)polyphosphazene]

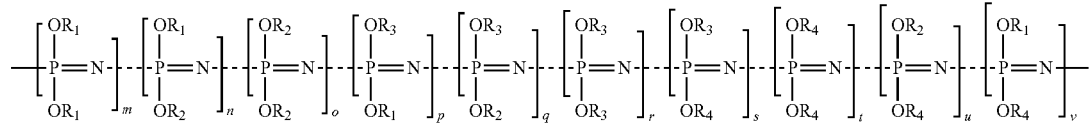

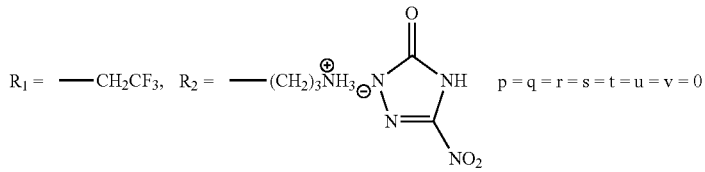

PolyPZ-45
[P-(2,2,2-trifluoroethan-1-oxy/3-ammonium(3-nitro-5-oxo-1,2,4-triazolonate)propan-1-oxy)
polyphosphazene]

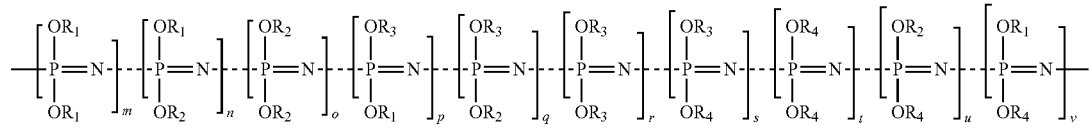

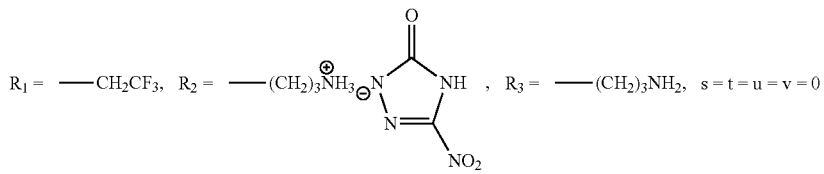

PolyPZ-46
[P-(2,2,2-trifluoroethan-1-oxy/3-aminopropan-1-oxy/3-ammonium(3-nitro-5-oxo-1,2,4-
triazolonate)
propan-1-oxy)polyphosphazene]

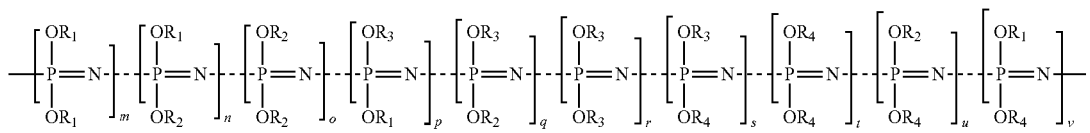

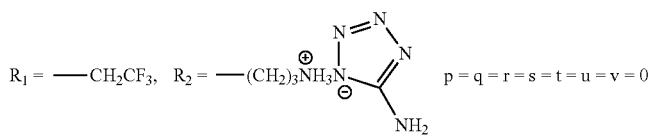

PolyPZ-47
[P-(2,2,2-trifluoroethan-1-oxy/3-ammonium(5-aminotetrazolate)propan-1-oxy)polyphosphazene]

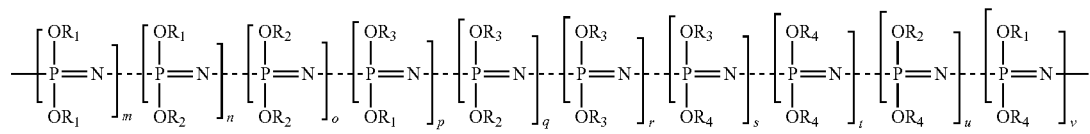

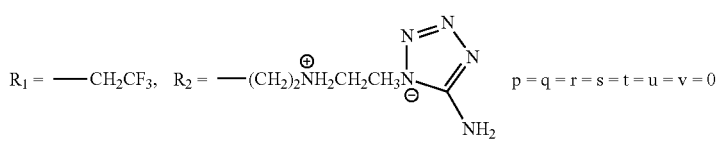

| Structure, Designation and Name |
|---|

PolyPZ-48
[P-(2,2,2-trifluoroethan-1-oxy/2-ethylammonium(5-aminotetrazolate)ethan-1-oxy)
polyphosphazene]

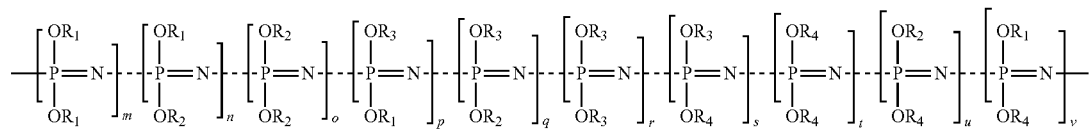

$R_1 =$ —CH$_2$CF$_3$,  $R_2 =$ —(CH$_2$)$_2\overset{\oplus}{N}H_2$CH$_2$CH$_3$N... (5-aminotetrazolate)  $p = q = r = s = t = u = v = 0$ PolyPZ-49
[P-(2,2,2-trifluoroethan-1-oxy/2-propylammonium(5-aminotetrazolate)ethan-1-oxy)
polyphosphazene]

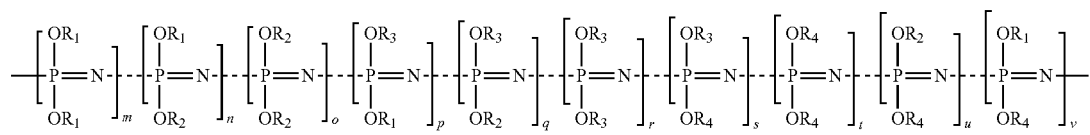

$R_1 =$ —CH$_2$CF$_3$,  $R_2 =$ —(CH$_2$)$_3\overset{\oplus}{N}H_3 \ominus$O—(picrate)  $p = q = r = s = t = u = v = 0$ PolyPZ-50
[P-(2,2,2-trifluoroethan-1-oxy/3-ammonium(picrate)propan-1-oxy)polyphosphazene]

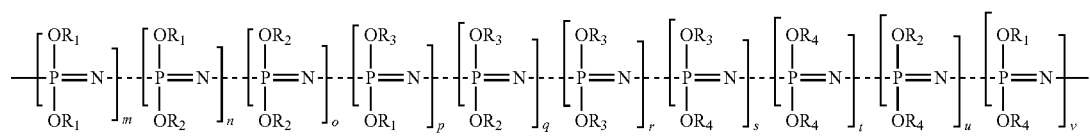

$R_1 =$ —CH$_2$CF$_3$,  $R_2 =$ —(CH$_2$)$_3\overset{\oplus}{N}H_3 \ominus$O—(3,5-diaminopicrate)  $p = q = r = s = t = u = v = 0$ PolyPZ-51
[P-(2,2,2-trifluoroethan-1-oxy/3-ammonium(3,5-diaminopicrate)propan-1-oxy)polyphosphazene]

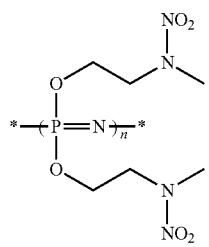

| Structure, Designation and Name |
|---|
PolyPZ-52
[P-bis(3-nitro-3-azabutan-1-oxy)polyphosphazene]
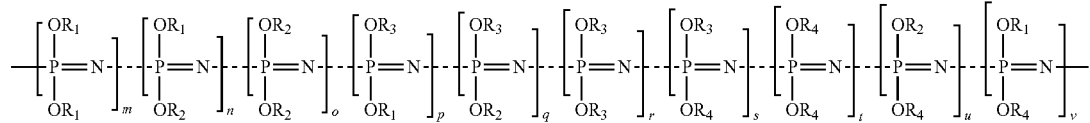
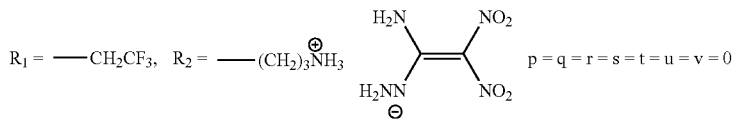
PolyPZ-53
[P-(2,2,2-trifluoroethan-1-oxy/3-ammonium (1'-amino-1'-hydrazino-2',2'-dinitroethenate)propan-1-oxy)polyphosphazene]
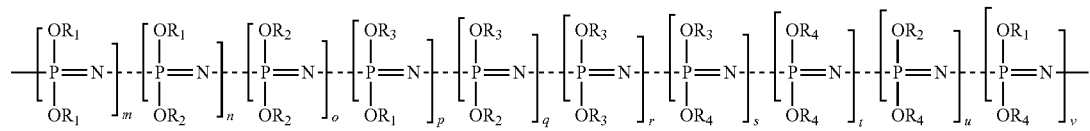
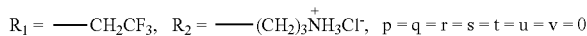
PolyPZ-55
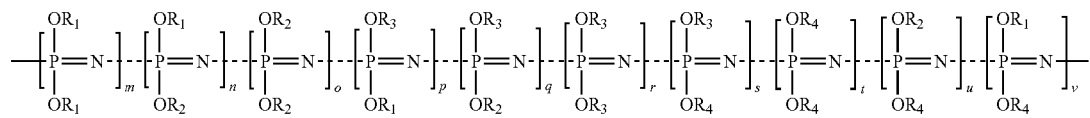
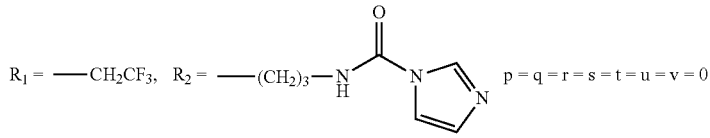
PolyPZ-56
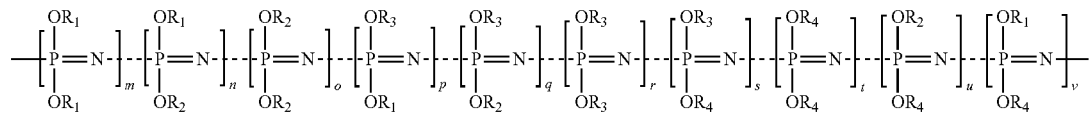
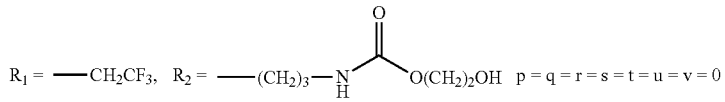
PolyPZ-57
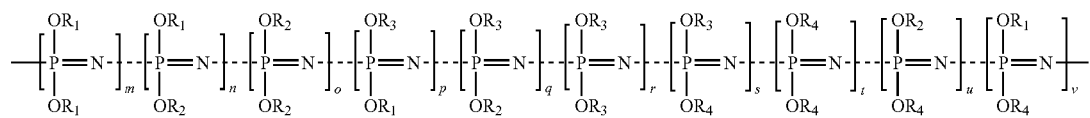
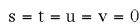
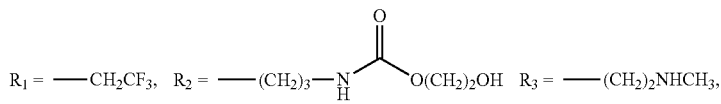

| Structure, Designation and Name |
|---|
| PolyPZ-58 |

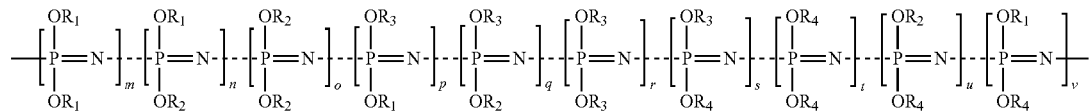

$s = t = u = v = 0$

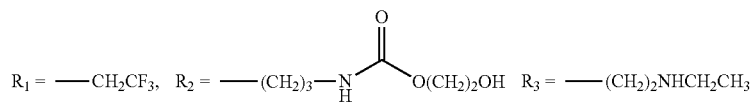

$R_1 = -CH_2CF_3$, $R_2 = -(CH_2)_3-\underset{H}{N}-\overset{O}{\overset{\|}{C}}-O(CH_2)_2OH$  $R_3 = -(CH_2)_2NHCH_2CH_3$ PolyPZ-59

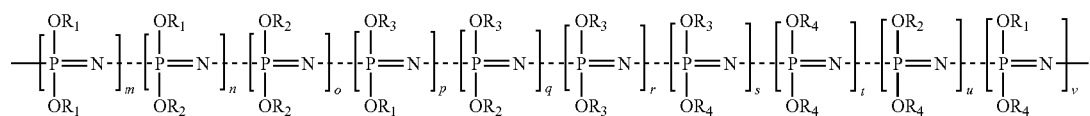

$s = t = u = v = 0$

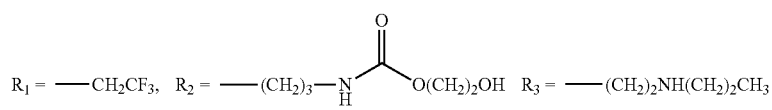

$R_1 = -CH_2CF_3$, $R_2 = -(CH_2)_3-\underset{H}{N}-\overset{O}{\overset{\|}{C}}-O(CH_2)_2OH$  $R_3 = -(CH_2)_2NH(CH_2)_2CH_3$ PolyPZ-60

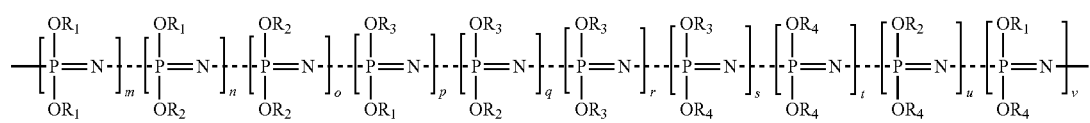

$s = t = u = v = 0$

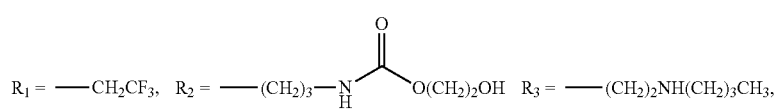

$R_1 = -CH_2CF_3$, $R_2 = -(CH_2)_3-\underset{H}{N}-\overset{O}{\overset{\|}{C}}-O(CH_2)_2OH$  $R_3 = -(CH_2)_2NH(CH_2)_3CH_3$, PolyPZ-61

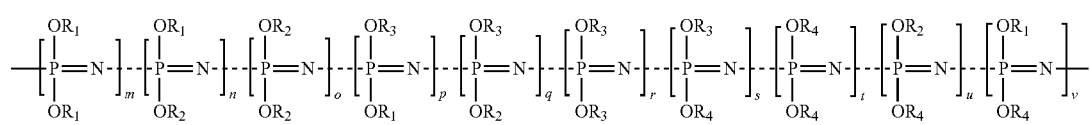

$s = t = u = v = 0$

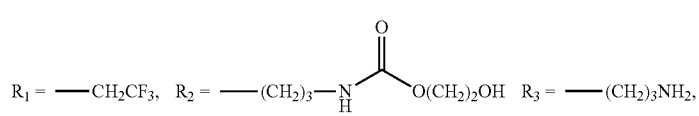

$R_1 = -CH_2CF_3$, $R_2 = -(CH_2)_3-\underset{H}{N}-\overset{O}{\overset{\|}{C}}-O(CH_2)_2OH$  $R_3 = -(CH_2)_3NH_2$, PolyPZ-62

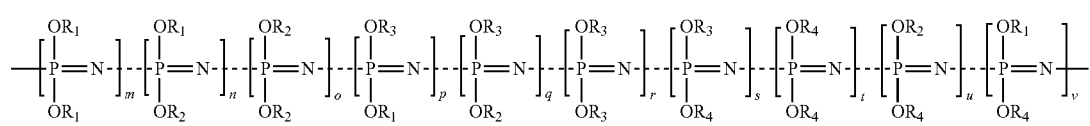

$s = t = u = v = 0$

-continued

Structure, Designation and Name $R_1 = -CH_2CF_3$, $R_2 = -(CH_2)_3-\underset{H}{N}-\overset{O}{\overset{\|}{C}}-O(CH_2)_2OH$  $R_3 = -(CH_2)_2\overset{+}{N}H_2CH_3[N(NO_2)_2]^-$ PolyPZ-63

$$\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v$$

$s = t = u = v = 0$ $R_1 = -CH_2CF_3$, $R_2 = -(CH_2)_3-\underset{H}{N}-\overset{O}{\overset{\|}{C}}-O(CH_2)_2OH$  $R_3 = -(CH_2)_2\overset{+}{N}H_2CH_3(NO_3)^-$ PolyPZ-64

$$\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v$$

$s = t = u = v = 0$ $R_1 = -CH_2CF_3$, $R_2 = -(CH_2)_3-\underset{H}{N}-\overset{O}{\overset{\|}{C}}-O(CH_2)_2OH$  $R_3 = -(CH_2)_2\overset{+}{N}H_2CH_2CH_3[N(NO_2)_2]^-$ PolyPZ-65

$$\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v$$

$s = t = u = v = 0$ $R_1 = -CH_2CF_3$, $R_2 = -(CH_2)_3-\underset{H}{N}-\overset{O}{\overset{\|}{C}}-O(CH_2)_2OH$  $R_3 = -(CH_2)_2\overset{+}{N}H_2CH_2CH_3(NO_3)^-$ PolyPZ-66

$$\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v$$

$s = t = u = v = 0$ $R_1 = -CH_2CF_3$, $R_2 = -(CH_2)_3-\underset{H}{N}-\overset{O}{\overset{\|}{C}}-O(CH_2)_2OH$  $R_3 = -(CH_2)_2\overset{+}{N}H_2(CH_2)_2CH_3[N(NO_2)_2]^-$ PolyPZ-67

$$\left[\begin{array}{c}OR_1\\|\\P=N\\|\\OR_1\end{array}\right]_m\left[\begin{array}{c}OR_1\\|\\P=N\\|\\OR_2\end{array}\right]_n\left[\begin{array}{c}OR_2\\|\\P=N\\|\\OR_2\end{array}\right]_o\left[\begin{array}{c}OR_3\\|\\P=N\\|\\OR_1\end{array}\right]_p\left[\begin{array}{c}OR_3\\|\\P=N\\|\\OR_2\end{array}\right]_q\left[\begin{array}{c}OR_3\\|\\P=N\\|\\OR_3\end{array}\right]_r\left[\begin{array}{c}OR_3\\|\\P=N\\|\\OR_4\end{array}\right]_s\left[\begin{array}{c}OR_4\\|\\P=N\\|\\OR_4\end{array}\right]_t\left[\begin{array}{c}OR_2\\|\\P=N\\|\\OR_4\end{array}\right]_u\left[\begin{array}{c}OR_1\\|\\P=N\\|\\OR_4\end{array}\right]_v$$

$s = t = u = v = 0$

| Structure, Designation and Name |
|---|
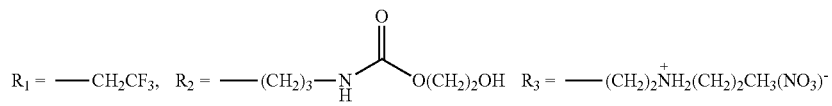
PolyPZ-68
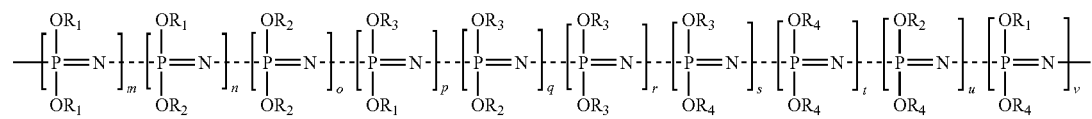
$s = t = u = v = 0$
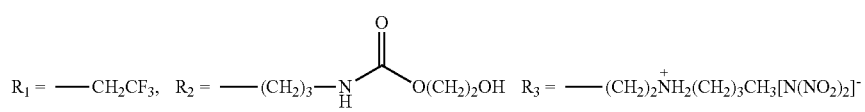
PolyPZ-69
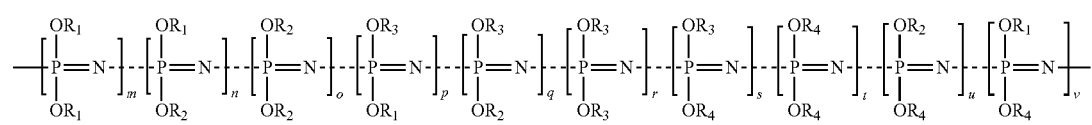
$s = t = u = v = 0$
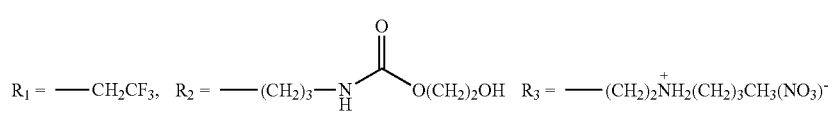
PolyPZ-70
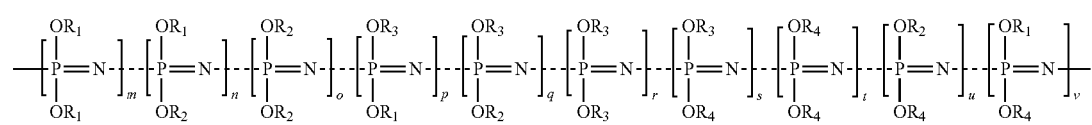
$s = t = u = v = 0$
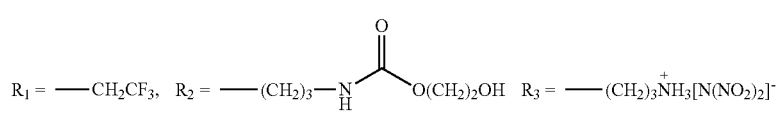
PolyPZ-71
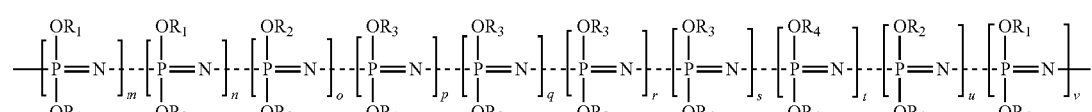
$s = t = u = v = 0$
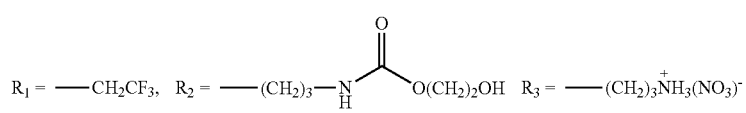

| Structure, Designation and Name |
|---|
| PolyPZ-72 |

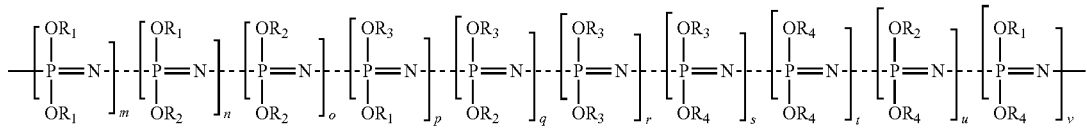

PolyPZ-73d  $R_1 = $ —CH$_2$CF$_3$,  $R_2 = $ —(CH$_2$)$_2$N$^+$H$_2$[N(NO$_2^-$)$_2$]CH$_3$,  $R_3 = $ —(CH$_2$)$_2$NHCH$_3$,
$s = t = u = v = 0$
PolyPZ-73n  $R_1 = $ —CH$_2$CF$_3$,  $R_2 = $ —(CH$_2$)$_2$N$^+$H$_2$(NO$_3^-$)CH$_3$,  $R_3 = $ —(CH$_2$)$_2$NHCH$_3$,
$s = t = u = v = 0$

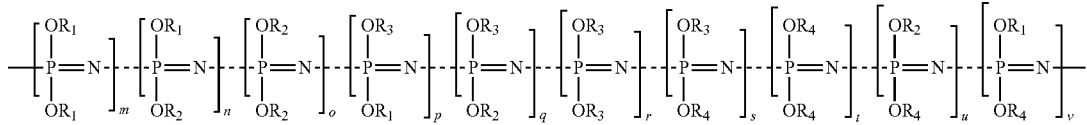

PolyPZ-74d  $R_1 = $ —CH$_2$CF$_3$,  $R_2 = $ —(CH$_2$)$_2$N$^+$H$_2$[N(NO$_2^-$)$_2$]CH$_2$CH$_3$,  $R_3 = $ —(CH$_2$)$_2$NHCH$_2$CH$_3$
$s = t = u = v = 0$
PolyPZ-74n  $R_1 = $ —CH$_2$CF$_3$,  $R_2 = $ —(CH$_2$)$_2$N$^+$H$_2$(NO$_3^-$)CH$_2$CH$_3$,  $R_3 = $ —(CH$_2$)$_2$NHCH$_2$CH$_3$
$s = t = u = v = 0$

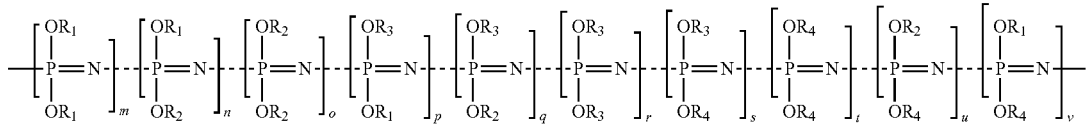

PolyPZ-75d  $R_1 = $ —CH$_2$CF$_3$,  $R_2 = $ —(CH$_2$)$_2$N$^+$H$_2$[N(NO$_2^-$)$_2$](CH$_2$)$_2$CH$_3$,  $R_3 = $ —(CH$_2$)$_2$NH(CH$_2$)$_2$CH$_3$
$s = t = u = v = 0$
PolyPZ-75n  $R_1 = $ —CH$_2$CF$_3$  $R_2 = $ —(CH$_2$)$_2$N$^+$H$_2$(NO$_3^-$)(CH$_2$)$_2$CH$_3$,  $R_3 = $ —(CH$_2$)$_2$NH(CH$_2$)$_2$CH$_3$
$s = t = u = v = 0$

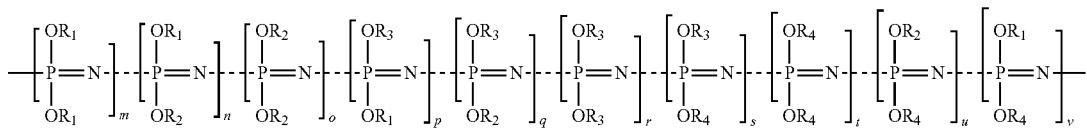

PolyPZ-76d  $R_1 = $ —CH$_2$CF$_3$,  $R_2 = $ —(CH$_2$)$_2$N$^+$H$_2$[N(NO$_2^-$)$_2$](CH$_2$)$_3$CH$_3$  $R_3 = $ —(CH$_2$)$_2$NH(CH$_2$)$_3$CH$_3$,
$s = t = u = v = 0$
PolyPZ-76n  $R_1 = $ —CH$_2$CF$_3$,  $R_2 = $ —(CH$_2$)$_2$N$^+$H$_2$(NO$_3^-$)(CH$_2$)$_3$CH$_3$,  $R_3 = $ —(CH$_2$)$_2$NH(CH$_2$)$_3$CH$_3$,
$s = t = u = v = 0$

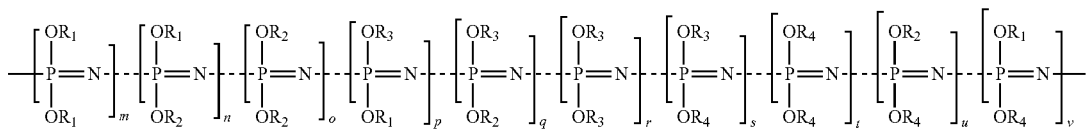

PolyPZ-77d  $R_1 = $ —CH$_2$CF$_3$,  $R_2 = $ —(CH$_2$)$_3$N$^+$H$_3$[N(NO$_2^-$)$_2$]  $R_3 = $ —(CH$_2$)$_3$NH$_2$,
$s = t = u = v = 0$
PolyPZ-77n  $R_1 = $ —CH$_2$CF$_3$,  $R_2 = $ —(CH$_2$)$_3$N$^+$H$_3$(NO$_3^-$)  $R_3 = $ —(CH$_2$)$_3$NH$_2$,
$s = t = u = v = 0$

-continued

Structure, Designation and Name

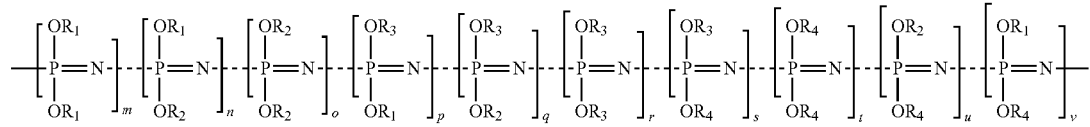

PolyPZ-78d  $R_1 =$ —$CH_2CF_3$,  $R_2 =$ —$(CH_2)_2\overset{+}{N}H_2[N(NO_2^-)_2]CH_3$,  $R_3 = (CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\quad |$
$\qquad\qquad\qquad\qquad\qquad\qquad\qquad\qquad\qquad\qquad\qquad\qquad\qquad\qquad\qquad\qquad\qquad\,CH_3$ $s = t = u = v = 0$ PolyPZ-78n  $R_1 =$ —$CH_2CF_3$,  $R_2 =$ —$(CH_2)_2\overset{+}{N}H_2(NO_3^-)CH_3$,  $R_3 = (CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\quad |$
$\qquad\qquad\qquad\qquad\qquad\qquad\qquad\qquad\qquad\qquad\qquad\qquad\qquad\qquad\qquad\qquad\qquad\,CH_3$ $s = t = u = v = 0$

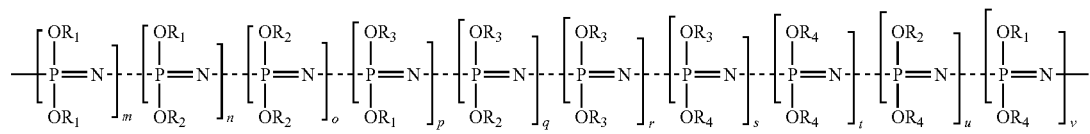

PolyPZ-79d  $R_1 =$ —$CH_2CF_3$,  $R_2 =$ —$(CH_2)_2\overset{+}{N}H_2[N(NO_2^-)_2]CH_2CH_3$,  $R_3 =$ —$(CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\qquad\qquad\qquad\qquad\qquad\qquad\,C_2H_5$ $s = t = u = v = 0$ PolyPZ-79n  $R_1 =$ —$CH_2CF_3$,  $R_2 =$ —$(CH_2)_2\overset{+}{N}H_2(NO_3^-)CH_2CH_3$,  $R_3 =$ —$(CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\qquad\qquad\qquad\qquad\qquad\qquad\,C_2H_5$ $s = t = u = v = 0$

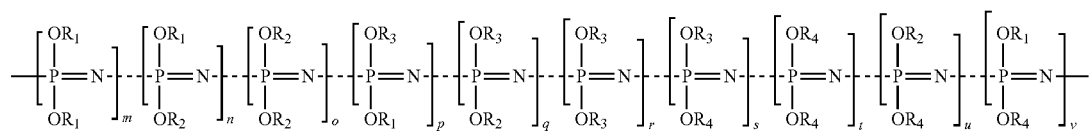

PolyPZ-80d  $R_1 =$ —$CH_2CF_3$,  $R_2 =$ —$(CH_2)_2\overset{+}{N}H_2[N(NO_2^-)_2](CH_2)_2CH_3$,  $R_3 =$ —$(CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\qquad\qquad\qquad\qquad\qquad\qquad\qquad\,C_3H_7$ $s = t = u = v = 0$ PolyPZ-80n  $R_1 =$ —$CH_2CF_3$   $R_2 =$ —$(CH_2)_2\overset{+}{N}H_2(NO_3^-)(CH_2)_2CH_3$,  $R_3 =$ —$(CH_2)_2NC(O)O(CH_2)_2OH$
$\qquad\qquad\qquad\qquad\qquad\qquad\qquad\qquad\qquad\qquad\qquad\qquad\qquad\qquad\qquad\qquad\qquad\qquad\qquad\qquad |$
$\qquad\qquad\qquad\qquad\qquad\qquad\qquad\qquad\qquad\qquad\qquad\qquad\qquad\qquad\qquad\qquad\qquad\qquad\qquad\,C_3H_7$ $s = t = u = v = 0$ -continued

| Structure, Designation and Name |
|---|

$$\left[\begin{array}{c}OR_1\\|\\P=N\\|\\OR_1\end{array}\right]_m \left[\begin{array}{c}OR_1\\|\\P=N\\|\\OR_2\end{array}\right]_n \left[\begin{array}{c}OR_2\\|\\P=N\\|\\OR_2\end{array}\right]_o \left[\begin{array}{c}OR_3\\|\\P=N\\|\\OR_1\end{array}\right]_p \left[\begin{array}{c}OR_3\\|\\P=N\\|\\OR_2\end{array}\right]_q \left[\begin{array}{c}OR_3\\|\\P=N\\|\\OR_3\end{array}\right]_r \left[\begin{array}{c}OR_3\\|\\P=N\\|\\OR_4\end{array}\right]_s \left[\begin{array}{c}OR_4\\|\\P=N\\|\\OR_4\end{array}\right]_t \left[\begin{array}{c}OR_2\\|\\P=N\\|\\OR_4\end{array}\right]_u \left[\begin{array}{c}OR_1\\|\\P=N\\|\\OR_4\end{array}\right]_v$$

PolyPZ-81d  $R_1 = $ —CH$_2$CF$_3$,  $R_2 = $ —(CH$_2$)$_2\overset{+}{\text{N}}$H$_2$[N(NO$_2^-$)$_2$](CH$_2$)$_3$CH$_3$,  $R_3 = $ —(CH$_2$)$_2$NC(O)O(CH$_2$)$_2$OH
                                                                                                                            |
                                                                                                                          C$_4$H$_9$ $s = t = u = v = 0$ PolyPZ-81n  $R_1 = $ —CH$_2$CF$_3$,  $R_2 = $ —(CH$_2$)$_2\overset{+}{\text{N}}$H$_2$(NO$_3^-$)(CH$_2$)$_3$CH$_3$,  $R_3 = $ —(CH$_2$)$_2$NC(O)O(CH$_2$)$_2$OH
                                                                                                                        |
                                                                                                                      C$_4$H$_9$ $s = t = u = v = 0$

The invention claimed is:

1. A substituted poly(phosphazene) compound comprising a combination of units having one or more of the structures (i) to (iii), (i)
$$\begin{array}{c}\phantom{xx}O^{R_1}\\\phantom{xx}|\\----P=N----\\\phantom{xx}|\\\phantom{xx}O_{\diagdown R_1}\end{array}$$

(ii)
$$\begin{array}{c}\phantom{xx}O^{R_1}\\\phantom{xx}|\\----P=N----\\\phantom{xx}|\\\phantom{xx}O_{\diagdown R_2}\end{array}$$

(iii)
$$\begin{array}{c}\phantom{xx}O^{R_2}\\\phantom{xx}|\\----P=N----\\\phantom{xx}|\\\phantom{xx}O_{\diagdown R_2}\end{array}$$

wherein:
the combination comprises one or both of the structures (i) or (ii);
each $R_1$ is independently an optionally substituted alkyl- or alkyl ether-based side chain containing an isocyanate-reactive moiety, an epoxide-reactive moiety, an amine-reactive moiety, a supramolecular noncovalent bonding moiety comprising at least two hydrogen bond donation sites and at least two hydrogen bond acceptance sites or being an electrostatic bonding moiety capable of establishing electrostatic bonds with one or more partner moieties, or combinations thereof,
at least one $R_1$ comprises a side chain containing an amine-reactive moiety comprising epoxy, isocyanate, aldehyde, carboxy, or combinations thereof; or a side chain containing an epoxide-reactive moiety comprising amino, phenol, hydroxyl, thiol or carboxy or combinations thereof; or a side chain containing an isocyanate-reactive moiety comprising hydroxyl, thiol, primary amino, secondary amino, carboxy, enamino, imino, ammonium compound, or combinations thereof, and
each $R_2$ is independently an optionally substituted alkyl- or alkyl ether-based side chain containing nitramine, nitrate ester, azide, an ammonium compound moiety with energetic counter-ion, or combinations thereof.

2. The compound of claim 1 wherein the hydrogen bonding moiety is self-complementary, such that it is capable of establishing hydrogen bonds with one or more partner moieties of the same structure.

3. The compound of claim 1 wherein at least one $R_1$ comprises a side chain of Formula I or Formula II:

Formula I $$-R_{10}\diagdown \underset{H}{N}\diagdown \underset{\parallel}{\underset{O}{C}}\diagdown \underset{H}{N}\diagdown \underset{}{\underset{N}{\diagup}}\diagdown \underset{}{\underset{O}{\diagup}}\phantom{x}\begin{array}{c}R_{11}\\N\end{array}$$

Formula II $$-R_{10}\diagdown \underset{H}{N}\diagdown \underset{\parallel}{\underset{O}{C}}\diagdown \underset{H}{N}\diagdown \underset{}{\underset{N}{\diagup}}\phantom{x}\begin{array}{c}R_{12}\\\phantom{x}\\R_{13}\\\phantom{x}\\O\end{array}$$

wherein:
each $R_{10}$ is independently selected from optionally substituted alkyl, alkyl ether, alkenyl or aryl based bridging groups;
each $R_{11}$ is independently selected from the group containing: optionally substituted alkyl, alkyl ether, alkenyl alkoxy, aryl, cyclic or heterocyclic, and UV active chromophores; and
each $R_{12}$ and $R_{13}$ is independently hydrogen or a side chain being a linear, cyclic or branched alkyl group comprising 1 to 7 carbon atoms.

4. The compound of claim 1 wherein at least one $R_1$ comprises $C_{1-9}$(alkyl)CH$_2$NH$_2$; $C_{1-9}$(alkyl)CH(OH)CH$_2$OH; $C_{1-9}$(alkyl)CH$_2$NHCOO(CH$_2$)$_2$OH; alkyl or alkyl ether based ammonium side chain with a tri- or tetrazonolate counter ion; alkyl or alkyl ether based ammonium compound side chain of general Formula III

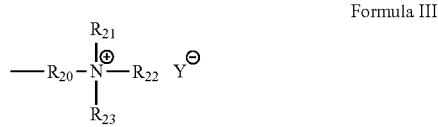

Formula III wherein: $R_{20}$ is an optionally substituted $C_{1-9}$ alkyl or alkyl ether bridging group; each $R_{21}$, $R_{22}$ and $R_{23}$ is independently hydrogen or optionally substituted $C_{1-5}$ alkyl or alkyl ether; and Y is an energetic counter ion; or combinations thereof.

5. The compound of claim 1 wherein at least one $R_2$ comprises one or more of: $C_{1-18}(alkyl)CH(ONO_2)CH_2(ONO_2)$; $C_{1-18}(alkyl)CH(N_3)CH_2(N_3)$; $C_{1-18}(alkyl)CH_2(N_3)$; $C_{1-19}(alkyl)CH_2(ONO_2)$; and an alkyl or alkyl ether based ammonium compound side chain of general Formula III

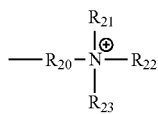

wherein: $R_{20}$ is an optionally substituted $C_{1-9}$ alkyl or alkyl ether bridging group; each $R_{21}$, $R_{22}$ and $R_{23}$ is independently hydrogen or optionally substituted $C_{1-5}$ alkyl or alkyl ether; and Y is an energetic counter ion selected from dinitramide, nitrate, tri- or tetrazolonates, or picrates, hydrazino-nitroethenates; or combinations thereof.

6. The compound of claim 1 further comprising one or more units having one or more of the structures (iv) to (vi)

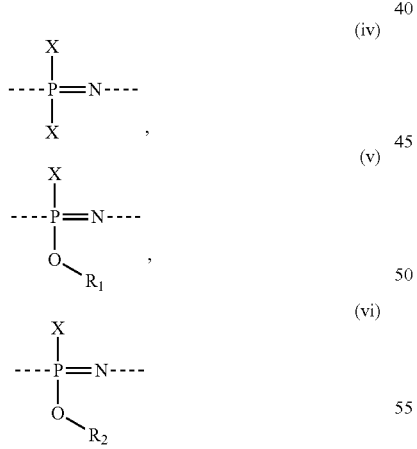

wherein $R_1$ and $R_2$ are as above; and each X is independently selected from $C_{1-20}$ fluoroalkoxy or fluoroalkoxy ether.

7. The compound of claim 1 consisting substantially of units of structures (i) to (iii) and optionally of structures (iv) to (vi).

8. The compound of claim 1 comprising one or more units with a chromophore attached thereto.

9. The compound of claim 1 comprising at least 50% side chains containing $R_2$.

10. A cross-linked polyphosphazene product, optionally foamed, comprising the reaction product of a compound according to claim 1 with a cross-linking agent.

11. A method of using a compound of claim 1, comprising including the compound as energetic binder/co-binder/ingredient in explosives, pyrotechnic compositions or propellant compositions.

12. The method of claim 11 wherein the compound is in a form of a foamed reaction product of an isocyanate with PZ-23[P-(2,2,2-trifluoroethan-1-oxy/5,6-dinitratohexan-1-oxy/4-aza-5-oxo-6-oxa-8-hydroxyoctan-1-oxy)polyphosphazene] and the product is used in or as a fuse or as a stab-sensitive foam.

13. A method for the synthesis of a poly(phosphazene) compound of claim 1, the method comprising:
providing a substitutable poly(phosphazene) backbone;
attaching a pendant group —O—$R_1$, or a precursor thereof, to the backbone via nucleophilic substitution with an alkoxide;
attaching a pendant group —O—$R_2$, or a precursor thereof, to the backbone via nucleophilic substitution with an alkoxide; and
converting at least part of any precursor into the relevant pendant group, wherein $R_1$ and $R_2$ are as defined in the compound.

14. The method of claim 13,
comprising the sequential steps of:
attaching a nitratable precursor group of —O—$R_2$ to the backbone;
attaching an aminoalkoxy group to the backbone;
nitrating to convert the precursor group to a nitratoalkoxy group, forming —O—$R_2$, and to convert the aminoalkoxy group into an ammonium nitrate alkoxy group; and,
optionally further reacting the ammonium nitrate alkoxy group to form —O—$R_1$;
or comprising the sequential steps of:
attaching a hydroxyalkoxy or hydroxyalkoxy precursor group and an aminoalkoxy group to the backbone in a one pot synthesis;
nitrating the groups to form a nitroalkoxy group forming —O—$R_2$ and an ammonium nitrate alkoxy group; and,
optionally further reacting the ammonium nitrate alkoxy group to form —O—$R_1$;
or comprising the sequential steps of:
attaching a nitratable precursor group to the backbone;
nitrating the precursor group to form a nitratoalkoxy group —O—$R_2$; and,
partially denitrating the nitrated precursor group to form an isocyanate-reactive —O—$R_1$.

* * * * *